US012710788B2

(12) United States Patent
Bartscherer et al.

(10) Patent No.: US 12,710,788 B2
(45) Date of Patent: Aug. 18, 2026

(54) LID CONTROLLER HUB

(71) Applicant: Intel Corporation, Santa Clara, CA (US)

(72) Inventors: Marko Bartscherer, Cornelius, OR (US); Aleksander Magi, Portland, OR (US); Paul S. Diefenbaugh, Portland, OR (US); Prashant Dewan, Portland, OR (US); Kristoffer Fleming, Chandler, AZ (US); Kathy Bui, Hillsboro, OR (US); Russell Beauregard, Portland, OR (US); Abin Thomas, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 17/247,836

(22) Filed: Dec. 24, 2020

(65) Prior Publication Data

US 2021/0149441 A1 May 20, 2021

Related U.S. Application Data

(60) Provisional application No. 63/067,071, filed on Aug. 18, 2020.

(51) Int. Cl.

*G06F 1/16* (2006.01)
*G06F 1/3231* (2019.01)
*G06F 21/32* (2013.01)

(52) U.S. Cl.

CPC .......... *G06F 1/1605* (2013.01); *G06F 1/1616* (2013.01); *G06F 1/1643* (2013.01);

(Continued)

(58) Field of Classification Search

CPC .... G06F 1/1605; G06F 1/1616; G06F 1/1643; G06F 1/1686; G06F 1/3231; G06F 21/32

See application file for complete search history.

(56) References Cited

U.S. PATENT DOCUMENTS 8,386,800 B2 2/2013 Kocher et al.
8,681,098 B2 3/2014 Underkoffler et al.

(Continued)

FOREIGN PATENT DOCUMENTS

CN 102365616 B 5/2015
CN 105243341 A 1/2016

(Continued)

OTHER PUBLICATIONS

EPO Communication Pursuant to Article 94(3) EPC in EP Application Serial No. 21186108.3 mailed on Mar. 13, 2024, 7 pages.

(Continued)

*Primary Examiner* — Ricky Chin
(74) *Attorney, Agent, or Firm* — Alliance IP, LLC

(57) ABSTRACT

A lid controller hub (LCH) comprising processing components located in the lid of a mobile computing device, such as a laptop, processes sensor data generated by input sensors (microphones, cameras, touchscreen) and provides for improved and enhanced experiences over existing devices. For example, the LCH provides hardened privacy and the synchronization of touch display activities with the display refresh rate, the latter providing for a smoother and more responsive touch experience over existing designs. The LCH comprises neural network accelerators and digital signal processors that enable waking a device upon detection of an authenticated user's voice or face. The LCH also allows for video- and audio-based contextual awareness and adaptive cooling. By enabling a reduced hinge wire count and a typical day's usage with a single battery charge, an LCH can (Continued)

also provide for an improved industrial design to a simpler hinge and smaller battery.

14 Claims, 70 Drawing Sheets

(52) U.S. Cl.
CPC .......... *G06F 1/1686* (2013.01); *G06F 1/3231* (2013.01); *G06F 21/32* (2013.01)

(56) References Cited

U.S. PATENT DOCUMENTS

| | | | | |
|---|---|---|---|---|
| 8,806,235 | B2 | 8/2014 | Deakin et al. | |
| 9,035,999 | B2 | 5/2015 | Carpenter et al. | |
| 9,093,050 | B1 | 7/2015 | Orlov et al. | |
| 9,232,189 | B2 | 1/2016 | Shaburov et al. | |
| 9,323,379 | B2 | 4/2016 | Aubauer et al. | |
| 9,354,744 | B2 | 5/2016 | Johansson et al. | |
| 9,465,276 | B2 * | 10/2016 | Jonsson | G06F 1/1656 |
| 9,509,941 | B2 | 11/2016 | Harple et al. | |
| 9,699,217 | B2 | 7/2017 | Plagemann et al. | |
| 9,710,046 | B2 | 7/2017 | Woo et al. | |
| 9,727,134 | B2 | 8/2017 | Aurongzeb et al. | |
| 10,536,716 | B2 | 1/2020 | Zhao et al. | |
| 10,687,184 | B2 | 6/2020 | Silverstein et al. | |
| 11,789,565 | B2 * | 10/2023 | Parikh | G06F 1/1643 345/173 |
| 2005/0066209 | A1 | 3/2005 | Kee et al. | |
| 2006/0171569 | A1 | 8/2006 | Budagavi | |
| 2010/0079508 | A1 | 4/2010 | Hodge et al. | |
| 2011/0292997 | A1 | 12/2011 | An et al. | |
| 2012/0300380 | A1 * | 11/2012 | Lin | G06F 1/1616 361/679.09 |
| 2013/0070862 | A1 | 3/2013 | Koh et al. | |
| 2013/0267794 | A1 * | 10/2013 | Fernstrom | A61B 5/6802 600/595 |
| 2014/0123208 | A1 | 5/2014 | Plagemann et al. | |
| 2014/0344889 | A1 | 11/2014 | Lee et al. | |
| 2015/0181168 | A1 | 6/2015 | Pahalawatta et al. | |
| 2015/0215535 | A1 | 7/2015 | Takahashi | |
| 2015/0248566 | A1 * | 9/2015 | Scott-Nash | G06F 21/6254 726/26 |
| 2016/0241884 | A1 | 8/2016 | Messing | |
| 2016/0330469 | A1 | 11/2016 | Amer et al. | |
| 2017/0185849 | A1 * | 6/2017 | High | G06V 20/52 |
| 2017/0337493 | A1 * | 11/2017 | Paramasivan | G06Q 10/0633 |
| 2018/0059780 | A1 | 3/2018 | Mitchell et al. | |
| 2018/0165472 | A1 * | 6/2018 | Adams | G06F 21/83 |
| 2019/0073747 | A1 | 3/2019 | Burch et al. | |
| 2020/0020493 | A1 * | 1/2020 | Weaver | G06F 1/1686 |
| 2020/0036886 | A1 * | 1/2020 | Kim | G05D 1/101 |
| 2020/0090662 | A1 | 3/2020 | Castro et al. | |
| 2020/0112587 | A1 * | 4/2020 | Jakubowski | H04L 63/0428 |
| 2020/0133374 | A1 | 4/2020 | Sinha et al. | |
| 2020/0159305 | A1 * | 5/2020 | Bartscherer | G06F 1/3215 |
| 2020/0196141 | A1 * | 6/2020 | Baker | H04W 12/02 |
| 2020/0371734 | A1 * | 11/2020 | Kawano | G06F 3/0416 |
| 2021/0127062 | A1 * | 4/2021 | Kuehnle | H04N 7/183 |
| 2021/0149441 | A1 * | 5/2021 | Bartscherer | G06F 1/1616 |
| 2021/0370879 | A1 * | 12/2021 | Julian | G06V 40/166 |

FOREIGN PATENT DOCUMENTS

| | | | | |
|---|---|---|---|---|
| CN | 105825490 | A | 8/2016 | |
| CN | 105917350 | A | 8/2016 | |
| CN | 107808104 | A | 3/2018 | |
| CN | 108259809 | A | 7/2018 | |
| CN | 109690635 | A * | 4/2019 | G01C 22/00 |
| CN | 110502153 | A | 11/2019 | |
| CN | 105898180 | B | 3/2020 | |
| EP | 3333753 | A1 | 6/2018 | |
| JP | 2001350549 | A | 12/2001 | |
| JP | 2009124578 | A | 6/2009 | |
| KR | 101760092 | B1 | 7/2017 | |
| WO | WO-2018039646 | A1 * | 3/2018 | B60R 11/04 |
| WO | WO-2020101663 | A1 * | 5/2020 | G01N 21/251 |
| WO | 2020125631 | A1 | 6/2020 | |

OTHER PUBLICATIONS

"HP Sure View," Technical White Paper, HP Development Company, LP; Nov. 2016 (5 pgs.).

"Password-less protection," Microsoft, copyright 2018, retrieved on Dec. 6, 2020 from https://query.prod.cms.rt.microsoft.com/cms/api/am/binary/RE2KEup (24 pgs.).

3M Privacy & Screen Protectors; 3M Products: as accessed Jan. 27, 2021 at "https://www.3m.com/3M/en_US/company-us/all-3m-products/~/All-3MProducts/Privacy-Screen-Protectors/?N=5002385+8710873+8711017+3294857497&rt=r3" (8 pgs.).

Dai et al., "Perception Optimized Signal Scaling for OLED Power Saving," SID Digest vol. 45, Issue 1 (Book 2, Session 50 pp. 732-735); Jul. 14, 2017, San Diego, CA. (4 pgs.).

Davenport, Corbin; "The Linux-based PinePhone is the most interesting smartphone I've tried in years," Android Police, Aug. 13, 2020. (10 pgs.).

Dostal, et al. "Subtle Gaze-Dependent Techniques for Visualising Display Changes in Multi-Display Environments," IUI'13, Mar. 19-22, 2013, Santa Monica, CA. (11 pgs.).

Google Nest Help, "FAQs on camera states and controls: Google Nest Hub Max," 2019; retrieved Jan. 27, 2020 at https://support.google.com/googlenest/answer/9449280?hl=en (2 pgs.).

Jordan, Jeremy; "An overview of semantic image segmentation," retrieved Nov. 20, 2020 from https://www.jeremyjordan.me/semantic-segmentation/ (29 pgs.).

Lyons, Kim; "Google to add background blur, captioning, and low-light mode to Meet video calls," The Verge, Jun. 27, 2020, retrieved Jan. 27, 2020 from https://www.theverge.com/2020/6/27/21305434/google-meet-background-blur-captioning-video-microsoft-teams-zoom (2 pgs.).

M. Budagavi, "Video compression using blur compensation," IEEE International Conference on Image Processing 2005, Genova, Italy, 2005, pp. II-882, doi: 10.1109/ICIP.2005.1530197. (4 pgs.).

Microsoft Support, "Change your background for a Teams meeting," retrieved on Dec. 6, 2020 from https://support.microsoft.com/en-us/office/change-your-background-for-a-teams-meeting-f77a2381-443a-499d-825e-509a140f4780 (3 pgs.).

Nopanen, Vesa; "Take Advantage of Background Blue in Teams Meetings," Wordpress.com, Oct. 2, 2018. (5 pgs.).

Perumal et al., "Disabling Camera Features in a Mobile Phone in Restricted Zones," Indian Journal of Science and Technology, vol. 9(33), DOI: 10.17485/ijst/2016/v9i33/99608, Aug. 2016 (6 pgs.).

PureSight Online Child Safety, "Web Filtering;" PureSight Technologies, Ltd., as accessed Dec. 7, 2020 at https://www.puresight.com/Features/web-filtering.html (4 pgs.).

Qualcomm Mobile Security, 2017; retrieved Jan. 27, 2020 at https://www.qualcomm.com/products/features/mobile-security (5 pgs.).

Redmond, Tony, "How to use Background Blur in Microsoft Teams," Sep. 25, 2018, retrieved from https://office365itpros.com/2018/09/25/background-blur-teams-meetings/ (12 pgs.).

Song et al., "In-air gestures around unmodified mobile devices;" UIST '14: Proceedings of the 27th annual ACM symposium on User interface software and technology; Oct. 2014, pp. 319-329 (11 pgs.).

Spycam Lizard, "Can a webcam's light be turned off?" Lizard Ware, as accessed Dec. 7, 2020 at www.spycamlizard.com/index.php?Page=Can-the-webcam-light-be-turned-off (2 pgs.).

ThinkShutter, from ThinkWiki; Jan. 4, 2020, as accessed Dec. 7, 2020 at https://www.thinkwiki.org/wiki/ThinkShutter (1 pgs.).

Wikipedia, "Intel Display Power Saving Technology," Apr. 6, 2020, retrieved on Dec. 6, 2020 from https://en.wikipedia.org/wiki/Intel_Display_Power_Saving_Technology (1 pg.).

PCT International Search Report and Written Opinion issued in PCT/US2021/045736, dated Dec. 2, 2021; 10 pages.

EPO; Office Action issued in EP Patent Application No. 21185902.0, dated Jul. 7, 2023; 8 pages

(56) References Cited

OTHER PUBLICATIONS

EPO; Extended European Search Report issued in EP Patent Application No. 21186108.3, dated Jan. 4, 2022; 9 pages.
Taiwan Office Action received in Application No. 110130140, dated Aug. 4, 2025, with Statement of Relevance, 21 pages.
Taiwan Office Action received in Application No. 110130140, dated Feb. 6, 2026, with English translation, 12 pages.

* cited by examiner

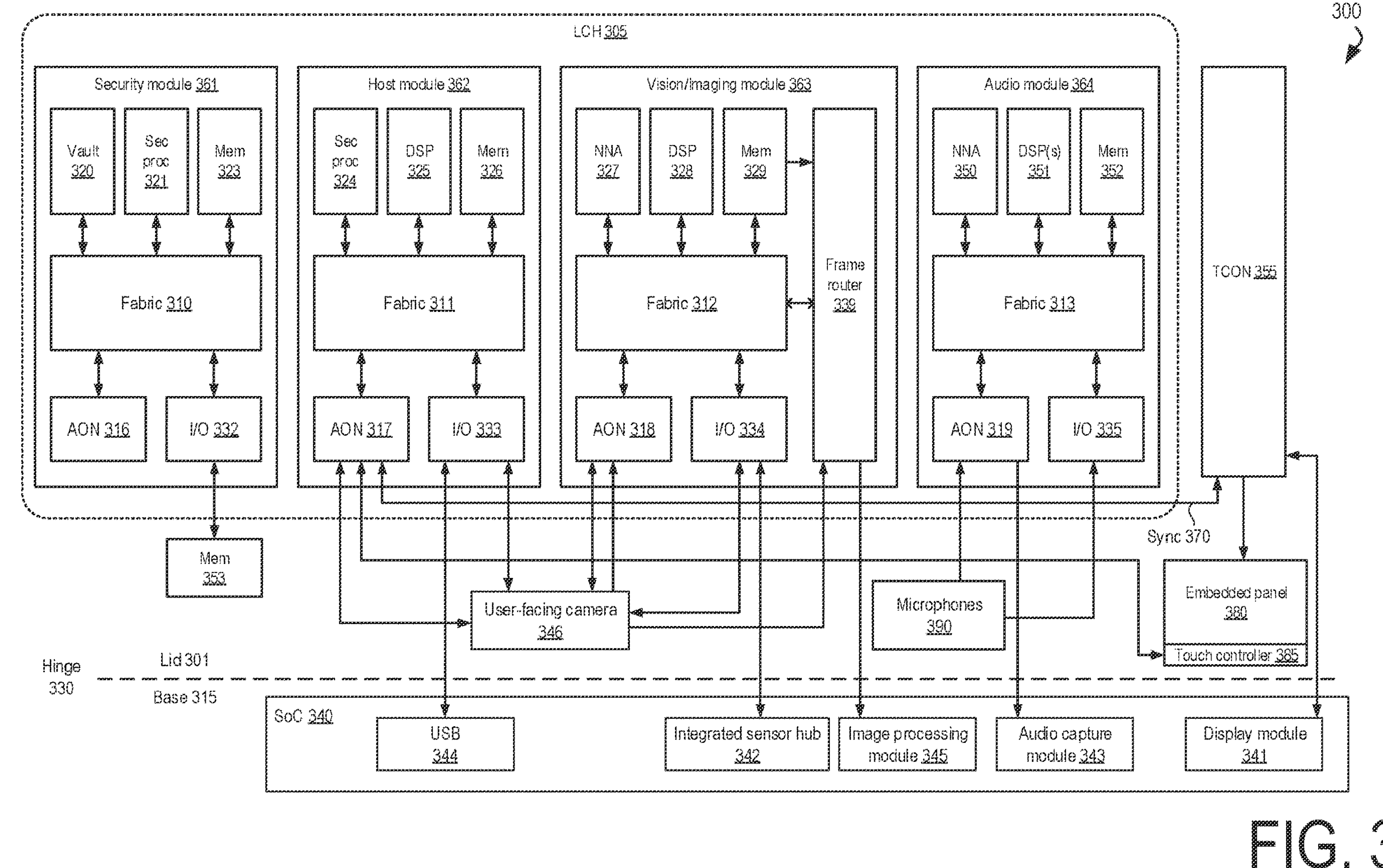
300
LCH 305
Security module 361
Vault 320
Sec proc 321
Mem 323
Fabric 310
AON 316
I/O 332
Host module 362
Sec proc 324
DSP 325
Mem 326
Fabric 311
AON 317
I/O 333
Vision/imaging module 363
NNA 327
DSP 328
Mem 329
Frame router 339
Fabric 312
AON 318
I/O 334
Audio module 364
NNA 350
DSP(s) 351
Mem 352
Fabric 313
AON 319
I/O 335
TCON 355
Sync 370
Mem 353
User-facing camera 346
Microphones 390
Embedded panel 380
Touch controller 385
Hinge 330
Lid 301
Base 315
SoC 340
USB 344
Integrated sensor hub 342
Image processing module 345
Audio capture module 343
Display module 341
FIG. 3

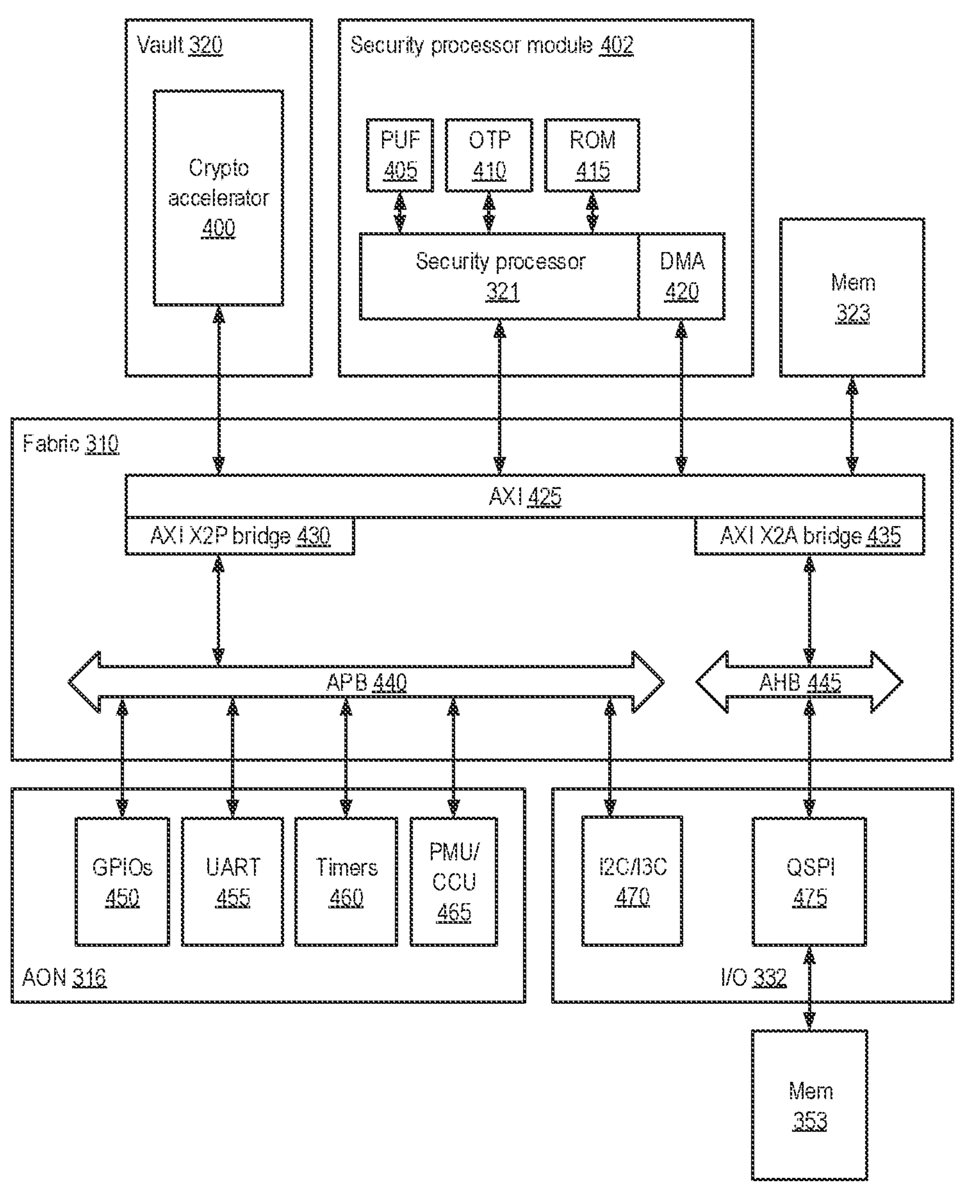
FIG. 4

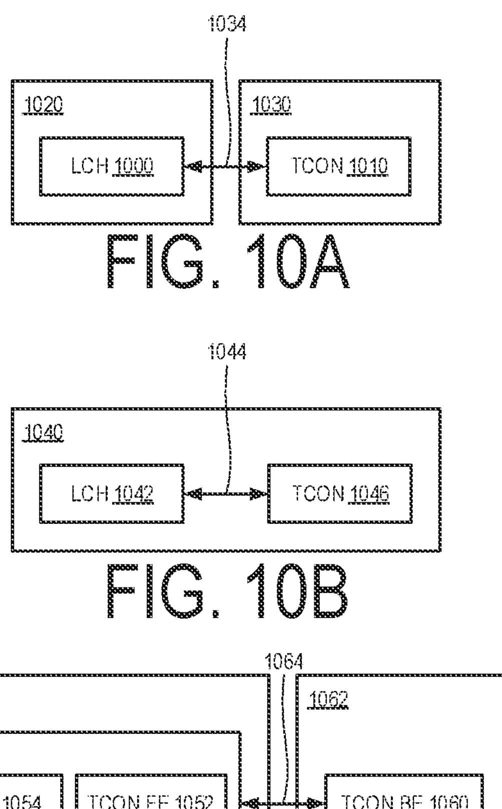
FIG. 10A
FIG. 10B
FIG. 10C
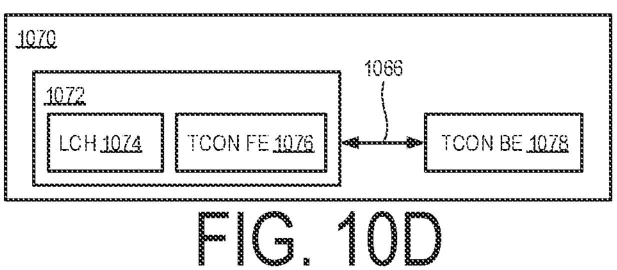
FIG. 10D
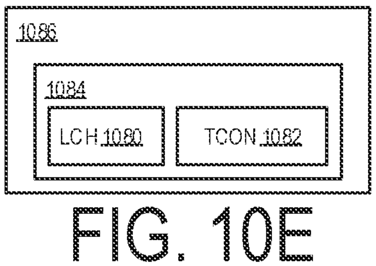
FIG. 10E

1100

| Signals | Data | Power | Total | Comments |
|---|---|---|---|---|
| Display | 19 | 16 | 35 | eDP x4 HBR2, 6 OEM signals |
| Image | 6 | 8 | 14 | 1 MP camera |
| Touch | 4 | 2 | 6 | I2C |
| Audio & Sensing | 8 | 2 | 10 | DMIC, I2C, INT |
| LCH | 7 | 0 | 7 | USB, QSPI |
| **Total wires** | **44** | **28** | **72** | |

FIG. 11A

1110

| Wires | Data | Power | Total | Comments |
|---|---|---|---|---|
| Display | 14 | 4 | 18 | eDP x2 HBR2, 6 OEM signals, lid power |
| Image | 6 | 0 | 6 | 1 MP camera |
| Touch | 4 | 0 | 4 | I2C |
| Audio & Sensing | 8 | 0 | 8 | DMIC, I2C, INT |
| LCH | 3 | 0 | 3 | USB, QSPI |
| **Total wires** | **35** | **4** | **39** | |

FIG. 11B

1120

| Wires | Data | Power | Total | Comments |
|---|---|---|---|---|
| Display | 8 | 4 | 12 | eDP x2 HBR2, lid power |
| Image | 8 | 0 | 8 | Dual cameras - RGB 2MP, IR |
| Touch | 0 | 0 | 0 | Touch over USB |
| Audio & Sensing | 4 | 0 | 4 | Soundwire |
| LCH | 5 | 0 | 5 | USB |
| **Total wires** | **25** | **4** | **29** | |

1350
1394
1365
1366
1367
CATHODE
1370
1371
1372
ELECTRON INJECTION LAYER
1375
1376
1377
ELECTRON TRANSPORT LAYER
1360
1361
1362
ORGANIC LIGHT-EMITTING LAYER
1390
1391
1392
HOLE TRANSPORT LAYER
1385
1386
1387
HOLE INJECTION LAYER
1380
1381
1382
ANODE
1398
1355
1396

1501
1502
1503
A
A'
1511
1512
1513
1520
1521
1504
1505
1506
1515
1507
1525
1508
1509
1526
1510
1550
1574
1575
1570
1580
1530
1560

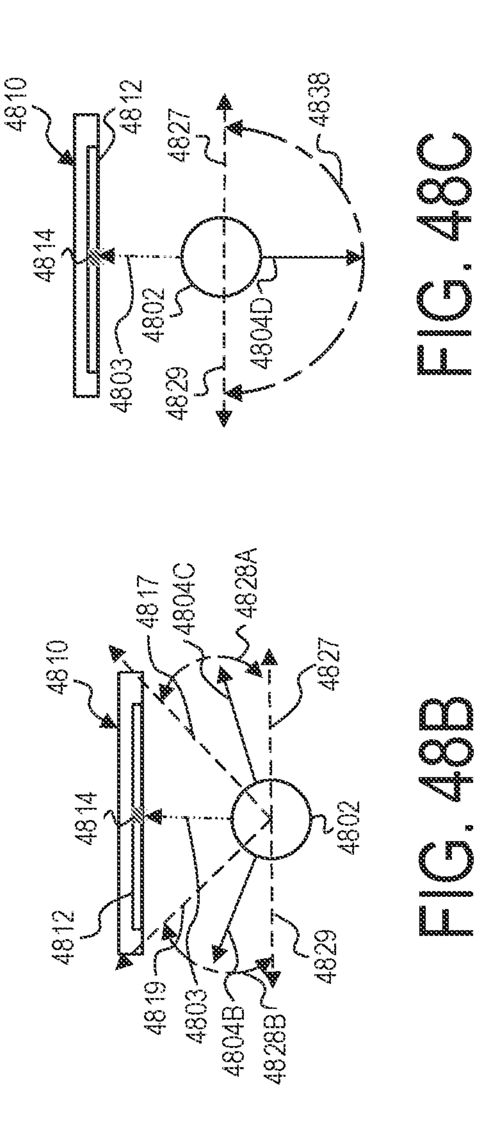
FIG. 48C
FIG. 48B
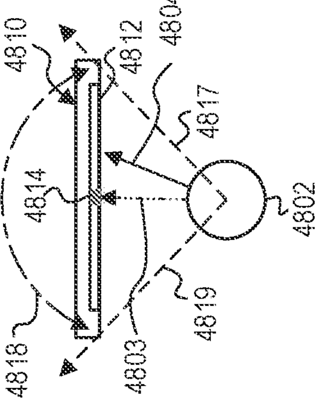
FIG. 48A 4900
4905
4910
4912
4914
4906
4904A
4902
4920
4922
4924

4904B 5000
5032
5034
5030
5022
5024
5020
5002
5004B
5012
5010
5014
5005
5006

5000
5032
5034
5030
5022
5024
5020
5002
5012
5010
5014
5005
5004A
5006

5032
5034
5030
5004C
5002
5022
5024
5020
5000
5012
5010
5014
5005
5006

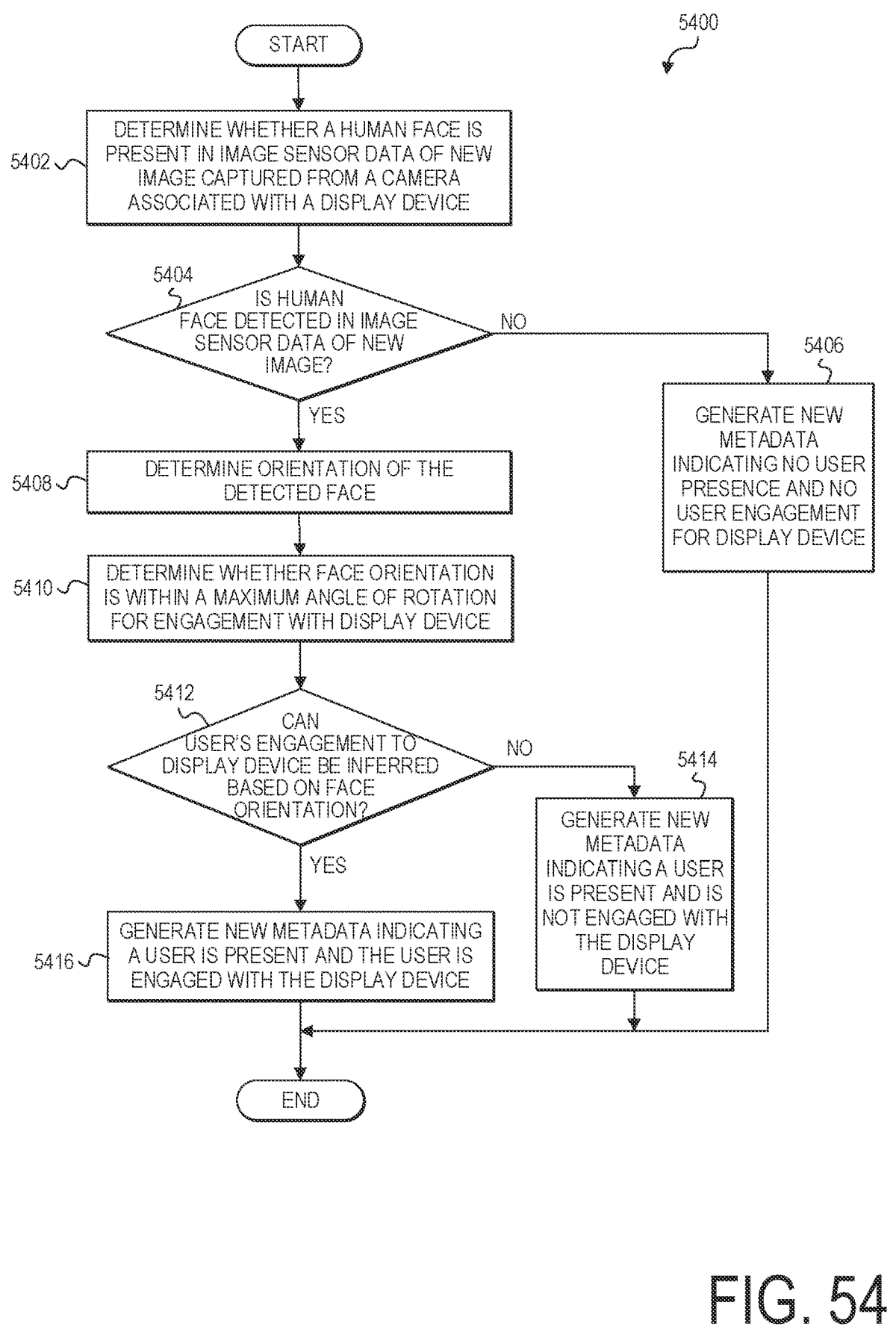

5400

START

5402 DETERMINE WHETHER A HUMAN FACE IS PRESENT IN IMAGE SENSOR DATA OF NEW IMAGE CAPTURED FROM A CAMERA ASSOCIATED WITH A DISPLAY DEVICE

5404 IS HUMAN FACE DETECTED IN IMAGE SENSOR DATA OF NEW IMAGE?

NO → 5406 GENERATE NEW METADATA INDICATING NO USER PRESENCE AND NO USER ENGAGEMENT FOR DISPLAY DEVICE

YES

5408 DETERMINE ORIENTATION OF THE DETECTED FACE

5410 DETERMINE WHETHER FACE ORIENTATION IS WITHIN A MAXIMUM ANGLE OF ROTATION FOR ENGAGEMENT WITH DISPLAY DEVICE

5412 CAN USER'S ENGAGEMENT TO DISPLAY DEVICE BE INFERRED BASED ON FACE ORIENTATION?

NO → 5414 GENERATE NEW METADATA INDICATING A USER IS PRESENT AND IS NOT ENGAGED WITH THE DISPLAY DEVICE

YES

5416 GENERATE NEW METADATA INDICATING A USER IS PRESENT AND THE USER IS ENGAGED WITH THE DISPLAY DEVICE

END

FIG. 54

Input image

Dimmed Enhanced image 6618
6619
6622
6624
6600
6614

6618
6620
6619

6612

6638
6639
6642
6644
6630
6634

6638
6640
6639

6632

6658
6662
6664
6650
6654

6658
6660

6652

6682
6684
6690
6670
6674

6686
6676

6688
6676
6682
6672

LID CONTROLLER HUB

CROSS-REFERENCES TO RELATED APPLICATIONS

This application claims priority to, and the benefit of, U.S. Provisional Application No. 63/067,071, filed Aug. 18, 2020, and titled, "Lid Controller Hub Architecture for Improved Touch Experiences," which is incorporated herein by reference in its entirety.

BACKGROUND

Existing laptops comprise various input sensors in the lid, such as microphones, cameras, and a touchscreen. The sensor data generated by these lid sensors are delivered by wires that travel across a hinge to the base of the laptop where they are processed by the laptop's computing resources and made accessible to the operating system and applications.

BRIEF DESCRIPTION OF THE DRAWINGS

FIG. 3 illustrates a block diagram of a fourth example mobile computing device comprising a lid controller hub.

FIG. 4 illustrates a block diagram of the security module of the lid controller hub of FIG. 3.

FIGS. 10A-10E illustrates block diagrams of example timing controller and lid controller hub physical arrangements within a lid.

FIGS. 11A-11C show tables breaking down the hinge wire count for various lid controller hub embodiments.

FIGS. 48A-48C are top plan views illustrating possible head/face orientations of a user relative to a display device.

FIG. 54 is a simplified flowchart of an example process that may be associated with detecting user presence according to at least one embodiment.

DETAILED DESCRIPTION

Figures 1A, 1B:
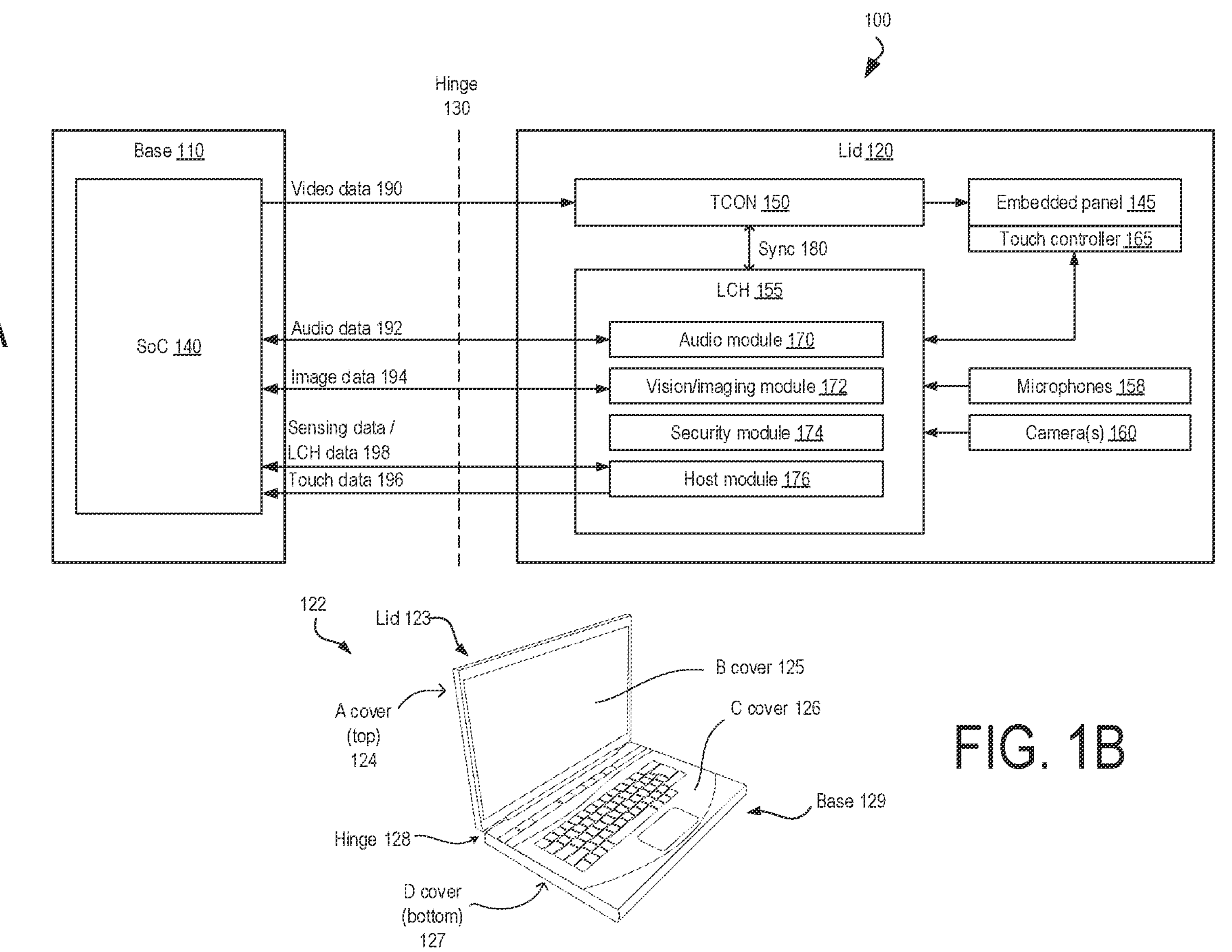
FIG. 1A illustrates a block diagram of a first example computing device comprising a lid controller hub.
FIG. 1B illustrates a perspective view of a second example mobile computing device comprising a lid controller hub.

Lid controller hubs are disclosed herein that perform a variety of computing tasks in the lid of a laptop or computing devices with a similar form factor. A lid controller hub can process sensor data generated by microphones, a touchscreen, cameras, and other sensors located in a lid. A lid controller hub allows for laptops with improved and expanded user experiences, increased privacy and security, lower power consumption, and improved industrial design over existing devices. For example, a lid controller hub allows the sampling and processing of touch sensor data to be synchronized with a display's refresh rate, which can result in a smooth and responsive touch experience. The continual monitoring and processing of image and audio sensor data captured by cameras and microphones in the lid allow a laptop to wake when an authorized user's voice or face is detected. The lid controller hub provides enhanced security by operating in a trusted execution environment. Only properly authenticated firmware is allowed to operate in the lid controller hub, meaning that no unwanted applications can access lid-based microphones and cameras and that image and audio sensor data processed by the lid controller hub to support lid controller hub features stay local to the lid controller hub.

Enhanced and improved experiences are enabled by the lid controller hub's computing resources. For example, neural network accelerators within the lid controller hub can blur displays or faces in the background of a video call or filter out the sound of a dog barking in the background of an audio call. Further, power savings are realized through the use of various techniques such as enabling sensors only when they are likely to be in use, such as sampling touch display input at a typical sampling rates when touch interaction is detected. Also, processing sensor data locally in the lid instead of having to send the sensor data across a hinge to have it processed by the operating system provides for latency improvements. Lid controller hubs also allow for laptop designs in which fewer wires are carried across a hinge. Not only can this reduce hinge cost, it can result in a simpler and thus more aesthetically pleasing industrial design. These and other lid controller hub features and advantages are discussed in greater detail below.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of a first example mobile computing device comprising a lid controller hub. The computing device 100 comprises a base 110 connected to a lid 120 by a hinge 130. The mobile computing device (also referred to herein as "user device") 100 can be a laptop or a mobile computing device with a similar form factor. The base 110 comprises a host system-on-a-chip (SoC) 140 that comprises one or more processor units integrated with one or more additional components, such as a memory controller, graphics processing unit (GPU), caches, an image processing module, and other components described herein. The base 110 can further comprise a physical keyboard, touchpad, battery, memory, storage, and external ports. The lid 120 comprises an embedded display panel 145, a timing controller (TCON) 150, a lid controller hub (LCH) 155, microphones 158, one or more cameras 160, and a touch controller 165. TCON 150 converts video data 190 received from the SoC 140 into signals that drive the display panel 145.

The display panel 145 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 165 drives the touchscreen technology utilized in the display panel 145 and collects touch sensor data provided by the employed touchscreen technology. The display panel 145 can comprise a touchscreen comprising one or more dedicated layers for implementing touch capabilities or 'in-cell' or 'on-cell' touchscreen technologies that do not require dedicated touchscreen layers.

The microphones 158 can comprise microphones located in the bezel of the lid or in-display microphones located in the display area, the region of the panel that displays content. The one or more cameras 160 can similarly comprise cameras located in the bezel or in-display cameras located in the display area.

LCH 155 comprises an audio module 170, a vision/imaging module 172, a security module 174, and a host module 176. The audio module 170, the vision/imaging module 172 and the host module 176 interact with lid sensors process the sensor data generated by the sensors. The audio module 170 interacts with the microphones 158 and processes audio sensor data generated by the microphones 158, the vision/imaging module 172 interacts with the one or more cameras 160 and processes image sensor data generated by the one or more cameras 160, and the host module 176 interacts with the touch controller 165 and processes touch sensor data generated by the touch controller 165. A synchronization signal 180 is shared between the timing controller (TCON) 150 and the lid controller hub (LCH) 155. The synchronization signal 180 can be used to synchronize the sampling of touch sensor data and the delivery of touch sensor data to the SoC 140 with the refresh rate of the display panel 145 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 170 processes audio sensor data generated by the microphones 158 and in some embodiments enables features such as Wake on Voice (causing the device 100 to exit from a low-power state when a voice is detected in audio sensor data), Speaker ID (causing the device 100 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 172 processes image sensor data generated by the one or more cameras 160 and in various embodiments can enable features such as Wake on Face (causing the device 100 to exit from a low-power state when a face is detected in image sensor data) and Face ID (causing the device 100 to exit from a low-power state when an authenticated user's face is detected in image sensor data). In some embodiments, the vision/imaging module 172 can enable one or more of the following features: head orientation detection, determining the location of facial landmarks (e.g., eyes, mouth, nose, eyebrows, cheek) in an image, and multi-face detection.

The host module 176 processes touch sensor data provided by the touch controller 165. The host module 176 is able to synchronize touch-related actions with the refresh rate of the embedded panel 145. This allows for the synchronization of touch and display activities at the system level, which provides for an improved touch experience for any application operating on the mobile computing device.

Thus, the LCH 155 can be considered to be a companion die to the SoC 140 in that the LCH 155 handles some sensor data-related processing tasks that are performed by SoCs in existing mobile computing devices. The proximity of the LCH 155 to the lid sensors allows for experiences and capabilities that may not be possible if sensor data has to be sent across the hinge 130 for processing by the SoC 140. The proximity of LCH 155 to the lid sensors reduces latency, which creates more time for sensor data processing. For example, as will be discussed in greater detail below, the LCH 155 comprises neural network accelerators, digital signals processors, and image and audio sensor data processing modules to enable features such as Wake on Voice, Wake on Face, and contextual understanding. Locating LCH computing resources in proximity to lid sensors also allows for power savings as lid sensor data needs to travel a shorter length—to the LCH instead of across the hinge to the base.

Lid controller hubs allow for additional power savings. For example, an LCH allows the SoC and other components in the base to enter into a low-power state while the LCH monitors incoming sensor data to determine whether the device is to transition to an active state. By being able to wake the device only when the presence of an authenticated user is detected (e.g., via Speaker ID or Face ID), the device can be kept in a low-power state longer than if the device were to wake in response to detecting the presence of any person. Lid controller hubs also allow the sampling of touch inputs at an embedded display panel to be reduced to a lower rate (or be disabled) in certain contexts. Additional power savings enabled by a lid controller hub are discussed in greater detail below.

As used herein the term "active state" when referencing a system-level state of a mobile computing device refers to a state in which the device is fully usable. That is, the full capabilities of the host processor unit and the lid controller hub are available, one or more applications can be executing, and the device is able to provide an interactive and responsive user experience—a user can be watching a movie, participating in a video call, surfing the web, operating a computer-aided design tool, or using the device in one of a myriad of other fashions. While the device is in an active state, one or more modules or other components of the device, including the lid controller hub or constituent modules or other components of the lid controller hub, can be placed in a low-power state to conserve power. The host processor units can be temporarily placed in a high-performance mode while the device is in an active state to accommodate demanding workloads. Thus, a mobile computing device can operate within a range of power levels when in an active state.

As used herein, the term "low-power state" when referencing a system-level state of a mobile computing device refers to a state in which the device is operating at a lower power consumption level than when the device is operating in an active state. Typically, the host processing unit is operating at a lower power consumption level than when the device is in an active state and more device modules or other components are collectively operating in a low-power state than when the device is in an active state. A device can operate in one or more low-power states with one difference between the low-power states being characterized by the power consumption level of the device level. In some embodiments, another difference between low-power states is characterized by how long it takes for the device to wake in response to user input (e.g., keyboard, mouse, touch, voice, user presence being detected in image sensor data, a user opening or moving the device), a network event, or input from an attached device (e.g., USB device). Such low-power states can be characterized as "standby", "idle", "sleep" or "hibernation" states.

In a first type of device-level low-power state, such as ones characterized as an "idle" or "standby" low-power state, the device can quickly transition from the low-power state to an active state in response to user input, hardware or network events. In a second type of device-level low-power state, such as one characterized as a "sleep" state, the device consumes less power than in the first type of low-power state and volatile memory is kept refreshed to maintain the device state. In a third type of device-level low-power state, such as one characterized as a "hibernate" low-power state, the device consumes less power than in the second type of low-power state. Non-volatile memory is not kept refreshed and the device state is stored in non-volatile memory. The device takes a longer time to wake from the third type of low-power state than from a first or second type of low-power state due to having to restore the system state from non-volatile memory. In a fourth type of low-power state, the device is off and not consuming power. Waking the device from an off state requires the device to undergo a full reboot. As used herein, waking a device refers to a device transitioning from a low-power state to an active state.

In reference to a lid hub controller, the term "active state", refers to a lid hub controller state in which the full resources of the lid hub controller are available. That is, the LCH can be processing sensor data as it is generated, passing along sensor data and any data generated by the LCH based on the sensor data to the host SoC, and displaying images based on video data received from the host SoC. One or more components of the LCH can individually be placed in a low-power state when the LCH is in an active state. For example, if the LCH detects that an authorized user is not detected in image sensor data, the LCH can cause a lid display to be disabled. In another example, if a privacy mode is enabled, LCH components that transmit sensor data to the host SoC can be disabled. The term "low-power" state, when referring to a lid controller hub can refer to a power state in which the LCH operates at a lower power consumption level than when in an active state, and is typically characterized by one or more LCH modules or other components being placed in a low-power state than when the LCH is in an active state. For example, when the lid of a computing device is closed, a lid display can be disabled, an LCH vision/imaging module can be placed in a low-power state and an LCH audio module can be kept operating to support a Wake on Voice feature to allow the device to continue to respond to audio queries.

A module or any other component of a mobile computing device can be placed in a low-power state in various manners, such as by having its operating voltage reduced, being supplied with a clock signal with a reduced frequency, or being placed into a low-power state through the receipt of control signals that cause the component to consume less power (such as placing a module in an image display pipeline into a low-power state in which it performs image processing on only a portion of an image).

In some embodiments, the power savings enabled by an LCH allow for a mobile computing device to be operated for a day under typical use conditions without having to be recharged. Being able to power a single day's use with a lower amount of power can also allow for a smaller battery to be used in a mobile computing device. By enabling a smaller battery as well as enabling a reduced number of wires across a hinge connecting a device to a lid, laptops comprising an LCH can be thinner and lighter and thus have an improved industrial design over existing devices.

In some embodiments, the lid controller hub technologies disclosed herein allow for laptops with intelligent collaboration and personal assistant capabilities. For example, an LCH can provide near-field and far-field audio capabilities that allow for enhanced audio reception by detecting the location of a remote audio source and improving the detection of audio arriving from the remote audio source location. When combined with Wake on Voice and Speaker ID capabilities, near- and far-field audio capabilities allow for a mobile computing device to behave similarly to the "smart speakers" that are pervasive in the market today. For example, consider a scenario where a user takes a break from working, walks away from their laptop, and asks the laptop from across the room, "What does tomorrow's weather look like?" The laptop, having transitioned into a low-power state due to not detecting the face of an authorized user in image sensor data provided by a user-facing camera, is continually monitoring incoming audio sensor data and detects speech coming from an authorized user. The laptop exits its low-power state, retrieves the requested information, and answers the user's query.

The hinge 130 can be any physical hinge that allows the base 110 and the lid 120 to be rotatably connected. The wires that pass across the hinge 130 comprise wires for passing video data 190 from the SoC 140 to the TCON 150, wires for passing audio data 192 between the SoC 140 and the audio module 170, wires for providing image data 194 from the vision/imaging module 172 to the SoC 140, wires for providing touch data 196 from the LCH 155 to the SoC 140, and wires for providing data determined from image sensor data and other information generated by the LCH 155 from the host module 176 to the SoC 140. In some embodiments, data shown as being passed over different sets of wires between the SoC and LCH are communicated over the same set of wires. For example, in some embodiments, touch data, sensing data 198, and other information generated by the LCH can be sent over a single USB bus.

In some embodiments, the lid 120 is removably attachable to the base 110. In some embodiments, the hinge can allow the base 110 and the lid 120 to rotate to substantially 360 degrees with respect to either other. In some embodiments, the hinge 130 carries fewer wires to communicatively couple the lid 120 to the base 110 relative to existing computing devices that do not have an LCH. This reduction in wires across the hinge 130 can result in lower device cost, not just due to the reduction in wires, but also due to being a simpler electromagnetic and radio frequency interface (EMI/RFI) solution.

The components illustrated in FIG. 1A as being located in the base of a mobile computing device can be located in a base housing and components illustrated in FIG. 1A as being located in the lid of a mobile computing device can be located in a lid housing.

FIG. 1B illustrates a perspective view of a secondary example mobile computing comprising a lid controller hub. The mobile computing device 122 can be a laptop or other mobile computing device with a similar form factor, such as a foldable tablet or smartphone. The lid 123 comprises an "A cover" 124 that is the world-facing surface of the lid 123 when the mobile computing device 122 is in a closed configuration and a "B cover" 125 that comprises a user-facing display when the lid 123 is open. The base 129 comprises a "C cover" 126 that comprises a keyboard that is upward facing when the device 122 is an open configuration and a "D cover" 127 that is the bottom of the base 129. In some embodiments, the base 129 comprises the primary computing resources (e.g., host processor unit(s), GPU) of the device 122, along with a battery, memory, and storage, and communicates with the lid 123 via wires that pass through a hinge 128. Thus, in embodiments where the mobile computing device is a dual-display device, such as a dual display laptop, tablet, or smartphone, the base can be regarded as the device portion comprising host processor units and the lid can be regarded as the device portion comprising an LCH. A Wi-Fi antenna can be located in the base or the lid of any computing device described herein.

In other embodiments, the computing device 122 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

Lid controller hubs are not limited to being implemented in laptops and other mobile computing devices having a form factor similar to that illustrated FIG. 1B. The lid controller hub technologies disclosed herein can be employed in mobile computing devices comprising one or more portions beyond a base and a single lid, the additional one or more portions comprising a display and/or one or more sensors. For example, a mobile computing device comprising an LCH can comprise a base; a primary display portion comprising a first touch display, a camera, and microphones; and a secondary display portion comprising a second touch display. A first hinge rotatably couples the base to the secondary display portion and a second hinge rotatably couples the primary display portion to the secondary display portion. An LCH located in either display portion can process sensor data generated by lid sensors located in the same display portion that the LCH is located in or by lid sensors generated in both display portions. In this example, a lid controller hub could be located in either or both of the primary and secondary display portions. For example, a first LCH could be located in the secondary display that communicates to the base via wires that pass through the first hinge and a second LCH could be located in the primary display that communicates to the base via wires passing through the first and second hinge.

Figure 2:
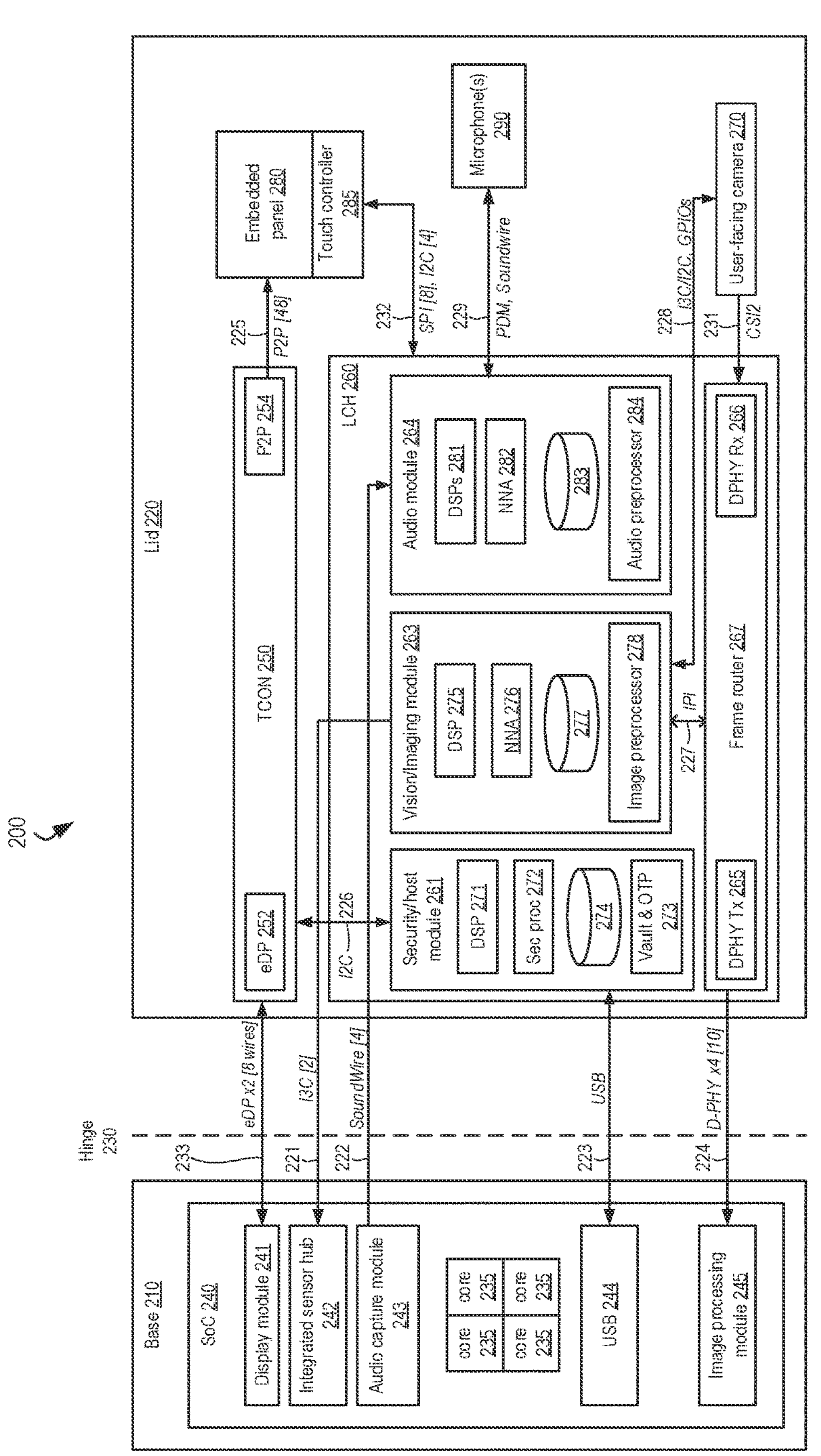
FIG. 2 illustrates a block diagram of a third example mobile computing device comprising a lid controller hub.

FIG. 2 illustrates a block diagram of a third example mobile computing device comprising a lid controller hub. The device 200 comprises a base 210 connected to a lid 220 by a hinge 230. The base 210 comprises an SoC 240. The lid 220 comprises a timing controller (TCON) 250, a lid controller hub (LCH) 260, a user-facing camera 270, an embedded display panel 280, and one or more microphones 290.

The SoC 240 comprises a display module 241, an integrated sensor hub 242, an audio capture module 243, a Universal Serial Bus (USB) module 244, an image processing module 245, and a plurality of processor cores 235. The display module 241 communicates with an embedded DisplayPort (eDP) module in the TCON 250 via an eight-wire eDP connection 233. In some embodiments, the embedded display panel 280 is a “3K2K” display (a display having a 3K×2K resolution) with a refresh rate of up to 120 Hz and the connection 233 comprises two eDP High Bit Rate 2 (HBR2 (17.28 Gb/s)) connections. The integrated sensor hub 242 communicates with a vision/imaging module 263 of the LCH 260 via a two-wire Mobile Industry Processor Interface (MIPI) I3C (SenseWire) connection 221, the audio capture module 243 communicates with an audio module 264 of the LCH 260 via a four-wire MIPI SoundWire® connection 222, the USB module 244 communicates with a security/host module 261 of the LCH 260 via a USB connection 223, and the image processing module 245 receives image data from a MIPI D-PHY transmit port 265 of a frame router 267 of the LCH 260 via a four-lane MIPI D-PHY connection 224 comprising 10 wires. The integrated sensor hub 242 can be an Intel® integrated sensor hub or any other sensor hub capable of processing sensor data from one or more sensors.

The TCON 250 comprises the eDP port 252 and a Peripheral Component Interface Express (PCIe) port 254 that drives the embedded display panel 280 using PCIe's peer-to-peer (P2P) communication feature over a 48-wire connection 225.

The LCH 260 comprises the security/host module 261, the vision/imaging module 263, the audio module 264, and a frame router 267. The security/host module 261 comprises a digital signal processing (DSP) processor 271, a security processor 272, a vault and one-time password generator (OTP) 273, and a memory 274. In some embodiments, the DSP processor 271 is a Synopsis® DesignWare® ARC® EM7D or EM11D DSP processor and the security processor is a Synopsis® DesignWare® ARC® SEM security processor. In addition to being in communication with the USB module 244 in the SoC 240, the security/host module 261 communicates with the TCON 250 via an inter-integrated circuit (I2C) connection 226 to provide for synchronization between LCH and TCON activities. The memory 274 stores instructions executed by components of the LCH 260.

The vision/imaging module 263 comprises a DSP 275, a neural network accelerator (NNA) 276, an image preprocessor 278, and a memory 277. In some embodiments, the DSP 275 is a DesignWare® ARC® EM11D processor. The vising/imaging module 263 communicates with the frame router 267 via an intelligent peripheral interface (IPI) connection 227. The vision/imaging module 263 can perform face detection, detect head orientation, and enables device access based on detecting a person's face (Wake on Face) or an authorized user's face (Face ID) in image sensor data. In some embodiments, the vision/imaging module 263 can implement one or more artificial intelligence (AI) models via the neural network accelerators 276 to enable these functions. For example, the neural network accelerator 276 can implement a model trained to recognize an authorized user's face in image sensor data to enable a Wake on Face feature. The vision/imaging module 263 communicates with the camera 270 via a connection 228 comprising a pair of I2C or I3C wires and a five-wire general-purpose I/O (GPIO) connection. The frame router 267 comprises the D-PHY transmit port 265 and a D-PHY receiver 266 that receives image sensor data provided by the user-facing camera 270 via a connection 231 comprising a four-wire MIPI Camera Serial Interface 2 (CSI2) connection. The LCH 260 communicates with a touch controller 285 via a connection 232 that can comprise an eight-wire serial peripheral interface (SPI) or a four-wire I2C connection.

The audio module 264 comprises one or more DSPs 281, a neural network accelerator 282, an audio preprocessor 284, and a memory 283. In some embodiments, the lid 220 comprises four microphones 290 and the audio module 264 comprises four DSPs 281, one for each microphone. In some embodiments, each DSP 281 is a Cadence® Tensilica® HiFi DSP. The audio module 264 communicates with the one or more microphones 290 via a connection 229 that comprises a MIPI SoundWire® connection or signals sent via pulse-density modulation (PDM). In other embodiments, the connection 229 comprises a four-wire digital microphone (DMIC) interface, a two-wire integrated inter-IC sound bus (I2S) connection, and one or more GPIO wires. The audio module 264 enables waking the device from a low-power state upon detecting a human voice (Wake on Voice) or the voice of an authenticated user (Speaker ID), near- and far-field audio (input and output), and can perform additional speech recognition tasks. In some embodiments, the NNA 282 is an artificial neural network accelerator implementing one or more artificial intelligence (AI) models to enable various LCH functions. For example, the NNA 282 can implement an AI model trained to detect a wake word or phrase in audio sensor data generated by the one or more microphones 290 to enable a Wake on Voice feature.

In some embodiments, the security/host module memory 274, the vision/imaging module memory 277, and the audio module memory 283 are part of a shared memory accessible to the security/host module 261, the vision/imaging module 263, and the audio module 264. During startup of the device 200, a section of the shared memory is assigned to each of the security/host module 261, the vision/imaging module 263, and the audio module 264. After startup, each section of shared memory assigned to a module is firewalled from the other assigned sections. In some embodiments, the shared memory can be a 12 MB memory partitioned as follows: security/host memory (1 MB), vision/imaging memory (3 MB), and audio memory (8 MB).

Any connection described herein connecting two or more components can utilize a different interface, protocol, or connection technology and/or utilize a different number of wires than that described for a particular connection. Although the display module 241, integrated sensor hub 242, audio capture module 243, USB module 244, and image processing module 245 are illustrated as being integrated into the SoC 240, in other embodiments, one or more of these components can be located external to the SoC. For example, one or more of these components can be located on a die, in a package, or on a board separate from a die, package, or board comprising host processor units (e.g., cores 235).

FIG. 3 illustrates a block diagram of a fourth example mobile computing device comprising a lid controller hub. The mobile computing device 300 comprises a lid 301 connected to a base 315 via a hinge 330. The lid 301 comprises a lid controller hub (LCH) 305, a timing controller 355, a user-facing camera 346, microphones 390, an embedded display panel 380, a touch controller 385, and a memory 353. The LCH 305 comprises a security module 361, a host module 362, a vision/imaging module 363, and an audio module 364. The security module 361 provides a secure processing environment for the LCH 305 and comprises a vault 320, a security processor 321, a fabric 310, I/Os 332, an always-on (AON) block 316, and a memory 323. The security module 361 is responsible for loading and authenticating firmware stored in the memory 353 and executed by various components (e.g., DSPs, neural network accelerators) of the LCH 305. The security module 361 authenticates the firmware by executing a cryptographic hash function on the firmware and making sure the resulting hash is correct and that the firmware has a proper signature using key information stored in the security module 361. The cryptographic hash function is executed by the vault 320. In some embodiments, the vault 320 comprises a cryptographic accelerator. In some embodiments, the security module 361 can present a product root of trust (PRoT) interface by which another component of the device 200 can query the LCH 305 for the results of the firmware authentication. In some embodiments, a PRoT interface can be provided over an I2C/I3C interface (e.g., I2C/I3C interface 470).

As used herein, the terms "operating", "executing", or "running" as they pertain to software or firmware in relation to a lid controller hub, a lid controller hub component, host processor unit, SoC, or other computing device component are used interchangeably and can refer to software or firmware stored in one or more computer-readable storage media accessible by the computing device component, even though the instructions contained in the software or firmware are not being actively executed by the component.

The security module 361 also stores privacy information and handles privacy tasks. In some embodiments, information that the LCH 305 uses to perform Face ID or Speaker ID to wake a computing device if an authenticated user's voice is picked up by the microphone or if an authenticated user's face is captured by a camera is stored in the security module 361. The security module 361 also enables privacy modes for an LCH or a computing device. For example, if user input indicates that a user desires to enable a privacy mode, the security module 361 can disable access by LCH resources to sensor data generated by one or more of the lid input devices (e.g., touchscreen, microphone, camera). In some embodiments, a user can set a privacy setting to cause a device to enter a privacy mode. Privacy settings include, for example, disabling video and/or audio input in a videoconferencing application or enabling an operating system level privacy setting that prevents any application or the operating system from receiving and/or processing sensor data. Setting an application or operating system privacy setting can cause information to be sent to the lid controller hub to cause the LCH to enter a privacy mode. In a privacy mode, the lid controller hub can cause an input sensor to enter a low-power state, prevent LCH resources from processing sensor data or prevent raw or processed sensor data from being sent to a host processing unit.

In some embodiments, the LCH 305 can enable Wake on Face or Face ID features while keeping image sensor data private from the remainder of the system (e.g., the operating system and any applications running on the operating system). In some embodiments, the vision/imaging module 363 continues to process image sensor data to allow Wake on Face or Face ID features to remain active while the device is in a privacy mode. In some embodiments, image sensor data is passed through the vision/imaging module 363 to an image processing module 345 in the SoC 340 only when a face (or an authorized user's face) is detected, irrespective of whether a privacy mode is enabled, for enhanced privacy and reduced power consumption. In some embodiments, the mobile computing device 300 can comprise one or more world-facing cameras in addition to user-facing camera 346 as well as one or more world-facing microphones (e.g., microphones incorporated into the "A cover" of a laptop).

In some embodiments, the lid controller hub 305 enters a privacy mode in response to a user pushing a privacy button, flipping a privacy switch, or sliding a slider over an input sensor in the lid. In some embodiments, a privacy indicator can be provided to the user to indicate that the LCH is in a privacy mode. A privacy indicator can be, for example, an LED located in the base or display bezel or a privacy icon displayed on a display. In some embodiments, a user activating an external privacy button, switch, slider, hotkey, etc. enables a privacy mode that is set at a hardware level or system level. That is, the privacy mode applies to all applications and the operating system operating on the mobile computing device. For example, if a user presses a privacy switch located in the bezel of the lid, the LCH can disable all audio sensor data and all image sensor data from being made available to the SoC in response. Audio and image sensor data is still available to the LCH to perform tasks such as Wake of Voice and Speaker ID, but the audio and image sensor data accessible to the lid controller hub is not accessible to other processing components.

The host module 362 comprises a security processor 324, a DSP 325, a memory 326, a fabric 311, an always-on block 317, and I/Os 333. In some embodiments, the host module 362 can boot the LCH, send LCH telemetry and interrupt data to the SoC, manage interaction with the touch controller 385, and send touch sensor data to the SoC 340. The host module 362 sends lid sensor data from multiple lid sensors over a USB connection to a USB module 344 in the SoC 340. Sending sensor data for multiple lid sensors over a single connection contributes to the reduction in the number of wires passing through the hinge 330 relative to existing laptop designs. The DSP 325 processes touch sensor data received from the touch controller 385. The host module 362 can synchronize the sending of touch sensor data to the SoC 340 with the display panel refresh rate by utilizing a synchronization signal 370 shared between the TCON 355 and the host module 362.

The host module 362 can dynamically adjust the refresh rate of the display panel 380 based on factors such as user presence and the amount of user touch interaction with the panel 380. For example, the host module 362 can reduce the refresh rate of the panel 380 if no user is detected or an authorized user is not detected in front of the camera 346. In another example, the refresh rate can be increased in response to detection of touch interaction at the panel 380 based on touch sensor data. In some embodiments and depending upon the refresh rate capabilities of the display panel 380, the host module 362 can cause the refresh rate of the panel 380 to be increased up to 120 Hz or down to 20 Hz or less.

The host module 362 can also adjust the refresh rate based on the application that a user is interacting with. For example, if the user is interacting with an illustration application, the host module 362 can increase the refresh rate (which can also increase the rate at which touch data is sent to the SoC 340 if the display panel refresh rate and the processing of touch sensor data are synchronized) to 120 Hz to provide for a smoother touch experience to the user. Similarly, if the host module 362 detects that the application that a user is currently interacting with is one where the content is relatively static or is one that involves a low degree of user touch interaction or simple touch interactions (e.g., such as selecting an icon or typing a message), the host module 362 can reduce the refresh rate to a lower frequency. In some embodiments, the host module 362 can adjust the refresh rate and touch sampling frequency by monitoring the frequency of touch interaction. For example, the refresh rate can be adjusted upward if there is a high degree of user interaction or if the host module 362 detects that the user is utilizing a specific touch input device (e.g., a stylus) or a particular feature of a touch input stylus (e.g., a stylus' tilt feature). If supported by the display panel, the host module 362 can cause a strobing feature of the display panel to be enabled to reduce ghosting once the refresh rate exceeds a threshold value.

The vision/imaging module 363 comprises a neural network accelerator 327, a DSP 328, a memory 329, a fabric 312, an AON block 318, I/Os 334, and a frame router 339. The vision/imaging module 363 interacts with the user-facing camera 346. The vision/imaging module 363 can interact with multiple cameras and consolidate image data from multiple cameras into a single stream for transmission to an integrated sensor hub 342 in the SoC 340. In some embodiments, the lid 301 can comprise one or more additional user-facing cameras and/or world-facing cameras in addition to user-facing camera 346. In some embodiments, any of the user-facing cameras can be in-display cameras. Image sensor data generated by the camera 346 is received by the frame router 339 where it undergoes preprocessing before being sent to the neural network accelerator 327 and/or the DSP 328. The image sensor data can also be passed through the frame router 339 to an image processing module 345 in the SoC 340. The neural network accelerator 327 and/or the DSP 328 enable face detection, head orientation detection, the recognition of facial landmarks (e.g., eyes, cheeks, eyebrows, nose, mouth), the generation of a 3D mesh that fits a detected face, along with other image processing functions. In some embodiments, facial parameters (e.g., location of facial landmarks, 3D meshes, face physical dimensions, head orientation) can be sent to the SoC at a rate of 30 frames per second (30 fps).

The audio module 364 comprises a neural network accelerator 350, one or more DSPs 351, a memory 352, a fabric 313, an AON block 319, and I/Os 335. The audio module 364 receives audio sensor data from the microphones 390. In some embodiments, there is one DSP 351 for each microphone 390. The neural network accelerator 350 and DSP 351 implement audio processing algorithms and AI models that improve audio quality. For example, the DSPs 351 can perform audio preprocessing on received audio sensor data to condition the audio sensor data for processing by audio AI models implemented by the neural network accelerator 350. One example of an audio AI model that can be implemented by the neural network accelerator 350 is a noise reduction algorithm that filters out background noises, such as the barking of a dog or the wailing of a siren. A second example is models that enable Wake on Voice or Speaker ID features. A third example is context awareness models. For example, audio contextual models can be implemented that classify the occurrence of an audio event relating to a situation where law enforcement or emergency medical providers are to be summoned, such as the breaking of glass, a car crash, or a gun shot. The LCH can provide information to the SoC indicating the occurrence of such an event and the SoC can query to the user whether authorities or medical professionals should be summoned.

The AON blocks 316-319 in the LCH modules 361-364 comprises various I/Os, timers, interrupts, and control units for supporting LCH "always-on" features, such as Wake on Voice, Speaker ID, Wake on Face, and Face ID and an always-on display that is visible and presents content when the lid 301 is closed.

FIG. 4 illustrates a block diagram of the security module of the lid controller hub of FIG. 3. The vault 320 comprises a cryptographic accelerator 400 that can implement the cryptographic hash function performed on the firmware stored in the memory 353. In some embodiments, the cryptographic accelerator 400 implements a 128-bit block size advanced encryption standard (AES)-compliant (AES-128) or a 384-bit secure hash algorithm (SHA)-complaint (SHA-384) encryption algorithm. The security processor 321 resides in a security processor module 402 that also comprises a platform unique feature module (PUF) 405, an OTP generator 410, a ROM 415, and a direct memory access (DMA) module 420. The PUF 405 can implement one or more security-related features that are unique to a particular LCH implementation. In some embodiments, the security processor 321 can be a DesignWare® ARC® SEM security processor. The fabric 310 allows for communication between the various components of the security module 361 and comprises an advanced extensible interface (AXI) 425, an advanced peripheral bus (APB) 440, and an advanced high-performance bus (AHB) 445. The AXI 425 communicates with the advanced peripheral bus 440 via an AXI to APB (AXI X2P) bridge 430 and the advanced high-performance bus 445 via an AXI to AHB (AXI X2A) bridge 435. The always-on block 316 comprises a plurality of GPIOs 450, a universal asynchronous receiver-transmitter (UART) 455, timers 460, and power management and clock management units (PMU/CMU) 465. The PMU/CMU 465 controls the supply of power and clock signals to LCH components and can selectively supply power and clock signals to individual LCH components so that only those components that are to be in use to support a particular LCH operational mode or feature receive power and are clocked. The I/O set 332 comprises an I2C/I3C interface 470 and a queued serial peripheral interface (QSPI) 475 to communicate to the memory 353. In some embodiments, the memory 353 is a 16 MB serial peripheral interface (SPI)-NOR flash memory that stores the LCH firmware. In some embodiments, an LCH security module can exclude one or more of the components shown in FIG. 4. In some embodiments, an LCH security module can comprise one or more additional components beyond those shown in FIG. 4.

Figure 5:
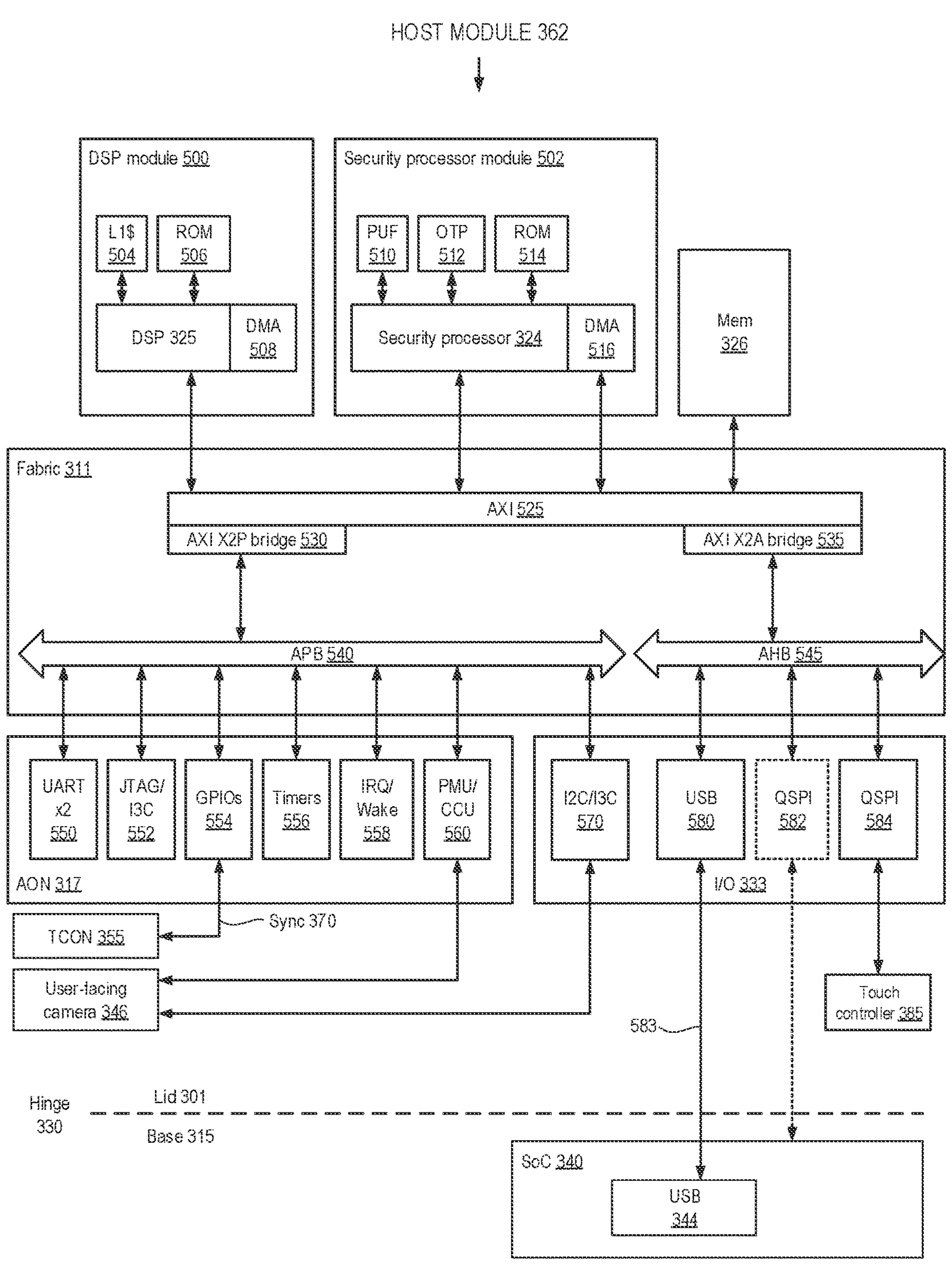
FIG. 5 illustrates a block diagram of the host module of the lid controller hub of FIG. 3.

FIG. 5 illustrates a block diagram of the host module of the lid controller hub of FIG. 3. The DSP 325 is part of a DSP module 500 that further comprises a level one (L1) cache 504, a ROM 506, and a DMA module 508. In some embodiments, the DSP 325 can be a DesignWare® ARC® EM11D DSP processor. The security processor 324 is part of a security processor module 502 that further comprises a PUF module 510 to allow for the implementation of platform-unique functions, an OTP generator 512, a ROM 514, and a DMA module 516. In some embodiments, the security processor 324 is a Synopsis® DesignWare® ARC® SEM security processor. The fabric 311 allows for communication between the various components of the host module 362 and comprises similar components as the security component fabric 310, including an advanced extensible interface (AXI) 525 connected to an advanced peripheral bus (APB) 540 by an AXI to APB (X2P) bridge 530 and an advanced high-performance bus 545 via an AXI to AHB (AXI X2A) bridge 535. The always-on block 317 comprises a plurality of UARTs 550, a Joint Test Action Group (JTAG)/I3C port 552 to support LCH debug, a plurality of GPIOs 554, timers 556, an interrupt request (IRQ)/wake block 558, and a PMU/CCU port 560 that provides a 19.2 MHz reference clock to the camera 346. The synchronization signal 370 is connected to one of the GPIO ports. I/Os 333 comprises an interface 570 that supports I2C and/or I3C communication with the camera 346, a USB module 580 that communicates with the USB module 344 in the SoC 340, and a QSPI block 584 that communicates with the touch controller 385. In some embodiments, the I/O set 333 provides touch sensor data with the SoC via a QSPI interface 582. In other embodiments, touch sensor data is communicated with the SoC over the USB connection 583. In some embodiments, the connection 583 is a USB 2.0 connection. By leveraging the USB connection 583 to send touch sensor data to the SoC, the hinge 330 is spared from having to carry the wires that support the QSPI connection supported by the QSPI interface 582. Not having to support this additional QSPI connection can reduce the number of wires crossing the hinge by four to eight wires.

In some embodiments, the host module 362 can support dual displays. In such embodiments, the host module 362 communicates with a second touch controller and a second timing controller. A second synchronization signal between the second timing controller and the host module allows for the processing of touch sensor data provided by the second touch controller and the sending of touch sensor data provided by the second touch sensor delivered to the SoC to be synchronized with the refresh rate of the second display. In some embodiments, the host module 362 can support three or more displays. In some embodiments, an LCH host module can exclude one or more of the components shown in FIG. 5. In some embodiments, an LCH host module can comprise one or more additional components beyond those shown in FIG. 5.

Figure 6:
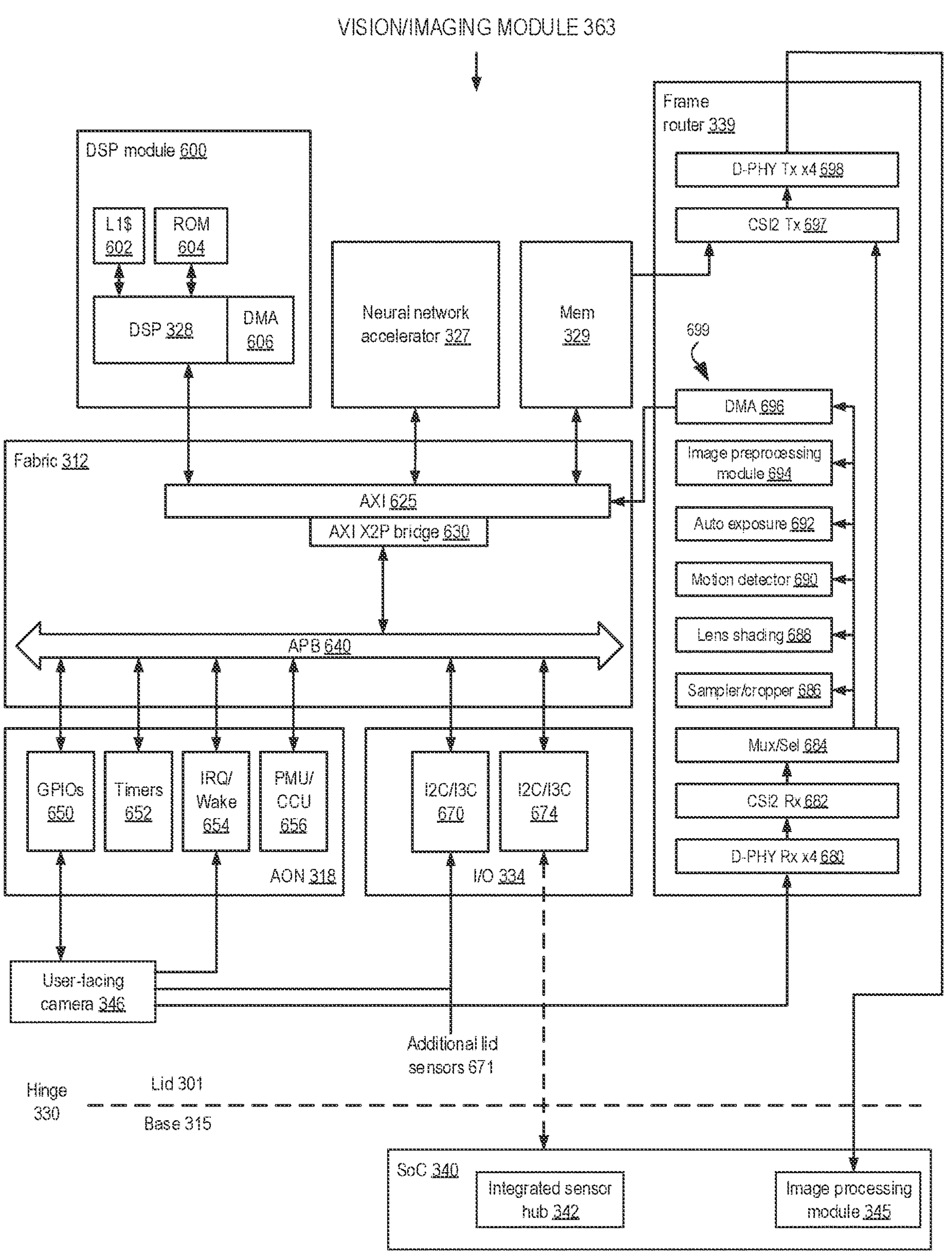
FIG. 6 illustrates a block diagram of the vision/imaging module of the lid controller hub of FIG. 3.

FIG. 6 illustrates a block diagram of the vision/imaging module of the lid controller hub of FIG. 3. The DSP 328 is part of a DSP module 600 that further comprises an L1 cache 602, a ROM 604, and a DMA module 606. In some embodiments, the DSP 328 can be a DesignWare® ARC® EMI ID DSP processor. The fabric 312 allows for communication between the various components of the vision/imaging module 363 and comprises an advanced extensible interface (AXI) 625 connected to an advanced peripheral bus (APB) 640 by an AXI to APB (X2P) bridge 630. The always-on block 318 comprises a plurality of GPIOs 650, a plurality of timers 652, an IRQ/wake block 654, and a PMU/CCU 656. In some embodiments, the IRQ/wake block 654 receives a Wake on Motion (WoM) interrupt from the camera 346. The WoM interrupt can be generated based on accelerometer sensor data generated by an accelerator located in or communicatively coupled to the camera or generated in response to the camera performing motion detection processing in images captured by the camera. The I/Os 334 comprise an I2C/I3C interface 674 that sends metadata to the integrated sensor hub 342 in the SoC 340 and an I2C3/I3C interface 670 that connects to the camera 346 and other lid sensors 671 (e.g., radar sensor, time-of-flight camera, infrared). The vision/imaging module 363 can receive sensor data from the additional lid sensors 671 via the I2C/I3C interface 670. In some embodiments, the metadata comprises information such as information indicating whether information being provided by the lid controller hub is valid, information indicating an operational mode of the lid controller hub (e.g., off, a "Wake on Face" low power mode in which some of the LCH components are disabled but the LCH continually monitors image sensor data to detect a user's face), auto exposure information (e.g., the exposure level automatically set by the vision/imaging module 363 for the camera 346), and information relating to faces detected in images or video captured by the camera 346 (e.g., information indicating a confidence level that a face is present, information indicating a confidence level that the face matches an authorized user's face, bounding box information indicating the location of a face in a captured image or video, orientation information indicating an orientation of a detected face, and facial landmark information).

The frame router 339 receives image sensor data from the camera 346 and can process the image sensor data before passing the image sensor data to the neural network accelerator 327 and/or the DSP 328 for further processing. The frame router 339 also allows the received image sensor data to bypass frame router processing and be sent to the image processing module 345 in the SoC 340. Image sensor data can be sent to the image processing module 345 concurrently with being processed by a frame router processing stack 699. Image sensor data generated by the camera 346 is received at the frame router 339 by a MIPI D-PHY receiver 680 where it is passed to a MIPI CSI2 receiver 682. A multiplexer/selector block 684 allows the image sensor data to be processed by the frame router processing stack 699, to be sent directly to a CSI2 transmitter 697 and a D-PHY transmitter 698 for transmission to the image processing module 345, or both.

The frame router processing stack 699 comprises one or more modules that can perform preprocessing of image sensor data to condition the image sensor data for processing by the neural network accelerator 327 and/or the DSP 328, and perform additional image processing on the image sensor data. The frame router processing stack 699 comprises a sampler/cropper module 686, a lens shading module 688, a motion detector module 690, an auto exposure module 692, an image preprocessing module 694, and a DMA module 696. The sampler/cropper module 686 can reduce the frame rate of video represented by the image sensor data and/or crops the size of images represented by the image sensor data. The lens shading module 688 can apply one or more lens shading effect to images represented by the image sensor data. In some embodiments, a lens shading effects to be applied to the images represented by the image sensor data can be user selected. The motion detector module 690 can detect motion across multiple images represented by the image sensor data. The motion detector can indicate any motion or the motion of a particular object (e.g., a face) over multiple images.

The auto exposure module 692 can determine whether an image represented by the image sensor data is over-exposed or under-exposed and cause the exposure of the camera 346 to be adjusted to improve the exposure of future images captured by the camera 346. In some embodiments, the auto exposure module 362 can modify the image sensor data to improve the quality of the image represented by the image sensor data to account for over-exposure or under-exposure. The image preprocessing module 694 performs image processing of the image sensor data to further condition the image sensor data for processing by the neural network accelerator 327 and/or the DSP 328. After the image sensor data has been processed by the one or more modules of the frame router processing stack 699 it can be passed to other components in the vision/imaging module 363 via the fabric 312. In some embodiments, the frame router processing stack 699 contains more or fewer modules than those shown in FIG. 6. In some embodiments, the frame router processing stack 699 is configurable in that image sensor data is processed by selected modules of the frame processing stack. In some embodiments, the order in which modules in the frame processing stack operate on the image sensor data is configurable as well.

Once image sensor data has been processed by the frame router processing stack 699, the processed image sensor data is provided to the DSP 328 and/or the neural network accelerator 327 for further processing. The neural network accelerator 327 enables the Wake on Face function by detecting the presence of a face in the processed image sensor data and the Face ID function by detecting the presence of the face of an authenticated user in the processed image sensor data. In some embodiments, the NNA 327 is capable of detecting multiple faces in image sensor data and the presence of multiple authenticated users in image sensor data. The neural network accelerator 327 is configurable and can be updated with information that allows the NNA 327 to identify one or more authenticated users or identify a new authenticated user. In some embodiments, the NNA 327 and/or DSP 328 enable one or more adaptive dimming features. One example of an adaptive dimming feature is the dimming of image or video regions not occupied by a human face, a useful feature for video conferencing or video call applications. Another example is globally dimming a screen while a computing device is in an active state and a face is longer detected in front of the camera and then undimming the display when the face is again detected. If this latter adaptive dimming feature is extended to incorporate Face ID, the screen is undimmed only when an authenticated user is again detected.

In some embodiments, the frame router processing stack 699 comprises a super resolution module (not shown) that can upscale or downscale the resolution of an image represented by image sensor data. For example, in embodiments where image sensor data represents 1-megapixel images, a super resolution module can upscale the 1-megapixel images to higher resolution images before they are passed to the image processing module 345. In some embodiments, an LCH vision/imaging module can exclude one or more of the components shown in FIG. 6. In some embodiments, an LCH vision/imaging module can comprise one or more additional components beyond those shown in FIG. 6.

Figure 7:
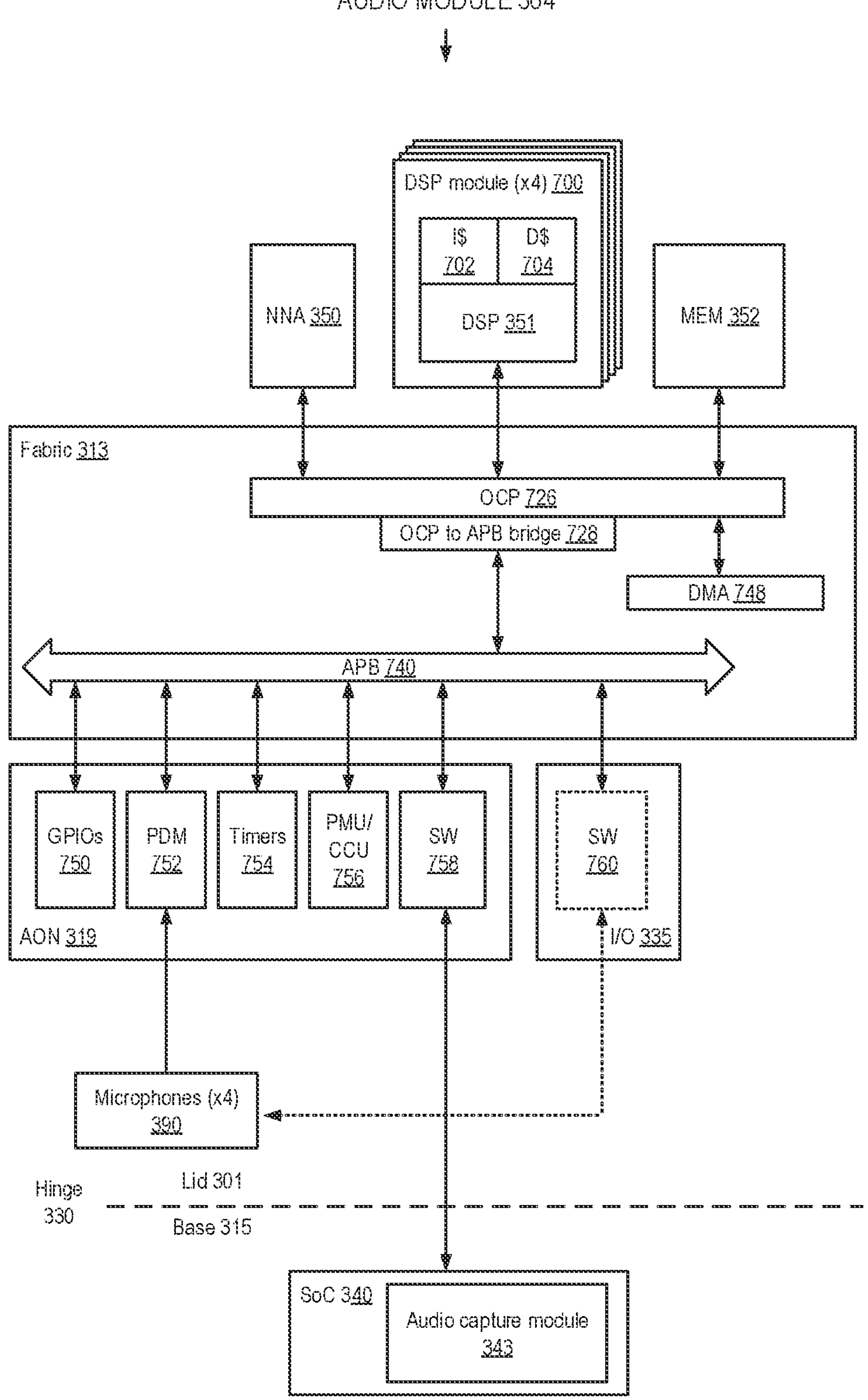
FIG. 7 illustrates a block diagram of the audio module of the lid controller hub of FIG. 3.

FIG. 7 illustrates a block diagram of the audio module 364 of the lid controller hub of FIG. 3. In some embodiments, the NNA 350 can be an artificial neural network accelerator. In some embodiments, the NNA 350 can be an Intel® Gaussian & Neural Accelerator (GNA) or other low-power neural coprocessor. The DSP 351 is part of a DSP module 700 that further comprises an instruction cache 702 and a data cache 704. In some embodiments, each DSP 351 is a Cadence® Tensilica® HiFi DSP. The audio module 364 comprises one DSP module 700 for each microphone in the lid. In some embodiments, the DSP 351 can perform dynamic noise reduction on audio sensor data. In other embodiments, more or fewer than four microphones can be used, and audio sensor data provided by multiple microphones can be processed by a single DSP 351. In some embodiments, the NNA 350 implements one or more models that improve audio quality. For example, the NNA 350 can implement one or more "smart mute" models that remove or reduce background noises that can be disruptive during an audio or video call.

In some embodiments, the DSPs 351 can enable far-field capabilities. For example, lids comprising multiple front-facing microphones distributed across the bezel (or over the display area if in-display microphones are used) can perform beamforming or spatial filtering on audio signals generated by the microphones to allow for far-field capabilities (e.g., enhanced detection of sound generated by a remote acoustic source). The audio module 364, utilizing the DSPs 351, can determine the location of a remote audio source to enhance the detection of sound received from the remote audio source location. In some embodiments, the DSPs 351 can determine the location of an audio source by determining delays to be added to audio signals generated by the microphones such that the audio signals overlap in time and then inferring the distance to the audio source from each microphone based on the delay added to each audio signal. By adding the determined delays to the audio signals provided by the microphones, audio detection in the direction of a remote audio source can be enhanced. The enhanced audio can be provided to the NNA 350 for speech detection to enable Wake on Voice or Speaker ID features. The enhanced audio can be subjected to further processing by the DSPs 351 as well. The identified location of the audio source can be provided to the SoC for use by the operating system or an application running on the operating system.

In some embodiments, the DSPs 351 can detect information encoded in audio sensor data at near-ultrasound (e.g., 15 kHz-20 kHz) or ultrasound (e.g., >20 kHz) frequencies, thus providing for a low-frequency low-power communication channel. Information detected in near-ultrasound/ultrasound frequencies can be passed to the audio capture module 343 in the SoC 340. An ultrasonic communication channel can be used, for example, to communicate meeting connection or Wi-Fi connection information to a mobile computing device by another computing device (e.g., Wi-Fi router, repeater, presentation equipment) in a meeting room. The audio module 364 can further drive the one or more microphones 390 to transmit information at ultrasonic frequencies. Thus, the audio channel can be used as a two-way low-frequency low-power communication channel between computing devices.

In some embodiments, the audio module 364 can enable adaptive cooling. For example, the audio module 364 can determine an ambient noise level and send information indicating the level of ambient noise to the SoC. The SoC can use this information as a factor in determining a level of operation for a cooling fan of the computing device. For example, the speed of a cooling fan can be scaled up or down with increasing and decreasing ambient noise levels, which can allow for increased cooling performance in noisier environments.

The fabric 313 allows for communication between the various components of the audio module 364. The fabric 313 comprises open core protocol (OCP) interfaces 726 to connect the NNA 350, the DSP modules 700, the memory 352 and the DMA 748 to the APB 740 via an OCP to APB bridge 728. The always-on block 319 comprises a plurality of GPIOs 750, a pulse density modulation (PDM) module 752 that receives audio sensor data generated by the microphones 390, one or more timers 754, a PMU/CCU 756, and a MIPI SoundWire® module 758 for transmitting and receiving audio data to the audio capture module 343. In some embodiments, audio sensor data provided by the microphones 390 is received at a DesignWare® SoundWire® module 760. In some embodiments, an LCH audio module can exclude one or more of the components shown in FIG. 7. In some embodiments, an LCH audio module can comprise one or more additional components beyond those shown in FIG. 7.

Figure 8:
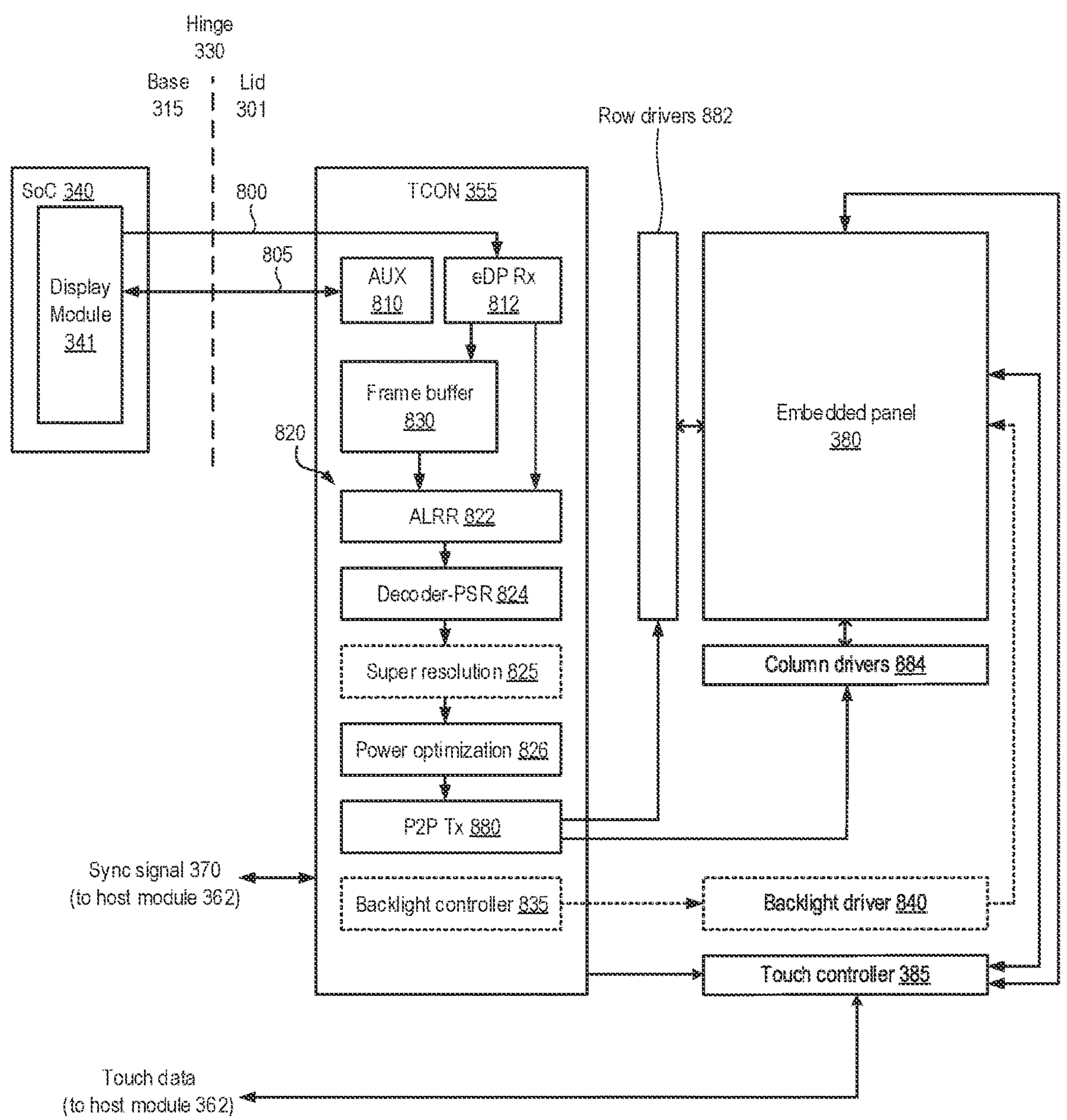
FIG. 8 illustrates a block diagram of the timing controller, embedded display panel, and additional electronics used in conjunction with the lid controller hub of FIG. 3

FIG. 8 illustrates a block diagram of the timing controller, embedded display panel, and additional electronics used in conjunction with the lid controller hub of FIG. 3. The timing controller 355 receives video data from the display module 341 of the SoC 340 over an eDP connection comprising a plurality of main link lanes 800 and an auxiliary (AUX) channel 805. Video data and auxiliary channel information provided by the display module 341 is received at the TCON 355 by an eDP main link receiver 812 and an auxiliary channel receiver 810 and. A timing controller processing stack 820 comprises one or more modules responsible for pixel processing and converting the video data sent from the display module 341 into signals that drive the control circuitry of the display panel 380, (e.g., row drivers 882, column drivers 884). Video data can be processed by timing controller processing stack 820 without being stored in a frame buffer 830 or video data can be stored in the frame buffer 830 before processing by the timing controller processing stack 820. The frame buffer 830 stores pixel information for one or more video frames (or frames, as used herein, the terms "image" and "frame" are used interchangeably). For example, in some embodiments, a frame buffer can store the color information for pixels in a video frame to be displayed on the panel.

The timing controller processing stack 820 comprises an autonomous low refresh rate module (ALRR) 822, a decoder-panel self-refresh (decoder-PSR) module 824, and a power optimization module 826. The ALRR module 822 can dynamically adjust the refresh rate of the display panel 380. In some embodiments, the ALRR module 822 can adjust the display refresh rate between 20 Hz and 120 Hz. The ALRR module 822 can implement various dynamic refresh rate approaches, such as adjusting the display refresh rate based on the frame rate of received video data, which can vary in gaming applications depending on the complexity of images being rendered. A refresh rate determined by the ALRR module 822 can be provided to the host module as the synchronization signal 370. In some embodiments, the synchronization signal comprises an indication that a display refresh is about to occur. In some embodiments, the ALRR module 822 can dynamically adjust the panel refresh rate by adjusting the length of the blanking period. In some embodiments, the ALRR module 822 can adjust the panel refresh rate based on information received from the host module 362. For example, in some embodiments, the host module 362 can send information to the ALRR module 822 indicating that the refresh rate is to be reduced if the vision/imaging module 363 determines there is no user in front of the camera. In some embodiments, the host module 362 can send information to the ALRR module 822 indicating that the refresh rate is to be increased if the host module 362 determines that there is touch interaction at the panel 380 based on touch sensor data received from the touch controller 385.

In some embodiments, the decoder-PSR module 824 can comprise a Video Electronics Standards Association (VESA) Display Streaming Compression (VDSC) decoder that decodes video data encoded using the VDSC compression standard. In other embodiments, the decoder-panel self-refresh module 824 can comprise a panel self-refresh (PSR) implementation that, when enabled, refreshes all or a portion of the display panel 380 based on video data stored in the frame buffer and utilized in a prior refresh cycle. This can allow a portion of the display pipeline leading up to the frame buffer to enter into a low-power state. In some embodiments, the decoder-panel self-refresh module 824 can be the PSR feature implemented in eDP v1.3 or the PSR2 feature implemented in eDP v1.4. In some embodiments, the TCON can achieve additional power savings by entering a zero or low refresh state when the mobile computing device operating system is being upgraded. In a zero-refresh state, the timing controller does not refresh the display. In a low refresh state, the timing controller refreshes the display at a slow rate (e.g., 20 Hz or less).

In some embodiments, the timing controller processing stack 820 can include a super resolution module 825 that can downscale or upscale the resolution of video frames provided by the display module 341 to match that of the display panel 380. For example, if the embedded panel 380 is a 3K×2K panel and the display module 341 provides 4K video frames rendered at 4K, the super resolution module 825 can downscale the 4K video frames to 3K×2K video frames. In some embodiments, the super resolution module 825 can upscale the resolution of videos. For example, if a gaming application renders images with a 1360×768 resolution, the super resolution module 825 can upscale the video frames to 3K×2K to take full advantage of the resolution capabilities of the display panel 380. In some embodiments, a super resolution module 825 that upscales video frames can utilize one or more neural network models to perform the upscaling.

The power optimization module 826 comprises additional algorithms for reducing power consumed by the TCON 355. In some embodiments, the power optimization module 826 comprises a local contrast enhancement and global dimming module that enhances the local contrast and applies global dimming to individual frames to reduce power consumption of the display panel 380.

In some embodiments, the timing controller processing stack 820 can comprise more or fewer modules than shown in FIG. 8. For example, in some embodiments, the timing controller processing stack 820 comprises an ALRR module and an eDP PSR2 module but does not contain a power optimization module. In other embodiments, modules in addition to those illustrated in FIG. 8 can be included in the timing controller stack 820. The modules included in the timing controller processing stack 820 can depend on the type of embedded display panel 380 included in the lid 301.

For example, if the display panel 380 is a backlit liquid crystal display (LCD), the timing controller processing stack 820 would not include a module comprising the global dimming and local contrast power reduction approach discussed above as that approach is more amenable for use with emissive displays (displays in which the light emitting elements are located in individual pixels, such as QLED, OLED, and micro-LED displays) rather than backlit LCD displays. In some embodiments, the timing controller processing stack 820 comprises a color and gamma correction module.

After video data has been processed by the timing controller processing stack 820, a P2P transmitter 880 converts the video data into signals that drive control circuitry for the display panel 380. The control circuitry for the display panel 380 comprises row drivers 882 and column drivers 884 that drive rows and columns of pixels in a display within the embedded panel 380 to control the color and brightness of individual pixels.

In embodiments where the embedded panel 380 is a backlit LCD display, the TCON 355 can comprise a backlight controller 835 that generates signals to drive a backlight driver 840 to control the backlighting of the display panel 380. The backlight controller 835 sends signals to the backlight driver 840 based on video frame data representing the image to be displayed on the panel 380. The backlight controller 835 can implement low-power features such as turning off or reducing the brightness of the backlighting for those portions of the panel (or the entire panel) if a region of the image (or the entire image) to be displayed is mostly dark. In some embodiments, the backlight controller 835 reduces power consumption by adjusting the chroma values of pixels while reducing the brightness of the backlight such that there is little or no visual degradation perceived by a viewer. In some embodiments the backlight is controlled based on signals send to the lid via the eDP auxiliary channel, which can reduce the number of wires sent across the hinge 330.

The touch controller 385 is responsible for driving the touchscreen technology of the embedded panel 380 and collecting touch sensor data from the display panel 380. The touch controller 385 can sample touch sensor data periodically or aperiodically and can receive control information from the timing controller 355 and/or the lid controller hub 305. The touch controller 385 can sample touch sensor data at a sampling rate similar or close to the display panel refresh rate. The touch sampling can be adjusted in response to an adjustment in the display panel refresh rate. Thus, if the display panel is being refreshed at a low rate or not being refreshed at all, the touch controller can be placed in a low-power state in which it is sampling touch sensor data at a low rate or not at all. When the computing device exits the low-power state in response to, for example, the vision/imaging module 363 detecting a user in the image data being continually analyzed by the vision/imaging module 363, the touch controller 385 can increase the touch sensor sampling rate or begin sampling touch sensor data again. In some embodiments, as will be discussed in greater detail below, the sampling of touch sensor data can be synchronized with the display panel refresh rate, which can allow for a smooth and responsive touch experience. In some embodiments, the touch controller can sample touch sensor data at a rate that is independent from the display refresh rate.

Although the timing controllers 250 and 355 of FIGS. 2 and 3 are illustrated as being separate from lid controller hubs 260 and 305, respectively, any of the timing controllers described herein can be integrated onto the same die, package, or printed circuit board as a lid controller hub. Thus, reference to a lid controller hub can refer to a component that includes a timing controller and reference to a timing controller can refer to a component within a lid controller hub. FIGS. 10A-10D illustrate various possible physical relationships between a timing controller and a lid controller hub.

In some embodiments, a lid controller hub can have more or fewer components and/or implement fewer features or capabilities than the LCH embodiments described herein. For example, in some embodiments, a mobile computing device may comprise an LCH without an audio module and perform processing of audio sensor data in the base. In another example, a mobile computing device may comprise an LCH without a vision/imaging module and perform processing of image sensor data in the base.

Figure 9:
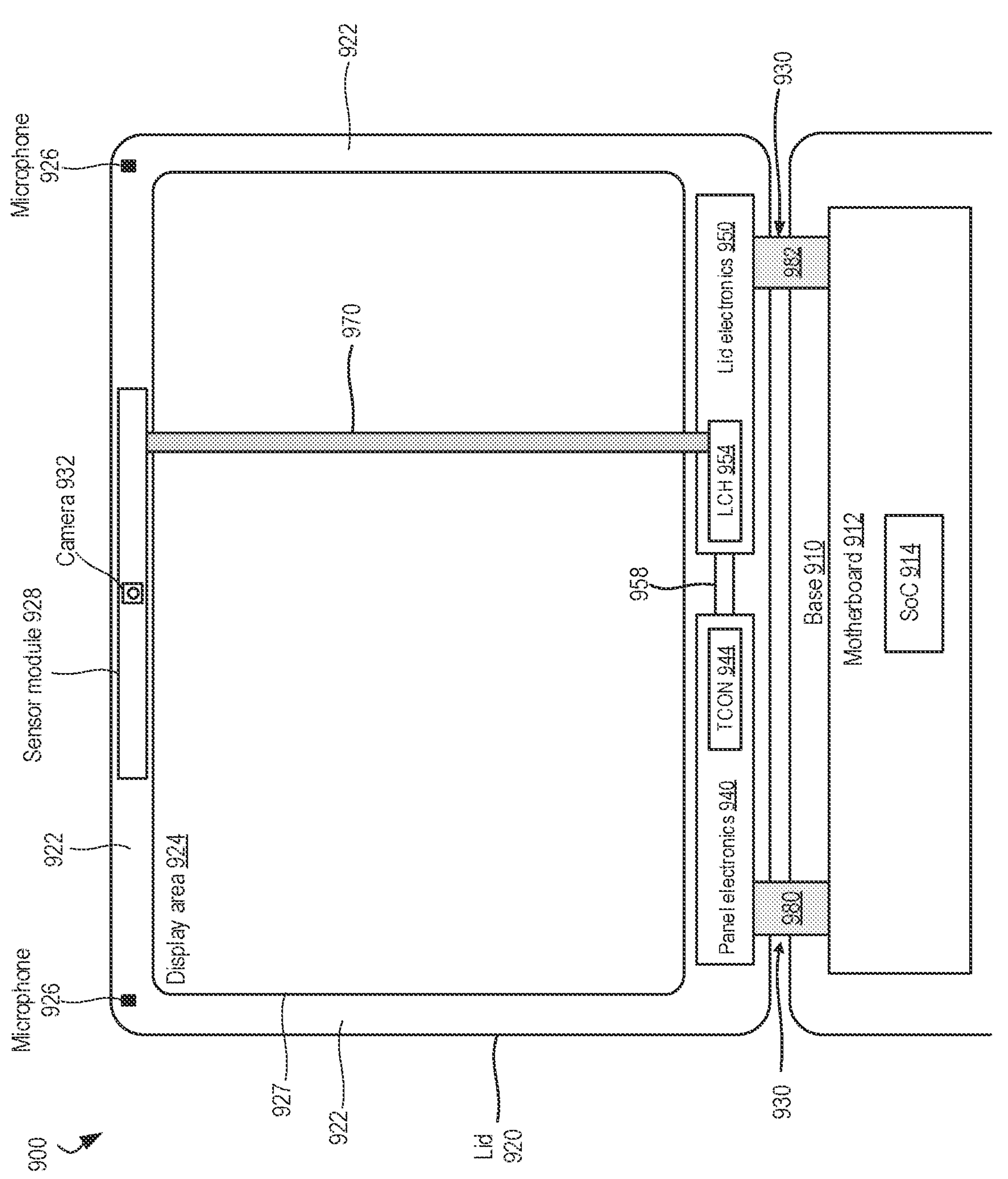
FIG. 9 illustrates a block diagram illustrating an example physical arrangement of components in a mobile computing device comprising a lid controller hub.

FIG. 9 illustrates a block diagram illustrating an example physical arrangement of components in a mobile computing device comprising a lid controller hub. The mobile computing device 900 comprises a base 910 connected to a lid 920 via a hinge 930. The base 910 comprises a motherboard 912 on which an SoC 914 and other computing device components are located. The lid 920 comprises a bezel 922 that extends around the periphery of a display area 924, which is the active area of an embedded display panel 927 located within the lid, e.g., the portion of the embedded display panel that displays content. The lid 920 further comprises a pair of microphones 926 in the upper left and right corners of the lid 920, and a sensor module 928 located along a center top portion of the bezel 922. The sensor module 928 comprises a front-facing camera 932. In some embodiments, the sensor module 928 is a printed circuit board on which the camera 932 is mounted. The lid 920 further comprises panel electronics 940 and lid electronics 950 located in a bottom portion of the lid 920. The lid electronics 950 comprises a lid controller hub 954 and the panel electronics 940 comprises a timing controller 944. In some embodiments the lid electronics 950 comprises a printed circuit board on which the LCH 954 in mounted. In some embodiments the panel electronics 940 comprises a printed circuit board upon which the TCON 944 and additional panel circuitry is mounted, such as row and column drivers, a backlight driver (if the embedded display is an LCD backlit display), and a touch controller. The timing controller 944 and the lid controller hub 954 communicate via a connector 958 which can be a cable connector connecting two circuit boards. The connector 958 can carry the synchronization signal that allows for touch sampling activities to be synchronized with the display refresh rate. In some embodiments, the LCH 954 can deliver power to the TCON 944 and other electronic components that are part of the panel electronics 940 via the connector 958. A sensor data cable 970 carries image sensor data generated by the camera 932, audio sensor data generated by the microphones 926, a touch sensor data generated by the touchscreen technology to the lid controller hub 954. Wires carrying audio signal data generated by the microphones 926 can extend from the microphones 926 in the upper and left corners of the lid to the sensor module 928, where they aggregated with the wires carrying image sensor data generated by the camera 932 and delivered to the lid controller hub 954 via the sensor data cable 970.

The hinge 930 comprises a left hinge portion 980 and a right hinge portion 982. The hinge 930 physically couples the lid 920 to the base 910 and allows for the lid 920 to be rotated relative to the base. The wires connecting the lid controller hub 954 to the base 910 pass through one or both of the hinge portions 980 and 982. Although shown as comprising two hinge portions, the hinge 930 can assume a variety of different configurations in other embodiments. For example, the hinge 930 could comprise a single hinge portion or more than two hinge portions, and the wires that connect the lid controller hub 954 to the SoC 914 could cross the hinge at any hinge portion. With the number of wires crossing the hinge 930 being less than in existing laptop devices, the hinge 930 can be less expensive and simpler component relative to hinges in existing laptops.

In other embodiments, the lid 920 can have different sensor arrangements than that shown in FIG. 9. For example, the lid 920 can comprise additional sensors such as additional front-facing cameras, a front-facing depth sensing camera, an infrared sensor, and one or more world-facing cameras. In some embodiments, the lid 920 can comprise additional microphones located in the bezel, or just one microphone located on the sensor module. The sensor module 928 can aggregate wires carrying sensor data generated by additional sensors located in the lid and deliver them to the sensor data cable 970, which delivers the additional sensor data to the lid controller hub 954.

In some embodiments, the lid comprises in-display sensors such as in-display microphones or in-display cameras. These sensors are located in the display area 924, in pixel area not utilized by the emissive elements that generate the light for each pixel and are discussed in greater detail below. The sensor data generated by in-display cameras and in-display microphones can be aggregated by the sensor module 928 as well as other sensor modules located in the lid and deliver the sensor data generated by the in-display sensors to the lid controller hub 954 for processing.

In some embodiments, one or more microphones and cameras can be located in a position within the lid that is convenient for use in an "always-on" usage scenario, such as when the lid is closed. For example, one or more microphones and cameras can be located on the "A cover" of a laptop or other world-facing surface (such as a top edge or side edge of a lid) of a mobile computing device when the device is closed to enable the capture and monitoring of audio or image data to detect the utterance of a wake word or phrase or the presence of a person in the field of view of the camera.

FIGS. 10A-10E illustrate block diagrams of example timing controller and lid controller hub physical arrangements within a lid. FIG. 10A illustrates a lid controller hub 1000 and a timing controller 1010 located on a first module 1020 that is physically separate from a second module 1030. In some embodiments, the first and second modules 1020 and 1030 are printed circuit boards. The lid controller hub 1000 and the timing controller 1010 communicate via a connection 1034. FIG. 10B illustrates a lid controller hub 1042 and a timing controller 1046 located on a third module 1040. The LCH 1042 and the TCON 1046 communicate via a connection 1044. In some embodiments, the third module 1040 is a printed circuit board and the connection 1044 comprises one or more printed circuit board traces. One advantage to taking a modular approach to lid controller hub and timing controller design is that it allows timing controller vendors to offer a single timing controller that works with multiple LCH designs having different feature sets.

FIG. 10C illustrates a timing controller split into front end and back end components. A timing controller front end (TCON FE) 1052 and a lid controller hub 1054 are integrated in or are co-located on a first common component 1056. In some embodiments, the first common component 1056 is an integrated circuit package and the TCON FE 1052 and the LCH 1054 are separate integrated circuit die integrated in a multi-chip package or separate circuits integrated on a single integrated circuit die. The first common component 1056 is located on a fourth module 1058 and a timing controller back end (TCON BE) 1060 is located on a fifth module 1062. The timing controller front end and back end components communicate via a connection 1064. Breaking the timing controller into front end and back end components can provide for flexibility in the development of timing controllers with various timing controller processing stacks. For example, a timing controller back end can comprise modules that drive an embedded display, such as the P2P transmitter 880 of the timing controller processing stack 820 in FIG. 8 and other modules that may be common to various timing controller frame processor stacks, such as a decoder or panel self-refresh module. A timing controller front end can comprise modules that are specific for a particular mobile device design. For example, in some embodiments, a TCON FE comprises a power optimization module 826 that performs global dimming and local contrast enhancement that is desired to be implemented in specific laptop models, or an ALRR module where it is convenient to have the timing controller and lid controller hub components that work in synchronization (e.g., via synchronization signal 370) to be located closer together for reduced latency.

FIG. 10D illustrates an embodiment in which a second common component 1072 (comprising LCH 1074 and TCON FE 1076) and a timing controller back end 1078 are located on the same module, a sixth module 1070, and the second common component 1072 and the TCON BE 1078 communicate via a connection 1066. FIG. 10E illustrates an embodiment in which a lid controller hub 1080 and a timing controller 1082 are integrated on a third common component 1084 that is located on a seventh module 1086. In some embodiments, the third common component 1084 is an integrated circuit package and the LCH 1080 and TCON 1082 are individual integrated circuit die packaged in a multi-chip package or circuits located on a single integrated circuit die. In embodiments where the lid controller hub and the timing controller are located on physically separate modules (e.g., FIG. 10A, FIG. 10C), the connection between modules can comprise a plurality of wires, a flexible printed circuit, a printed circuit, or by one or more other components that provide for communication between modules.

The modules and components in FIGS. 10C-10E that comprise a lid controller hub and a timing controller (e.g., fourth module 1058, second common component 1072, and third common component 1084) can be referred to a lid controller hub.

FIGS. 11A-11C show tables breaking down the hinge wire count for various lid controller hub embodiments. The display wires deliver video data from the SoC display module to the LCH timing controller, the image wires deliver image sensor data generated by one or more lid cameras to the SoC image processing module, the touch wires provide touch sensor data to the SoC integrated sensor hub, the audio and sensing wires provide audio sensor data to the SoC audio capture module and other types sensor data to the integrated sensor hub, and the additional set of "LCH" wires provide for additional communication between the LCH and the SoC. The type of sensor data provided by the audio and sensing wires can comprise visual sensing data generated by vision-based input sensors such as fingerprint sensors, blood vessel sensors, etc. In some embodiment, the vision sensing data can be generated based on information generated by one or more general-purpose cameras rather than a dedicated biometric sensor, such as a fingerprint sensor.

Table 1100 shows a wire breakdown for a 72-wire embodiment. The display wires comprise 19 data wires and 16 power wires for a total of 35 wires to support four eDP HBR2 lanes and six signals for original equipment manufacturer (OEM) use. The image wires comprise six data wires and eight power wires for a total of 14 wires to carry image sensor data generated by a single 1-megapixel camera. The touch wires comprise four data wires and two power wires for a total of six wires to support an I2C connection to carry touch sensor data generated by the touch controller. The audio and sensing wires comprise eight data wires and two power wires for a total of ten wires to support DMIC and I2C connections to support audio sensor data generated by four microphones, along with a single interrupt (INT) wire. Seven additional data wires carry additional information for communication between the LCH and SoC over USB and QSPI connections.

Table 1110 shows a wire breakdown for a 39-wire embodiment in which providing dedicated wires for powering the lid components and eliminating various data signals contribute to the wire count reduction. The display wires comprise 14 data wires and 4 power wires for a total of 18 wires that support two eDP HBR2 lines, six OEM signals and power delivery to the lid. The power provided over the four power wires power the lid controller hub and the other lid components. Power resources in the lid receive the power provided over the dedicated power wires from the base and control the delivery of power to the lid components. The image wires, touch wires, and audio & sensing wires comprise the same number of data wires as in the embodiment illustrated in table 1100, but do not comprise power wires due power being provided to the lid separately. Three additional data wires carry additional information between the LCH and the SoC, down from seven in the embodiment illustrated in table 1100.

Table 1120 shows a wire breakdown for a 29-wire embodiment in which further wire count reductions are achieved by leveraging the existing USB bus to also carry touch sensor data and eliminating the six display data wires carrying OEM signals. The display wires comprise eight data wires and four power wires for a total of 12 wires. The image wires comprise four data wires each for two cameras—a 2-megapixel RGB (red-green-blue) camera and an infrared (IR) camera. The audio & sensing comprise four wires (less than half the embodiment illustrated in table 1110) to support a SoundWire® connection to carry audio data for four microphones. There are no wires dedicated to the transmission of touch sensor data and five wires are used to communicate the touch sensor data. Additional information is to be communicated between the LCH and SoC via a USB connection. Thus, tables 1100 and 1120 illustrate wire count reductions that are enabled by powering the lid via a set of dedicated power wires, reducing the number of eDP channels, leveraging an existing connection (USB) to transport touch sensor data, and eliminating OEM-specific signals. Further reduction in the hinge wire count can be realized via streaming video data from the base to the lid, and audio sensor data, touch sensor data, image sensor data, and sensing data from the lid to the base over a single interface. In some embodiments, this single connection can comprise a PCIe connection.

In embodiments other than those summarized in tables 1100, 1110, and 1120, a hinge can carry more or fewer total wires, more or fewer wires to carry signals of each type listed type (display, image, touch, audio & sensing, etc.), and can utilize connection and interface technologies other than those shown in tables 1100, 1100, and 1120.

Figures 12A, 12B, 12C:
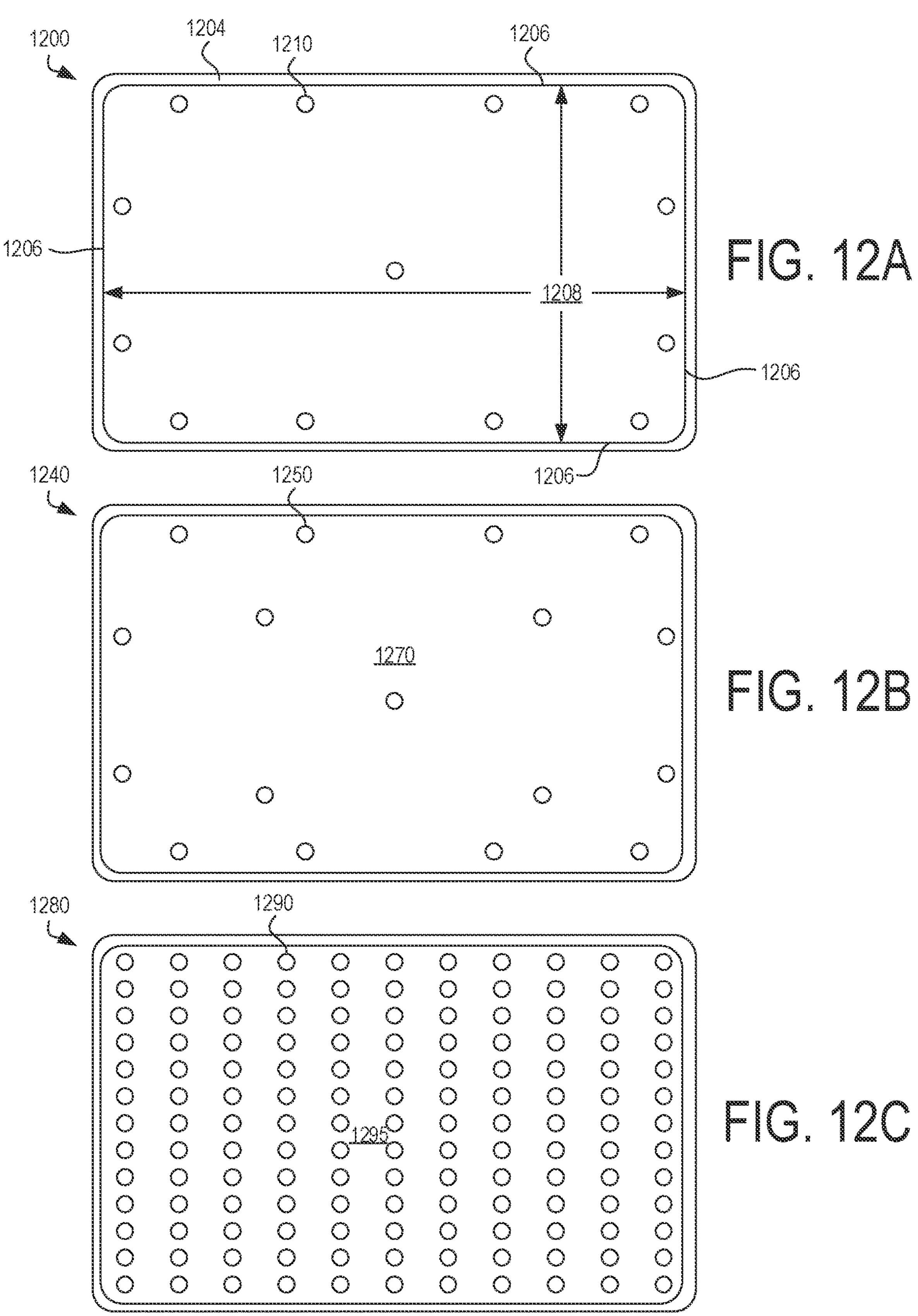
FIGS. 12A-12C illustrate example arrangements of in-display microphones and cameras in a lid.

As mentioned earlier, a lid can comprise in-display cameras and in-display microphones in addition to cameras and microphones that are located in the lid bezel. FIGS. 12A-12C illustrate example arrangements of in-display microphones and cameras in a lid. FIG. 12A illustrates a lid 1200 comprising a bezel 1204, in-display microphones 1210, and a display area 1208. The bezel 1204 borders the display area 1208, which is defined by a plurality of pixels that reside on a display substrate (not shown). The pixels extend to interior edges 1206 of the bezel 1204 and the display area 1208 thus extends from one interior bezel edge 1206 to the opposite bezel edge 1206 in both the horizontal and vertical directions. The in-display microphones 1210 share real estate with the pixel display elements, as will be discussed in greater detail below. The microphones 1210 include a set of microphones located in a peripheral region of a display area 1208 and a microphone located substantially in the center of the display area 1208. FIG. 12B illustrates a lid 1240 in which in-display microphones 1250 include a set of microphones located in a peripheral region of a display area 1270, a microphone located at the center of the display area 1270, and four additional microphones distributed across the display area 1270. FIG. 12C illustrates a lid 1280 in which an array of in-display microphones 1290 are located within a display area 1295 of the lid 1280. In other embodiments, a display can have a plurality of in-display microphones that vary in number and arrangement from the example configurations shown in FIGS. 12A-12C.

FIGS. 12A-12C also illustrate example arrangements of front-facing cameras in an embedded display panel, with 1210, 1250, and 1290 representing in-display cameras instead of microphones. In some embodiments, an embedded display panel can comprise a combination of in-display microphones and cameras. An embedded display can comprise arrangements of in-display cameras or combinations of in-display cameras and in-display microphones that vary in number and arrangement from the example configurations shown in FIGS. 12A-12C.

Figures 13A, 13B:
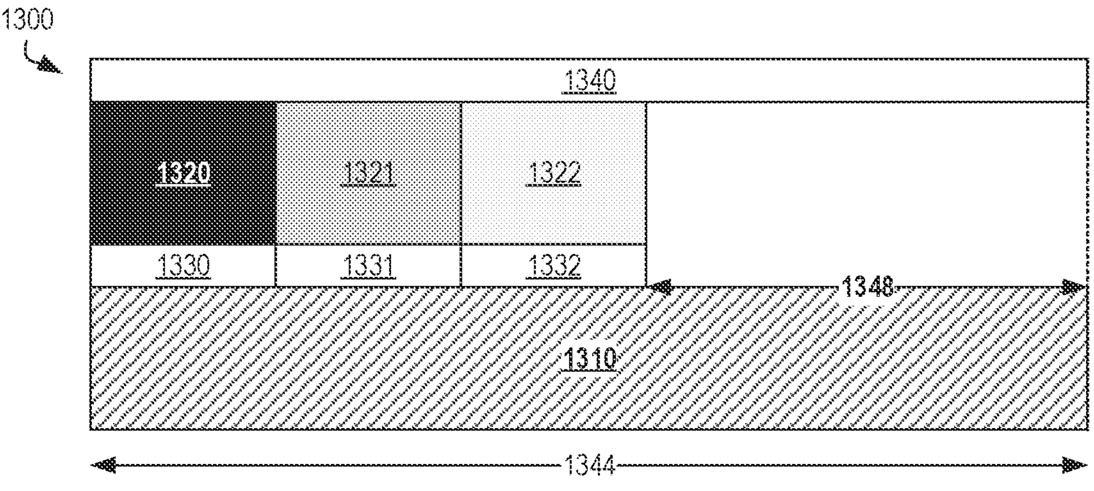
FIGS. 13A-13B illustrate simplified cross-sections of pixels in an example emissive display.

FIGS. 13A-13B illustrate simplified cross-sections of pixels in an example emissive display. FIG. 13A illustrates a simplified illustration of the cross-section of a pixel in an example micro-LED display. Micro-LED pixel 1300 comprises a display substrate 1310, a red LED 1320, a green LED 1321, a blue LED 1322, electrodes 1330-1332, and a transparent display medium 1340. The LEDs 1320-1322 are the individual light-producing elements for the pixel 1300, with the amount of light produced by each LED 1320-1322 being controlled by the associated electrode 1330-1332.

The LED stacks (red LED stack (layers 1320 and 1330), green LED stack (layers 1321 and 1331) and blue LED stack (layers 1322 and 1332)) can be manufactured on a substrate using microelectronic manufacturing technologies. In some embodiments, the display substrate 1310 is a substrate different from the substrate upon which the LEDs stacks are manufactured and the LED stacks are transferred from the manufacturing substrate to the display substrate 1310. In other embodiments, the LED stacks are grown directly on the display substrate 1310. In both embodiments, multiple pixels can be located on a single display substrate and multiple display substrates can be assembled to achieve a display of a desired size.

The pixel 1300 has a pixel width 1344, which can depend on, for example, display resolution and display size. For example, for a given display resolution, the pixel width 1344 can increase with display size. For a given display size, the pixel width 1344 can decrease with increased resolution. The pixel 1300 has an unused pixel area 1348, which is part of the black matrix area of a display. In some displays, the combination of LED size, display size, and display resolution can be such that the unused pixel area 1348 can be large enough to accommodate the integration of components, such as microphones, within a pixel.

FIG. 13B illustrates a simplified illustration of the cross-section of a pixel in an example OLED display. OLED pixel 1350 comprises a display substrate 1355, organic light-emitting layers 1360-1362, which are capable of producing red (layer 1360), green (layer 1361) and blue (layer 1362) light, respectively. The OLED pixel 1350 further comprises cathode layers 1365-1367, electron injection layers 1370-1372, electron transport layers 1375-1377, anode layers 1380-1382, hole injections layers 1385-1387, hole transport layers 1390-1392, and a transparent display medium 1394. The OLED pixel 1350 generates light through application of a voltage across the cathode layers 1365-1367 and anode layers 1380-1382, which results in the injection of electrons and holes into electron injection layers 1370-1372 and hole injection layers 1385-1387, respectively. The injected electrons and holes traverse the electron transport layers 1375-1377 and hole transport layers 1390-1392, respectively, and electron-hole pairs recombine in the organic light-emitting layers 1360-1362, respectively, to generate light.

Similar to the LED stacks in micro-LED displays, OLED stacks (red OLED stack (layers 1365, 1370, 1375, 1360, 1390, 1385, 1380), green OLED stack (layers 1366, 1371, 1376, 1361, 1391, 1386, 1381), and blue OLED stack (layers 1367, 1372, 1377, 1362, 1392, 1387, 1382), can be manufactured on a substrate separate from the display substrate 1355. In some embodiments, the display substrate 1355 is a substrate different from the substrate upon which the OLED stacks are transferred from the manufacturing substrate to the display substrate 1355. In other embodiments, the OLED stacks are directly grown on the display substrate 1355. In both types of embodiments, multiple display substrate components can be assembled in order to achieve a desired display size. The transparent display mediums 1340 and 1394 can be any transparent medium such as glass, plastic or a film. In some embodiments, the transparent display medium can comprise a touchscreen.

Again, similar to the micro-LED pixel 1300, the OLED pixel 1350 has a pixel width 1396 that can depend on factors such as display resolution and display size. The OLED pixel 1350 has an unused pixel area 1398 and in some displays, the combination of OLED stack widths, display size, and display resolution can be such that the unused pixel area 1398 is large enough to accommodate the integration of components, such as microphones, within a pixel.

As used herein, the term "display substrate" can refer to any substrate used in a display and upon which pixel display elements are manufactured or placed. For example, the display substrate can be a backplane manufactured separately from the pixel display elements (e.g., micro-LED/OLEDs in pixels 1300 and 1350) and upon which pixel display elements are attached, or a substrate upon which pixel display elements are manufactured.

Figures 14A, 14B, 14C, 14D:
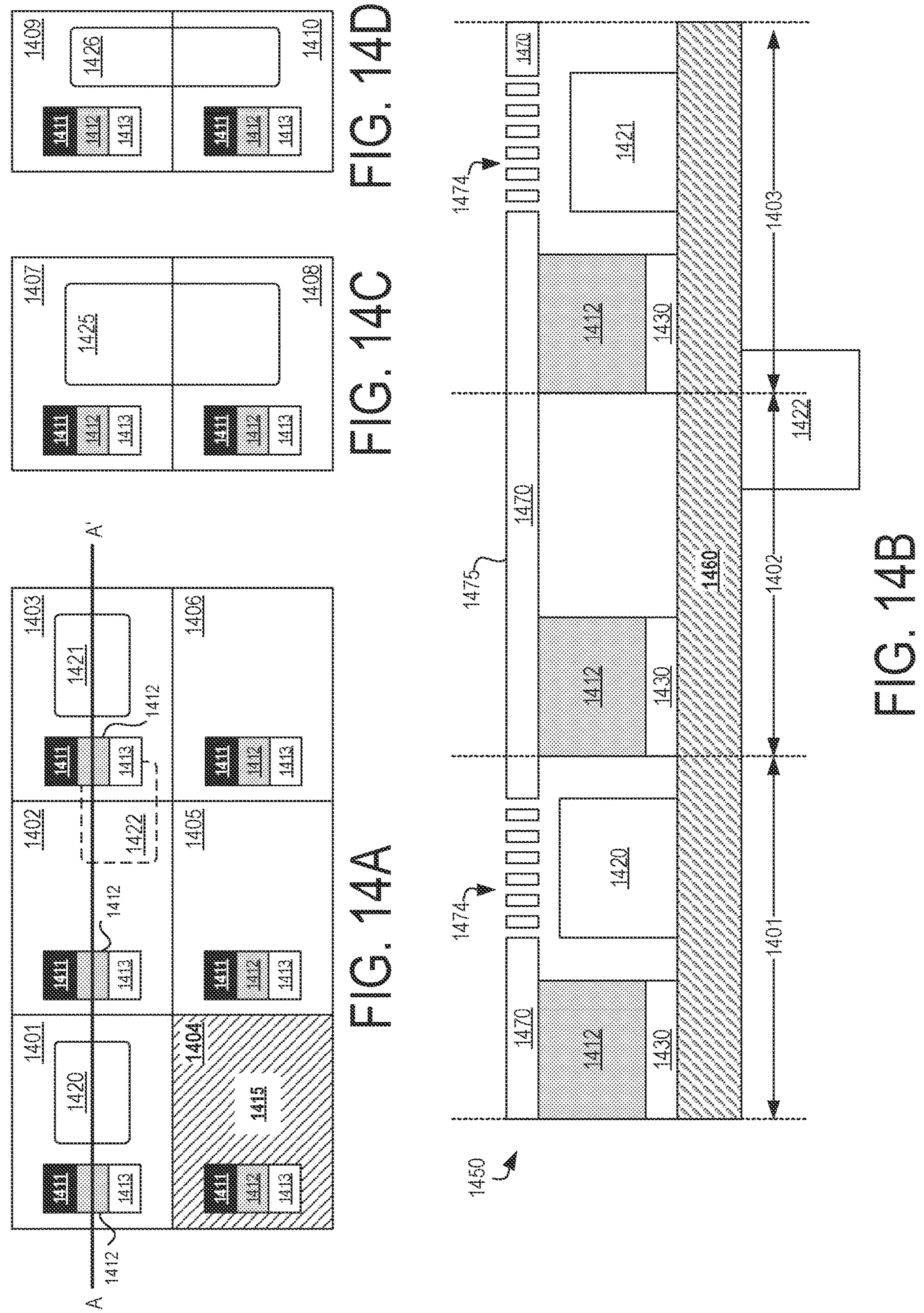
FIG. 14A illustrates a set of example pixels with integrated microphones.
FIG. 14B illustrates a cross-section of the example pixels of FIG. 14A taken along the line A-A'.
FIGS. 14C-14D illustrate example microphones that span multiple pixels.

FIG. 14A illustrates a set of example pixels with integrated microphones. Pixels 1401-1406 each have a red display element 1411, green display element 1412, and blue display element 1413, which can be, for example, micro-LEDs or OLEDs. Each of the pixels 1401-1406 occupies a pixel area. For example, the pixel 1404 occupies pixel area 1415. The amount of pixel area occupied by the display elements 1411-1413 in each pixel leaves enough remaining black matrix space for the inclusion of miniature microphones. Pixels 1401 and 1403 contain front-facing microphones 1420 and 1421, respectively, located alongside the display elements 1411-1413. As rear-facing microphones are located on the back side of the display substrate, they are not constrained by unused pixel area or display element size and can be placed anywhere on the back side of a display substrate. For example, rear-facing microphone 1422 straddles pixels 1402 and 1403.

FIG. 14B illustrates a cross-section of the example pixels of FIG. 14A taken along the line A-A'. Cross-section 1450 illustrates the cross-section of pixels 1401-1403. Green display elements 1412 and corresponding electrodes 1430 for the pixels 1401-1403 are located on display substrate 1460. The pixels 1401-1403 are covered by transparent display medium 1470 that has holes 1474 above microphones 1420 and 1421 to allow for acoustic vibrations reaching a display surface 1475 to reach the microphones 1420 and 1421. The rear-facing microphone 1422 is located on the back side of the display substrate 1460. In some embodiments, a display housing (not shown) in which pixels 1401-1403 are located has vents or other openings to allow acoustic vibrations reaching the back side of the housing to reach rear-facing microphone 1422.

In some embodiments, the microphones used in the technologies described herein can be discrete microphones that are manufactured or fabricated independently from the pixel display elements and are transferred from a manufacturing substrate or otherwise attached to a display substrate. In other embodiments, the microphones can be fabricated directly on the display substrate. Although front-facing microphones are shown as being located on the surface of the display substrate 1460 in FIG. 14B, in embodiments where the microphones are fabricated on a display substrate, they can reside at least partially within the display substrate.

As used herein, the term "located on" in reference to any sensors (microphones, piezoelectric elements, thermal sensors) with respect to the display substrate refers to sensors that are physically coupled to the display substrate in any manner (e.g., discrete sensors that are directly attached to the substrate, discrete sensors that are attached to the substrate via one or more intervening layers, sensors that have been fabricated on the display substrate). As used herein, the term "located on" in reference to LEDs with respect to the display substrate similarly refers to LEDs that are physically coupled to the display substrate in any manner (e.g., discrete LEDs that are directly attached to the substrate, discrete LEDs that are attached to the substrate via one or more intervening layers, LEDs that have been fabricated on the display substrate). In some embodiments, front-facing microphones are located in the peripheral area of a display to reduce any visual distraction that holes in the display above the front-facing microphones (such as holes 1474) may present to a user. In other embodiments, holes above a microphone may small enough or few enough in number such that they present little or no distraction from the viewing experience.

Although the front-facing microphones 1420 and 1421 are each shown as residing within one pixel, in other embodiments, front-facing microphones can straddle multiple pixels. This can, for example, allow for the integration of larger microphones into a display area or for microphones to be integrated into a display with smaller pixels. FIGS. 14C-14D illustrate example microphones that span multiple pixels. FIG. 14C illustrates adjacent pixels 1407 and 1408 having the same size as pixels 1401-1406 and a front-facing microphone 1425 that is bigger than front-facing microphones 1420-1421 and occupies pixel area not used by display elements in two pixels. FIG. 14D illustrates adjacent pixels 1409 and 1410 that are narrower in width than pixels 1401-1406 and a front-facing microphone 1426 that spans both pixels. Using larger microphones can allow for improved acoustic performance of a display, such as allowing for improved acoustic detection. Displays that have many integrated miniature microphones distributed across the display area can have acoustic detection capabilities that exceed displays having just one or a few discrete microphones located in the display bezel.

In some embodiments, the microphones described herein are MEMS (microelectromechanical systems) microphones. In some embodiments, the microphones generate analog audio signals that are provided to the audio processing components and in other embodiments, the microphones provide digital audio signals to the audio processing components. Microphones generating digital audio signals can contain a local analog-to-digital converter and provide a digital audio output in pulse-density modulation (PDM), I2S (Inter-IC Sound), or other digital audio signal formats. In embodiments where the microphones generate digital audio signals, the audio processing components may not comprise analog-to-digital converters. In some embodiments, the integrated microphones are MEMS PDM microphones having dimensions of approximately 3.5 mm (width)×2.65 mm (length)×0.98 mm (height).

As microphones can be integrated into individual pixels or across several pixels using the technologies described herein, a wide variety of microphone configurations can be incorporated into a display. FIGS. 12A-12C and 14A-14D illustrate several microphone configurations and many more are possible. The display-integrated microphones described herein generate audio signals that are sent to the audio module of a lid controller hub (e.g., audio module 364 in FIGS. 3 and 7).

Displays with microphones integrated into the display area as described herein can perform various audio processing tasks. For example, displays in which multiple front-facing microphones are distributed over the display area can perform beamforming or spatial filtering on audio signals generated by the microphones to allow for far-field capabilities (e.g., enhanced detection of sound generated by a remote acoustic source). Audio processing components can determine the location of a remote audio source, select a subset of microphones based on the audio source location, and utilize audio signals from the selected subset of microphones to enhance detection of sound received at the display from the audio source. In some embodiments, the audio processing components can determine the location of an audio source by determining delays to be added to audio signals generated by various combinations of microphones such that the audio signals overlap in time and then inferring the distance to the audio source from each microphone in the combination based on the added delay to each audio signal. By adding the determined delays to the audio signals provided by the microphones, audio detection in the direction of the remote audio source can be enhanced. A subset of the total number of microphones in a display can be used in beamforming or spatial filtering, and microphones not included in the subset can be powered off to reduce power. Beamforming can similarly be performed using rear-facing microphones distributed across the back side of the display substrate. As compared to displays having a few microphones incorporated into a display bezel, displays with microphones integrated into the display area are capable of improved beamforming due to the greater number of microphones that can be integrated into the display and being spread over a greater area.

In some embodiments, a display is configured with a set of rear-facing microphones distributed across the display area that allows for a closeable device incorporating the display to have audio detection capabilities when the display is closed. For example, a closed device can be in a low-power mode in which the rear-facing microphones and audio processing components capable of performing wake phrase or word detection or identifying a particular user (Speaker ID) are enabled.

In some embodiments, a display comprising both front- and rear-facing microphones can utilize both types of microphones for noise reduction, enhanced audio detection (far field audio), and enhanced audio recording. For example, if a user is operating a laptop in a noisy environment, such as a coffee shop or cafeteria, audio signals from one or more rear-facing microphones picking up ambient noise can be used to reduce noise in an audio signal provided by a front-facing microphone containing the voice of the laptop user. In another example, an audio recording made by a device containing such a display can include audio received by both front- and rear-facing microphones. By including audio captured by both front- and rear-facing microphones, such a recording can provide a more accurate audio representation of the recorded environment. In further examples, a display comprising both front- and rear-facing microphones can provide for 360-degree far field audio reception. For example, the beamforming or spatial filtering approaches described herein can be applied to audio signals provided by both front- and rear-facing microphones to provide enhanced audio detection.

Displays with integrated microphones located within the display area have advantages over displays with microphones located in a display bezel. Displays with microphones located in the display area can have a narrower bezel as bezel space is not needed for housing the integrated microphones. Displays with reduced bezel width can be more aesthetically pleasing to a viewer and allow for a larger display area within a given display housing size. The integration of microphones in a display area allows for a greater number of microphones to be included in a device, which can allow for improved audio detection and noise reduction. Moreover, displays that have microphones located across the display area allow for displays with enhanced audio detection capabilities through the use of beamforming or spatial filtering of received audio signals as described above. Further, the cost and complexity of routing audio signals from microphones located in the display area to audio processing components that are also located in the display area can be less than wiring discrete microphones located in a display bezel to audio processing components located external to the display.

Figures 15A, 15B, 15C, 15D:
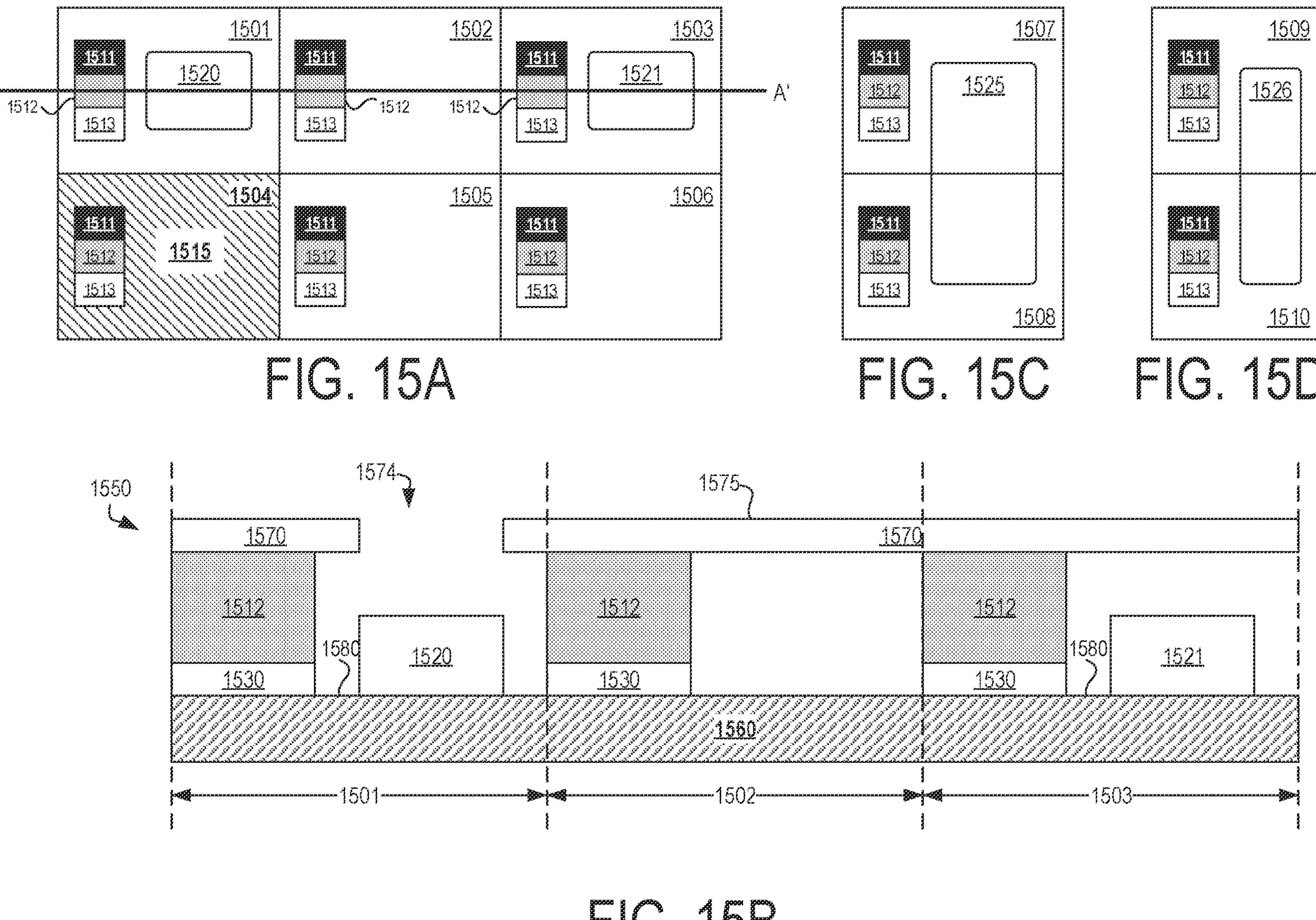
FIG. 15A illustrates a set of example pixels with in-display cameras.
FIG. 15B illustrates a cross-section of the example pixels of FIG. 15A taken along the line A-A'.
FIGS. 15C-15D illustrate example cameras that span multiple pixels.

FIG. 15A illustrates a set of example pixels with in-display cameras. Pixels 1501-1506 each have a red display element 1511, green display element 1512, and blue display element 1513. In some embodiments, these display elements are micro-LEDs or OLEDs. Each of the pixels 1501-1506 occupies a pixel area. For example, the pixel 1504 occupies pixel area 1515. The amount of pixel area occupied by the display elements 1511-1513 in each pixel leaves enough remaining black matrix area for the inclusion of miniature cameras or other sensors. Pixels 1501 and 1503 contain cameras 1520 and 1521, respectively, located alongside the display elements 1511-1513. As used herein, the term "in-display camera" refers to a camera that is located in the pixel area of one or more pixels within a display. Cameras 1520 and 1521 are in-display cameras.

FIG. 15B illustrates a cross-section of the example pixels of FIG. 15A taken along the line A-A'. Cross-section 1550 illustrates a cross-section of pixels 1501-1503. The green display elements 1512 and the corresponding electrodes 1530 for the pixels 1501-1503 are located on display substrate 1560 and are located behind a transparent display medium 1570. A camera located in a display area can receive light that passes or does not pass through a transparent display medium. For example, the region of the transparent display medium 1570 above the camera 1520 has a hole 1574 in it to allow for light to hit the image sensor of the camera 1520 without having to pass through the transparent display medium. The region of the transparent display medium 1570 above the camera 1521 does not have a hole and the light reaching the image sensor in the camera 1521 passes through the transparent display medium.

In some embodiments, in-display cameras can be discrete cameras manufactured independently from pixel display elements and the discrete cameras are attached to a display substrate after they are manufactured. In other embodiments, one or more camera components, such as the image sensor can be fabricated directly on a display substrate. Although the cameras 1520-1521 are shown as being located on a front surface 1580 of the display substrate 1560 in FIG. 15B, in embodiments where camera components are fabricated on a display substrate, the cameras can reside at least partially within the display substrate.

As used herein, the term "located on" in reference to any sensors or components (e.g., cameras, thermal sensors) with respect to the display substrate refers to sensors or components that are physically coupled to the display substrate in any manner, such as discrete sensors or other components that are directly attached to the substrate, discrete sensors or components that are attached to the substrate via one or more intervening layers, and sensors or components that have been fabricated on the display substrate. As used herein, the term "located on" in reference to LEDs with respect to the display substrate similarly refers to LEDs that are physically coupled to the display substrate in any manner, such as discrete LEDs that are directly attached to the substrate, discrete LEDs that are attached to the substrate via one or more intervening layers, and LEDs that have been fabricated on the display substrate.

Although cameras 1520 and 1521 are shown as each residing within one pixel in FIGS. 15A and 15B, in other embodiments, in-display cameras can span multiple pixels. This can allow, for example, for the integration of larger cameras into a display area or for cameras to be integrated into a display with pixels having a smaller black matrix area. FIGS. 15C-15D illustrate example cameras that span multiple pixels. FIG. 15C illustrates adjacent pixels 1507 and 1508 having the same size as pixels 1501-1506 and a camera 1525 that is bigger than cameras 1520-1521 and that occupies a portion of the pixel area in the pixels 1507-1508. FIG. 15D illustrates adjacent pixels 1509 and 1510 that are narrower in width than pixels 1501-1506 and a camera 1526 that spans both pixels. Using larger cameras can allow for an improved image or video capture, such as for allowing the capture of higher-resolution images and video at individual cameras.

As cameras can be integrated into individual pixels or across several pixels, a wide variety of camera configurations can be incorporated into a display. FIGS. 12A-12C, and 15A-15D illustrate just a few camera configurations and many more are possible. In some embodiments, thousands of cameras could be located in the display area. Displays that have a plurality of in-display cameras distributed across the display area can have image and video capture capabilities exceeding those of displays having just one or a few cameras located in a bezel.

The in-display cameras described herein generate image sensor data that is sent to a vision/imaging module in a lid controller hub, such as vision/imaging module 363 in FIGS. 3 and 6. Image sensor data is the data that is output from the camera to other components. Image sensor data can be image data, which is data representing an image or video data, which is data representing video. Image data or video data can be in compressed or uncompressed form. Image sensor data can also be data from which image data or video data is generated by another component (e.g., the vision/imaging module 363 or any component therein).

The interconnections providing the image sensor data from the cameras to a lid controller hub can be located on the display substrate. The interconnections can be fabricated on the display substrate, attached to the display substrate, or physically coupled to the display substrate in any other manner. In some embodiments, display manufacture comprises manufacturing individual display substrate portions to which pixels are attached and assembling the display substrate portions together to achieve a desired display size.

Figure 16:
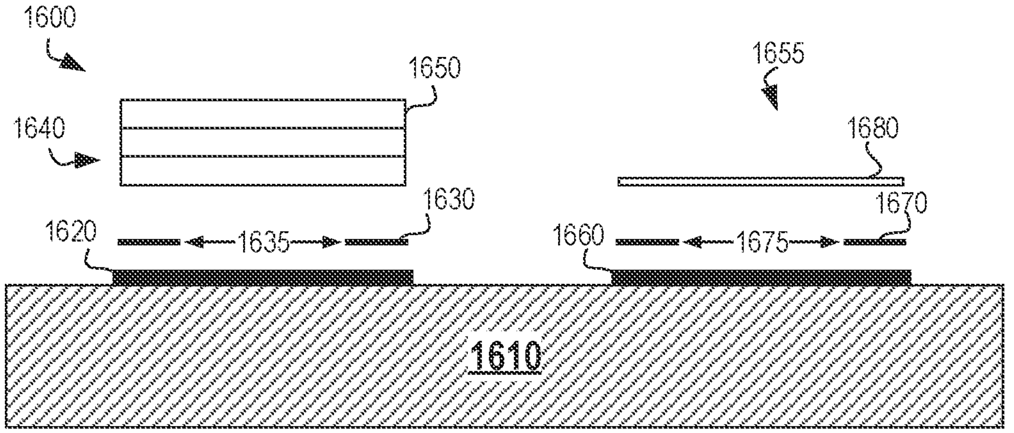
FIG. 16 illustrates example cameras that can be incorporated into an embedded display.

FIG. 16 illustrates example cameras that can be incorporated into an embedded display. A camera 1600 is located on a display substrate 1610 and comprises an image sensor 1620, an aperture 1630, and a microlens assembly 1640. The image sensor 1620 can be a CMOS photodetector or any other type of photodetector. The image sensor 1620 comprises a number of camera pixels, the individual elements used for capturing light in a camera, and the number of pixels in the camera can be used as a measure of the camera's resolution (e.g., 1 megapixel, 12 megapixels, 20 megapixels). The aperture 1630 has an opening width 1635. The microlens assembly 1640 comprises one or more microlenses 1650 that focus light to a focal point and which can be made of glass, plastic, or other transparent material. The microlens assembly 1640 typically comprises multiple microlenses to account for various types of aberrations (such as chromatic aberration) and distortions.

A camera 1655 is also located on display substrate 1610 and comprises an image sensor 1660, an aperture 1670 and a metalens 1680. The camera 1655 is similar to camera 1600 except for the use of a metalens instead of a microlens assembly as the focusing element. Generally, a metalens is a planar lens comprising physical structures on its surface that act to manipulate different wavelengths of light such they reach the same focal point. Metalenses do not produce the chromatic aberration that can occur with single existing microlenses. Metalenses can be much thinner than glass, plastic or other types of microlenses and can be fabricated using MEMS (microelectromechanical systems) or NEMS (nanoelectromechanical systems) approaches. As such, a camera comprising a single, thin metalens, such as the camera 1655 can be thinner than a camera comprising a microlens assembly comprising multiple microlenses, such as the camera 1600. The aperture 1670 has an opening width 1675.

The distance from the microlens assembly 1640 to image sensor 1620 and from the metalens 1680 to the image sensor 1660 defines the focal length of the cameras 1600 and 1655, respectively, and the ratio of the focal length to the aperture opening width (1635, 1675) defines the f-stop for the camera, a measure of the amount of light that reaches the surface of the image sensor. The f-stop is also a measure of the camera's depth of field, with small f-stop cameras having shallower depths of field and large f-stop cameras having deeper depths of field. The depth of field can have a dramatic effect on a captured image. In an image with a shallow depth of field it is often only the subject of the picture that is in focus whereas in an image with a deep depth of field, most objects are typically in focus.

In some embodiments, the cameras 1600 and 1655 are fixed-focus cameras. That is, their focal length is not adjustable. In other embodiments, the focal length of cameras 1600 and 1655 can be adjusted by moving the microlens assembly 1640 or the metalens 1680 either closer to or further away from the associated image sensor. In some embodiments, the distance of the microlens assembly 1640 or the metalens 1680 to their respective image sensors can be adjusted by MEMS-based actuators or other approaches.

In-display cameras can be distributed across a display area in various densities. For example, cameras can be located at 100-pixel intervals, 10-pixel intervals, in adjacent pixels, or in other densities. A certain level of camera density (how many cameras there are per unit area for a region of the display) may be desirable for a particular use case. For example, if the cameras are to be used for image and video capture, a lower camera density may suffice than if the cameras are to be used for touch detection or touch location determination.

In some embodiments, image data corresponding to images captured by multiple individual cameras can be utilized to generate a composite image. The composite image can have a higher resolution than any image capable of being captured by the individual cameras. For example, a system can utilize image data corresponding to images captured by several 3-megapixel cameras to produce a 6-megapixel image. In some embodiments, composite images or videos generated from images or videos captured by individual in-display cameras could have ultra-high resolution, such as in the gigapixel range. Composite images and videos could be used for ultra-high resolution self-photography and videos, ultra-high resolution security monitors, or other applications.

The generation of higher-resolution images from image data corresponding to images captured by multiple individual cameras can allow for individual cameras with lower megapixel counts to be located in the individual pixels. This can allow for cameras to be integrated into higher resolution displays for a given screen size or in smaller displays for a given resolution (where there are more pixels per unit area of display size and thus less free pixel area available to accommodate the integration of cameras at the pixel level). Composite images can be generated in real time as images are captured, with only the image data for the composite image being stored, or the image data for e images captured by the individual cameras can be stored and a composite image can be generated during post-processing. Composite video can be similarly generated using video data corresponding to videos generated by multiple individual cameras, with the composite video being generated in real time or during post-processing.

In some embodiments, in-display cameras can be used in place of touchscreens to detect an object (e.g., finger, stylus) touching the display surface and determining where on the display the touch has occurred. Some existing touchscreen technologies (e.g., resistance-based, capacitance-based) can add thickness to a display though the addition of multiple layers on top of a transparent display medium while others use in-cell or on-cell touch technologies to reduce display thickness. As used herein, the term "transparent display medium" includes touchscreen layers, regardless of whether the touchscreen layers are located on top of a transparent display medium or a transparent display medium is used as a touchscreen layer. Some existing touchscreen technologies employ transparent conductive surfaces laminated together with an isolation layer separating them. These additional layers add thickness to a display and can reduce the transmittance of light through the display. Eliminating the use of separate touchscreen layers can reduce display expense as the transparent conductors used in touchscreens are typically made of indium tin oxide, which can be expensive.

Touch detection and touch location determination can be performed using in-display cameras by, for example, detecting the occlusion of visible or infrared light caused by an object touching or being in close proximity to the display. A touch detection module, which can be located in the display or otherwise communicatively coupled to the display can receive images captured by in-display cameras and process the image data to detect one or more touches to the display surface and determine the location of the touches. Touch detection can be done by, for example, determining whether image sensor data indicates that the received light at an image sensor has dropped below a threshold. In another example, touch detection can be performed by determining whether image sensor data indicates that the received light at a camera has dropped by a determined percentage or amount. In yet another example, touch detection can be performed by determining whether image sensor data indicates that the received light at a camera has dropped by a predetermined percentage or amount within a predetermined amount of time.

Touch location determination can be done, for example, by using the location of the camera whose associated image sensor data indicates that a touch has been detected at the display (e.g., the associated image sensor data indicates that the received light at an image sensor of the camera has dropped below a threshold, dropped by a predetermined percentage or amount, or dropped by a predetermined percentage or amount in a predetermined amount of time) as the touch location. In some embodiments, the touch location is based on the location within an image sensor at which the lowest level of light is received. If the image sensor data associated with multiple neighboring cameras indicate a touch, the touch location can be determined by determining the centroid of the locations of the multiple neighboring cameras.

In some embodiments, touch-enabled displays that utilize in-display cameras for touch detection and touch location determination can have a camera density greater than displays comprising in-displays cameras that are not touch-enabled. However, it is not necessary that displays that are touch-enabled through the use of in-display cameras have cameras located in every pixel. The touch detection module can utilize image sensor data from one or more cameras to determine a touch location. The density of in-display cameras can also depend in part on the touch detection algorithms used.

Information indicating the presence of a touch and touch location information can be provided to an operating system, an application, or any other software or hardware component of a system comprising a display or communicatively coupled to the display. Multiple touches can be detected as well. In some embodiments, in-display cameras provide updated image sensor data to the touch detection module at a frequency sufficient to provide for the kind of touch display experience that users have come to expect of modern touch-enabled devices. The touch detection capabilities of a display can be temporarily disabled as in-display cameras are utilized for other purposes as described herein.

In some embodiments, if a touch is detected by the system in the context of the system having prompted the user to touch their finger, thumb, or palm against the display to authenticate a user, the system can cause the one or more pixel display elements located at or in the vicinity of where a touch has been detected to emit light to allow the region where a user's finger, thumb, or palm is touching to be illuminated. This illumination may allow for the capture of a fingerprint, thumbprint, or palmprint in which print characteristics may be more discernible or easily extractible by the system or device.

The use of in-display cameras allows for the detection of a touch to the display surface by a wider variety of objects than can be detected by existing capacitive touchscreen technologies. Capacitive touchscreens detect a touch to the display by detecting a local change in the electrostatic field generated by the capacitive touchscreen. As such, capacitive touchscreens can detect a conductive object touching or in close proximity to the display surface, such as a finger or metallic stylus. As in-display cameras rely on the occlusion of light to detect touches and not on sensing a change in capacitance at the display surface, in-display camera-based approaches for touch sensing can detect the touch of a wide variety of objects, including passive styluses. There are no limitations that the touching object be conductive or otherwise able to generate a change in a display's electrostatic field.

In some embodiments, in-display cameras can be used to detect gestures that can be used by a user to interface with a system or device. A display incorporating in-display cameras can allow for the recognition of two-dimensional (2D) gestures (e.g., swipe, tap, pinch, unpinch) made by one or more fingers or other objects on a display surface or of three-dimensional (3D) gestures made by a stylus, finger, hand, or another object in the volume of space in front of a display. As used herein, the phrase "3D gesture" describes a gesture, at least a portion of which, is made in the volume of space in front of a display and without touching the display surface.

The twist gesture can be mapped to an operation to be performed by an operating system or an application executing on the system. For example, a twist gesture can cause the manipulation of an object in a CAD (computer-aided design) application. For instance, a twist gesture can cause a selected object in the CAD application to be deformed by the application keeping one end of the object fixed and rotating the opposite end of the object by an amount corresponding to a determined amount of twisting of the physical object by the user. For example, a 3D cylinder in a CAD program can be selected and be twisted about its longitudinal axis in response to the system detecting a user twisting a stylus in front of the display. The resulting deformed cylinder can look like a piece of twisted licorice candy. The amount of rotation, distortion, or other manipulation that a selected object undergoes in response to the detection of a physical object being in front of the display being rotated does not need to have a one-to-one correspondence with the amount of detected rotation of the physical object. For example, in response to detecting that a stylus is rotated 360 degrees, a selected object can be rotated 180 degrees (one-half of the detected amount of rotation), 720 degrees (twice the detected amount of rotation), or any other amount proportional to the amount of detected rotation of the physical object.

Systems incorporating a display or communicatively coupled to a display with in-display cameras are capable of capturing 3D gestures over a greater volume of space in front of the display than what can be captured by only a small number of cameras located in a display bezel. This is due to in-display cameras being capable of being located across a display collectively have a wider viewing area relative to the collective viewing area of a few bezel cameras. If a display contains only one or more cameras located in a display bezel, those cameras will be less likely to capture 3D gestures made away from the bezel (e.g., in the center region of the display) or 3D gestures made close to the display surface. Multiple cameras located in a display area can also be used to capture depth information for a 3D gesture.

The ability to recognize 3D gestures in front of the display area allows for the detection and recognition of gestures not possible with displays comprising resistive or capacitive touchscreens or bezel cameras. For example, systems incorporating in-display cameras can detect 3D gestures that start or end with a touch to the display. For example, a "pick-up-move-place" gesture can comprise a user performing a pinch gesture on the display surface to select an object shown at or in the vicinity of the location where the pinched fingers come together (pinch location), picking up the object by moving their pinched fingers away from the display surface, moving the object by moving their pinched fingers along a path from the pinched location to a destination location, placing the object by moving their pinched finger back towards the display surface until the pinched fingers touch the display surface and unpinching their fingers at the destination location.

During a "pick-up-move-place" gesture, the selected object can change from an unselected appearance to a selected appearance in response to detection of the pinch portion of the gesture, the selected object can be moved across the display from the pinch location to the destination location in response to detection of the move portion of the gesture, and the selected object can change back to an unselected appearance in response to detecting the placing portion of the gesture. Such a gesture could be used for the manipulation of objects in a three-dimensional environment rendered on a display. Such a three-dimensional environment could be part of a CAD application or a game. The three-dimension nature of this gesture could manifest itself by, for example, the selected object not interacting with other objects in the environment located along the path traveled by the selected objected as it is moved between the pinched location and the destination location. That is, the selected object is being picked up and lifted over the other objects in the application via the 3D "pick-up-move-place" gesture.

Variations of this gesture could also be recognized. For example, a "pick-up-and-drop" gesture could comprise a user picking up an object by moving their pinched fingers away from the display surface after grabbing the object with a pinch gesture and then "dropping" the object by unpinching their fingers while they are located above the display. An application could generate a response to detecting that a picked-up object has been dropped. The magnitude of the response could correspond to the "height" from which the object was dropped, the height corresponding to a distance from the display surface that the pinched fingers were determined to be positioned when they were unpinched. In some embodiments, the response of the application to an object being dropped can correspond to one or more attributes of the dropped object, such as its weight.

For example, in a gaming application, the system could detect a user picking up a boulder by detecting a pinch gesture at the location where the boulder is shown on the display, detect that the user has moved their pinched fingers a distance from the display surface, and detect that the user has unpinched their pinched fingers at a distance from the display surface. The application can interpret the unpinching of the pinched fingers at a distance away from the display surface as the boulder being dropped from a height. The gaming application can alter the gaming environment to a degree that corresponds to the "height" from which the boulder was dropped, the height corresponding to a distance from the display surface at which the system determined the pinched fingers to have been unpinched and the weight of the boulder. For example, if the boulder was dropped from a small height, a small crater may be created in the environment, and the application can generate a soft thud noise as the boulder hits the ground. If the boulder is dropped from a greater height, a larger crater can be formed, nearby trees could be knocked over, and the application could generate a loud crashing sound as the boulder hits the ground. In other embodiments, the application can take into account attributes of the boulder, such as its weight, in determining the magnitude of the response, a heavier boulder creating a greater alternation in the game environment when dropped.

In some embodiments, a measure of the distance of unpinched or pinched fingers from the display surface can be determined by the size of fingertips extracted from image sensor data generated by in-display cameras, with larger extracted fingertip sizes indicating that the fingertips are closer to the display surface. The determined distance of pinched or unpinched fingers does not need to be determined according to a standardized measurement system (e.g., metric, imperial), and can be any metric wherein fingers located further away from the display surface are a greater distance away from the display surface than fingers located nearer the display surface.

Figure 17:
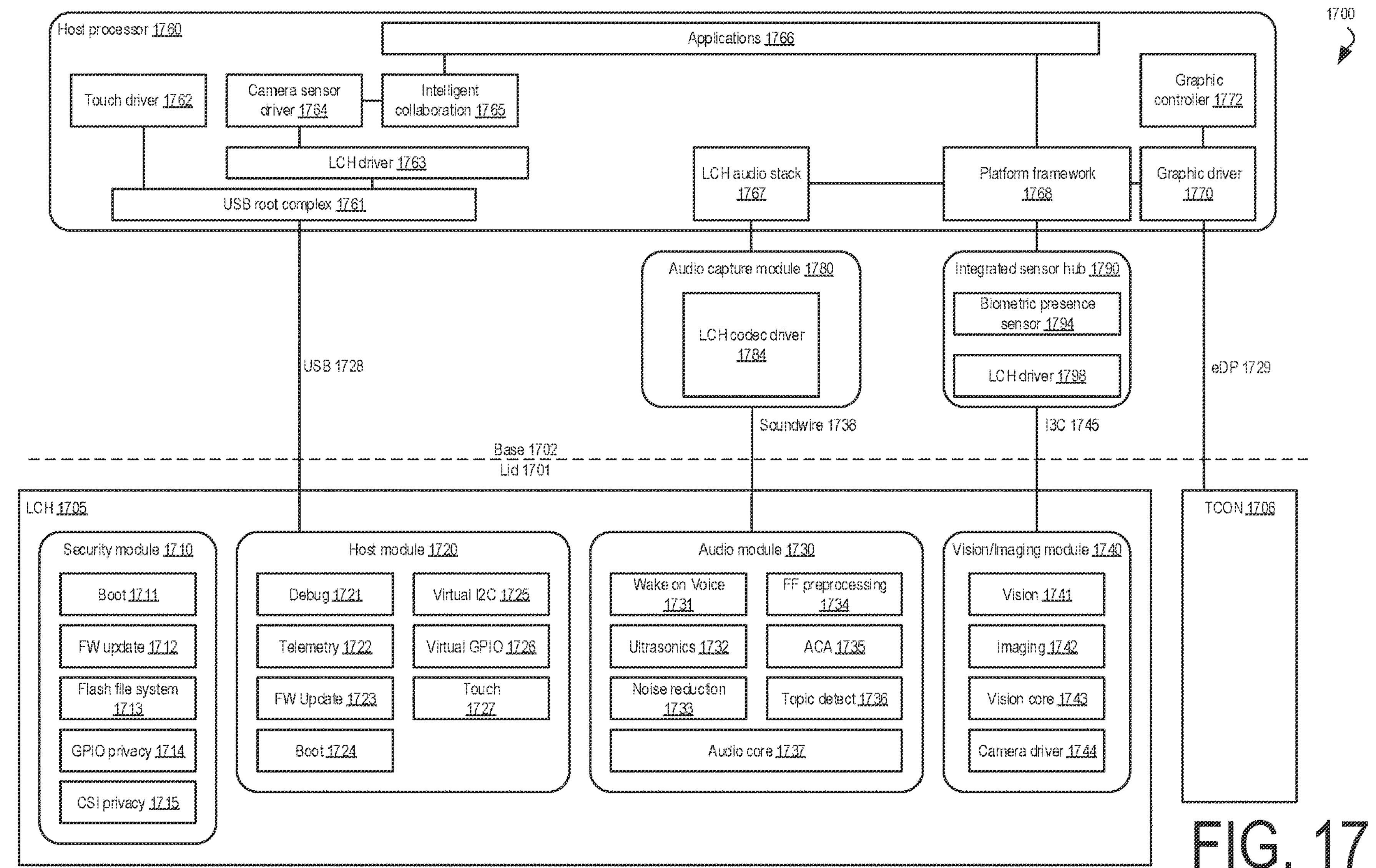
FIG. 17 illustrates a block diagram of an example software/firmware environment of a mobile computing device comprising a lid controller hub.

FIG. 17 illustrates a block diagram of an example software/firmware environment of a mobile computing device comprising a lid controller hub. The environment 1700 comprises a lid controller hub 1705 and a timing controller 1706 located in a lid 1701 in communication with components located in a base 1702 of the device. The LCH 1705 comprises a security module 1710, a host module 1720, an audio module 1730, and a vision/imaging module 1740. The security module 1710 comprises a boot module 1711, a firmware update module 1712, a flash file system module 1713, a GPIO privacy module 1714, and a CSI privacy module 1715. In some embodiments, any of the modules 1711-1715 can operate on or be implemented by one or more of the security module 1710 components illustrated in FIGS. 2-4 or otherwise disclosed herein. The boot module 1711 brings the security module into an operational state in response to the computing device being turned on. In some embodiments, the boot module 1711 brings additional components of the LCH 1705 into an operational state in response to the computing device being turned on. The firmware update module 1712 updates firmware used by the security module 1710, which allows for updates to the modules 1711 and 1713-1715. The flash file system module 1713 implements a file system for firmware and other files stored in flash memory accessible to the security module 1710. The GPIO and CSI privacy modules 1714 and 1715 control the accessibility by LCH components to image sensor data generated by cameras located in the lid.

The host module 1720 comprises a debug module 1721, a telemetry module 1722, a firmware update module 1723, a boot module 1724, a virtual I2C module 1725, a virtual GPIO 1726, and a touch module 1727. In some embodiments, any of the modules 1721-1727 can operate on or be implemented by one or more of the host module components illustrated in FIGS. 2-3 and 5 or otherwise disclosed herein. The boot module 1724 brings the host module 1720 into an operational state in response to the computing device being turned on. In some embodiments, the boot module 1724 brings additional components of the LCH 1705 into an operational responsible in response to the computing device being turned on. The firmware update module 1723 updates firmware used by the host module 1720, which allows for updates to the modules 1721-1722 and 1724-1727. The debug module 1721 provides debug capabilities for the host module 1720. In some embodiments the debug module 1721 utilizes a JTAG port to provide debug information to the base 1702. In some embodiments. The telemetry module 1722 generates telemetry information that can be used to monitor LCH performance. In some embodiments, the telemetry module 1722 can provide information generated by a power management unit (PMU) and/or a clock controller unit (CCU) located in the LCH. The virtual I2C module 1725 and the virtual GPIO 1726 allow the host processor 1760 to remotely control the GPIO and I2C ports on the LCH as if they were part of the SoC. By providing control of LCH GPIO and I2C ports to a host processor over a low-pin USB connection allows for the reduction in the number of wires in the device hinge. The touch module 1727 processes touch sensor data provided to the host module 1720 by a touch sensor controller and drives the display's touch controller. The touch module 1727 can determine, for example, the location on a display of one or more touches to the display and gesture information (e.g., type of gesture, information indicating the location of the gesture on the display). Information determined by the touch module 1727 and other information generated by the host module 1720 can be communicated to the base 1702 over the USB connection 1728.

The audio module 1730 comprises a Wake on Voice module 1731, an ultrasonics module 1732, a noise reduction module 1733, a far-field preprocessing module 1734, an acoustic context awareness module 1735, a topic detection module 1736, and an audio core 1737. In some embodiments, any of the modules 1731-1737 can operate on or be implemented by one or more of the audio module components illustrated in FIGS. 2-3 and 6 or otherwise disclosed herein. The Wake on Voice module 1731 implements the Wake on Voice feature previously described and in some embodiments can further implement the previously described Speaker ID feature. The ultrasonics module 1732 can support a low-power low-frequency ultrasonic channel by detecting information in near-ultrasound/ultrasonic frequencies in audio sensor data. In some embodiments, the ultrasonics module 1732 can drive one or more speakers located in the computing device to transmit information via ultrasonic communication to another computing device. The noise reduction module 1733 implements one or more noise reduction algorithms on audio sensor data. The far-field preprocessing module 1734 perform preprocessing on audio sensor data to enhance audio signals received from a remote audio source. The acoustic context awareness module 1735 can implement algorithms or models that process audio sensor data based on a determined audio context of the audio signal (e.g., detecting an undesired background noise and then filtering the unwanted background noise out of the audio signal).

The topic detection module 1736 determines one or more topics in speech detected in audio sensor data. In some embodiments, the topic detection module 1736 comprises natural language processing algorithms. In some embodiments, the topic detection module 1736 can determine a topic being discussed prior to an audio query by a user and provide a response to the user based on a tracked topic. For example, a topic detection module 1736 can determine a person, place, or other topic discussed in a time period (e.g., in the past 30 seconds, past 1 minute, past 5 minutes) prior to a query, and answer the query based on the topic. For instance, if a user is talking to another person about Hawaii, the topic detection module 1736 can determine that "Hawaii" is a topic of conversation. If the user then asks the computing device, "What's the weather there?", the computing device can provide a response that provides the weather in Hawaii. The audio core 1737 is a real-time operating system and infrastructure that the audio processing algorithms implemented in the audio module 1730 are built upon. The audio module 1730 communicates with an audio capture module 1780 in the base 1702 via a SoundWire® connection 1738.

The vision/imaging module 1740 comprises a vision module 1741, an imaging module 1742, a vision core 1743, and a camera driver 1744. In some embodiments, any of the components 1741-1744 can operate on or be implemented by one or more of the vision/imaging module components illustrated in FIGS. 2-3 and 7 or otherwise disclosed herein. The vision/imaging module 1740 communicates with an integrated sensor hub 1790 in the base 1702 via an I3C connection 1745. The vision module 1741 and the imaging module 1742 can implement one or more of the algorithms disclosed herein as acting on image sensor data provided by one or more cameras of the computing device. For example, the vision and image modules can implement, separately or working in concert, one or more of the Wake on Face, Face ID, head orientation detection, facial landmark tracking, 3D mesh generation features described herein. The vision core 1743 is a real-time operating system and infrastructure that video and image processing algorithms implemented in the vision/imaging module 1740 are built upon. The vision/imaging module 1740 interacts with one or more lid cameras via the camera driver 1744. In some instance the camera driver 1744 can be a microdriver.

The components in the base comprise a host processor 1760, an audio capture module 1780 and an integrated sensor hub 1790. In some embodiments, these three components are integrated on an SoC. The audio capture module 1780 comprises an LCH audio codec driver 1784. The integrated sensor hub 1790 can be an Intel® integrated sensor hub or any other sensor hub capable of processing sensor data from one or more sensors. The integrated sensor hub 1790 communicates with the LCH 1705 via an LCH driver 1798, which, in some embodiments, can be a microdriver. The integrated sensor hub 1790 further comprises a biometric presence sensor 1794. The biometric presence sensor 1794 can comprise a sensor located in the base 1702 that is capable of generating sensor data used by the computing device to determine the presence of a user. The biometric presence sensor 1794 can comprise, for example, a pressure sensor, a fingerprint sensor, an infrared sensor, or a galvanic skin response sensor. In some embodiments, the integrated sensor hub 1790 can determine the presence of a user based on image sensor data received from the LCH and/or sensor data generated by a biometric presence sensor located in the lid (e.g., lid-based fingerprint sensor, a lid-based infrared sensor).

The host processor 1760 comprises a USB root complex 1761 that connects a touch driver 1762 and an LCH driver 1763 to host module 1720. The host module 1720 communicates data determined from image sensor data, such as the presence of one or more users in an image or video, facial landmark data, 3D mesh data, etc. to one or more applications 1766 on the host processor 1760 via the USB connection 1728 to the USB root complex 1761. The data passes from the USB root complex 1761 through an LCH driver 1763, a camera sensor driver 1764, and an intelligent collaboration module 1765 to reach the one or more applications 1766.

The host processor 1760 further comprises a platform framework module 1768 that allows for power management at the platform level. For example, the platform framework module 1768 provides for the management of power to individual platform-level resources such as the host processor 1760, SoC components (GPU, I/O controllers, etc.), LCH, display, etc. The platform framework module 1768 also provides for the management of other system-level settings, such as clock rates for controlling the operating frequency of various components, fan settings to increase cooling performance. The platform framework module 1768 communicates with an LCH audio stack 1767 to allow for the control of audio settings and a graphic driver 1770 to allow for the control of graphic settings. The graphic driver 1770 provides video data to the timing controller 1706 via an eDP connection 1729 and a graphic controller 1772 provides for user control over a computing device's graphic settings. For example, a user can configure graphic settings to optimize for performance, image quality, or battery life. In some embodiments, the graphic controller is an Intel® Graphic Control Panel application instance.

Enhanced Privacy

Software applications implementing always-on (AON) usages, like face or head orientation detection, on the host may make their data accessible to the operating system as these solutions are running on the host system-on-chip (SoC). This creates a potential exposure of private user data (e.g., face images from a user-facing camera) to other software applications and may put the user's data and privacy at risk to viruses or other un-trusted software obtaining user(s) data without them knowing.

Current privacy solutions generally include rudimentary controls and/or indicators for the microphone or user-facing camera. For example, devices may include software-managed "hotkeys" for enabling/disabling the user-facing camera or other aspects of the device (e.g., microphone). The software managing the hotkey (or other software) may also control one or more associated indicators (e.g., LEDs) that indicate whether the camera (or another device) is currently on/active. However, these controls are generally software-managed and are inherently insecure and may be manipulated by malware running on the host SoC. As such, these controls are not trusted by most IT professionals or end-users. This is because microphone- or camera-disabling hotkeys & associated indicators can be easily spoofed by malicious actors. As another example, some devices have included physical barriers to prevent the user-facing camera from obtaining unwanted images of a device user. However, while physically blocking the imaging sensor may work as a stop-gap privacy mechanism for the user-facing camera, they prevent the camera from being used in other potentially helpful ways (e.g., face detection for authentication or other purposes).

Figure 18:
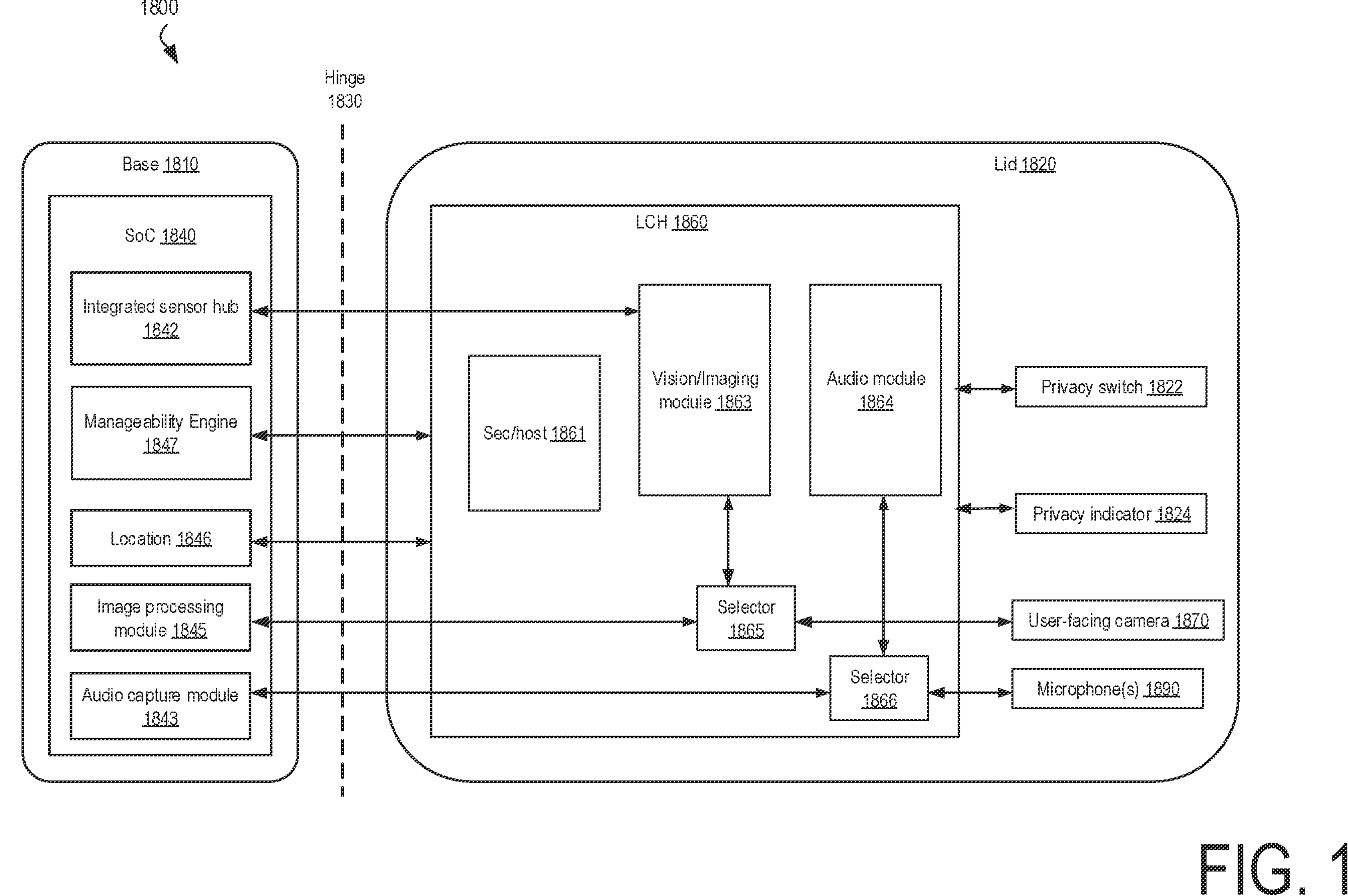
FIG. 18 illustrates a simplified block diagram of an example mobile computing device comprising a lid controller hub in accordance with certain embodiments.

Embodiments of the present disclosure, however, provide a hardened privacy control system that includes hardened privacy controls and indicators (e.g., privacy controls/indicators that are not controlled by software running on a host SoC/processor), offering protection for potentially private sensor data (e.g., images obtained from a user-facing camera) while also allowing the sensor(s) to be used by the device for one or more useful functions. In certain embodiments, the hardened privacy control system may be part of a lid controller hub as described herein that is separate from a host SoC/processor. Accordingly, user data may be isolated from the SoC/host processor and thus, the host OS and other software running on the OS. Further, embodiments of the present disclosure may enable integration of AON capabilities (e.g., face detection or user presence detection) on devices, and may allow for such functions to be performed without exposing user data FIG. 18 illustrates a simplified block diagram of an example mobile computing device 1800 comprising a lid controller hub in accordance with certain embodiments. The example mobile computing device 1800 may implement a hardened privacy control system that includes a hardened privacy switch and privacy indicator as described herein. Although the following examples are described with respect to a user-facing camera, the techniques may be applied to other types of device sensors (e.g., microphones) to offer similar advantages to those described herein.

The device 1800 comprises a base 1810 connected to a lid 1820 by a hinge 1830. The base 1810 comprises an SoC 1840, and the lid 1820 comprises a lid controller hub (LCH) 1860, which includes a security/host module 1861 and a vision/imaging module 1863. Aspects of the device 1800 may include one or more additional components than those shown and may be implemented in a similar manner to the device 100 of FIG. A, device 122 of FIG. 1B, device 200 of FIG. 2 or device 300 of FIG. 3 or the other computing devices described herein above (for example but not limited to FIG. 9 and FIG. 17). For example, the base 1810, SoC 1840, and LCH 1860 may be implemented with components of, or features similar to, those described above with respect to the base 110/124/210/310, SoC 140/240/340, and LCH 155/260/305 of the device 100/122/200/300, respectively. Likewise, the security/host module 1861, vision/imaging module 1863, and audio module 1864 may be implemented with components of, or features similar to, those described above with respect to the security/host module 174/261/361/362, vision/imaging module 172/263/363, and audio module 170/264/364 of the device 100/200, respectively.

In the example shown, the lid 1820 further includes a user-facing camera 1870, microphone(s) 1890, a privacy switch 1822, and a privacy indicator 1824 coupled to the LCH 1860, similar to the example computing devices in FIGS. 1A, 1B, 2 and 3 (and the other computing devices described herein above, such as but not limited to FIG. 9 and FIG. 17). The privacy switch 1822 may be implemented by hardware, firmware, or a combination thereof, and may allow the user to hard-disable the camera, microphone, and/or other sensors of the device from being accessed by a host processor (e.g., in the base 1810) or software running on the host processor. For example, when the user toggles/changes the state of the privacy switch to the "ON" position (e.g., Privacy Mode is On), the selector 1865 may block the image stream from the camera 1870 from passing to the image processing module 1845 in the SoC 1840, from passing to the vision/imaging module 1863, or both. In addition, the selector 1866 may block the audio stream from the microphone(s) 1890 from passing to the audio capture module 1843 in the SoC 1840 when the privacy switch is in the "ON" position. As another example, when the user toggles/changes the state of the privacy switch to the "OFF" position (e.g., Privacy Mode is Off), the selector 1865 may pass the image stream from the camera 1870 to the vision/imaging module 1863 and/or allow only metadata to pass through to the integrated sensor hub 1842 of the SoC 1840. Likewise, when the user toggles/changes the state of the privacy switch to the "OFF" position (e.g., Privacy Mode is Off), the selector 1866 may pass the audio stream from the microphone(s) 1890 to the audio module 1864 and/or to the audio capture module 1843 of the SoC 1840. Although shown as incorporated in the lid 1820, the user-facing camera 1870 and/or microphone(s) 1890 may be incorporated elsewhere, such as in the base 1810.

In certain embodiments, the security/host module 1861 of the LCH 1860 may control access to image data from the user-facing camera 1870, audio data from the microphone(s) 1890, and/or metadata or other information associated with the image or audio data based on the position or state of the privacy switch 1822. For example, the state of the privacy switch 1822 (which may be based, e.g., on a position of a physical privacy switch, location information, and/or information from a manageability engine as described herein) may be stored in memory of the security/host module 1861, which may control the selectors 1865, 1866 and or one or more other aspects of the LCH 1860 to control access to the image or audio data. The selectors 1865, 1866 may route the signals of the user-facing camera 1870 and/or microphone(s) 1890 based on signals or other information from the security/host module 1861. The selectors 1865, 1866 may be implemented separately as shown, or may be combined into one selector. In some embodiments, the security/host module 1861 may allow only trusted firmware of the LCH 1860, e.g., in the vision/imaging module 1863 and/or audio module 1864, to access the image or audio data, or information associated therewith. The security/host module 1861 may control the interfaces between such modules and the host SoC 1840, e.g., by allowing/prohibiting access to the memory regions of the modules by components of the SoC 1840 via such interfaces.

In some embodiments, the privacy switch 1822 may be implemented as a physical switch that allows a user of the device 1800 to select whether to allow images from the user-facing camera 1870 (or information, e.g., metadata, about or related to such images) and/or audio from the microphone(s) 1890 (or information, e.g., metadata, about or related to such audio) to be passed to the host processor. In some embodiments, the switch may be implemented using a capacitive touch sensing button, a slider, a shutter, a button switch, or another type of switch that requires physical input from a user of the device 1800. In some embodiments, the privacy switch 1822 may be implemented in another manner than a physical switch. For example, the privacy switch 1822 may be implemented as a keyboard hotkey or as a software user interface (UI) element.

In some embodiments, the privacy switch 1822 may be exposed remotely (e.g., to IT professionals) through a manageability engine (ME) (e.g., 1847) of the device. For example, the LCH 1860 may be coupled to the ME 1847 as shown in FIG. 18. The ME 1847 may generally expose capabilities of the device 1800 to remote users (e.g., IT professionals), such as, for example, through Intel® Active Management Technology (AMT). By connecting the LCH 1860 to the ME 1847, the remote users may be able to control the privacy switch 1822 and/or implement one or more security policies on the device 1800.

The privacy indicator 1824 may include one or more visual indicators (e.g., light-emitting diode(s) (LEDs)) that explicitly convey a privacy state to the user (e.g., a Privacy Mode is set to ON and camera images are being blocked from passing to the host SoC and/or vision/imaging module). Typically, such indicators are controlled by software.

However, in embodiments of the present disclosure, a privacy state may be determined by the LCH 1860 based on a position of the switch 1822 and/or one or more other factors (e.g., a privacy policy in place on the device, e.g., selected by a user), and the LCH 1860 may directly control the illumination of the privacy indicator 1824. For example, in some embodiments, when the user toggles the switch 1822 to the "ON" position (e.g., Privacy Mode is On), LED(s) of the privacy indicator 1824 may light up in a first color to indicate that the camera images are blocked from being accessed by the host SoC and vision/imaging module. Further, if the user toggles the switch 1822 to the "OFF" position (e.g., Privacy Mode is Off), LED(s) of the privacy indicator 1824 may light up in a second color to indicate that the camera images may be accessed by the host SoC. In some cases, e.g., where the privacy state is based on both the state of the privacy switch and a privacy policy in place or where the privacy switch is implemented with more than two positions, LED(s) of the privacy indicator 1824 may light up in a third color to indicate that the camera images may not be accessed by the host SoC but that the camera is being used by the vision/imaging module 1863 for another purpose (e.g., face detection) and that only metadata related to the other purpose (e.g., face detected/not detected) is being passed to the host SoC.

In some embodiments, the privacy indicator 1824 may include a multicolor LED to convey one or more potential privacy states to a user of the device 1800. For example, the multicolor LED could convey one of multiple privacy states to a user, where the privacy state is based on the state of the privacy switch (which may be based on a position of a physical switch (e.g., on/off, or in one of multiple toggle positions), a current location of the device (as described below), commands from a manageability engine (as described below), or a combination thereof) and/or a current privacy policy in place on the device. Some example privacy states are described below.

In a first example privacy state, the LED may be lit orange to indicate that the sensor(s) (e.g., camera and/or microphone) are disabled. This may be referred to as a "Privacy Mode". This mode may be the mode set when the privacy switch 1822 is in the ON position for an on/off switch or in a first position of a switch with three or more toggle positions, for example. This mode indicates are hard disabling of the sensors, e.g., nothing on the device can access any privacy-sensitive sensor such as the camera 1870.

In a second example privacy state, the LED may be lit yellow to indicate that the sensor(s) are actively streaming data in a non-encrypted form to software running on the host SoC. This may be referred to as a "Pass-through mode". This mode may be the mode set when the privacy switch 1822 is in the OFF position for an on/off switch or in a second position of a switch with three or more toggle positions, for example.

In a third example privacy state, the LED may be lit blue, to indicate that the sensor(s) are actively streaming, but only to trusted software. This may be referred to as a "Trusted Streaming Mode", wherein cryptographically secure (e.g., encrypt or digitally sign) imaging sensor data is sent to an application executing on the host SoC. In this Trusted Streaming Mode, circuitry of the selector(s) 1865, 1866 may perform the encryption and/or digital signing functions. For example, in some embodiments, the image stream may be encrypted in real-time using a key that is only shared with a trusted application, cloud service, etc. Though performed by the circuitry of the selector(s) 1865, 1866, the security/host module 1861 may control certain aspects of the cryptographic operations (e.g., key sharing and management). This mode may be the mode set when the privacy switch 1822 is in the ON position for an on/off switch (e.g., with a security policy in place that allows for the Trusted Streaming Mode for certain trusted applications), or in a third position of a switch with three or more toggle positions, for example.

In a fourth example privacy state, the LED may be turned off, indicating that the sensor(s) are inactive or operating in a privacy-protected mode where sensitive data is fully protected from eavesdropping by software running on the host SoC/processor. This may be referred to as a "Vision Mode", wherein the sensor(s) may still be in use, but only privacy-protected metadata (e.g., indicated a face or specific user is detected, not the actual camera images) may be provided to the host SoC. This mode may be the mode set when the privacy switch 1822 is in the ON position for an on/off switch (e.g., with a security policy in place that allows for the vision/imaging module to access the data from the camera), or in a fourth position of a switch with four or more toggle positions, for example.

In some embodiments, the LCH 1860 may be coupled to a location module 1846 that includes a location sensor (e.g., sensor compatible with a global navigation satellite system (GNSS), e.g., global positioning system (GPS), GLONASS, Galileo, or Beidou, or another type of location sensor) or otherwise obtains location information (e.g., via a modem of the device 1800), and the LCH 1860 may determine a privacy mode of the device 1800 based at least partially on the location information provided by the location module 1846. For example, in some embodiments, the LCH 1860 may be coupled to a WWAN or Wi-Fi modem (e.g., via a sideband UART connection), which may function as the location module 1846, and location information may be routed to the LCH 1860 such that the LCH 1860 can control the privacy switch 1822. That is, the modem, functioning as the location module 1846, may utilize nearby wireless network (e.g., Wi-Fi networks) information (e.g., wireless network name(s)/identifier(s), wireless network signal strength(s), or other information related to wireless networks near the device) to determine a relative location of the device. In some instances, fine-grain Wi-Fi location services may be utilized. As another example, the LCH 1860 may be coupled to a GPS module, which may function as the location module 1846, and location information from the GPS module may be routed to the LCH 1860 such that the LCH 1860 can control the privacy switch 1822.

The LCH 1860 may process one or more privacy policies to control the state of the privacy switch 1822. For example, the policies may include "good" (e.g., coordinates in which the LCH 1860 may allow image or audio data to be accessed) and/or "bad" coordinates (e.g., coordinates in which the LCH 1860 may prevent image or audio data from being accessed (in some instances, regardless of a position of a physical privacy switch on the device)). For good coordinates, the LCH 1860 may allow a physical switch to control the privacy switch state solely. For bad coordinates, however, the LCH 1860 may enable a privacy mode automatically, even ignoring a physical privacy switch setting so that the user cannot enable the camera at a "bad" location. In this way, a user or IT professional can set up geo-fenced privacy policies whereby use of the camera, microphone, or other privacy-sensitive sensor of the device 1800 may be limited in certain locations. Thus, location-based automation of the privacy switch 1822 may be provided. For example, the privacy switch 1822 may toggle to ON automatically (and block images from the camera) when the device is near sensitive locations (e.g., top secret buildings) or is outside certain geographical boundaries (e.g., outside the user's home country).

In certain embodiments, functionality of the vision/imaging module 1863 may be maintained in one or more privacy modes. For example, in some instances, the vision/imaging module 1863 may provide continuous user authentication based on facial recognition performed on images obtained from the user-facing camera 1870. The vision/imaging module 1863 (e.g., based on security policies implemented by the security/host module 1861) may perform this or other functions without providing the obtained images to the host SoC 1840, protecting such images from being accessed by software running on the host SoC 1840.

For example, the vision/imaging module 1863 may allow the mobile computing device 1800 to "wake" only when the vision/imaging module 1863 detects an authorized user is present. The security/host module 1861 may store user profiles for one or more authorized users, and the vision/imaging module 1863 may use these profiles to determine whether a user in the field of view of the user-facing camera 1870 is an authorized user. The vision/imaging module 1863 may send an indication to host SoC 1840 that there is an authorized user in front of the device 1800, and the operating system or other software running on the host SoC 1840 may provide auto-login (e.g., Windows Hello) functionality or may establish trust. In some cases, the vision/imaging module 1863 authentication may be used to provide auto-login functionality without further OS/software scrutiny.

As another example, the vision/imaging module 1863 may provide privacy and security to software running on the host SoC 1840, e.g., in web browsers or other applications, by only engaging password, payment and other auto-fill options when an authorized user is detected as being by the vision/imaging module 1863. The device 1800 may still allow other users to continue to use the device 1800, however, they will be prevented from using such auto-fill features.

As yet another example, the vision/imaging module 1863 may provide improved document handling. For instance, the continuous user authentication provided by the vision/imaging module 1863 may allow software running on the host SoC 1840 to handle secure documents and ensure the authorized user is the one and only face present in front of the system at the time a secure document is being viewed, e.g., as described herein.

As yet another example, the vision/imaging module 1863 may provide an auto-enrollment and training functionality. For instance, upon receipt of acknowledgment of a successful operating system or other software login (manually or through biometrics, e.g., Windows Hello), the vision/imaging module 1863 may record properties of the face currently in the field of view and use this information to train and refine the face authentication model. Once the model is properly trained, user experience (UX) improvements can be realized, and each successful operating system login thereafter can further refine the model, allowing the model used by the vision/imaging module 1863 to continuously learn and adapt to changes in the user's appearance etc.

Figure 19:
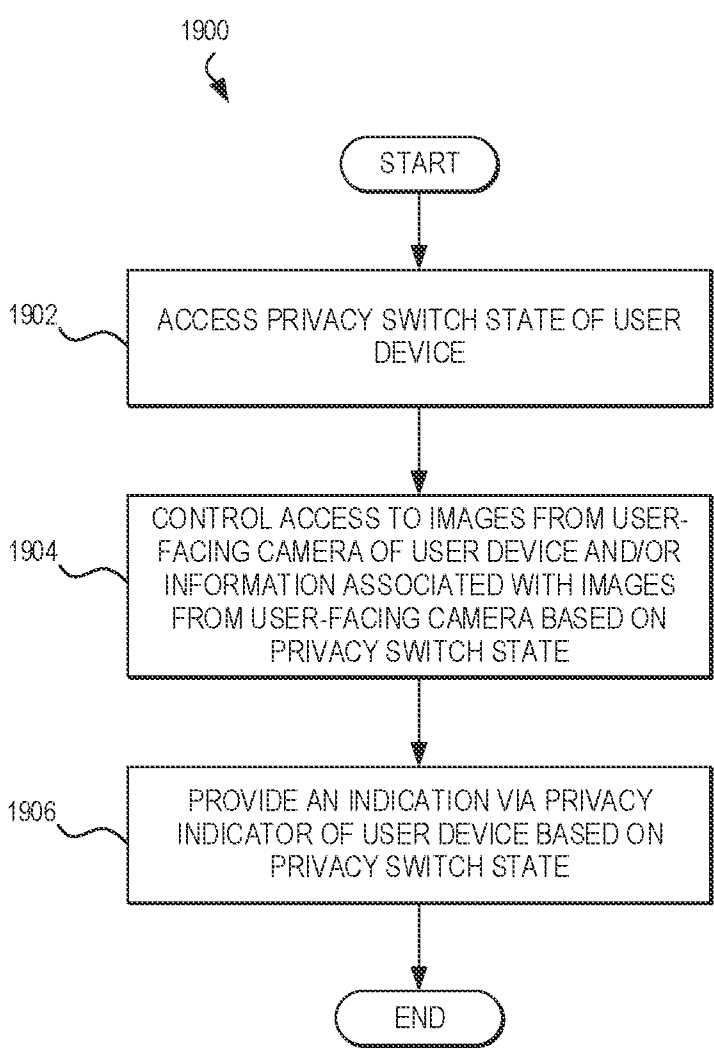
FIG. 19 illustrates a flow diagram of an example process of controlling access to data associated with images from a user-facing camera of a user device in accordance with certain embodiments.

FIG. 19 illustrates a flow diagram of an example process 1900 of controlling access to data associated with images from a user-facing camera of a user device in accordance with certain embodiments. The example process may be implemented in software, firmware, hardware, or a combination thereof. For example, in some embodiments, operations in the example process shown in FIG. 19, may be performed by a controller hub apparatus that implements the functionality of one or more components of lid controller hub (LCH) (e.g., one or more of security/host module 261, vision/imaging module 263, and audio module 264 of FIG. 2 or the corresponding modules in the computing device 100 of FIG. 1A and/or the device 300 of FIG. 3 and/or any other computing device discussed herein previously). In some embodiments, a computer-readable medium (e.g., in memory 274, memory 277, and/or memory 283 of FIG. 2) may be encoded with instructions that implement one or more of the operations in the example process below. The example process may include additional or different operations, and the operations may be performed in the order shown or in another order. In some cases, one or more of the operations shown in FIG. 19 are implemented as processes that include multiple operations, sub-processes, or other types of routines. In some cases, operations can be combined, performed in another order, performed in parallel, iterated, or otherwise repeated or performed another manner.

At 1902, a privacy switch state of the user device is accessed. The privacy switch state may be, for example, stored in a memory of the user device. The privacy switch state could, for example, indicate a (current) privacy mode enabled in the user device.

At 1904, access to images from the user-facing camera and/or information (e.g., metadata) associated with images from the user-facing camera (which may be collectively referred to as data associated with images of the user-facing camera) by a host SoC of the user device is controlled based on the privacy switch state accessed at 1902. In one example, the control of access by the SoC may involve the LCH or component thereof accessing one or more security policies stored on the user device and controlling access to images from the user-facing camera or other information (e.g., metadata) associated with images based on the one or more security policies and the privacy switch state. Further, in this example, or in an alternative example, the LCH can control access as follows: In case the privacy switch state is in a first state, images from the user-facing camera and/or information (e.g., metadata) associated with the images are blocked by the LCH from being passed to the host SoC, whereas in case the privacy switch state is in a second state, the images from the user-facing camera and/or information (e.g., metadata) associated with the images are passed from the controller hub to the host SoC.

At 1906, an indication is provided via a privacy indicator of the user device based on the privacy switch state accessed at 1902. The privacy indicator may be, for example, directly connected to the controller hub so that the controller hub can control the privacy indicator of the user device directly (e.g., without using the host SoC as an intermediate), preventing malicious actors from spoofing indications via the privacy indicator. The privacy indicator may be implemented as, or include, a light emitting diode (LED) which may be turned on/off by the controller hub to indicate the current privacy switch state of the user device. In some embodiments, the privacy indicator may be implemented as, or include, a multicolor LED to indicate different privacy switch states by means of different colors. In some embodiments, the privacy indicator may include other visual indicators in addition to, or in lieu or, such LED(s). Thus, the current privacy switch state and/or privacy mode enabled on the user device can be indicted to the user of the user device directly by the controller hub apparatus.

It is noted that performing both of 1904 and 1906 may be optional. Hence, the process 1900 could include only blocks 1902 and 1904, or only blocks 1902 and 1906, or all three of 1902, 1904, and 1906 as shown. The user device can for example comprise a base that is connected to a lid by a hinge. The user device may be for example a laptop or a mobile user device with a similar form factor. The base could comprise the host SoC. The controller hub and the user-facing camera may be comprised in the lid, but this is not mandatory.

In an example implementation, the functionality described with respect to the process 1900 may be implemented by a lid controller hub apparatus in one of the example computing devices 1800, 2000, 2100, 2200 and 2300 in FIGS. 18 and 20-23, but may also implemented in the example computing devices of FIGS. 1A, 1, 2-9, and 10A-10E, 11A-11E, 12A-2C, 13A-B, 14A-4D, 15A-D, 16 and 17. In some implementations, the controller hub apparatus performing operations of the process 1900 may be implemented by a lid controller hub (LCH), such as for example LCH 1860, or by one or more components thereof, such as for example, the vision/imaging module 1863 and/or audio module 1864.

FIGS. 20-23 illustrate example physical arrangements of components in a mobile computing device. Each of the examples shown in FIGS. 20-23 include a base (e.g., 2010, 2110, 2210, 2310) connected to a lid (e.g., 2020, 2120, 2220, 2320) by hinges (e.g., 2080, 2082, 2180, 2182, 2280, 2282, 2380, 2382). The base in each example embodiment of FIGS. 20-23 may be implemented in a similar manner to (e.g., include one or more components of) the base 110 of FIG. 1A, the base 210 of FIG. 2, or the base 315 of FIG. 3. Likewise, the lid in each example embodiment of FIGS. 20-23 may be implemented in a similar manner to (e.g., include one or more components of) the lid 120 of FIG. 1A, the lid 220 of FIG. 2, or the lid 301 of FIG. 3. In each example embodiment, the lid includes a bezel (e.g., 2022, 2122, 2222) that extends around the periphery of a display area (e.g., 2024, 2124, 2224, 2324), which is the area in which content is displayed. Further, each example embodiment includes a privacy switch and privacy indicator. The privacy switch (e.g., 2026) may be coupled to an LCH in the lid (e.g., 2020) and may have the same or similar functionality as described above with respect to the privacy switch 1822 of FIG. 18. The privacy indicator (e.g., 2028) may be implemented as an LED (e.g., a multi-color LED) beneath the surface of the bezel (e.g., 2022), and may be coupled to an LCH in the lid (e.g., 2020), and may have the same or similar functionality as described above with respect to the privacy indicator 1824 of FIG. 18.

Figure 20:
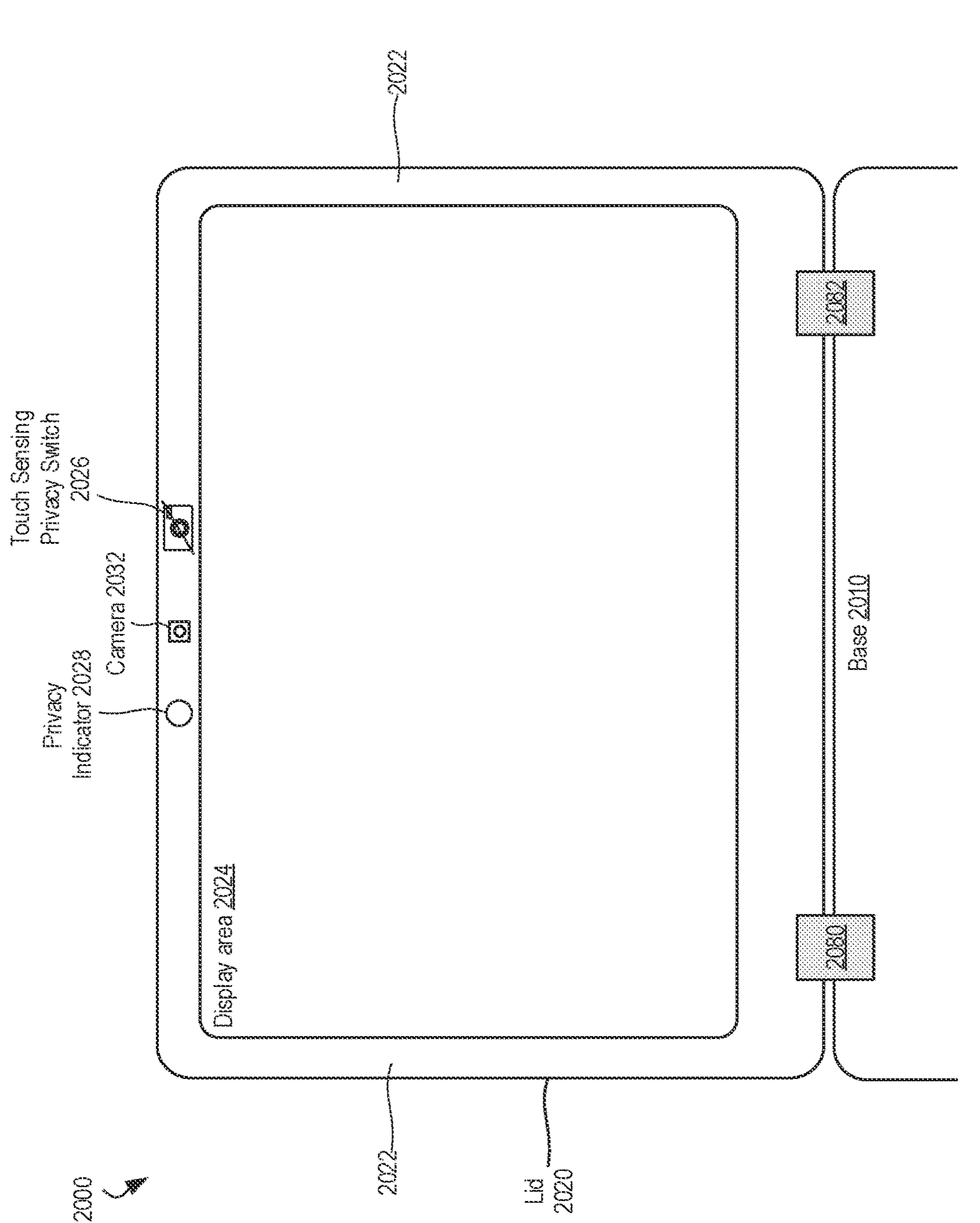
FIG. 20 illustrates an example embodiment that includes a touch sensing privacy switch and privacy indicator on the bezel, and on opposite sides of the user-facing camera.

FIG. 20 illustrates an example embodiment that includes a touch sensing privacy switch 2026 and privacy indicator 2028 on the bezel 2022, and on opposite sides of the user-facing camera 2032. The touch sensing privacy switch 2026 may be implemented by a backlit capacitive touch sensor, and may illuminate (or not) based on the state of the switch. As an example, in some embodiments, an LED of switch 2026 (which is distinct from an LED of the privacy indicator 2028) may illuminate (showing the crossed-out camera image) when the LCH is not allowing images to be processed/passed through to the host SoC, and not illuminate when the LCH is allowing images to be processed/passed through to the host SoC.

Figure 21:
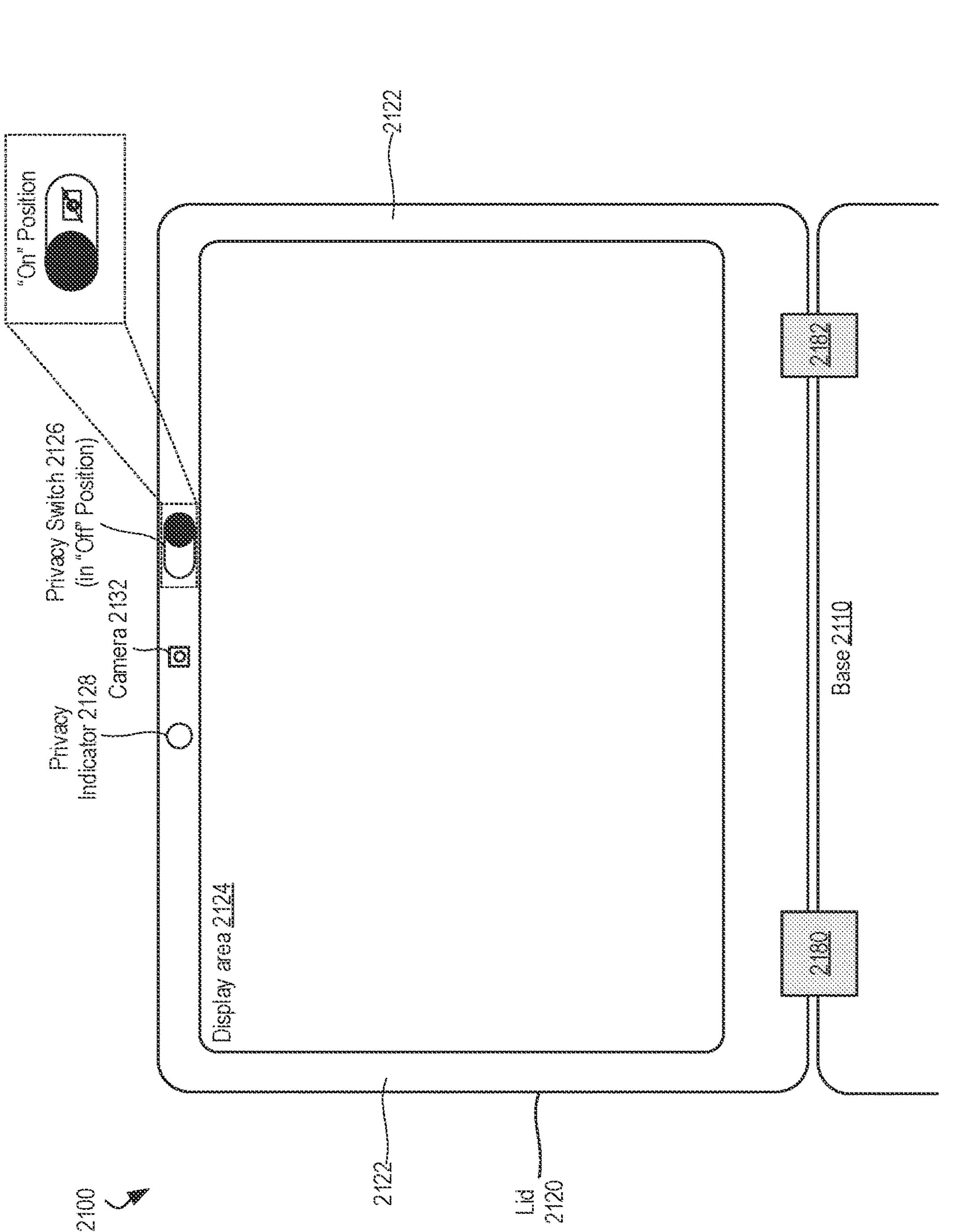
FIG. 21 illustrates an example embodiment that includes a physical privacy switch and privacy indicator on the bezel, and on opposite sides of the user-facing camera.

FIG. 21 illustrates an example embodiment that includes a physical privacy switch 2126 and privacy indicator 2128 on the bezel 2122, and on opposite sides of the user-facing camera 2132. In the example shown, the physical privacy switch 2126 is implemented as a slider; however, other types of switches may be used as well. As shown, when the switch is toggled in the "On" position (e.g., Privacy mode is ON) the switch may provide a visual indication (a crossed-out camera icon in this example), and when the switch is toggled in the "Off" position (e.g., Privacy mode is OFF) no indication may be shown. Other types of indications may be used than those shown.

Figure 22:
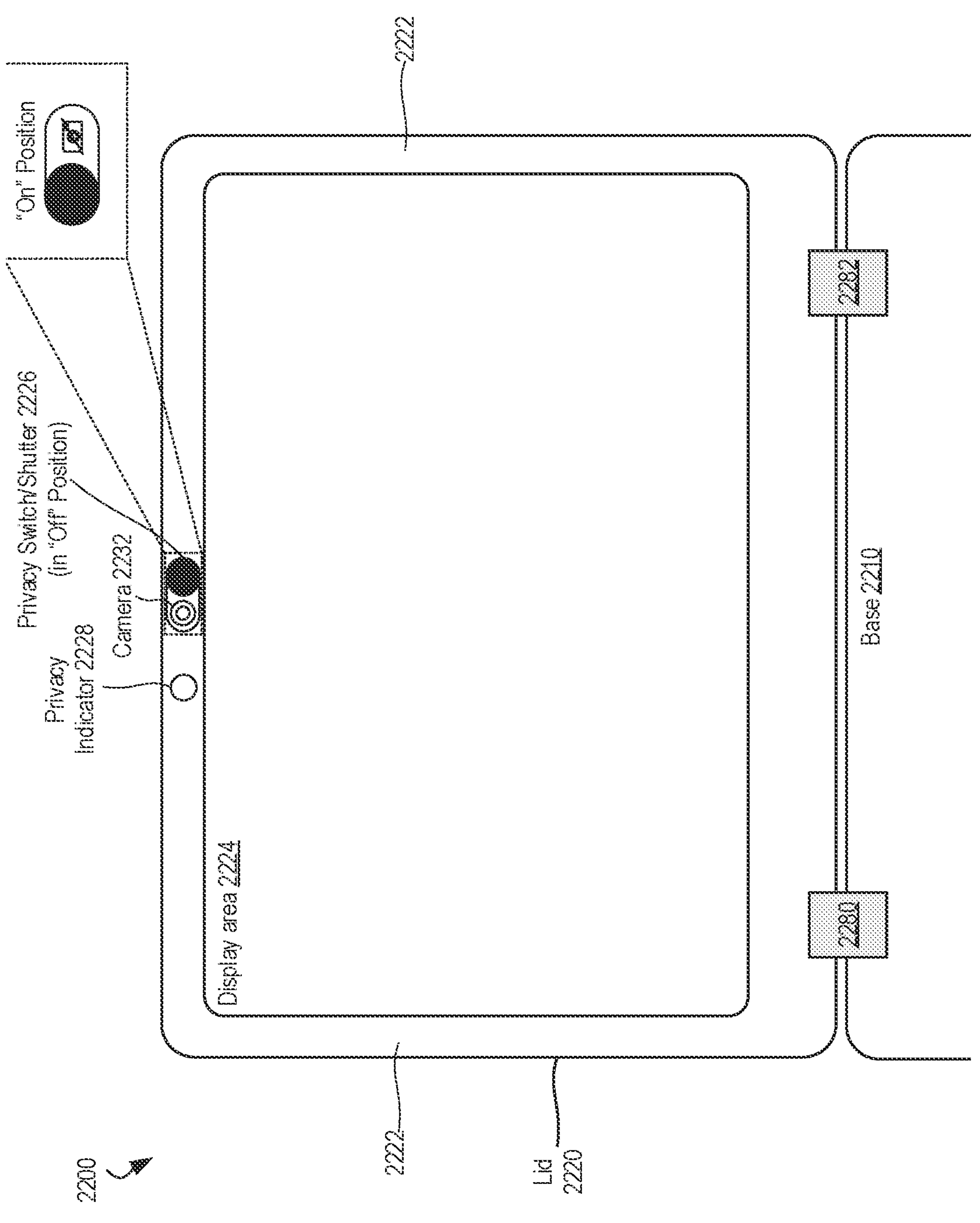
FIG. 22 illustrates an example embodiment that includes a physical privacy switch and privacy indicator in the bezel.

FIG. 22 illustrates an example embodiment that includes a physical privacy switch 2226 and privacy indicator 2228 in the bezel 2222. The physical privacy switch 2226 is implemented similar to the physical privacy switch 2126 described above, except that the physical privacy switch 2226 also acts to physically obstruct the view of the user-facing camera 2232 as well, providing additional assurance to a user of the device.

Figure 23:
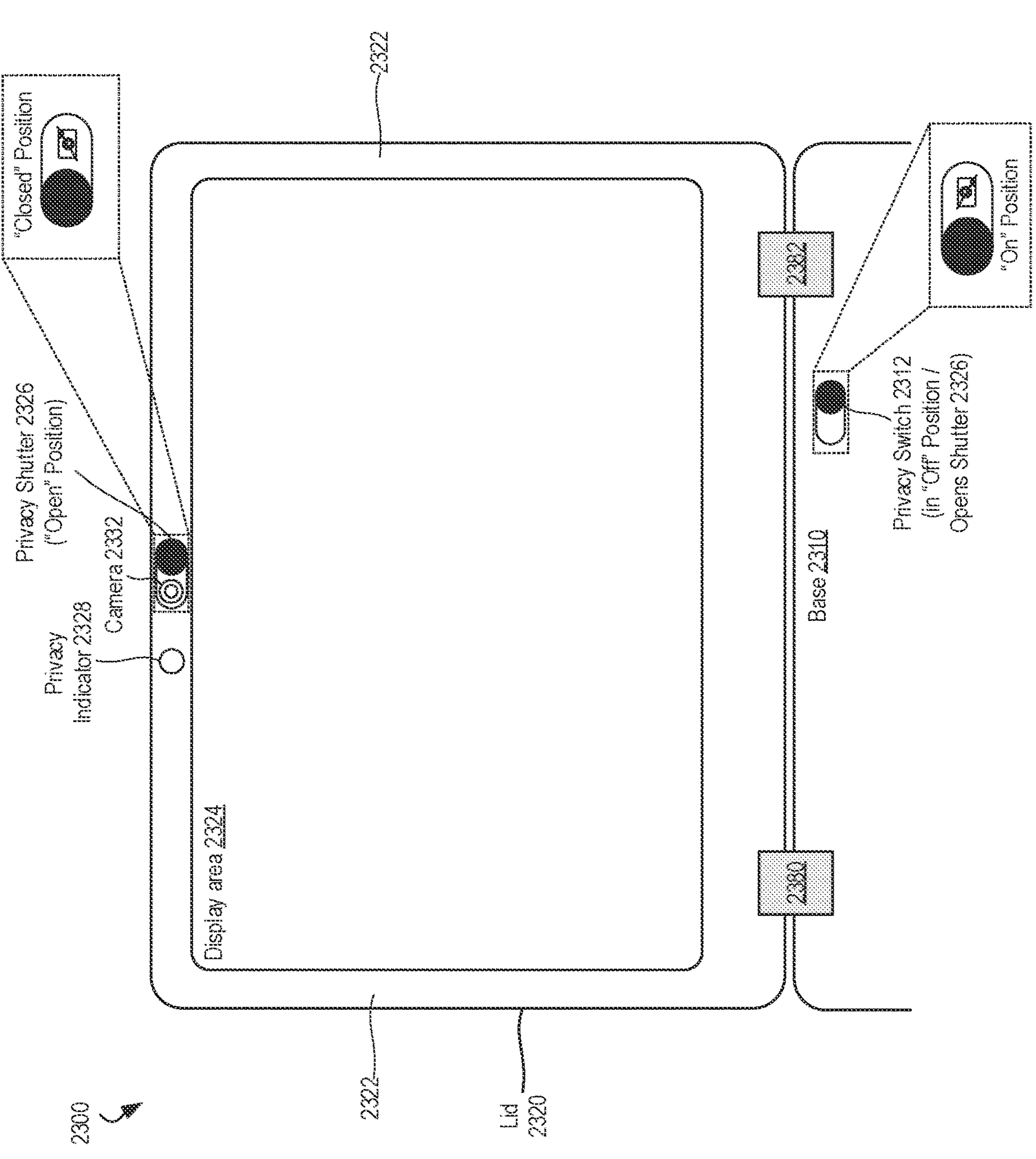
FIG. 23 illustrates an example embodiment that includes a physical privacy switch on the base, a privacy indicator on the bezel, and a physical privacy shutter controlled by the privacy switch.

FIG. 23 illustrates an example embodiment that includes a physical privacy switch 2312 on the base 2310, a privacy indicator 2328 on the bezel 2322, and a physical privacy shutter 2326 controlled by the privacy switch 2312. In the example shown, the physical privacy switch 2312 is implemented similar to the physical privacy switch 2126 described above. In other embodiments, the physical privacy switch 2312 is implemented as a keyboard "hotkey" (e.g., a switch tied to pressing certain keyboard keys).

Further, in the example shown, the physical privacy switch 2312 is hardwired to a physical privacy shutter 2326 that physically obstructs the view of the user-facing camera 2332 based on the position of the physical privacy switch 2312. For example, as shown, when the switch 2312 is toggled in the "Off" position (e.g., Privacy mode is OFF), the privacy shutter 2326 does not cover the camera. Likewise, when the switch is toggled in the "On" position (e.g., Privacy mode is ON), the shutter may be positioned to cover the camera. This may prevent the end-user from having to manually close the shutter, and provide additional assurance to the user that the camera is physically obstructed (in addition to being electrically prevented from passing images to the host SoC).

In some instances, the physical privacy shutter 2326 can be automatically opened based on the position of the privacy switch 2312 (e.g., by software of the device or by an electrical coupling between the switch 2312 and the shutter 2326). For example, when a trusted application (e.g., as described above with respect to the "Trusted Streaming Mode") is loaded on the device, the trusted application may enable the camera and open the shutter. The shutter being opened by the application may cause the privacy indicator 2328 to be illuminated in a corresponding manner, e.g., to indicate that the camera is on and images are being accessed, but in a "trusted" mode (e.g., as described above with respect to the "Trusted Streaming Mode").

Although the example illustrated in FIG. 23 includes both a physical privacy shutter 2326 that is controlled by the privacy switch 2312, embodiments may include a physical privacy switch in the base similar to the privacy switch 2312 without also including a physical privacy shutter like physical privacy shutter 2326 that is controlled by the privacy switch. Further, embodiments with other types of privacy switches (e.g., the privacy switches shown in FIGS. 20-21 and described above) may also include a physical privacy shutter as like physical privacy shutter 2326 that is controlled by the privacy switch.

Additional examples of the presently described enhanced privacy embodiments include the following, non-limiting implementations. Each of the following non-limiting examples may stand on its own or may be combined in any permutation or combination with any one or more of the other examples provided below or throughout the present disclosure.

Example AA1 relates to an apparatus which may be used in a user device. The apparatus comprises: a first connection to interface with a host system-on-chip (SoC) of the user device; a second connection to interface with a user-facing camera of a user device; and circuitry configured to: access a privacy switch state of the user device; and control access to data associated with the user-facing camera based on the privacy switch state. The apparatus may be, for example, controller hub, such as a lid controller hub (LCH).

Example AA2 includes the subject matter of Example AA1, further comprising memory configured to store one or more security policies, wherein the circuitry is configured to control access to the data associated with the user-facing camera based on the one or more security policies and the privacy switch state.

Example AA3 includes the subject matter of Example AA1 or AA2, wherein the circuitry is configured to allow information about the data from the user-facing camera to be passed to the host SoC and not allow the data from the user-facing camera to be passed to the host SoC.

Example AA4 includes the subject matter of Example AA1 or AA2, wherein the circuitry is configured to allow the data from the user-facing camera to be passed to the host SoC.

Example AA5 includes the subject matter of Example AA1 or AA2, wherein the circuitry is further configured to: cryptographically secure the data from the user-facing camera; and allow the cryptographically secured data to be passed to the image processing module.

Example AA6 includes the subject matter of Example AA5, wherein the circuitry is configured to cryptographically secure the data from the user-facing camera by one or more of encrypting the data and digitally signing the data.

Example AA7 includes the subject matter of any one of Examples AA1-AA6, further comprising a third connection to interface with a privacy indicator of the user device, wherein the circuitry is further configured to cause the privacy indicator to provide an indication based on the privacy switch state.

Example AA8 includes the subject matter of Example AA7, wherein the circuitry is configured to: when the privacy switch state is in a first state: block data from the user-facing camera from be passed to the host SoC; and cause the privacy indicator to provide a first indication; and when the privacy switch state is in a second state: allow data from the user-facing camera or information about the data from the user-facing camera to be passed to the host SoC; and cause the privacy indicator to provide a second indication.

Example AA9 includes the subject matter of any previous Example AA herein above, further comprising a third connection to interface with a location module, wherein the circuitry is further configured to control the privacy switch state based on location information obtained from the location module.

Example AA10 includes the subject matter of Example AA9, wherein the location information is based on one or more of global navigation satellite system (GNSS) coordinates and wireless network information.

Example AA11 includes the subject matter of any previous Example AA herein above, further comprising a third connection to interface with a manageability engine, wherein the circuitry is further configured to control the privacy switch state based on information obtained from the manageability engine.

Example AA12 includes the subject matter of any previous Example AA herein above, further comprising a third connection to interface with a microphone of the user device, wherein the circuitry is coupled to the microphone and is further configured to control access to data from the microphone based on the privacy switch state.

Example AA13 includes the subject matter of any previous Example AA herein above, further comprising a third connection to interface with a physical switch to control the privacy switch state based on a position of the physical switch.

Example AA14 includes the subject matter of any previous Example AA herein above, wherein the apparatus is on a printed circuitry board (PCB) of a mobile computing device and the host SoC is not on the PCB.

Example AA15 includes the subject matter of Example AA14, wherein the PCB is in a lid of the mobile computing device and the host SoC is in a base of the mobile computing device.

Example AB1 relates to a system comprising a host system-on-chip (SoC); a user-facing camera; a privacy indicator; a privacy switch; and lid controller hub (LCH) circuitry coupled to the user-facing camera, the privacy switch, and the privacy indicator, wherein the LCH circuitry is configured to implement the circuitry of any previous Example AA herein above.

Example AC1 relates to a system comprising: a host system-on-chip (SoC); a user-facing camera; a privacy switch; and circuitry coupled to the user-facing camera and the privacy switch, wherein the circuitry is configured to control access to data from the user-facing camera based on a state of the privacy switch.

Example AC2 includes the subject matter of Example AC1, further comprising a memory configured to store one or more security policies, wherein the circuitry is configured to allow data associated with the user-facing camera to be passed to the host SoC based on the one or more security policies.

Example AC3 includes the subject matter of Example AC1 or AC2, wherein the circuitry is configured to allow information about the data from the user-facing camera to be passed to the host SoC and not allow the data from the user-facing camera to be passed to the host SoC.

Example AC4 includes the subject matter of Example AC3, wherein the host SoC comprises an integrated sensor hub, and the circuitry is to allow metadata associated with the data from the user-facing camera to be passed to the integrated sensor hub based on the privacy switch state.

Example AC5 includes the subject matter of Example AC1 or AC2, wherein the circuitry is to allow the data from the user-facing camera to be passed to the host SoC.

Example AC6 includes the subject matter of Example AC5, wherein the host SoC comprises an image processing module, and the circuitry is to allow data from the user-facing camera to be passed to the image processing module.

Example AC7 includes the subject matter of Example AC1 or AC2, wherein the host SoC comprises an image processing module, and the circuitry is configured to: cryptographically secure the data from the user-facing camera; and allow the cryptographically secured data to be passed to the image processing module.

Example AC8 includes the subject matter of Example AC7, wherein the circuitry is configured to cryptographically secure the data from the user-facing camera by one or more of encrypting the data and digitally signing the data.

Example AC9 includes the subject matter of any previous Example AC herein above, further comprising a privacy indicator coupled to the circuitry, wherein the circuitry is configured to: when the privacy switch state is in a first state:

block data from the user-facing camera from be passed to the host SoC; and cause the privacy indicator to provide a first indication; and when the privacy switch state is in a second state: allow data from the user-facing camera or information about the data from the user-facing camera to be passed to the host SoC; and cause the privacy indicator to provide a second indication.

Example AC10 includes the subject matter of Example AC9, wherein the privacy indicator comprises a light emitting diode (LED) and the circuitry is to cause the LED to not be illuminated when the privacy switch is in the first state.

Example AC11 includes the subject matter of Example AC9, wherein the privacy indicator comprises a multicolor light emitting diode (LED), and the circuitry is to cause the multicolor LED to emit a first color based on allowing data from the user-facing camera to be passed to the host SoC when the privacy switch is in the second state, and emit a second color based on allowing information about the data from the user-facing camera to be passed to the host SoC when the privacy switch is in the second state.

Example AC12 includes the subject matter of any previous Example AC herein above, wherein the privacy switch comprises one or more of a physical switch and a capacitive touch sensing switch.

Example AC13 includes the subject matter of Example AC12, wherein the privacy switch is to obscure the user-facing camera based on a state of the privacy switch.

Example AC14 includes the subject matter of Example AC12, further comprising a shutter coupled to the user-facing camera, wherein the circuitry is to cause the shutter to obscure the user-facing camera based on a state of the privacy switch.

Example AC15 includes the subject matter of any previous Example AC herein above, further comprising a location module coupled to the circuitry, wherein the circuitry is further configured to control the state of the privacy switch based on location information obtained from the location module.

Example AC16 includes the subject matter of Example AC15, wherein the location module comprises a global navigation satellite system (GNSS) module to obtain location information from one or more satellites.

Example AC17 includes the subject matter of Example AC15, wherein the location module determines the location information based on wireless network information for wireless networks proximate to the device.

Example AC18 includes the subject matter of any previous Example AC herein above, further comprising a manageability engine coupled to the circuitry, wherein the circuitry is further configured to control the state of the privacy switch based on information obtained from the manageability engine.

Example AC19 includes the subject matter of any previous Example AC herein above, further comprising a microphone, wherein the circuitry is further coupled to the microphone and is further configured to control access to data from the microphone by the host SoC based on the privacy switch state.

Example AC20 includes the subject matter of any previous Example AC herein above, wherein the system comprises a base and a lid coupled to the base via a hinge, the base comprising the host SoC, and the lid comprising the user-facing camera, the privacy indicator, and a lid controller hub that comprises the circuitry.

Example AC21 includes the subject matter of Example AC20, wherein the lid further comprises the privacy switch.

Example AC22 includes the subject matter of Example AC20, wherein the base further comprises the privacy switch.

Example AD1 relates to a system comprising: a host system-on-chip (SoC); a user-facing camera; means for storing a privacy switch state; and means for controlling access to data from the user-facing camera by the host SoC based on the privacy switch state.

Example AD2 includes the subject matter of Example AD1, further comprising means for storing one or more security policies, wherein the means for controlling access to the from the user-facing camera is to control access based on the one or more security policies and the privacy switch state.

Example AD3 includes the subject matter of Example AD1 or AD2, wherein the means for controlling access comprises means for allowing the data from the user-facing camera to be passed to the host SoC.

Example AD4 includes the subject matter of Example AD1 or AD2, wherein the means for controlling access comprises means for allowing information about the data from the user-facing camera to be passed to the host SoC.

Example AD5 includes the subject matter of Example AD1 or AD2, further comprising means for: cryptographically securing the data from the user-facing camera; and allowing the cryptographically secured data to be passed to the image processing module.

Example AD6 includes the subject matter of Example AD5, wherein the means for cryptographically securing the data from the user-facing camera comprises means for encrypting the data.

Example AD7 includes the subject matter of Example AD5 or AD6, wherein the means for cryptographically securing the data from the user-facing camera comprises means for digitally signing the data.

Example AD8 includes the subject matter of any previous Example AD herein above, further comprising means for obtaining location information and means for controlling the privacy switch state based on the location information.

Example AD9 includes the subject matter of any previous Example AD herein above, further comprising a microphone and means for controlling access to data from the microphone based on the privacy switch state.

Example AD10 includes the subject matter of any previous Example AD herein above, further comprising a privacy indictor and means for causing the privacy indicator to provide an indication based on the privacy switch state.

Example AE1 relates to more computer-readable media comprising instructions that, when executed by an apparatus of a user device, cause the apparatus to: access a privacy switch state for a user device; and control access by a host system-on-chip (SoC) of the user device to data associated with a user-facing camera of the user device based on the privacy switch state.

Example AE2 includes the subject matter of Example AE1, wherein the instructions are further configured to cause the apparatus to: access one or more security policies stored on the user device; and control access to the data from the user-facing camera based on the one or more security policies and the privacy switch state Example AE3 includes the subject matter of Example AE1 or AE2, wherein the instructions are further configured to cause the apparatus to allow the data from the user-facing camera to be passed to the host SoC.

Example AE4 includes the subject matter of Example AE1 or AE2, wherein the instructions are further configured to cause the apparatus to allow information about the data from the user-facing camera to be passed to the host SoC and not allow the data from the user-facing camera to be passed to the host SoC.

Example AE5 includes the subject matter of Example AE1 or AE2, wherein the instructions are further configured to: cryptographically secure the data from the user-facing camera; and allow the cryptographically secured data to be passed to the image processing module.

Example AE6 includes the subject matter of Example AE5, wherein the instructions are to cryptographically secure the data from the user-facing camera by one or more of encrypting the data and digitally signing the data.

Example AE7 includes the subject matter of any previous Example AE herein above, wherein the instructions are further configured to cause the apparatus to cause a privacy indicator of the user device to provide an indication based on the privacy switch state.

Example AE8 includes the subject matter of Example AE7, wherein the instructions are further configured to cause the apparatus to: when the privacy switch state is in a first state: block data from the user-facing camera from being passed to the host SoC; and cause the privacy indicator to provide a first indication; and when the privacy switch state is in a second state: allow data from the user-facing camera or information about the data from the user-facing camera to be passed to the host SoC; and cause the privacy indicator to provide a second indication.

Example AE9 includes the subject matter of any previous Example AE herein above, wherein the instructions are further configured to cause the apparatus to control the privacy switch state based on location information obtained from a location module of the user device.

Example AE10 includes the subject matter of Example AD9, wherein the location information is based on one or more of global navigation satellite system (GNSS) coordinates and wireless network information.

Example AE11 includes the subject matter of any previous Example AE herein above, wherein the instructions are further configured to cause the apparatus to control the privacy switch state based on information obtained from a manageability engine of the user device.

Example AE12 includes the subject matter of any previous Example AE herein above, wherein the instructions are further configured to cause the apparatus to control access to data from a microphone of the user device based on the privacy switch state.

Example AF1 relates to a method to be performed by a controller hub apparatus of a user deice. The method comprises: obtaining a privacy switch state for the user device; and controlling access by a host system-on-chip (SoC) of the user device to data associated with a user-facing camera of the user device based on the privacy switch state.

Example AF2 includes the subject matter of Example AF1, further comprising: accessing one or more security policies stored on the user device; and controlling access to the data associated with the user-facing camera based on the one or more security policies and the privacy switch state.

Example AF3 includes the subject matter of Example AF1 or AF2, wherein controlling access by the host SoC comprises allowing the data from the user-facing camera to be passed to the host SoC.

Example AF4 includes the subject matter of Example AF1 or AF2, wherein controlling access by the host SoC comprises allowing information about the data from the user-facing camera to be passed to the host SoC.

Example AF5 includes the subject matter of Example AF1 or AF2, further comprising: cryptographically securing the data from the user-facing camera; and allowing the cryptographically secured data to be passed to the image processing module.

Example AF6 includes the subject matter of Example AF5, wherein cryptographically securing the data from the user-facing camera comprises one or more of encrypting the data and digitally signing the data.

Example AF7 includes the subject matter of any previous Example AF herein above, further comprising indicating the privacy switch state via a privacy indicator of the user device.

Example AF8 includes the subject matter of any previous Example AF herein above, further comprising: obtaining location information from a location module of the user device; and controlling the privacy switch state based on the location information.

Example AF9 includes the subject matter of Example AF8, wherein the location information is based on one or more of global navigation satellite system (GNSS) coordinates and wireless network information.

Example AF10 includes the subject matter of any previous Example AF herein above, further comprising: obtaining information from a manageability engine of the user device; and controlling the privacy switch state based on the information.

Example AF11 includes the subject matter of any previous Example AF herein above, further comprising controlling access to data from a microphone of the user device based on the privacy switch state.

Example AF12 includes the subject matter of any previous Example AF herein above, wherein obtaining the privacy switch state comprises determining a position of a physical switch of the user device.

Example AF13 includes the subject matter of any previous Example AF herein above, wherein the controller hub apparatus is in a lid of the user device, and the host SoC is in a base of the user device.

Example AG1 includes an apparatus configured to implement a method as in any one of Examples AF herein above.

Example AH1 includes one or more computer-readable media comprising instructions that, when executed by a machine, cause the machine to implement one or more of the methods of Examples AF herein above.

Example AI1 includes a system comprising means to implement one or more of the methods of Examples AF herein above.

Privacy and Toxicity Control

In some instances, users may have documents stored on a device or may be viewing content on the device that may be confidential, protected, sensitive, or inappropriate for other viewers (e.g., children), and thus, may not want the content to be visible to other users of the device (e.g., collaborators that might not have rights to that specific content, or unauthorized users of the device) or nearby on-lookers. Furthermore, in some instances, inappropriate (or toxic), or mature content may appear on a screen unknowingly or unprompted, such as, for example, when browsing internet articles, school research, auto-play algorithms for media, etc. Unfortunately, client devices typically have limited options for protecting users from these scenarios, especially for unique users that may be using or viewing the system. These problems increase in complexity as systems are moving to ownerless working models (e.g., for schools or businesses) and are not always owned by one or few users.

Current solutions include privacy screens, content protection software, or webpage rejection software; however, these solutions are quite limited. For instance, privacy screens are static and limit collaborative experiences (e.g., a parent helping a child with a research project). Certified user content protection software limits the sharing of certain documents, but does not limit the viewing of the given document from an on-looker or collaborator without the credentials for viewing the specific document. Further, while webpage rejection software (e.g., parental control products and/or settings) limits the viewing of a webpage if deemed inappropriate by the program, the page is either viewable or not (binary toggle), limiting the cases where the given webpage might want to be visited for research examples but not in its entirety (e.g., where you may want to still show portions of the website). Furthermore, these controls require the user to turn them on and off for a certain time or account.

Embodiments of the present disclosure, however, may provide a dynamic privacy monitoring system that allows for modification of content shown on a display based on dynamic facial detection, recognition, and/or classification. For example, a lid controller hub (LCH, such as for example LCH 155/260/305/1860/etc. of the device 100 of FIG. A, device 122 of FIG. 1B, device 200 of FIG. 2, device 300 of FIG. 3, device 1800 of FIG. 18 or the other computing devices described herein above (for example but not limited to FIG. 9 and FIG. 17)) may provide user detection capabilities and may be able to modify aspects of the image stream being provided by a display output (e.g., GPU or other image processing apparatus, such as for example the display module 241/341/of FIGS. 2 and 3), changing the content on the screen based on the people in view. Embodiments herein may accordingly provide a dynamic privacy solution whereby the user does not have to remember to toggle otherwise modify privacy settings given the people in view and/or scenario. Further, embodiments herein may provide a profile-based system (known users "User A" and "User B", e.g., a parent and a child), and may take advantage of machine learning techniques to determine if one or both users are able to view displayed content given one or more settings on the device.

According to embodiments, another apparatus for use in a user device is provided. The apparatus may correspond to a controller hub of the user device, e.g., a lid controller hub (LCH), or to a component apparatus of a LCH, as described below in more detail. The apparatus comprises a first connection to interface with a user-facing camera of the user device and a second connection to interface with video display circuitry of the user device. The apparatus further has circuitry configured to detect and classify a person proximate to the user device based on images obtained from the user-facing camera; determine that visual data being processed by the video display circuitry to be displayed on the user device includes content that is inappropriate for viewing by the detected person; and based on the determination, cause the video display circuitry to visually obscure the portion of the visual data that contains the inappropriate content when displayed on the user device. Alternatively, the entire visual data may be visually obscured based on the determination. Obscuring of at least a portion of the visual data that contains the inappropriate content may be realized by one or more of blurring, blocking, and replacing the content with other content.

Optionally, the apparatus may further comprise a third connection to interface with a microphone of the user device, wherein the circuitry is further configured to detect and classify a person proximate to the user device based on the audio obtained from the microphone. The classification of the person as could be for example classify the person as one or more of not authorized to use the user device, not authorized to view confidential information, an unknown user, and a child. The obscuring of the portion of the video display may be based on the classification.

The obscuring of data is not limited to visual data, but it is also possible to (alternatively or additionally) auditorily obscure a portion of audio data that contains the inappropriate content when played on the user device, if it is determines that that audio data to be played on the user device includes content that is inappropriate for hearing by the detected person. The apparatus may optionally also incorporate the features to implement enhanced privacy, as discussed above in connection with FIGS. 18-23.

In particular, in certain embodiments, the vision/imaging subsystem of an LCH (e.g., vision-imaging module 172 of LCH 155 of FIG. 1A, vision/imaging module 263 of FIG. 2, vision-imaging module 363 of FIG. 3, or vision-imaging module 1863 of FIG. 18) continuously captures the view of a user-facing camera (e.g., camera(s) 160 of FIG. 1A, user-facing camera 270 of FIG. 2, user-facing camera 346 of FIG. 3, or user-facing camera 1870 of FIG. 18), and analyzes the images (e.g., using a neural network of NNA 276 of FIG. 2) to detect, recognize, and/or classify faces of people in front of the camera or otherwise in proximity to the user device, and may provide metadata or other information indicating an output of the detection, recognition, or classification. Further, in some embodiments, the audio subsystem of an LCH (e.g., audio module 170 of FIG. 1A, audio module 264 of FIG. 2, or audio module 364 of FIG. 3, vision-imaging module 1863 of FIG. 18) continuously captures audio from a microphone (e.g., microphone(s) 158 of FIG. 1A, microphone(s) 290 of FIG. 2, microphones 390 of FIG. 3, or microphone(s) 1890 of FIG. 18), and analyzes the audio (e.g., using a neural network of NNA 282 of FIG. 2 or a neural network of NNA 350 of FIG. 3) to detect, recognize, and/or classify users in proximity to the user device. Based on the video- and/or audio-based user detection and classification, the LCH may activate or enforce one or more security policies that can selectively block, blur, or otherwise obscure video or audio content that is deemed inappropriate for one or more of the user(s) detected by the LCH. The LCH may obscure the video data, for example, by accessing images held in a buffer of a connected TCON (e.g., frame buffer 830 of TCON 355 of FIG. 8), and modifying the images prior to them being passed to the panel (e.g., embedded panel 380 of FIG. 8) for display.

For instance, the LCH may include a Deep Learning Engine (e.g., in NNA 276 of FIG. 2 or a neural network of NNA 327 of FIG. 3) that can continuously monitor the content of what is being output by a display module of a device (e.g., the output of display module 241 of FIG. 2 or display module 341 of FIG. 3). The Deep Learning Engine can be trained to detect and classify certain categories of information in the images output by the display module, such as, for example, confidential information/images that only certain users may view or mature information/images that are inappropriate for children or younger users. Further, in some embodiments, an Audio Subsystem of the LCH (e.g., audio module 264 of FIG. 2 or audio module 364 of FIG. 3) also includes a neural network accelerator (NNA) that can detect and classify audio information being output by the audio module of a device (e.g., audio capture module 243 of FIG. 2 or audio capture module 343 of FIG. 3) and can auditorily obscure (e.g., mute and/or filter) certain audio that is inappropriate for certain users (e.g., confidential or mature audio (e.g., "bad" words or "swear" words)).

The LCH (e.g., via security/host module 261 of FIG. 2 and/or other corresponding modules or circuitry (e.g. 174, 361, 1861) as shown in the other example computing devices discussed previously) may use the information provided by the NNAs of the video-imaging module and/or audio module to determine whether to filter content being output to the display panel or speakers of the device. In some instances, the LCH may use additional information, e.g., document metadata, website information (e.g., URL), etc., in the determination. The determination of whether to filter the content may be based on identification or classification of a user detected by the user-facing camera. Using the user identification or classification and the other information previously described, the LCH can apply filtering based on one or more security policies that indicate rules for types of content that may be displayed. For example, the security policy may indicate that children may not view or hear any mature content, or that anyone other than known users may view confidential information being displayed. In other embodiments, the LCH may filter content being output to the display panel or speakers of the device based only on the detection of inappropriate content (e.g., as defined by a security policy of the user device).

Figure 24:
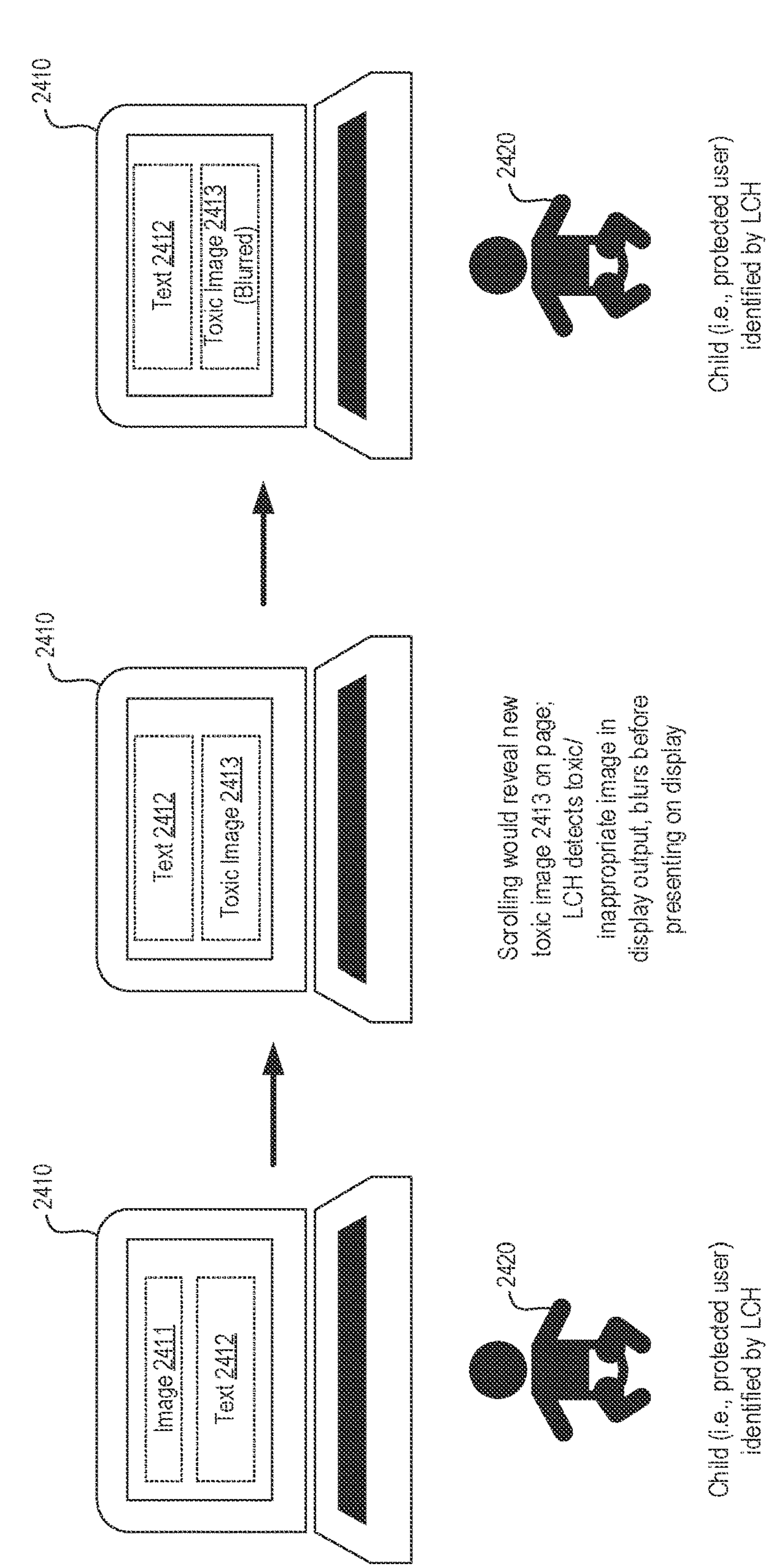
FIG. 24 illustrates an example usage scenario for a dynamic privacy monitoring system in accordance with certain embodiments.

FIG. 24 illustrates an example usage scenario 2400 for a dynamic privacy monitoring system in accordance with certain embodiments. In the example shown, a child 2420 is browsing the computer 2410. The computer 2410 may be implemented similar to the device 100 of FIG. 1A and/or the device 200 of FIG. 2 and/or the device 300 of FIG. 3 and/or the device 1800 of FIG. 18, or any other computing device discussed herein previously. For example, the computer 2410 may include an LCH and its constituent components as described with respect the devices 100, 200, 300, 1800 or any other computing device discussed herein previously.

Figure 26A:
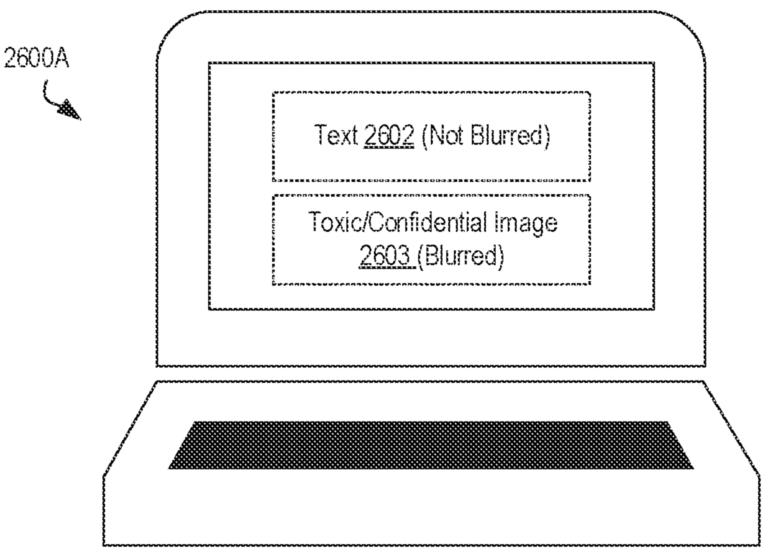
FIGS. 26A-26B illustrate example screen blurring scenarios that may be implemented by a dynamic privacy monitoring system in accordance with certain embodiments.
Figure 26B:
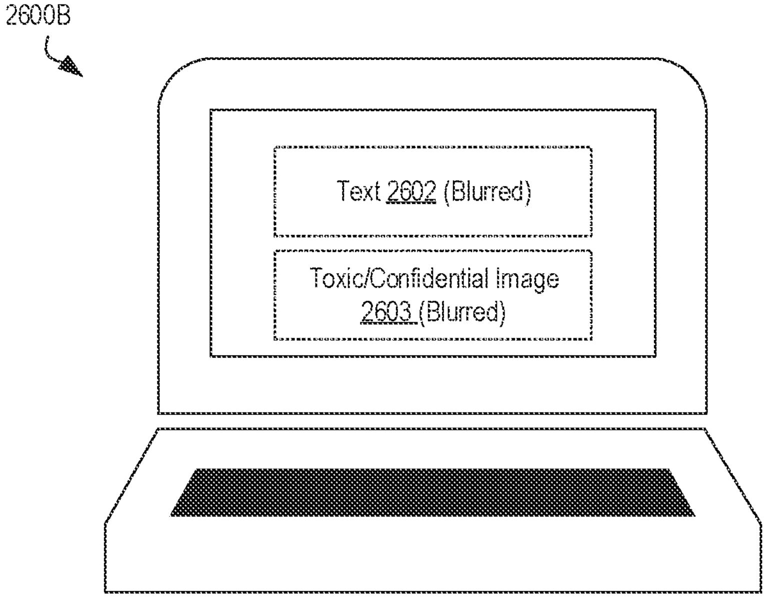

In the example shown, the computer 2410 is displaying an image 2411 and text 2412 at first. Later, as the child scrolls, the LCH detects a toxic/inappropriate image 2413 in the image stream being output by the display output (e.g., GPU of the computer 2410). Because the LCH continues to detect that the child 2420 is in front of the computer 2410, the LCH blurs (or otherwise obscures) the toxic/inappropriate image 2413 before it is presented on the display. That is, the LCH classifies the image in the image stream being provided by the display output and modifies the image(s) before they are presented to the user. In the example shown, the child 2420 may be able to still read the text 2412, but may not be able to view the toxic/inappropriate image 2413. However, in other embodiments, the entire screen may be blurred or otherwise obscured from view (e.g., as shown in FIG. 26B). Further, while the example shows that the image 2413 is blurred, the image 2413 may be blocked (e.g., blacked or whited out), not shown, replaced with another image, or otherwise hidden from the user in another manner.

Figure 25:
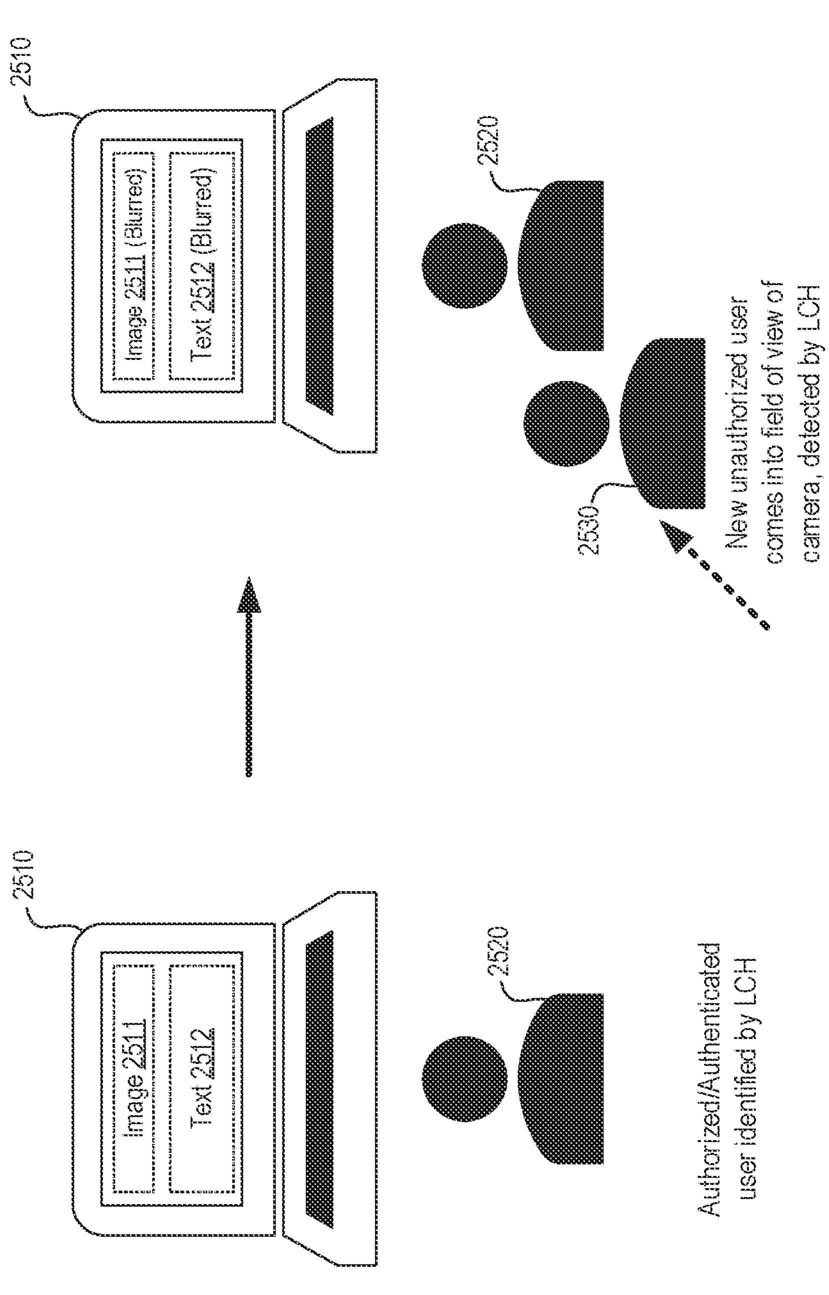
FIG. 25 illustrates another example usage scenario for a dynamic privacy monitoring system in accordance with certain embodiments.

FIG. 25 illustrates another example usage scenario 2500 for a dynamic privacy monitoring system in accordance with certain embodiments. In the example shown, a user 2520 is browsing the device 2510. The device 2510 may be implemented similar to the device 100 of FIG. 1A and/or the device 200 of FIG. 2 and/or the device 300 of FIG. 3 and/or the device 1800 of FIG. 18, or any other computing device discussed herein previously. For example, the device 2510 may include an LCH and its constituent components as described with respect the devices 100, 200, 300, 1800 or any other computing device discussed herein previously.

In the example shown, the device 2510 is displaying an image 2511 and text 2512. Later, another user 2530 comes into view of the user-facing camera of the device 2510, is heard by a microphone of the device 2510, or both, and is accordingly detected by the LCH. The LCH classifies the user 2530 as unauthorized (e.g., based on comparing information gathered by the user-facing camera and/or microphone with known user profiles), and accordingly, proceeds to blur the image 2511 and text 2512 so that they may not be viewed at all. For example, the user 2530 may be a child or some other user that is not authorized to view information on the computer (e.g., known confidential information). In other embodiments, only a portion of the display output (e.g., images or text known to be inappropriate, confidential) may be blurred rather than the entire display output (e.g., as shown in FIG. 26A). Further, while the example shows that the image 2511 and text 2512 are blurred, the image 2511 and/or text 2512 may be blocked (e.g., blacked out or redacted), not shown, replaced with a/another image, or otherwise hidden from the user in another manner.

In some instances, however, the second user 2530 may be a known or authorized user and may accordingly be permitted to view the image 2511 and/or text 2512. For example, the second user 2530 may be a co-worker of user 2520 with similar privileges or authorizations. In such instances, the LCH may classify the second user 2530 as authorized (e.g., based on comparing information gathered by the user-facing camera and/or microphone with known user profiles), and continued to display the image 2511 and text 2512.

FIGS. 26A-26B illustrate example screen blurring scenarios 2600A, 2600B that may be implemented by a dynamic privacy monitoring system in accordance with certain embodiments. In the example shown in FIG. 26A, only a portion of the display output (toxic/confidential image 2603) is blurred or otherwise obscured from viewing by a user via the LCH. The portion that is blurred or obscured by the LCH may be based on the portion being detected or classified as toxic, confidential, etc. as described above. The remaining portions of the display output may be maintained and may thus be viewable by user(s) of the device. In contrast, in the example shown in FIG. 26B, the entire display output (text 2602 and toxic/confidential image 2603) is blurred or otherwise obscured from viewing by a user via the LCH. The blurring by the LCH may be based on only a portion of the display output being detected or classified as toxic, confidential, etc. as described above.

Figure 27:
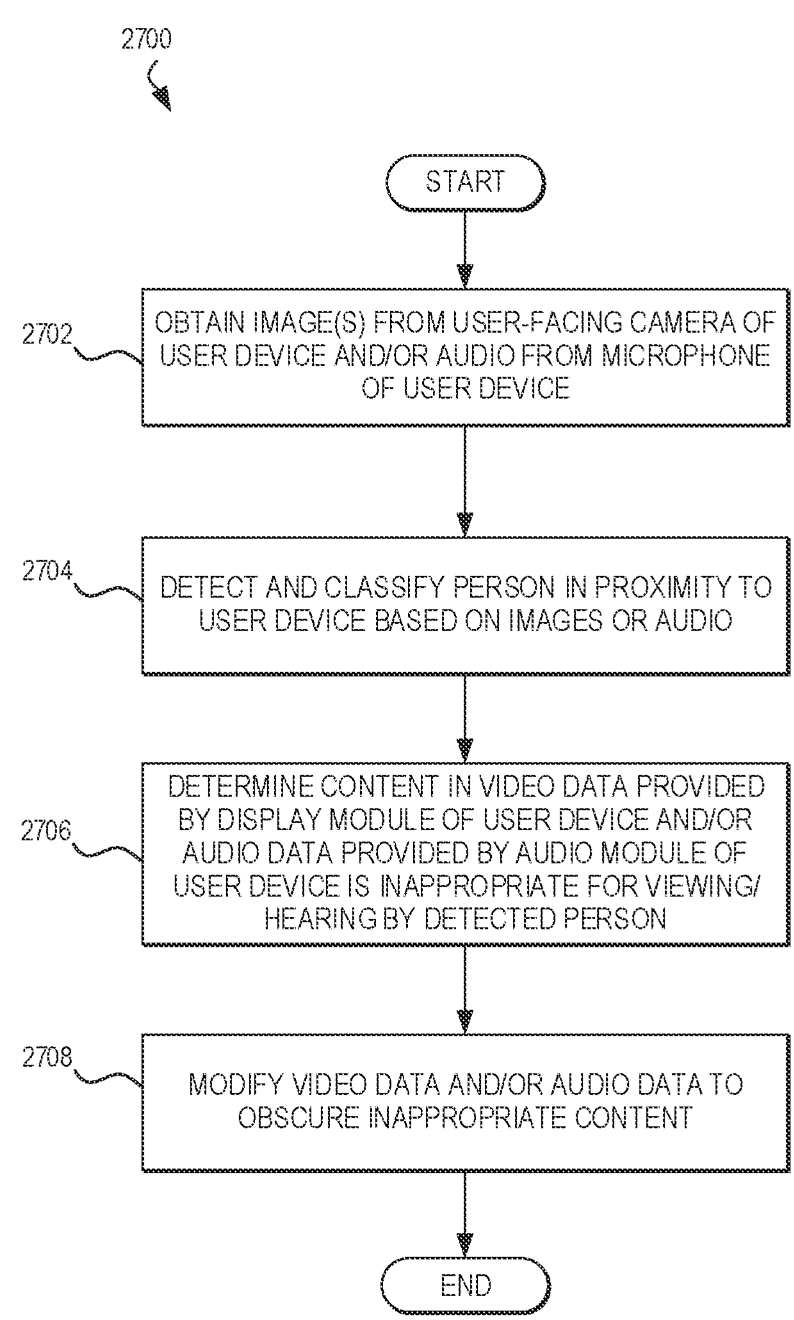
FIG. 27 illustrates a flow diagram of an example process of filtering visual and/or audio output for a device in accordance with certain embodiments.

FIG. 27 is a flow diagram of an example process 2700 of filtering visual and/or audio output for a device in accordance with certain embodiments. The example process may be implemented in software, firmware, hardware, or a combination thereof. For example, in some embodiments, operations in the example process shown in FIG. 27, may be performed by a controller hub apparatus that implements the functionality of one or more components of lid controller hub (LCH) (e.g., one or more of security/host module 261, vision/imaging module 263, and audio module 264 of FIG. 2 or the corresponding modules in the computing device 100 of FIG. 1A and/or the device 300 of FIG. 3 and/or the device 1800 of FIG. 18, or any other computing device discussed herein previously). In some embodiments, a computer-readable medium (e.g., in memory 274, memory 277, and/or memory 283 of FIG. 2 or the corresponding modules in the computing device 100 of FIG. 1A and/or the device 300 of FIG. 3 and/or the device 1800 of FIG. 18, or any other computing device discussed herein previously) may be encoded with instructions that implement one or more of the operations in the example process below. The example process may include additional or different operations, and the operations may be performed in the order shown or in another order. In some cases, one or more of the operations shown in FIG. 27 are implemented as processes that include multiple operations, sub-processes, or other types of routines. In some cases, operations can be combined, performed in another order, performed in parallel, iterated, or otherwise repeated or performed another manner.

At 2702, the LCH obtains one or more images from a user-facing camera of a user device and/or audio from a microphone of the user device. For instance, referring to the example shown in FIG. 2, the LCH 260 may obtain images from user-facing camera 270 and audio from microphone(s) 290.

At 2704, the LCH detects and classifies a person in proximity to the user device based on the images and/or audio obtained at 2702. The detection and classification may be performed by one or more neural network accelerators of the LCH (e.g., NNAs 276, 282 of FIG. 2). As some examples, the LCH may classify the person as: authorized or not authorized to use the user device, authorized or not authorized to view confidential information, a known/an unknown user, or as old/young (e.g., an adult, child, or adolescent). In some cases, more than one person may be detected by the LCH as being in proximity to the user device (e.g., as described above with respect to FIG. 2) and each detected person may be classified separately.

At 2706, it is determined that content in the visual data provided by a display module of the user device and/or audio data provided by an audio module of the user device is inappropriate for viewing/hearing by the detected person. The determination may be based on classification(s) performed on the content by one or more neural network accelerators (e.g., NNAs 276, 282 of FIG. 2). For example, the NNA may classify text or images as being mature or confidential, and the LCH may accordingly determine to obscure the text or images based on detecting a child or unauthorized user in proximity of the user device.

At 2708, the visual data, audio data, or both are modified to obscure the content determined to be inappropriate for the detected user. This may include obscuring just the portion of the content determined to be inappropriate or the entire content being displayed on the panel or played via speakers. The content that is obscured may be obscured via one or more of blurring, blocking, or replacing the content with other content. For example, the LCH may access a buffer in the TCON of video display circuitry that holds images to be displayed, and may modify the images prior to them being passed to the panel of the device for display.

Additional examples of the presently described method, system, and device privacy and toxicity embodiments include the following, non-limiting implementations. Each of the following non-limiting examples may stand on its own or may be combined in any permutation or combination with any one or more of the other examples provided below or throughout the present disclosure.

Example BA1 relates to an apparatus comprising: a first connection to interface with a user-facing camera of a user device; a second connection to interface with video display circuitry of the user device; and circuitry to: detect and classify a person proximate to the user device based on images obtained from the user-facing camera; determine that visual data being processed by the video display circuitry to be displayed on the user device includes content that is inappropriate for viewing by the detected person; and based on the determination, cause at least the portion of the visual data that contains the inappropriate content to be visually obscured when displayed on the user device. The apparatus may be, for example, controller hub, such as a lid controller hub (LCH).

Example BA2 includes the subject matter of Example BA1, wherein the circuitry is to visually obscure the entire visual data.

Example BA3 includes the subject matter of Example BA1 or BA2, further comprising a third connection to interface with a microphone of the user device, wherein the circuitry is further configured to detect and classify a person proximate to the user device based on the audio obtained from the microphone.

Example BA4 includes the subject matter of any one of Examples BA1-BA3, wherein the circuitry is configured to classify the person as one or more of not authorized to use the user device, not authorized to view confidential information, an unknown user, and a child.

Example BA5 includes the subject matter of Example BA4, wherein the detected person is a first person, and the circuitry is configured to further detect and classify a second person proximate to the user device as one or more of authorized to use the user device, authorized to view confidential information, an known user, and an adult.

Example BA6 includes the subject matter of any one of Examples BA1-BA5, wherein the circuitry is configured to determine that the visual data includes content that is inappropriate for viewing by the detected person based on classification of the content by a neural network accelerator.

Example BA7 includes the subject matter of any one of Examples BA1-BA6, wherein the circuitry is configured to detect and classify the person using one or more neural network accelerators.

Example BA8 includes the subject matter of any one of Examples BA1-BA7, wherein the circuitry is configured to cause the video display circuitry to visually obscure the portion of the visual data that contains the inappropriate content by one or more of blurring, blocking, and replacing the content with other content.

Example BA9 includes the subject matter of any one of Examples BA1-BA8, wherein the video display circuitry comprises one or more of a timing controller (TCON) and a display panel of the user device.

Example BA10 includes the subject matter of any one of Examples BA1-BA9, further comprising a third connection to interface with an audio module of the user device, wherein the circuitry is further configured to: determine that audio data to be played on the user device includes content that is inappropriate for hearing by the detected person; and based on the determination, cause at least the portion of the audio data that contains the inappropriate content to be auditorily obscured when played on the user device.

Example BA11 includes the subject matter of Example BA10, wherein the circuitry is configured to determine that the audio data includes content that is inappropriate for hearing by the detected person based on classification of the content by a neural network accelerator.

Example BA12 includes the subject matter of any one of Examples BA herein above, wherein the circuitry is to use the video display circuitry to visually obscure at least the portion of the visual data that contains the inappropriate content when displayed on the user device by: accessing the visual data in a buffer of the video display circuitry; and modifying the visual data.

Example BA13 includes the subject matter of any one of Examples BA herein above, and further the features of any one of the Examples AA herein above or AG1 (as far as those features are not redundant with the features of Examples BA herein above).

Example BB1 relates to one or more computer-readable media comprising instructions that, when executed by a machine, are to: obtain images from a user-facing camera of a user device; detect and classify a person proximate to the user device based on the images; determine that visual data being processed to be displayed on the user device includes content that is inappropriate for viewing by the detected person; and based on the determination, cause at least the portion of the visual data that contains the inappropriate content to be visually obscured when displayed on the user device.

Example BB2 includes the subject matter of Example BB1, wherein the instructions are to visually obscure the entire visual data when displayed on the user device.

Example BB3 includes the subject matter of any one of Example BB1-BB2, wherein the instructions are further configured to: obtain audio from a microphone of the user device; and detect and classify a person proximate to the user device based on the audio obtained from the microphone.

Example BB4 includes the subject matter of any one of Examples BB1-BB3, wherein the instructions are to classify the person as one or more of not authorized to use the user device, not authorized to view confidential information, an unknown user, and a child.

Example BB5 includes the subject matter of Example BB4, wherein the detected person is a first person, and the instructions are further configured to detect and classify a second person proximate to the user device as one or more of authorized to use the user device, authorized to view confidential information, a known user, and an adult.

Example BB6 includes the subject matter of any one of Examples BB1-BB5, wherein the instructions are to determine that the visual data includes content that is inappropriate for viewing by the detected person based on classification of the content by a neural network accelerator.

Example BB7 includes the subject matter of any one of Examples BB1-BB6, wherein the instructions are to detect and classify the person using one or more neural network accelerators.

Example BB8 includes the subject matter of any one of Examples BB1-BB7, wherein the instructions are to visually obscure at least the portion of the visual data that contains the inappropriate content by one or more of blurring, blocking, and replacing the content with other content.

Example BB9 includes the subject matter of any one of Examples BB1-BB8, wherein the instructions are further configured to: determine that audio data to be played on the user device includes content that is inappropriate for hearing by the detected person; and based on the determination, cause the audio module to auditorily obscure at least the portion of the audio data that contains the inappropriate content when played on the user device.

Example BB10 includes the subject matter of Examples BB9, wherein the instructions are to determine that the audio data includes content that is inappropriate for hearing by the detected person based on classification of the content by a neural network accelerator.

Example BB11 includes the subject matter of any one of Examples BB herein above, wherein the instructions are to cause at least the portion of the visual data that contains the inappropriate content to be visually obscured when displayed on the user device by: accessing the visual data in a buffer of video display circuitry of the user device; and modifying the visual data.

Example BB12 includes the subject matter of any one of Examples BB herein above, and further the features of any one of the Examples AE herein above or AH1 (as far as those features are not redundant with features of Examples BB herein above).

Example BC1 relates to a system comprising: a base comprising: one or more processor cores; and a display module to generate visual data; a lid coupled to the base via a hinge, the lid comprising: a user-facing camera; a display panel; a timing controller (TCON) comprising circuitry to interface between the display module and the display panel; and a lid controller hub (LCH) coupled to the TCON, wherein the LCH comprises circuitry to: detect and classify a person proximate to the user device based on images obtained from the user-facing camera; determine that visual data in the frame buffer of the TCON includes content that is inappropriate for viewing by the detected person; and based on the determination, modify the visual data in the frame buffer of the TCON to visually obscure at least the portion of the visual data that contains the inappropriate content.

Example BC2 includes the subject matter of Examples BC1, wherein the LCH circuitry is further to modify the visual data to visually obscure the entire visual data when displayed on the user device.

Example BC3 includes the subject matter of any one of Examples BC1-BC2, wherein the lid further comprises a microphone, and the LCH circuitry is further configured to detect and classify a person proximate to the user device based on audio obtained from the microphone.

Example BC4 includes the subject matter of any one of Examples BC1-BC3, wherein the LCH circuitry is configured to classify the person as one or more of not authorized to use the user device, not authorized to view confidential information, an unknown user, and a child.

Example BC5 includes the subject matter of Example BC4, wherein the detected person is a first person, and the LCH circuitry is configured to further detect and classify a second person proximate to the user device as one or more of authorized to use the user device, authorized to view confidential information, an known user, and an adult.

Example BC6 includes the subject matter of any one of Examples BC1-BC5, wherein the LCH circuitry is configured to determine that the visual data includes content that is inappropriate for viewing by the detected person based on classification of the content by a neural network accelerator.

Example BC7 includes the subject matter of any one of Examples BC1-BC6, wherein the LCH circuitry is configured to detect and classify the person using one or more neural network accelerators.

Example BC8 includes the subject matter of any one of Examples BC1-BC7, wherein the LCH circuitry is to modify the visual data to visually obscure at least the portion of the visual data that contains the inappropriate content by one or more of blurring, blocking, and replacing the content with other content.

Example BC9 includes the subject matter of any one of Examples BC1-BC8, wherein the base further comprises an audio module to generate audio data, and the LCH circuitry is further configured to: determine that audio data to be played on the user device includes content that is inappropriate for hearing by the detected person; and based on the determination, cause the audio module to auditorily obscure at least the portion of the audio data that contains the inappropriate content when played on the user device.

Example BC10 includes the subject matter of Example BC9, wherein the LCH circuitry is configured to determine that the audio data includes content that is inappropriate for hearing by the detected person based on classification of the content by a neural network accelerator.

Example BC11 includes the subject matter of any one of Examples BC1-BC10, wherein the base comprises a system-on-chip (SoC) and the one or more processor cores and display module are implemented within the SoC.

Example BC12 includes the subject matter of any one of Examples BC herein above, and further the features of any one of the Examples AB herein above, AC herein above, AD herein above or All (as far as those features are not redundant with features of Examples BC herein above).

Example BD1 relates to a method comprising: obtaining images from a user-facing camera of a user device; detecting and classifying a person proximate to the user device based on the images; determining that visual data being processed to be displayed on the user device includes content that is inappropriate for viewing by the detected person; and based on the determination, visually obscuring at least the portion of the visual data that contains the inappropriate content when displayed on the user device.

Example BD2 includes the subject matter of Example BD1, wherein the entire visual data is visually obscured when displayed on the user device.

Example BD3 includes the subject matter of any one of Examples BD1-BD2, further comprising obtaining audio from a microphone of the user device, wherein detecting and classifying the person proximate to the user device is further based on the audio obtained from the microphone.

Example BD4 includes the subject matter of any one of Examples BD1-BD3, wherein the person is classified as one or more of not authorized to use the user device, not authorized to view confidential information, an unknown user, and a child.

Example BD5 includes the subject matter of Example BD5, wherein the detected person is a first person, and the method further comprises detecting and classifying a second person proximate to the user device as one or more of authorized to use the user device, authorized to view confidential information, an known user, and an adult.

Example BD6 includes the subject matter of any one of Examples BD1-BD5, further comprising classifying the content using a neural network accelerator, wherein determining that the visual data includes content that is inappropriate for viewing by the detected person is based on the classification by the neural network accelerator.

Example BD7 includes the subject matter of any one of Examples BD1-BD6, wherein detecting and classifying the person is based on classification by one or more neural network accelerators.

Example BD8 includes the subject matter of any one of Examples BD1-BD7, wherein visually obscuring at least the portion of the visual data that contains the inappropriate content comprises one or more of blurring, blocking, and replacing the content with other content.

Example BD9 includes the subject matter of any one of Examples BD1-BD8, further comprising: determining that audio data to be played on the user device includes content that is inappropriate for hearing by the detected person; and based on the determination, obscuring at least the portion of the audio data that contains the inappropriate content when played on the user device.

Example BD10 includes the subject matter of Examples BD9, wherein the circuitry is configured to determine that the audio data includes content that is inappropriate for hearing by the detected person based on classification of the content by a neural network accelerator.

Example BD11 includes the subject matter of any one of Examples BD herein above, wherein visually obscuring at least the portion of the visual data that contains the inappropriate content when displayed on the user device comprises: accessing the visual data in a frame buffer of the user device; and modifying the visual data.

Example BD12 includes the subject matter of any one of Examples BD herein above, and further the method steps of any one of the Examples AF herein above (as far as those method steps are not redundant with the method steps of Examples BD herein above).

Example BE1 relates to an apparatus configured to implement a method as in any one of Examples BD herein above.

Example BF1 relates to one or more computer-readable media comprising instructions that, when executed by a machine, cause the machine to implement one or more of the methods of Examples BD herein above.

Example BG1 relates to a system comprising means to implement one or more of the methods of Examples BD herein above.

Example BH1 includes a system comprising: means for detecting and classifying a person proximate to a user device based on images obtained from a user-facing camera of the user device; means for determining that visual data being processed to be displayed on the user device includes content that is inappropriate for viewing by the detected person; means for visually obscuring at least the portion of the visual data that contains the inappropriate content when displayed on the user device based on the determination; and means for displaying the visual data.

Example BH2 includes the subject matter of Example BH1, further comprising means for detecting and classifying the person proximate to the user device is further based on audio obtained from a microphone of the user device.

Example BH3 includes the subject matter of any one of Examples BH1-BH2, wherein the means for detecting and classifying a person proximate to the user device comprises one or more neural network accelerators.

Example BH4 includes the subject matter of any one of Examples BH1-BH3, wherein the means for determining that the visual data includes content that is inappropriate for viewing by the detected person comprises a neural network accelerator.

Example BH5 includes the subject matter of any one of Examples BH1-BH4, further comprising: means for determining that audio data to be played on the user device includes content that is inappropriate for hearing by the detected person; and means for auditorily obscuring at least the portion of the audio data that contains the inappropriate content when played on the user device based on the determination.

Example BH6 includes the subject matter of Example BH5, wherein the means for determining that the audio data includes content that is inappropriate for hearing by the detected person comprises a neural network accelerator.

Example BH7 includes the subject matter of any one of Examples BH herein above, wherein the means for visually obscuring at least the portion of the visual data that contains the inappropriate content based on the determination comprise means for accessing and modifying the visual data in the means for displaying the visual data.

Example BH8 includes the subject matter of any one of Examples BH herein above, and further means for implementing the features of any one of the Examples AB herein above, AC herein above, AD herein above or All (as far as those steps are not redundant with the method steps of Examples BH herein above).

Video Call Pipeline Optimization

Recently, video calling/conferencing usage has exploded with the emergence of sophisticated and widely available video calling applications. Currently, however, video calling on a typical device (e.g., personal computer, laptop, tablet, mobile device) can negatively impact system power and bandwidth consumption. For example, light used to display each video frame in a video stream can detrimentally impact system power and shorten the run on a battery charge. User demand for high quality video calls can result in greater Internet bandwidth usage to route the high-quality encoded video frames from one node to another node via the Internet. Additionally, video calling can contribute to "burn-in" of an organic light-emitting diode (OLED) display panel, especially when the display panel is used to provide user-facing light to enhance the brightness of the user whose image is being captured.

Optimizing a video call pipeline, as disclosed herein, can resolve these issues (and more). Certain video calling features can be optimized to reduce system power and/or bandwidth consumption, and to enhance brightness of a video image without increasing the risk of burn-in on an OLED display panel. For example, signal paths for implementing background blurring, sharpening of an image with user intent, and using a user-facing display panel as lighting, can be optimized to reduce system power and/or bandwidth consumption. In one example, one or more machine learning algorithms can be applied to captured video frames of a video stream to identify a user head/face, a user body, user gestures, and background portions of the captured images. A blurring technique can be used to encode a captured video frame with the identified background portions at a lower resolution. Similarly, certain objects or areas of a video frame can be identified and filtered in the encoded video frame. In at least one embodiment, "hot spots" can be identified in a captured video frame and the pixel values associated with the hot spots may be modified to reduce the whiteness or brightness when the video frame is displayed. The brightness of the background of a captured video frame may also be toned down to enable power saving techniques to be used by a receiving device when the video frame is received and displayed. Thus, the captured video frame can be encoded with the modified pixels.

Enhancements can also be applied to video frames as disclosed herein, to provide a better user experience in a video call. Combining the optimizations described herein with the enhancements can offset (or more than offset) any additional bandwidth needed for enhancements. Enhancements may include sharpening selected objects identified based on gesture recognition and/or eye tracking or gaze direction. For example, sometimes a user may need to present an item during a video call. If the user is gesturing (e.g., holding, pointing to) an item, the location of the item in the video frame can be determined and sharpened by any suitable technique, such as a super resolution technique. Similarly, if the user's eyes or gaze direction is directed to a particular item within the video frame, then the location of that item can be determined based on the user's eyes or gaze direction and can be sharpened.

In one or more embodiments, a lid controller hub, such as LCH 155, 260, 305, 954, 1705, 1860, can be used to implement these optimizations and enhancements. Each of the optimizations individually can provide a particular improvement in a device as outlined above. In addition, the combination of these optimizations and enhancements using a lid controller hub with low power imaging components as disclosed herein can improve overall system performance. Specifically, the combination of the optimizations can improve the quality of video calls, reduce the system power and/or battery power consumption, and reduce Internet bandwidth usage by a device, among other benefits.

Some embodiments relate to a system, e.g., a user device, which has a neural network accelerator. The neural network accelerator (NNA) may be for example implemented in a controller hub, such as the lid controller hubs described herein above, for example in connection with FIGS. 1A, 2, 3, 9, 17-23. In this example implementation, the NNA may be configured to receive a video stream from a camera of a computing device, the neural network accelerator including first circuitry to: receive a video frame captured by a camera during a video call; identify a background area in the video frame; identify an object of interest in the video frame; and generate a segmentation map including a first label for the background area and a second label for the object of interest. The system further comprises an image processing module. The image processing module may be for example implemented in a host SoC of the user devices described herein above, such as for example computing devices 100, 122, 200, 300, 900, 1700-2300. The image processing module may include second circuitry to receive the segmentation map from the neural network accelerator; and encode the video frame based, at least in part, on the segmentation map, wherein encoding the video frame is configured to include blurring the background area in the video frame. The object of interest can be, for example, a human face, a human body, a combination of the human face and the human body, an animal, or a machine capable of human interaction. Optionally, the NNA may increase resolution of a portion of the video frame corresponding to the object of interest without increasing the resolution of the background area.

Alternatively, the NNA may be configured to identify one or more gestures of a user in the video frame; identify a presentation area in the video frame, wherein the presentation area is identified based, at least in part, on proximity to the one or more gestures; and cause the segmentation map to include a label for the presentation area. The NNA may increase a resolution of the presentation area without increasing the resolution of the background area. Note that the features of this alternative may also be added to the implementation discussed in the example implementation of the system above.

Figure 28:
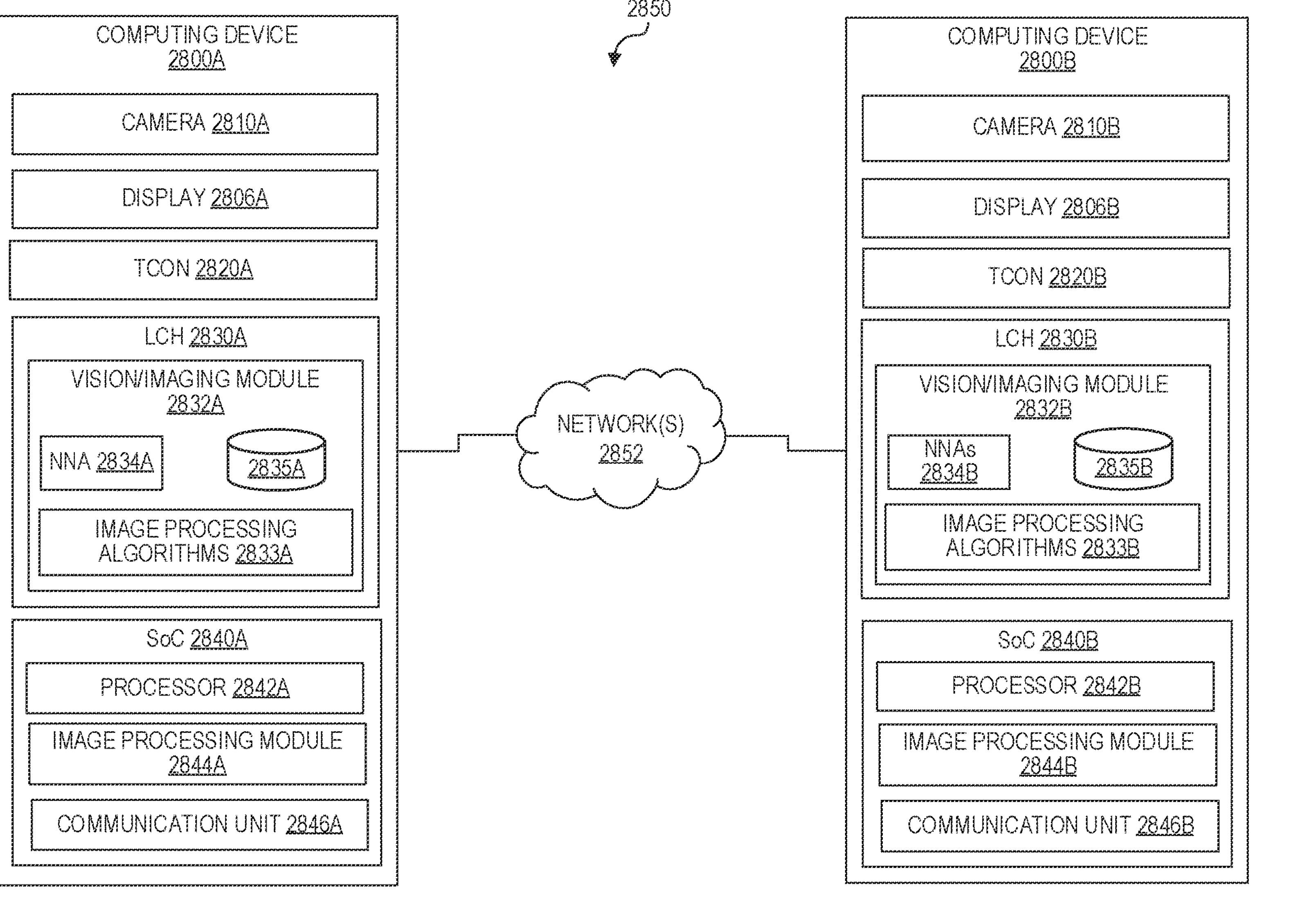
FIG. 28 is a simplified block diagram illustrating a communication system for a video call between devices configured with a lid controller hub according to at least one embodiment.

Turning to FIG. 28, FIG. 28 is a simplified block diagram illustrating a communication system 2850 including two devices configured to communicate via a video calling application and to perform optimizations for a video call pipeline. In this example, a first device 2800A includes a user-facing camera 2810A, a display panel 2806A, a lid controller hub (LCH) 2830A, a timing controller (TCON) 2820A, and a silicon-on-a-chip (SoC) 2840A. LCH 2830A can include a vision/imaging module 2832A, among other components further described herein. Vision/imaging module 2832A can include a neural network accelerator (NNA) 2834A, image processing algorithms 2833A, and a vision/imaging memory 2835A. SoC 2840A can include a processor 2842A, an image processing module 2844A, and a communication unit 2846A. In an example implementation, LCH 2830A can be positioned proximate to a display (e.g., in a lid housing, display monitor housing) of device 2800A. In this example, SoC 2840A may be positioned in another housing (e.g., a base housing, a tower) and communicatively connected to LCH 2830A. In one or more embodiments, LCH 2830A represents an example implementation of LCH 155, 260, 305, 954, 1705, 1860, and SoC 2840A represents an example implementation of SoC 140, 240, 340, 914, 1840, both of which include various embodiments that are disclosed and described herein.

A second device 2800B includes a user-facing camera 2810B, a display panel 2806B, a lid controller hub (LCH) 2830B, a timing controller (TCON) 2820B, and a silicon-on-a-chip (SoC) 2840B. LCH 2830B can include a vision/imaging module 2832B. In some implementations, the timing controllers 2820A, 2820B) can be integrated onto the same die or package as a lid controller hub 2830A, 2830B. Vision/imaging module 2832B can include a neural network accelerator (NNA) 2834B, image processing algorithms 2833A, and a vision/imaging memory 2835B. SoC 2840B can include a processor 2842B, an image processing module 2844B, and a communication unit 2846B. In an example implementation, LCH 2830B can be positioned proximate to a display (e.g., in a lid housing, display monitor housing) of device 2800B. In this example, SoC 2840B may be positioned in another housing (e.g., a base housing, a tower) and communicatively connected to LCH 2830B. In one or more embodiments, LCH 2830B represents an example implementation of LCH 155, 260, 305, 954, 1705, 1860, and SoC 2840B represents an example implementation of SoC 140, 240, 340, 914, 1840, both of which include various embodiments that are disclosed and described herein.

First and second devices 2800A and 2800B can communicate via any type or topology of networks. First and second devices 2800A and 2800B represent points or nodes of interconnected communication paths for receiving and transmitting packets of information that propagate through one or more networks 2852. Examples of networks 2852 in which the first and second devices may be implemented and enabled to communicate can include, but are not necessarily limited to, a wide area network (WAN) such as the Internet, a local area network (LAN), a metropolitan area network (MAN), vehicle area network (VAN), a virtual private network (VPN), an Intranet, any other suitable network, or any combination thereof. These networks can include any technologies (e.g., wired or wireless) that facilitate communication between nodes in the network.

Communication unit 2846A can transmit encoded video frames generated by image processing module 2844A, to one or more other nodes, such as device 2800B, via network(s) 2852. Similarly, communication unit 2846B of second device 2800B may be operable to transmit encoded video frames generated by image processing module 2844B, to one or more other nodes, such as device 2800A via network(s) 2852. Communication units 2846A and 2846B may include any wired or wireless device (e.g., modems, network interface devices, or other types of communication devices) that is operable to communicate via network(s) 2852.

Cameras 2810A and 2810B may be configured and positioned to capture video stream for video calling applications, among other uses. Although devices 2800A and 2800B may be designed to enable various orientations and configurations of their respective housings (e.g., lid, base, second display), in at least one position, cameras 2810A and 2810B can be user-facing. In one or more examples, cameras 2810A and 2810B may be configured as always-on image sensors, such that each camera can capture sequences of images, also referred to herein as "video frames", by generating image sensor data for the video frames when its respective device 2800A or 2800B is in an active state or a low-power state. A video stream captured by camera 2810A of the first device can be optimized and optionally enhanced before transmission to second device 2800B. Image processing module 2844A can encode the video frame with the optimizations and enhancements using any suitable encoding and/or compression technique. In some embodiments, a single video frame is encoded for transmission, but in other embodiments, multiple video frames may be encoded together.

LCH 2830A and LCH 2830B may utilize machine learning algorithms to detect objects and areas in captured video frames. LCH 2830A and LCH 2830B may provide not only the functionality described in this section of the description, but may also implement the functionality of the LCH described in connection with the computing devices described earlier herein, for example the computing devices 100, 200, 300, 900, 1700-2300. Neural network accelerators (NNAs) 2834A and 2834B may include hardware, firmware, software, or any suitable combination thereof. In one or more embodiments, neural network accelerators (NNAs) 2834A and 2834B may each implement one or more deep neural networks (DNNs) to identify the presence of a user, a head/face of a user, a body of a user, head orientation, gestures of a user, and/or background areas of an image. Deep learning is a type of machine learning that uses a layered structure of algorithms, known as artificial neural networks (or ANNs), to learn and recognize patterns from data representations. ANNs are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing and object recognition. Convolution Neural Networks (CNNs) represent just one example of a computation paradigm that employs ANN algorithms and will be further discussed herein.

Image processing algorithms 2833A, 2833B may perform various functions including, but not necessarily limited to identifying certain features in the video frame (e.g., high brightness), and/or identifying certain objects or areas (e.g., object to which super resolution is applied, area to which a user is pointing or gazing, etc.) in the image once the segmentation map is generated, and/or performing a super resolution technique. The image processing algorithms may be implemented as one logical and physical unit with NNA 2834A, 2834B, or may be separately implemented in hardware and/or firmware as part of vision/imaging module 2832A, 2832B. In one example, image processing algorithms 2833A, 2833B may be implemented in microcode.

When a video call is established between first and second devices 2800A and 2800B, video streams may be captured by each device and sent to the other device for display on the other device's display panel. Different operations and activities may be performed when a device is capturing and sending a video stream and when the device is receiving and displaying a video stream, which can happen concurrently. Some of these operations and activities will now be generally described with reference to device 2800A as the capturing and sending device and device 2800B as the receiving and displaying device.

Camera 2810A of first device 2800A may be configured to capture a video stream in the form of a sequence of images from a field of view (FOV) of camera 2810A. The FOV of camera 2810A is an area that is visible through the camera based on its particular position and orientation to capture a video stream in the form of a sequence of images from a field of view (FOV) of camera 2810A. Each captured image in the sequence of images may comprise image sensor data, which can be generated by user-facing camera 2810A in the form of individual pixels (also referred to as "pixel elements"). Pixels are the smallest addressable unit of an image that can be displayed in a display panel. A captured image may be represented by one video frame in a video stream.

In one or more embodiments, captured video frames can be optimized and enhanced by device 2800A before being transmitted to a receiving device for display, such as second device 2800B. Generally, the focus and brightness of relevant, important objects or portions in a video frame are not reduced (or may be minimally reduced) by device 2800A and, in at least some cases, may be enhanced. In one or more embodiments, gestures or a gaze of a user (e.g., human, animal, or communicating machine) captured in the video frame may be used to identify relevant objects that can be enhanced. Enhancements may include, for example, applying super resolution to optimize focus and rendering of the user and/or identified relevant object or area within a video frame in which a relevant object is located.

Other objects or portions of the video frame that are unimportant or less relevant may be modified (e.g., reduced resolution, lowered brightness) to reduce power consumption and bandwidth usage. In addition, the unimportant or unwanted objects in a background area may not be shown. For example, background areas that are blurred can be identified and pixel density/resolution of those areas can be decreased in image processing module 2844A. Decreasing pixel density can reduce the content sent through the pipeline, and thus can reduce bandwidth usage and power consumption on radio links in networks 2852, for example. Appearance filtering (also referred to as "beautification") may also be applied to any object, although it may be more commonly applied to a human face. Filtering a face, for example, can be achieved by reducing the resolution of the face to soften the features, but not necessarily reducing the resolution as much as it is reduced in an unwanted or unimportant area. Hot spots, which are localized areas of high brightness (or white), can be identified and muted, which can also reduce power consumption when the video frame is displayed. Finally, in some scenarios, the background areas could be further darkened or "turned off" (e.g., backlight to those areas is reduced or turned off) to save the most display power possible.

In one or more embodiments, an encoded video frame that is received by second device 2800B (e.g., from first device 2800A) may be decoded by image processing module 2844B. TCON 2820B can perform a power saving technique on the decoded video frame so that a backlight provided to display panel 2806B can be reduced, and thus reduce power consumption. TCON 2820B may provide not only the functionality described in this section of the description, but may also implement the functionality of the TCON described in connection with the computing devices described earlier herein, for example the computing devices 100, 200, 300, 900, 1700-2300.

It should be noted that first device 2800A and second device 2800B may be configured with the same or similar components and may have the same or similar capabilities. Moreover, both devices may have video calling capabilities and thus, each device may be able to generate and send video streams as well as receive and display video streams. For ease of explanation of various operations and features, however, embodiments herein will generally be described with reference to first device 2800A as the capturing and sending device, and with reference to second device 2800B as the receiving and displaying device.

Figure 29:
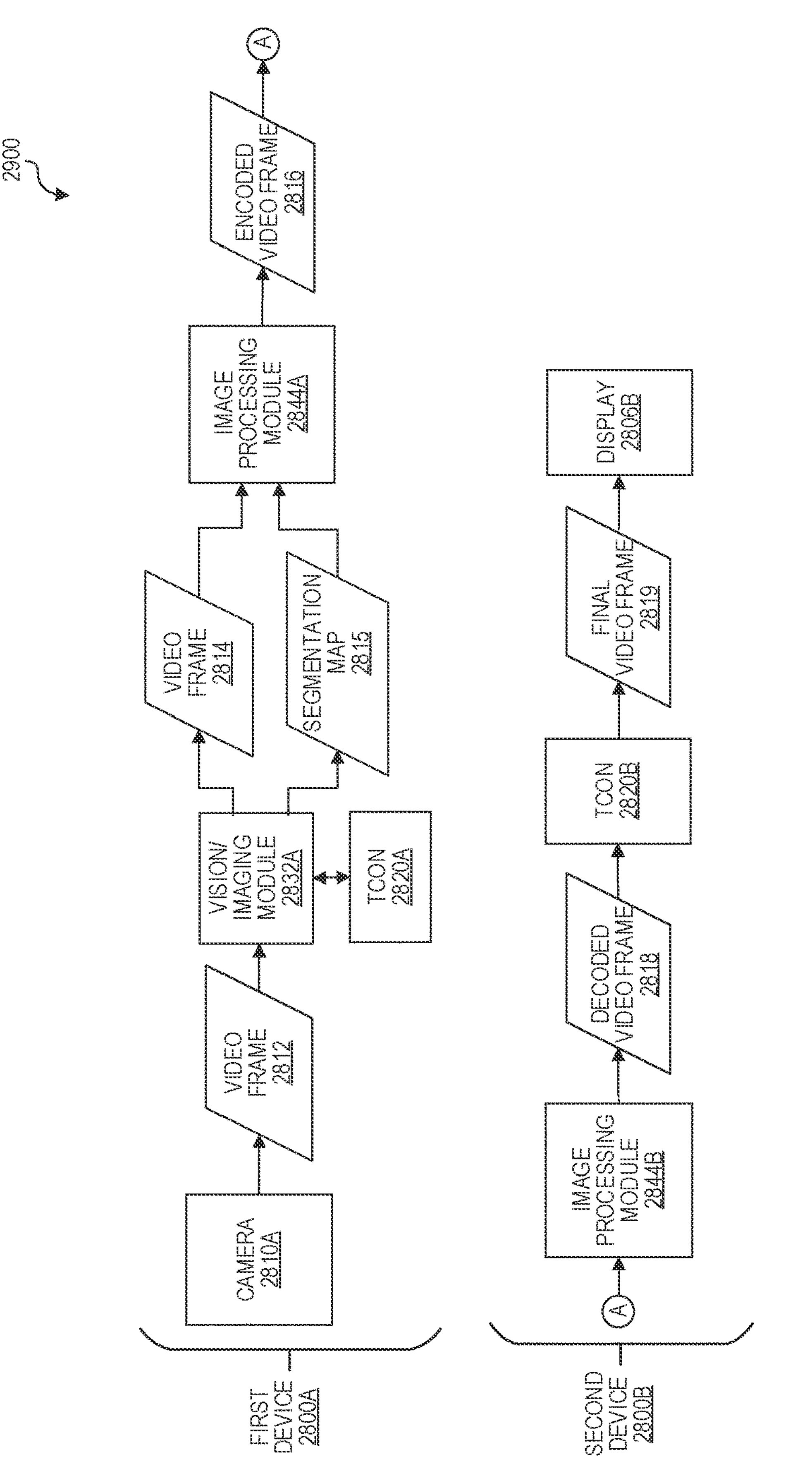
FIG. 29 is a simplified block diagram of possible computing components and data flow during a video call according to at least one embodiment.

FIG. 29 is a simplified block diagram of an example flow 2900 of one video frame in a video stream of a video call established between first and second devices 2800A and 2800B. In example flow 2900, user-facing camera 2810A captures an image and generates image sensor data for one video frame 2812 in a video stream flowing from first device 2800A to second device 2800B during an established video call connection between the devices. NNA 2834A of vision/imaging module 2832A may use one or more machine learning algorithms that have been trained to identify background portions and user(s) in a video frame. In some embodiments the user may include only a human face. In other embodiments, identification of a user may include all or part of a human body or a human body may be separately identified.

Figure 30:
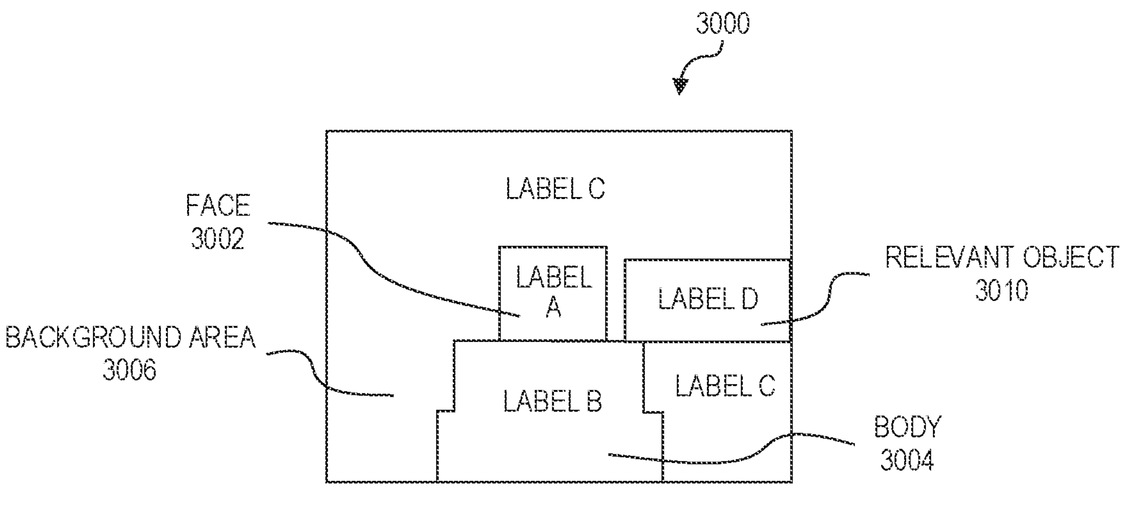
FIG. 30 is an example illustration of a possible segmentation map according to at least one embodiment.

In at least one embodiment, NNA 2834A of vision/imaging module 2832A can create a segmentation map 2815 using neural network accelerator 2834A. An illustration of a possible segmentation map 3000 for a particular video frame is shown in FIG. 30. Generally, a segmentation map is a partition of a digital image into multiple segments (e.g., sets of pixels). Segments may also be referred to herein as "objects". In a segmentation map, a label may be assigned to every pixel in an image such that pixels with the same label share common characteristics. In other embodiments, labels may be assigned to groups of pixels that share common characteristics. For example, in the illustrated segmentation map 3000 of FIG. 30, Label A may be assigned to pixels (or the group of pixels) corresponding to a human face 3002, Label B may be assigned to pixels (or the group of pixels) corresponding to a human body 3004, and Label C (shown in two areas of segmentation map 3000) may be assigned to pixels (or a group of pixels) corresponding to a background area 3006.

With reference to FIG. 29, in some embodiments, vision/imaging module 2832A may use one or more machine learning algorithms (also referred to herein as "models") that have been trained to identify user presence and attentiveness from a video frame captured by user-facing camera 2810A. In particular, a gaze direction may be determined. Additionally, a machine learning algorithm (or imaging model) may be trained to identify user gestures. One or more algorithms may be used to identify a relevant object or area indicated by the user's gaze direction and/or the user's gestures. It should be apparent that the gaze direction and gestures may indicate different objects or areas or may indicate the same object or area. Some non-limiting examples of relevant objects can include, but are not limited to, text on a whiteboard, a product prototype, or a picture or photo. Segmentation map 2815 may be modified to label the indicated object(s) and/or area(s) indicated by the user's gaze direction and/or gestures. For example, in segmentation map 3000 of FIG. 30, Label D may be assigned to pixels (or a group of pixels) corresponding to a relevant object/area 3010 that has been identified. Thus, the background area may be partitioned to assign Label D to the relevant object/area so that the relevant object/area is not blurred as part of the background area.

With reference again to FIG. 29, vision/imaging module 2832A can also run one or more image processing algorithms 2833A to identify hot spots within video frame 2812. A hot spot is a localized area of high brightness and can be identified by determining a cluster of pixel values that meet a localized brightness threshold. A localized brightness threshold may be based on a certain number of adjacent pixels meeting a localized brightness threshold, or a ratio of pixels meeting the localized brightness threshold within a threshold number of adjacent pixels. A hot spot may be located at any location within the image. For example, a hot spot could include a window in the background area, a powered-on computer or television screen in the background, a reflection on certain material or skin, etc. In an embodiment, the cluster of pixel values can be modified in video frame 2812 to mute the brightness. For example, the cluster of pixel values may be modified based on a muting brightness parameter. The selected muting brightness parameter may be an actual value (e.g., to reduce hot spot brightness to level X) or a relative value (e.g., to reduce hot spot brightness by X %).

Average brightness may also be lowered within the blurred spaces (e.g., background) of video frame 2812. Once the background areas are identified, TCON 2820A can identify where and how much brightness should be reduced in the background areas. In one example, TCON 2820A can determine the average brightness of video frame 2812 (or the average brightness of the background areas) and reduce brightness in background areas so that power can be saved by the receiving device. Average brightness may be reduced by modifying (e.g., decreasing) pixel values to a desired brightness level based on a background brightness parameter. The background brightness parameter may be an actual value (e.g., to reduce background brightness to level Y) or a relative value (e.g., to reduce background brightness by Y %). This parameter may be user or system configurable. When a receiving device receives the modified video frame with blurred background areas, muted hot spots, and reduced or toned-down brightness, the receiving device can perform a power saving technique that enables the backlight supplied to the display panel to be lowered. Thus, the optimization techniques by the sending device can result in power savings on the receiving device.

In at least some embodiments, identified certain objects of interest, such as a face of a user and a relevant object indicated by gestures and/or gaze direction, may be enhanced for better picture quality on the receiving device (e.g., 2800B). In one example, a super resolution technique may be applied to the objects of interest in video frame 2812. For example, neural network accelerator 2834A may include machine learning algorithms to apply super resolution to objects of interest in an image. In one embodiment, a convolutional neural network (CNN) may be implemented to generate a high-resolution video frame from multiple consecutive lower resolution video frames in a video stream. A CNN may be trained by lower resolution current frames and reference frames with predicted motion to learn a mapping function to generate the super resolution frame. In one or more embodiments, the learned mapping function may increase only the resolution of the objects of interest, such as the relevant objects identified in segmentation map 2815 (e.g., Label A, Label B, Label D). In other embodiments, super resolution may be applied to the entire frame, but the encoder can sync the segmentation map to the super resolution frame and apply optimizations to the background areas. Thus, picture quality can be enhanced only in selected areas of a video frame, rather the entire frame. Such selective enhancement can prevent unnecessary bandwidth usage that may occur if super resolution is applied to an entire video frame.

Vision/imaging module 2832A can produce a modified video frame 2814 that represents the original captured video frame 2812 including any modifications to the pixel values (e.g., hot spots, brightness, super resolution) that were made during processing by LCH 2830A. Segmentation map 2815 and modified video frame 2814 can be provided to image processing module 2844A. Image processing module 2844A can sync segmentation map 2815 with video frame 2814 to encode video frame 2814 with optimizations based on the various labeled segments in segmentation map 2815. An encoded video frame 2816 can be produced from the encoding. For example, one or more background areas (e.g., Label C) may be blurred by operations performed by image processing module 2844A. In at least one embodiment, the background portions may be blurred by decreasing the pixel density based on a background resolution parameter for background objects. Pixel density can be defined as a number of pixels per inch (PPI) in a screen or frame. Encoding a video frame with higher PPI can result in higher resolution and improved picture quality when it is displayed. Transmitting a video frame with lower PPI, however, can reduce the content in the pipeline and therefore, can reduce Internet bandwidth usage in communication paths of network(s) 2852.

Figure 31A:
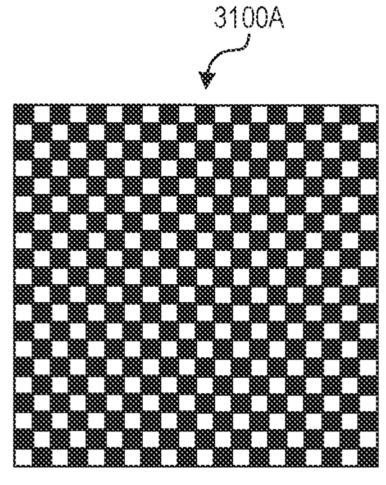
FIGS. 31A-31B are example representations of different pixel densities for a video frame displayed on a display panel.
Figure 31B:
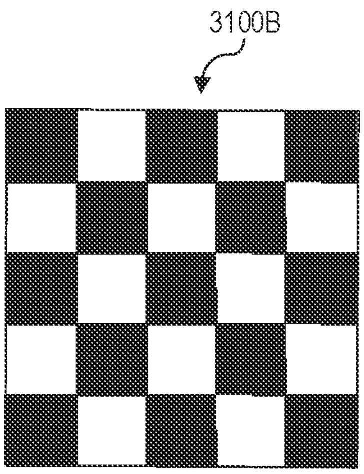

FIGS. 31A-31B illustrate example differences in pixel density. FIG. 31A illustrates an example of a high pixel density 3100A, and FIG. 31B illustrates an example of a lower pixel density 3100B. In this illustration, a portion of a video frame encoded with pixel density 3100A could have a higher resolution than a portion of the video frame encoded with pixel density 3100B. A video frame with at least some portion encoded using the lower pixel density 3100B may use less bandwidth than an entire video frame encoded using the higher pixel density 3100A.

With reference again to FIG. 29, appearance filtering is another possible optimization that can be encoded into video frame 2816 by image processing module 2844A. Appearance filtering may include slightly decreasing pixel density to soften an object. For example, a face (e.g., Label A) may be filtered to soften, but not blur facial features. In at least one embodiment, a face may be filtered by decreasing the pixel density based on appropriate filtering parameter(s) for a face and optionally, other objects to be filtered. Filtered objects may be encoded with a lower pixel density than other objects of interest (e.g., body, relevant areas/objects), but with a higher pixel density than blurred background areas. Thus, encoding a video frame with appearance filtering before transmitting the video frame may also help reduce bandwidth usage.

Encoded video frame 2816 may be generated by image processing module 2844A with any one or more of the disclosed optimizations and/or enhancements based, at least in part, on segmentation map 2815. First device 2800A may send encoded video frame 2816 to second device 2800B using any suitable communication protocol (e.g., Transmission Control Protocol/Internet Protocol, User Datagram Protocol (UDP)), via one or more networks 2852.

At second device 2800B, the encoded video frame 2816 may be received by image processing module 2844B. The image processing module 2844B can decode the received encoded video frame to produce decoded video frame 2818. Decoded video frame 2818 can be provided to TCON 2820B, which can use a power saving technique to enable a lower backlight in final video frame 2819 supplied to display panel 2806B in response to manipulating the pixel values (brightness of color) of decoded video frame 2818. Generally, the higher the number the pixel value is, the brighter the color that corresponds to them. The power saving technique can include increasing the pixel values (i.e., increasing brightness of color), which allows the backlight for the video frame when displayed to be reduced. This can be particularly useful for LCD display panels with LED backlighting, for example. Thus, this manipulation of the pixel values can reduce power consumption on the receiving device 2800B. Without hot spot muting and background blurring being performed by the sending device, however, the power saving technique on the receiving device may not be leveraged for maximum power savings because the background areas and hot spots area of the decoded video frame may not be sufficiently manipulatable by TCON 2820B to allow lowering the backlight. In a first display panel, the backlight can be supplied to the entire panel. In a second display panel, the panel may be divided into multiple regions (e.g., 100 regions) and a unique level of backlight can be supplied to each region. Accordingly, TCON 2820B can determine the brightness for the decoded video frame and set the backlight.

Figures 32A, 32B:
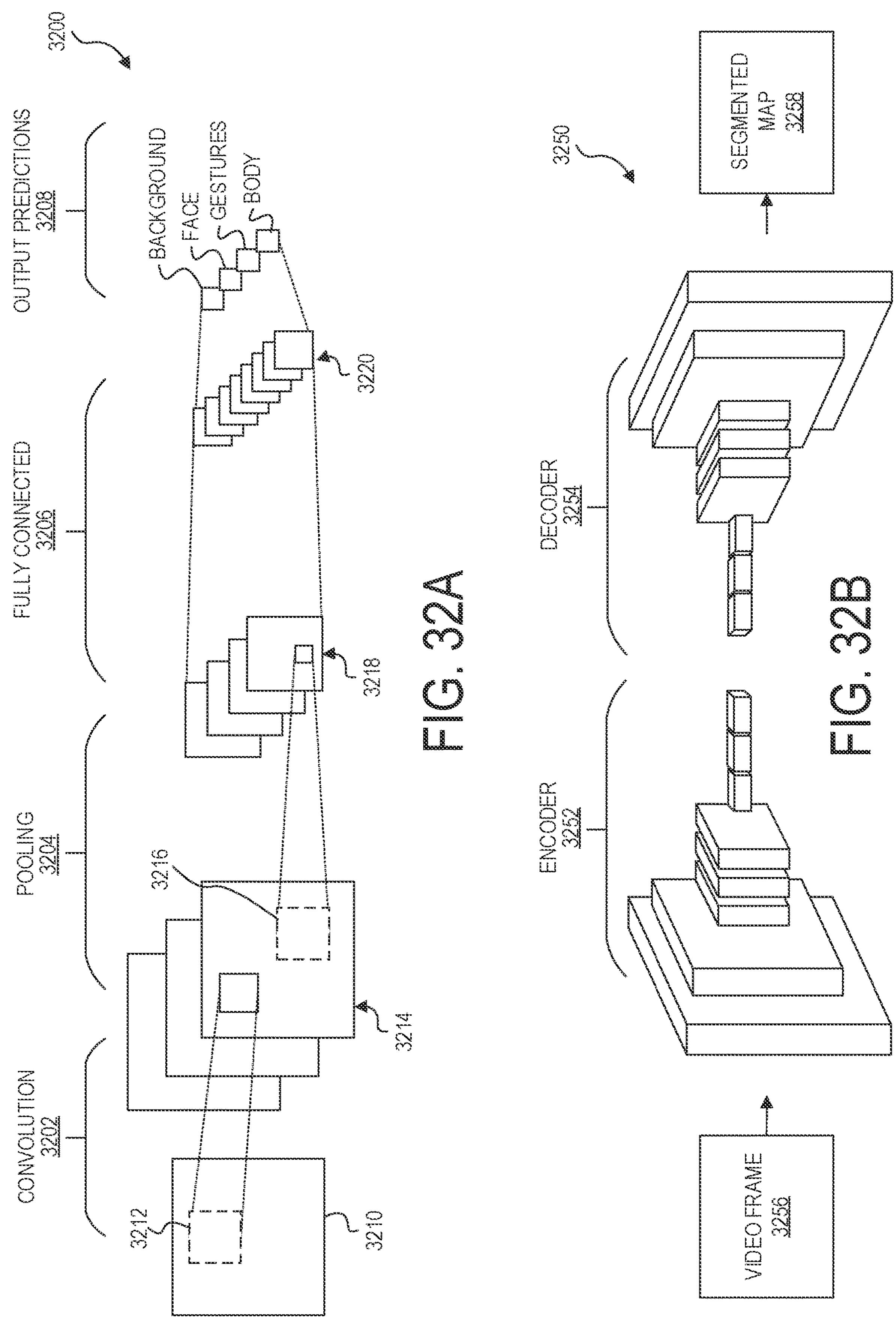
FIG. 32A illustrates an example of a convolutional neural network according to at least one embodiment.
FIG. 32B illustrates an example of a fully convolutional neural network according to at least one embodiment.

FIGS. 32A and 32B illustrate example deep neural networks that may be used in one or more embodiments. In at least one embodiment, a neural network accelerator (NNA) (e.g., 276, 327, 1740, 1863, 2834A, 2834B) implements one or more deep neural networks, such as those shown in FIGS. 32A and 32B. FIG. 32A illustrates a convolutional neural network (CNN) 3200 that includes a convolution layer 3202, a pooling layer 3204, a fully-connected layer 3206, and output predictions 3208 in accordance with embodiments of the present disclosure. Each layer may perform a unique type of operation. The convolutional layers apply a convolution operation to the input in order to extract features from the input image and pass the result to the next layer. Features of an image, such as video frame 2812, can be extracted by applying one or more filters in the form of matrices to the input image, to produce a feature map (or neuron cluster). For example, when an input is a time series of images, convolution layer 3202 may apply filter operations 3212 to pixels of each input image, such as image 3210. Filter operations 3212 may be implemented as convolution of a filter over an entire image.

Results of filter operations 3212 may be summed together to provide an output, such as feature maps 3214. Downsampling may be performed through pooling or strided convolutions, or any other suitable approach. For example, feature maps 3214 may be provided from convolution layer 3202 to pooling layer 3204. Other operations may also be performed, such as a Rectified Linear Unit operation, for example. Pooling layers combine the outputs of selected features or neuron clusters in one layer into a single neuron in the next layer. In some implementations, the output of a neuron cluster may be the maximum value from the cluster. In another implementation, the output of a neuron cluster may be the average value from the cluster. In yet another implementation, the output of a neuron cluster may be the sum from the cluster. For example, pooling layer 3204 may perform subsampling operations 3216 (e.g., maximum value, average, or sum) to reduce feature map 3214 to a stack of reduced feature maps 3218.

This output of pooling layer 3204 may be fed to the fully connected layer 3206 to perform pattern detections. Fully connected layers 3220 connect every neuron in one layer to every neuron in another layer. The fully connected layers use the features from the other layers to classify an input image based on the training dataset. Fully connected layer 3206 may apply a set of weights in its inputs and accumulate a result as output prediction(s) 3208. For example, embodiments herein could result in output predictions (e.g., a probability) of which pixels represent which objects. For example, the output could predict an individual pixel (or a group of pixels) or a group of pixels as being part of a background area, a user head/face, a user body, and/or a user gesture. In some embodiments, a different neural network may be used to identify different objects. For example, gestures may be identified using a different neural network.

In practice, convolution and pooling layers may be applied to input data multiple times prior to the results being transmitted to the fully connected layer. Thereafter, the final output value may be tested to determine whether a pattern has been recognized or not. Each of the convolution, pooling, and fully connected neural network layers may be implemented with regular multiply-and-then-accumulate operations. Algorithms implemented on standard processors such as CPU or GPU may include integer (or fixed-point) multiplication and addition, or float-point fused multiply-add (FMA). These operations involve multiplication operations of inputs with parameters and then summation of the multiplication results.

In at least one embodiment, a convolutional neural network (CNN) may be used to perform semantic segmentation or instance segmentation of video frames. In semantic segmentation, each pixel of an image is classified (or labeled) as a particular object. In instance segmentation, each instance of an object in an image is identified and labeled. Multiple objects identified as the same type are assigned the same label. For example, two human faces could each be labeled as a face. A CNN architecture can be used for image segmentation by providing segments of an image (or video frame) as input to the CNN. The CNN can scan the image until the entire image is mapped and then can label the pixels.

Another deep learning architecture that could be used is Ensemble learning, which can combine the results of multiple models into a single segmentation map. In this example, one model could run to identify and label background areas, another model could run to identify and label a head/face, another model could run to label a body, another model could run to label gestures. The results of the various models could be combined to generate a single segmentation map containing all of the assigned labels. Although CNN and Ensemble are two possible deep learning architectures that may be used in one or more embodiments, other deep learning architectures that enable identification and labeling of objects in an image, such as a video frame, may be used based on particular needs and implementations.

FIG. 32B illustrates another example deep neural network (DNN) 3250 (also referred to herein as an "image segmentation model"), which can be trained to identify particular objects in a pixelated image, such as a video frame, and perform semantic image segmentation of the image. In one or more embodiments of the LCH (e.g., 155, 260, 305, 954, 1705, 1860, 2830A, 2830B) disclosed herein, DNN 3250 may be implemented by the neural network accelerator (e.g., 276, 327, 1740, 1863, 2834A, 2834B) to receive a video frame 3256 as input, to identify objects on which the neural network was trained (e.g., background areas, head/face, body, and/or gestures) that are in the video frame, and to create a segmentation map 3258 with labels that classify each of the objects. The classification may be done at a pixel level in at least some embodiments.

In one example, DNN 3250 includes an encoder 3252 and a decoder 3254. The encoder downsamples the spatial resolution of the input (e.g., video frame 3256) to produce feature mappings having a lower resolution. The decoder then upsamples the feature mappings into a segmentation map (e.g., segmentation map 3258 having a full resolution). Various approaches may be used to accomplish the upsampling of a feature map, including unpooling (e.g., reverse of pooling described with reference to CNN 3200) and transpose convolutions where upsampling is learned. A fully convolutional neural network (FCN) is one example using convolutional layer transposing to upsample feature maps into full-resolution segmentation maps. Various functions and techniques may be incorporated an FCN to enable accurate shape reconstruction during upsampling. Moreover, these deep neural networks (e.g., CNN 3200, DNN 3250) are intended for illustrative purposes only, and are not intended to limit the broad scope of the disclosure, which allows for any type of machine learning algorithms that can produce a segmentation map from a pixelated image, such as a video frame.

Figure 33:
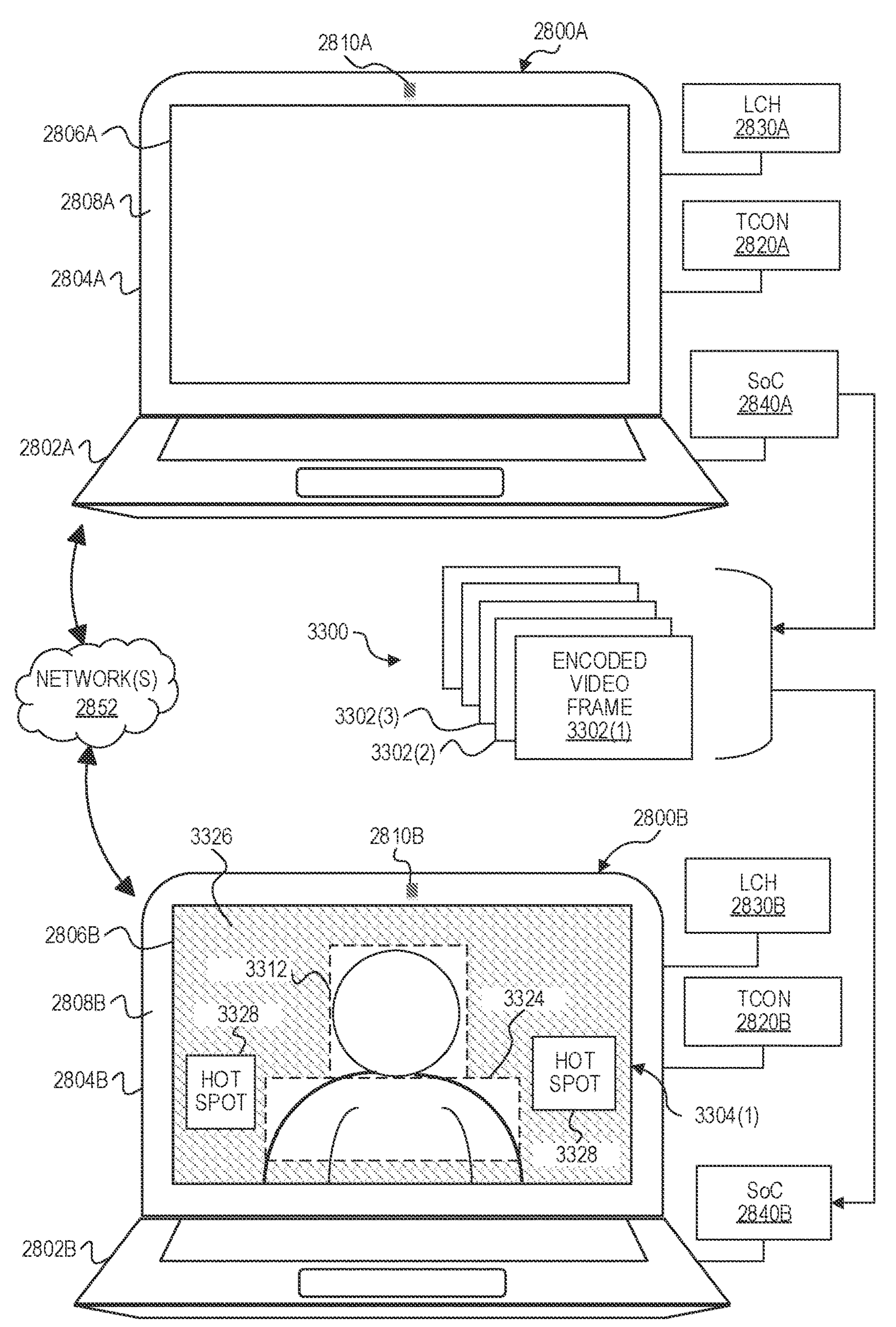
FIG. 33 is an illustration of an example video stream flow in a video call established between devices implemented with a lid controller hub according to at least one embodiment.

Turning to FIG. 33, FIG. 33 is an illustration of an example video stream flow in a video call established between first and second devices 2800A and 2800B, in which optimizations of a video call pipeline are implemented. By way of example, but not of limitation, first device 2800A is illustrated as a mobile computing device implementation. First device 2800A is an example implementation of mobile computing device 122. First device 2800A includes a base 2802A and a lid 2804A with an embedded display panel 2806A. Lid 2804A may be constructed with a bezel area 2808A surrounding a perimeter of display panel 2806A. User-facing camera 2810A may be disposed in bezel area 2808A of lid 2804A. LCH 2830A and TCON 2820A can be disposed in lid 2804A and can be proximate and operably coupled to display panel 2806A. SoC 2840A can be disposed within base 2802A and operably coupled to LCH 2830A. In one or more configurations of lid 2804A and base 2802A, lid 2804A may be rotatably connected to base 2802A. It should be apparent, however, that numerous other configurations and variations of a device that enables implementation of LCH 2830A may be used to implement the features associated with optimizing a video call pipeline as disclosed herein.

For non-limiting example purposes, second device 2800B is also illustrated as a mobile computing device implementation. Second device 2800B is an example implementation of mobile computing device 122. Second device 2800B includes a base 2802B and a lid 2804B with an embedded display panel 2806B. Lid 2804B may be constructed with a bezel area 2808B surrounding a perimeter of display panel 2806B. User-facing camera 2810B may be disposed in bezel area 2808B of lid 2804B. LCH 2830B and TCON 2820B can be disposed in lid 2804B and can be proximate and operably coupled to display panel 2806B. SoC 2840A can be disposed within base 2802B and operably coupled to LCH 2830B. In one or more configurations of lid 2804B and base 2802B, lid 2804B may be rotatably connected to base 2802B. It should be apparent, however, that numerous other configurations and variations of a device that enables implementation of LCH 2830B may be used to implement the features associated with optimizing a video call pipeline as disclosed herein.

User-facing camera 2810A of first device 2800A may be configured and positioned to capture a video stream in the form of a sequence of images from a field of view (FOV) of the camera. For example, in a video call, a user of device 2800A may be facing display panel 2806A and the FOV from user-facing camera 2810A could include the user and some of the area surrounding the user. Each captured image in the sequence of images may comprise image sensor data generated by the camera and may be represented by one video frame of a video stream. The captured video frames can be optimized and enhanced by first device 2800A before the first device encodes and transmits the video frames to another device according to one or more embodiments contained herein. The image processing module 2844A of SoC 2840A can encode each video frame with one or more optimizations and/or enhancements to produce a sequence 3300 of encoded video frames 3302(1), 3302(2), 3302(3), etc. Each encoded video frame can be transmitted by communication unit 2846A via network(s) 2852 to one or more receiving devices, such as second device 2800B. Second device 2800B can decode the encoded video frames and display the decoded video frames, such as decoded final video frame 3304(1), at a given frequency on display panel 2806B.

In FIG. 33, a stick figure illustration of example decoded final video frame 3304(1) displayed on display panel 2806B of the second (receiving) device is illustrated. Various optimizations that were applied to the corresponding captured video frame at the first (sending) device 2800A are represented in the decoded final video frame 3304(1) on display panel 2806B. The focus and brightness of relevant, important objects in the video frame, when captured on first (sending) device 2800A, are not reduced by first device 2800A and instead may be enhanced. For example, a human face and a portion of a human body are indicated with bounding boxes 3312 and 3324, respectively, and appear in focus (e.g., high pixel density) and bright when displayed on receiving device 2800B. Other objects that are unimportant or unwanted (e.g., in a background area) are not shown, or may be modified (e.g., decreased pixel density, reduced brightness) to reduce power consumption and bandwidth usage. For example, a background area 3326 may be blurred (e.g., decreased pixel density) and displayed with lower average light. In addition, one or more hot spots 3328 where the brightness of pixels in a cluster of pixels meet a localized brightness threshold, may be muted (e.g., pixel values modified to reduce brightness) by first device 2800A to save power when the final video frame is displayed on the receiving device. By first (sending) device 2800A lowering the average brightness once any hot spots are muted, power consumption can be reduced on the second (receiving) device 2800B when the video frame is displayed.

Figure 34:
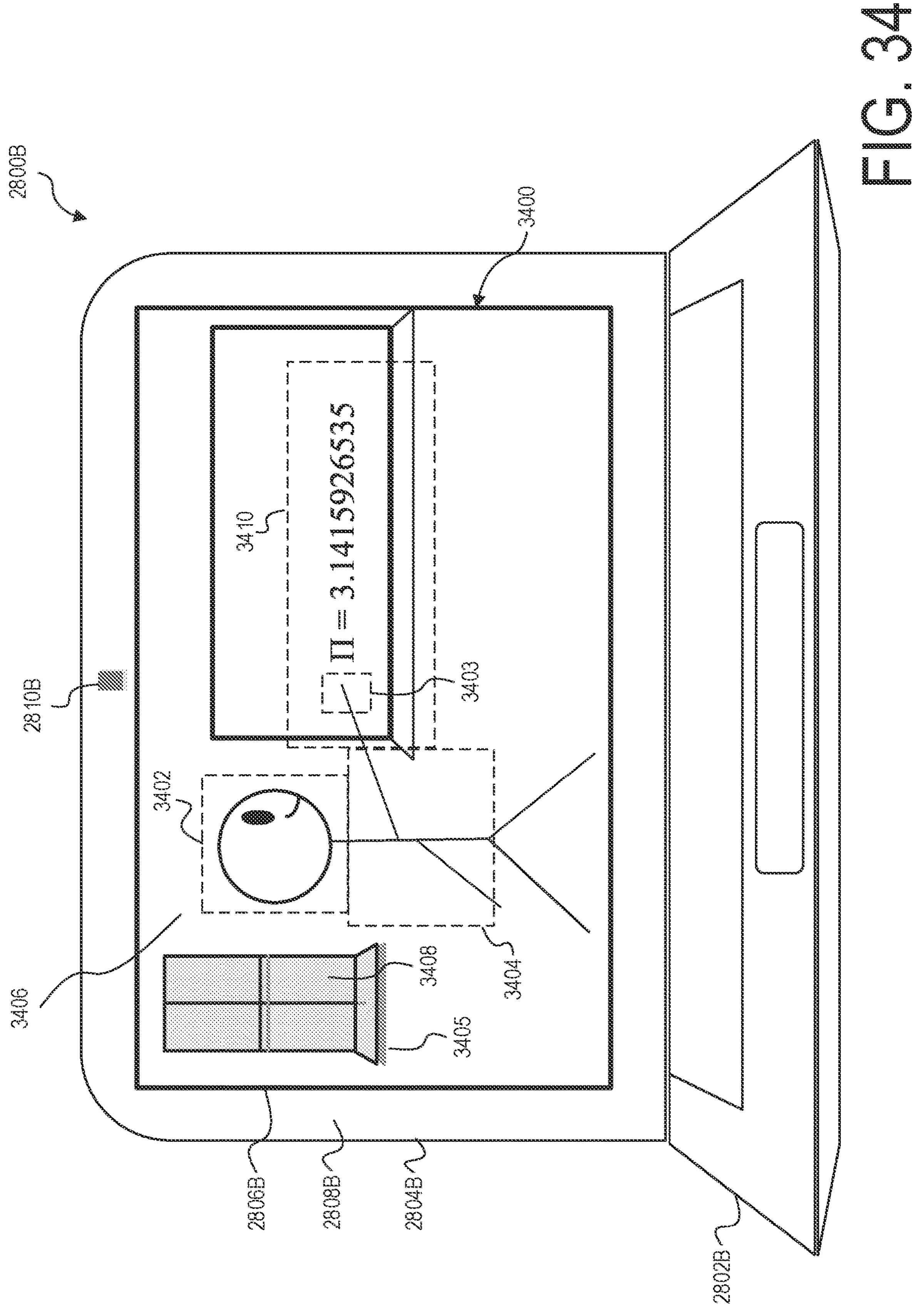
FIG. 34 is a diagrammatic representation of example optimizations and enhancements of objects that could be displayed during a video call established between devices according to at least one embodiment.

FIG. 34 is a diagrammatic representation of example optimizations and enhancements of objects in a video frame that could be displayed during a video call established between devices according to at least one embodiment. FIG. 34 illustrates an example decoded final video frame 3400 displayed on display panel 2806B of second (receiving) device 2800B. Various optimizations that were applied to the corresponding captured video frame at the first (sending) device 2800A are represented in the decoded final video frame 3400 on display panel 2806B. The focus and brightness of relevant, important objects in the video frame, when captured on first (sending) device 2800A, are not reduced by first device 2800A and instead may be enhanced.

For example, a human face and a portion of a human body are indicated with bounding boxes 3402 and 3404, respectively, and appear in focus (e.g., high pixel density) and bright when displayed on receiving device 2800B. In addition, the gesture of pointing, as indicated by bounding box 3403, may also be in focus and bright when final video frame 3400 displayed. The first (sending) device can identify the gesture and use it to identify a relevant object, such as text on a whiteboard as indicated by bounding box 3410. Accordingly, the area within bounding box 3410 is in focus and bright when final video frame 3400 is displayed. In addition (or alternatively), eye tracking or gaze direction of the identified user in the captured video frame may be used by the first (sending) device 2800A to identify the text on the whiteboard or another relevant object.

Other objects that are unimportant or unwanted (e.g., in a background area) are not shown, or may be modified (e.g., decreased pixel density, reduced brightness) to reduce power consumption and bandwidth usage. For example, a background area 3406 may be blurred (e.g., decreased pixel density) and displayed with lower average light. For illustration purposes, a blurred window frame 3405 is shown in background area 3406. It should be noted, however, that either the entire background area 3406 or just selected objects could be blurred. In addition, one or more hot spots such as window panes 3408, where the brightness of pixels in a cluster of pixels met a localized brightness threshold, may be muted (e.g., pixel values modified to reduce brightness) by first device 2800A to save power when the final video frame is displayed on the receiving device. By first (sending) device 2800A lowering the average brightness once any hot spots are muted, power consumption can be decreased on the second (receiving) device 2800B when the video frame is displayed.

Turning to FIGS. 35-39, simplified flowcharts illustrating example processes for optimizing a video call pipeline and enhancing picture quality according to one or more embodiments disclosed herein. The processes of FIGS. 35-39 may be implemented in hardware, firmware, software, or any suitable combination thereof. Although various components of LCH 2830A and SoC 2840A may be described with reference to particular processes described with reference to FIGS. 35-39, the processes may be combined and performed by a single component or separated into multiple processes, each of which may include one or more operations, which can be performed by the same or different components. Additionally, while the processes described with reference to FIGS. 35-39 describe processing a single video frame of a video stream, it should be apparent that the processes could be repeated for each video frame and/or at least some processes could be performed using multiple video frames of the video stream. Additionally, for ease of reference, the processes described herein will reference first device 2800A as the device that captures and processes video frames of a video stream and second device 2800B as the device that receives and displays the video frames of the video stream. However, it should be apparent that second device 2800B could simultaneously capture and process video frames of a second video stream and that first device 2800A could receive and display the video frames of the second video stream. Furthermore, it should be apparent that first device 2800A and second device 2800B and their components may be example implementations of other computing devices and their components (similarly named) described herein, including, but not necessarily limited to computing device 122.

Figure 35:
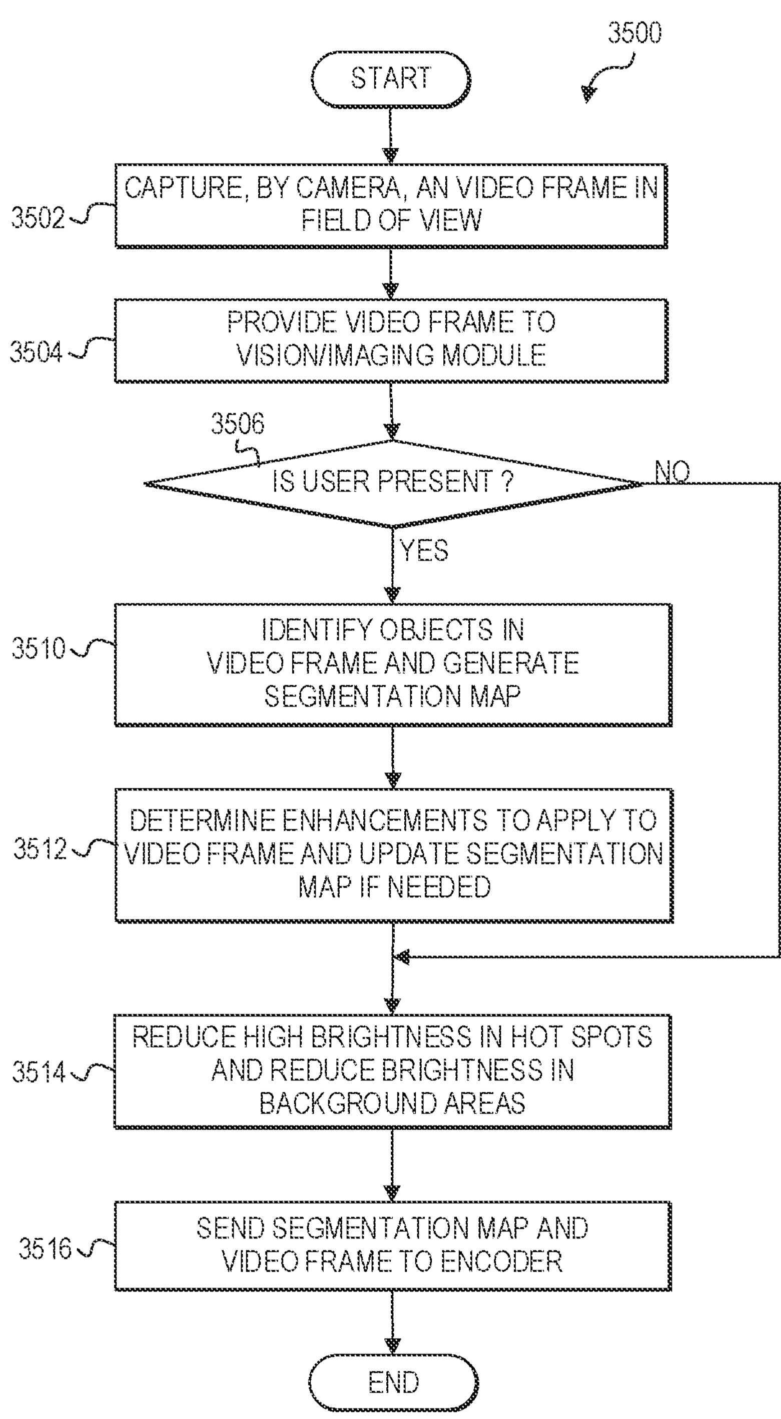
FIG. 35 is a high-level flowchart of an example process that may be associated with a lid controller hub according to at least one embodiment.

FIG. 35 is a simplified flowchart illustrating an example high level process 3500 for optimizing a video frame of a video stream. One or more operations to implement process 3500 may be performed by user-facing camera 2810A and lid controller hub (LCH) 2830A. In at least some embodiments, neural network accelerator 2834A, image processing algorithms 2833A of vision/imaging module 2832A, and/or timing controller (TCON) 2820A may perform one or more operations of process 3500.

At 3502, user-facing camera 2810A of first device 2800A captures an image in its field of view. Image sensor data can be generated for a video frame representing the image. The video frame can be part of a sequence of video frames captured by the user-facing camera. At 3504, the video frame may be provided to vision/imaging module 2832A to determine whether a user is present in the video frame. In one example, user presence, gestures, and/or gaze direction may be determined using one or more machine learning algorithms of neural network accelerator 2834A. At 3506, a determination is made as to whether a user is present in the video frame, based on the output (e.g., predictions) of neural network accelerator 2834A.

If a user is present in the video frame, as determined at 3506, then at 3508, the video frame may be provided to vision/imaging module of LCH 2830A. At 3510, a process may be performed to identify objects in the video frame and generate a segmentation map of the video frame based on the identified objects. At 3512, a process may be performed to identify relevant objects in the video frame, if any, and update the segmentation map of the video frame if needed. The resolution of objects of interest, including identified relevant objects, may be enhanced. At 3514, localized areas of brightness (or "hot spots") may be identified and muted. Also, the average brightness may be reduced in the background of the video frame. Additional details of the processes indicated at 3510-3514 will be further described herein with reference to FIGS. 36-38.

At 3516, the segmentation map and modified video frame are provided to image processing module 2844A of SoC 2840A to sync the segmentation map with the video frame and generate an encoded video frame with optimizations. Additional details of the process indicated at 3516 will be further described herein with reference to FIG. 39.

Figure 36:
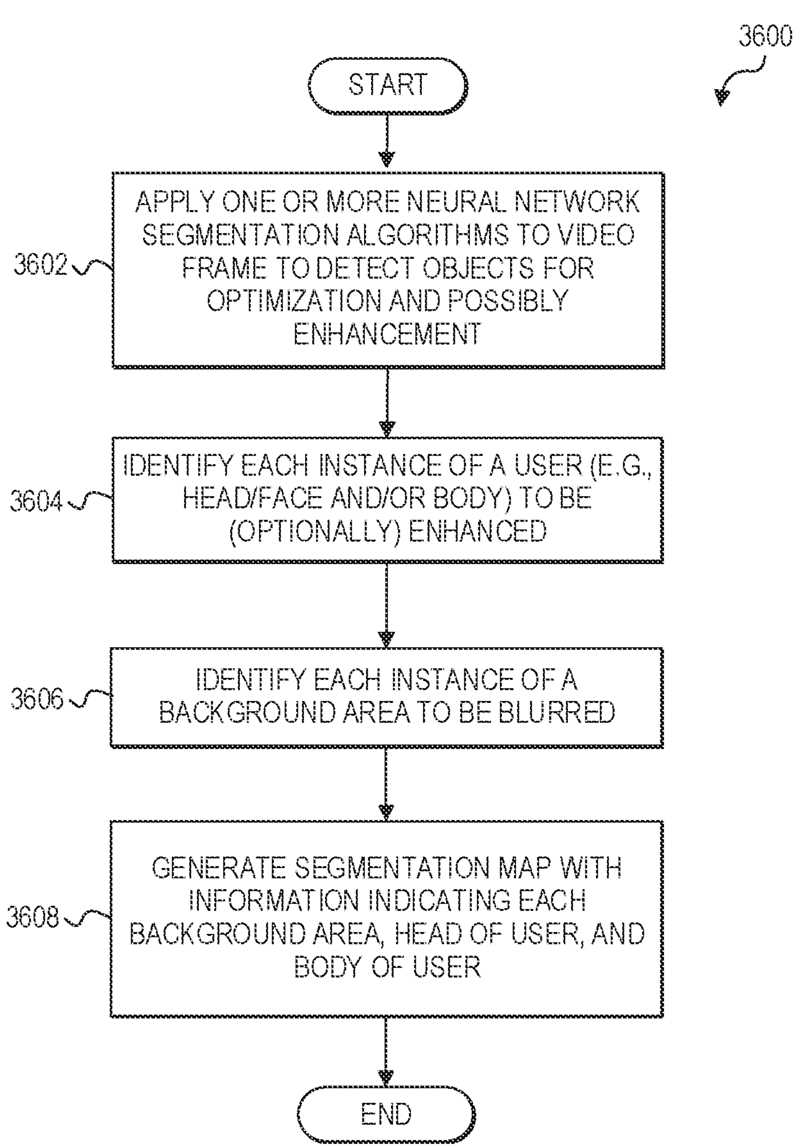
FIG. 36 is a simplified flowchart of an example process that may be associated with a lid controller hub according to at least one embodiment.

FIG. 36 is a simplified flowchart illustrating an example high level process 3600 for identifying objects in a captured video frame and generating a segmentation map of the video frame based on the identified objects. One or more portions of process 3600 may correspond to 3510 of FIG. 35. One or more operations to implement process 3600 may be performed by neural network accelerator 2834A of vision/imaging module 2832A of LCH 2830A in first device 2800A.

At 3602, one or more neural network algorithms may be applied to the video frame to detect certain objects (e.g., users, background areas) in the video frame for optimization and possibly enhancement and generate a segmentation map. In an example, the video frame may be an input into a neural network segmentation algorithm, for example. At 3604, each instance of a user is identified. For example, a user may be a human, an animal, or a robot with at least some human features (e.g., face). If multiple users are present in the video frame, then they may all be identified as users. In other implementations, the user who is speaking (or who spoke most recently) may be identified as a user. In yet other embodiments, the user closest to the camera may be the only user identified. If only one user is identified, then the other users may be identified as part of a background area. The identified face (and possibly the body) in the video frame are not to be blurred like background areas. Rather, the identified face and body are to remain in focus. Optionally, users in the video frame may be enhanced (e.g., with super resolution) before being transmitted.

At 3606, each instance of a background area in the video frame is identified. In at least one embodiment, any portions of the video frame that are not identified as a user may be part of a background area. At 3608, a segmentation map may be generated. The segmentation map can include information indicating each background area, and a head and a body of each user. In one example, a first label (or first classification) may be assigned to each background. Similarly, a second label (or second classification) may be assigned to each head, and a third label (or third classification) may be assigned to each body. It should be apparent, however, that numerous other approaches may be used to generate the segmentation map depending on which parts of a video frame are considered to be important and relevant (e.g., users in this example) and which part of a video frame are considered unimportant and unwanted (e.g., background areas in this example).

Figure 37:
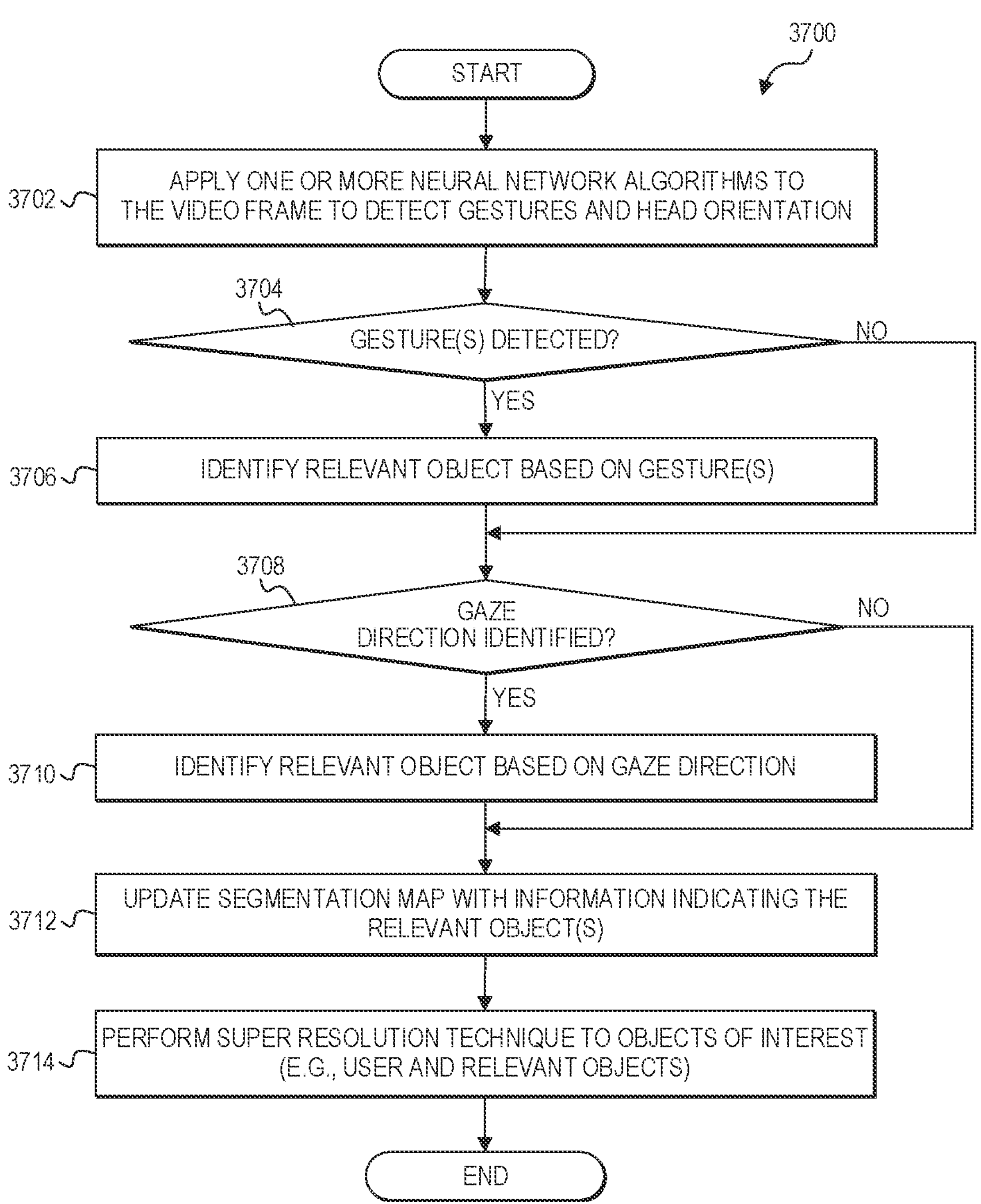
FIG. 37 is simplified flowchart of another example process that may be associated with a lid controller hub according to at least one embodiment.

FIG. 37 is a simplified flowchart illustrating an example process 3700 for identifying relevant objects in the video frame and updating the segmentation map of the video frame if needed. In an example, the video frame may be an input into the neural network segmentation algorithm, for example, or another neural network algorithm to identify gestures and/or gaze direction. One or more portions of process 3700 may correspond to 3512 of FIG. 35. One or more operations to implement process 3700 may be performed by neural network accelerator 2834A and/or image processing algorithms 2833A of vision/imaging module 2832A of LCH 2830A in first device 2800A.

At 3702, one or more neural network algorithms may be applied to the video frame to detect a head orientation and/or eye-tracking of a user, and gestures of the user. At 3704, a determination is made as to whether any gestures of the user were detected in the video frame. If any gestures were detected, then at 3706, one or more algorithms may be performed to identify, based on the gestures, a presentation area that contains a relevant object. In one possible embodiment, a trajectory of the gesture may be determined and a bounding box may be created proximate the gesture based on the trajectory, such that the bounding box encompasses the presentation area, which includes the relevant object. A bounding box for a presentation area may be created anywhere in the video frame including, for example, to the front, the side, and/or behind the user.

At 3708, a determination is made as to whether a gaze direction of a user was identified in the video frame. If a gaze direction was identified, then at 3710, one or more algorithms may be performed to identify, based on the gaze direction, a viewing area that contains a relevant object. In one possible embodiment, a trajectory of the gaze direction may be determined and a bounding box may be created based on the trajectory such that the bounding box encompasses the viewing area, which includes the relevant object. In some scenarios, the bounding box generated based on the identified gaze direction may entirely or partially overlap with the bounding box generated based on the detected gestures, for example, if the user is looking at the same relevant object indicated by the gestures. In other scenarios, more than one relevant object may be identified where the bounding box generated based on the identified gaze direction may be separate from the bounding box generated based on the detected gesture.

At 3712, the segmentation map may be updated to include information indicating the identified relevant object(s). In some scenarios, updating the segmentation map can include changing a label for a portion of a background area to a different label indicating that those pixels represent a relevant object, rather than a background area.

At 3714, super resolution may be applied to identified objects of interest, which may include identified relevant object(s), the head/face of a user, and/or at least part of a body of a user. For example, a super resolution technique to be applied may include a convolutional neural network (CNN) to learn a mapping function to generate a super resolution frame. In one or more embodiments, super resolution may be applied only to the objects of interest. Alternatively, super resolution may be applied to the entire frame and the image processing module 2844A can subsequently sync the segmentation map to the super resolution video frame and apply optimizations (e.g., blurring, filtering).

Figure 38:
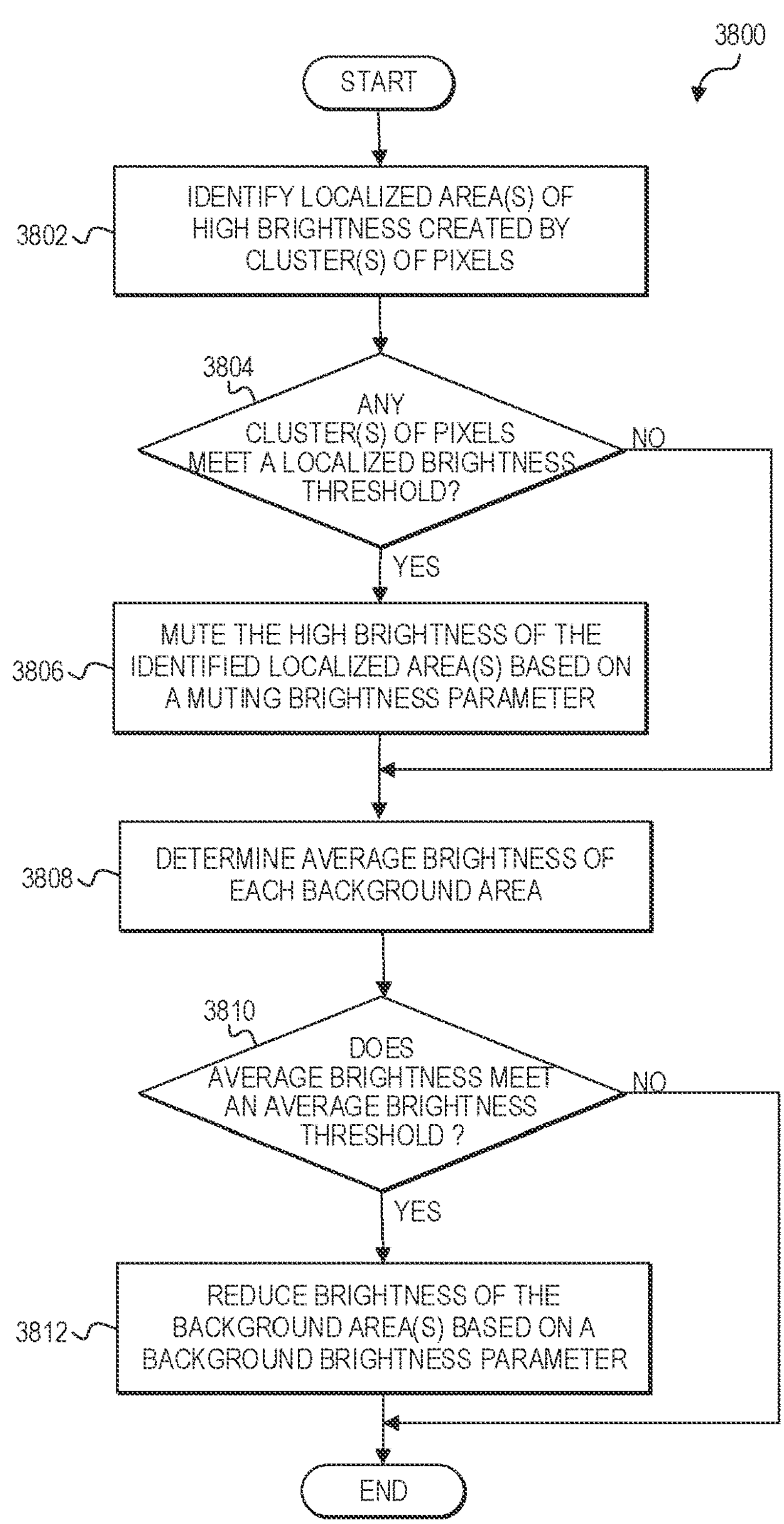
FIG. 38 is simplified flowchart of another example process that may be associated with a lid controller hub according to at least one embodiment.

FIG. 38 is a simplified flowchart illustrating an example process 3800 for muting localized area(s) of high brightness in the video frame and reducing average brightness in the background areas of a captured video frame. One or more portions of process 3800 may correspond to 3514 of FIG. 35. One or more operations to implement process 3800 may be performed by image processing algorithms (e.g., 2833A) of vision/imaging module (e.g., 172, 263, 363, 1740, 1863, 2832A, 2832B) of the LCH (e.g., 155, 260, 305, 954, 1705, 1860, 2830A, 2830B) and/or the timing controller (TCON) (e.g., 150, 250, 355, 944, 1706, 2820A, 2820B).

At 3802, pixels in the video frame are examined to identify one or more localized areas of brightness, also referred to as "hot spots". A hot spot can be created by a cluster of pixels that meets a localized brightness threshold (e.g., a number of adjacent pixels that each have a brightness value that meets a localized brightness threshold, a number of adjacent pixels having an average brightness that meets a localized brightness threshold). A hot spot may be located at any place within the video frame. For example, a hot spot may be in the background area or on an object of interest. At 3804, a determination is made as to whether one or more clusters of pixels have been identified that meet (or exceed) the localized brightness threshold. If a cluster of pixels meets (or exceeds) the localized brightness threshold, then at 3806, the identified hot spot(s) may be muted, for example, by modifying the pixel values in the identified cluster. The modification may be based on a muting brightness parameter, which can result in decreasing the pixel values.

At 3808, once any hot spots have been muted, the average brightness of the background area(s) of the video frame may be calculated. In at least one embodiment, the average brightness may be calculated based on the pixel values of the background area(s). At 3810, a determination is made as to whether the calculated average brightness of each background area meets (or exceeds) an average brightness threshold. If the calculated average brightness of any background area meets (or exceeds) the average brightness threshold, then at 3812 the brightness of that background area(s) may be reduced based on a background brightness parameter.

It should also be noted that in some implementations, if a user is not present in the video frame (e.g., as determined at 3506), then the entire video frame may be labeled as a background area. Running machine learning algorithms may be avoided as a segmentation map can be generated based on a single label identifying the entire frame as a background area. In this scenario, hot spots may still be identified and muted, and the brightness of the entire video frame may be reduced. However, the brightness may be reduced more drastically to save more power until a user is present.

Figure 39:
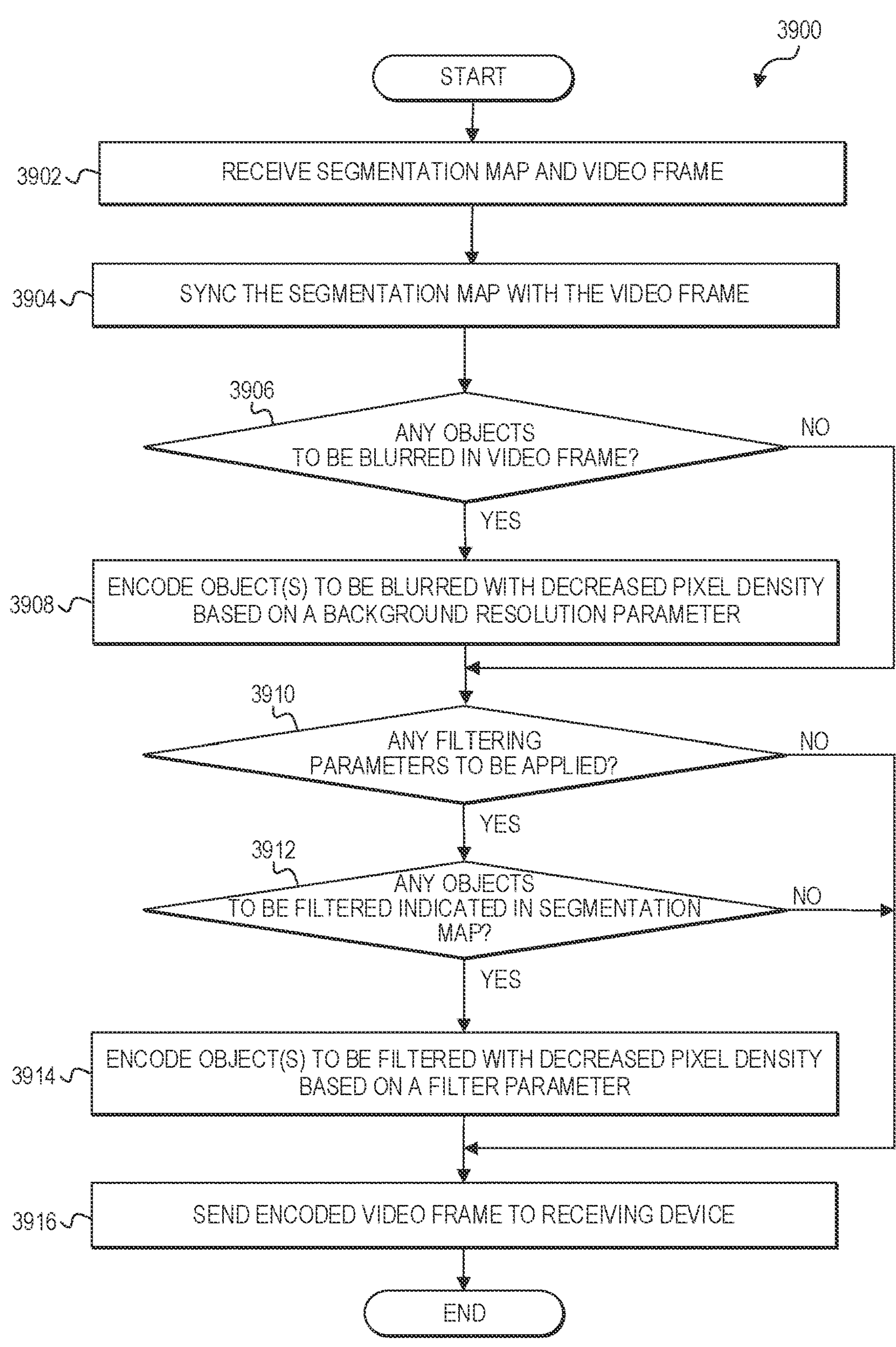
FIG. 39 is a simplified flowchart of an example process that may be associated with an encoder of a device according to at least one embodiment.

FIG. 39 is a simplified flowchart illustrating an example process 3900 for syncing a segmentation map and a video frame to generate an encoded video frame for transmission. One or more operations to implement process 3900 may be performed by image processing module 2844A and communication unit 2846A in SoC 2840A of device 2800A.

At 3902, image processing module 2844A may receive a segmentation map and a video frame to be synced and encoded. The segmentation map and video frame may be received from LCH 2830A located in the lid of first device 2800A. At 3904, the segmentation map is synced with the video frame to determine which objects in the video frame are to be blurred. The segmentation map can include labels that indicate where the background areas in the video frame are located. At 3906, a determination is made as to whether the segmentation map includes any objects (e.g., background areas) that are to be blurred in the video frame. If any background objects are indicated (e.g., assigned a label for background areas) in the segmentation map, then at 3908, the indicated (or labeled) background objects are blurred in the video frame. For example, any objects labeled as a background area (e.g., Label C in FIG. 30) can be located in the video frame and the associated pixel density of those background areas in the video frame can be decreased. The pixel density may be decreased based on a background resolution parameter. Other objects indicated in the segmentation map (e.g., objects of interest) can maintain their current resolution/pixel density.

At 3910, a determination may be made as to whether appearance filtering is to be encoded in the video frame and if so, to which objects. For example, a user or system setting may indicate that appearance filtering is to be applied to a face of a user. If filtering is to be applied to a particular object, then at 3912, a determination is made as to whether the segmentation map includes any objects (e.g., face of user) that are to be filtered in the video frame. If any objects to be filtered are indicated (e.g., assigned a label for a face or other object to be filtered) in the segmentation map, then at 3914, the indicated (or labeled) objects are filtered in the video frame. For example, any objects labeled as a face area (e.g., Label A in FIG. 30) can be located in the video frame and the associated pixel density of those faces in the video frame can be decreased. The pixel density may be decreased based on a filter parameter. In one or more embodiments, the filter parameter indicates less reduction in the object resolution than the background resolution parameter. In other words, resolution may be decreased more in background areas than in filtered objects in at least some embodiments.

Once the video frame is encoded with the optimizations and/or enhancements (e.g., blurring, filtering), at 3916, the encoded video frame can be sent to a receiving node, such as second device 2800B, via one or more networks 2852.

Figure 40:
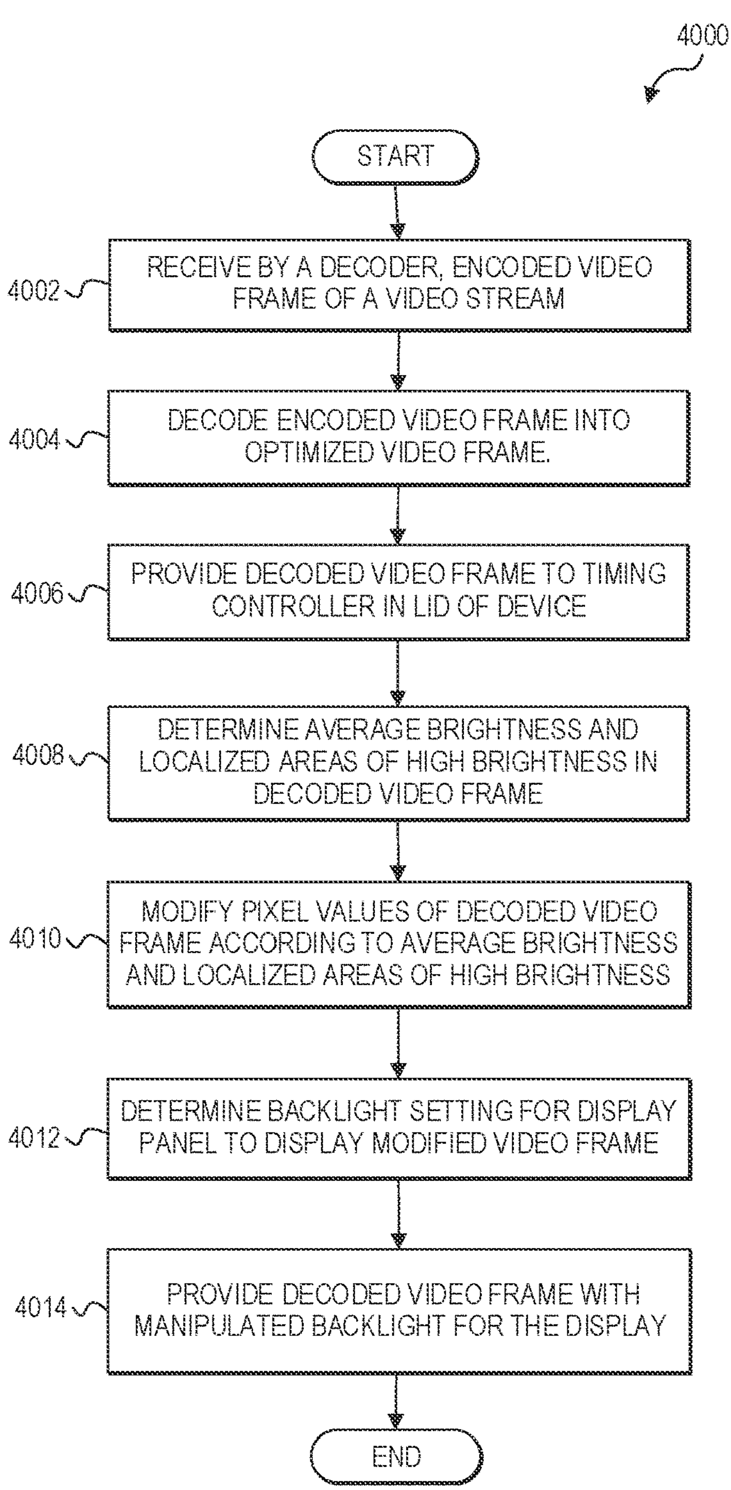
FIG. 40 is a simplified flowchart of an example process that may be associated with a device that receives encoded video frame for a video call according to at least one embodiment.

FIG. 40 is a simplified flowchart illustrating an example process 4000 for receiving an encoded video frame at a receiving computing device, decoding, and displaying the decoded video frame. One or more operations to implement process 4000 may be performed by image processing module 2844B in SoC 2840B of second (receiving) device 2800B, and/or by TCON 2820B of the receiving device.

At 4002, image processing module 2844B of receiving device 2800B may receive an encoded video frame from sending device 2800A. At 4004, image processing module 2844B may decode the encoded video frame into a decoded video frame containing the optimizations and enhancements applied by the sending device. At 4006, the decoded video frame can be provided to TCON 2820B.

TCON 2820B can perform a power saving technique on the decoded video frame to produce a final video frame to be displayed that will reduce the amount of backlight needed. The power saving technique can involve increasing pixel values (i.e., to increase brightness of color) in order to lower backlight required on the display panel. At 4008, TCON 2820B can determine the average brightness of the decoded video frame in addition to the localized areas of high brightness. At 4010, the pixel values of the video frame can be modified (e.g., increased) according to the average brightness and the localized areas of high brightness. However, the localized areas of high brightness have been muted and the background areas have been toned down. Therefore, TCON 2820B can modify the pixel values more significantly (e.g., greater increase) than if the hot spots were not muted.

At 4012, a backlight setting for the display panel to display the final video frame (with modified pixel values) is determined. The more the pixel values have been increased (i.e., brightened), the more the backlight supplied to the display panel can be lowered in response to the increase. Thus, more power can be saved when the hot spots have been muted and the background has been toned down. In addition, in some implementations, for display panels that are divided into multiple regions, TCON 2820B may lower the backlight by different amounts depending on which region is receiving the light (e.g., lower backlight for background areas, greater backlight for objects of interest). In another display panel, the same backlight may be supplied to the entire display panel. At 4014, the final modified video frame is provided for display on display panel 2806B, and the backlight is adjusted according to the determined backlight setting.

Figure 41:
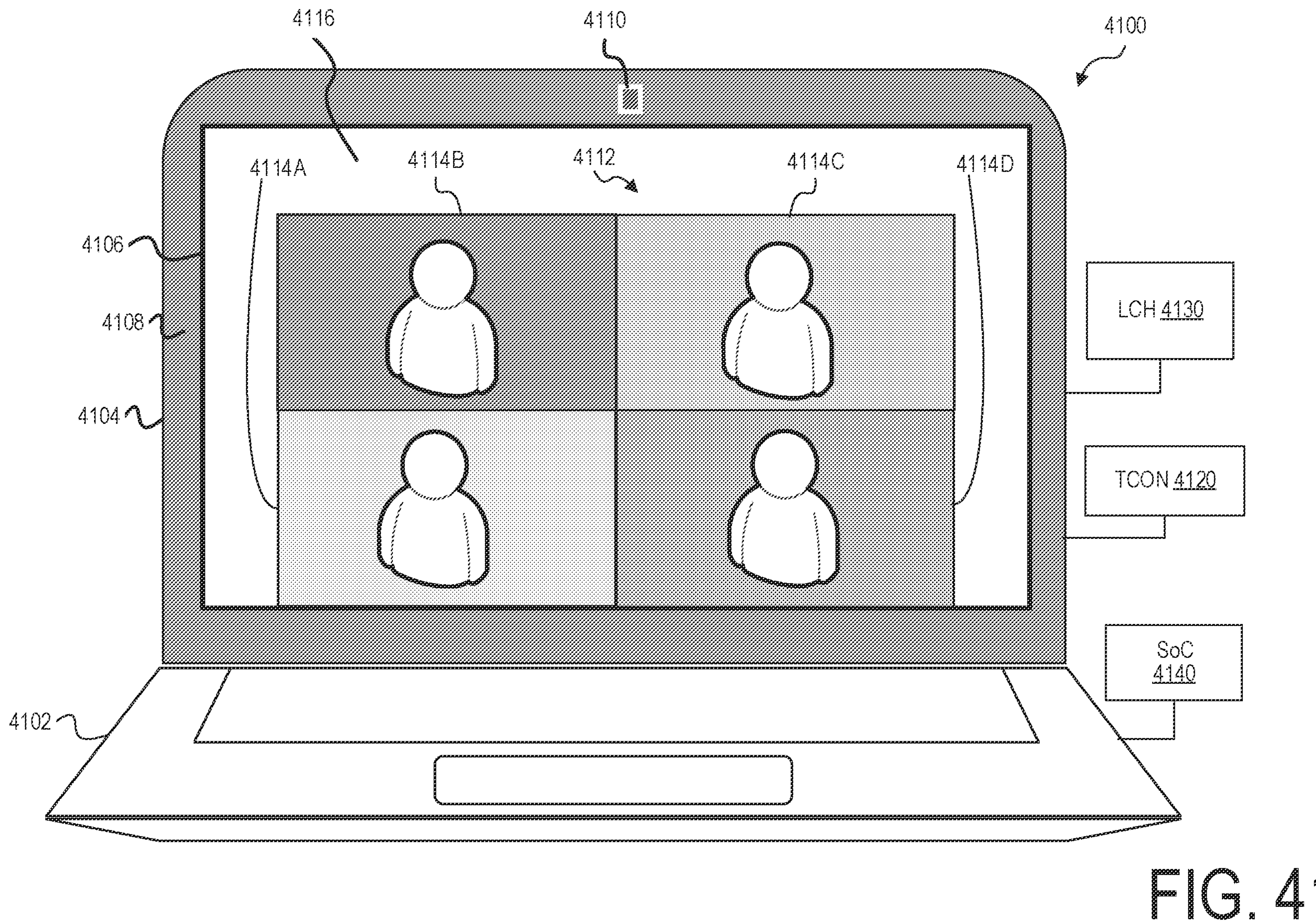
FIG. 41 is a diagrammatic representation of an example video frame of a video stream for a video call displayed on a display screen with an illumination border according to at least one embodiment.
Figure 42:
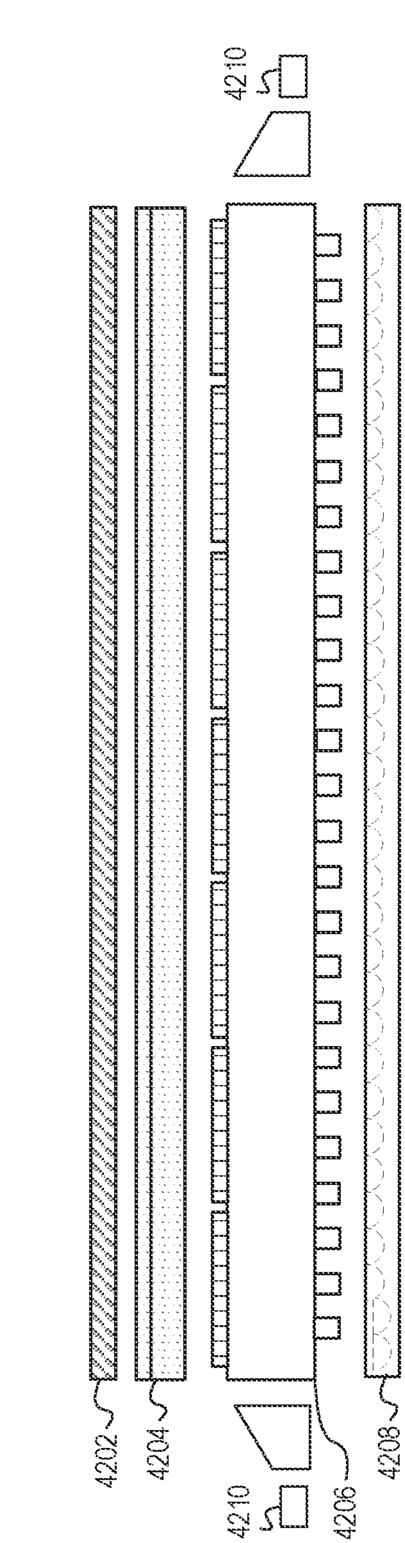
FIG. 42 is a diagrammatic representation of possible layers of an organic light-emitting diode (OLED) display of a computing device.
Figure 43:
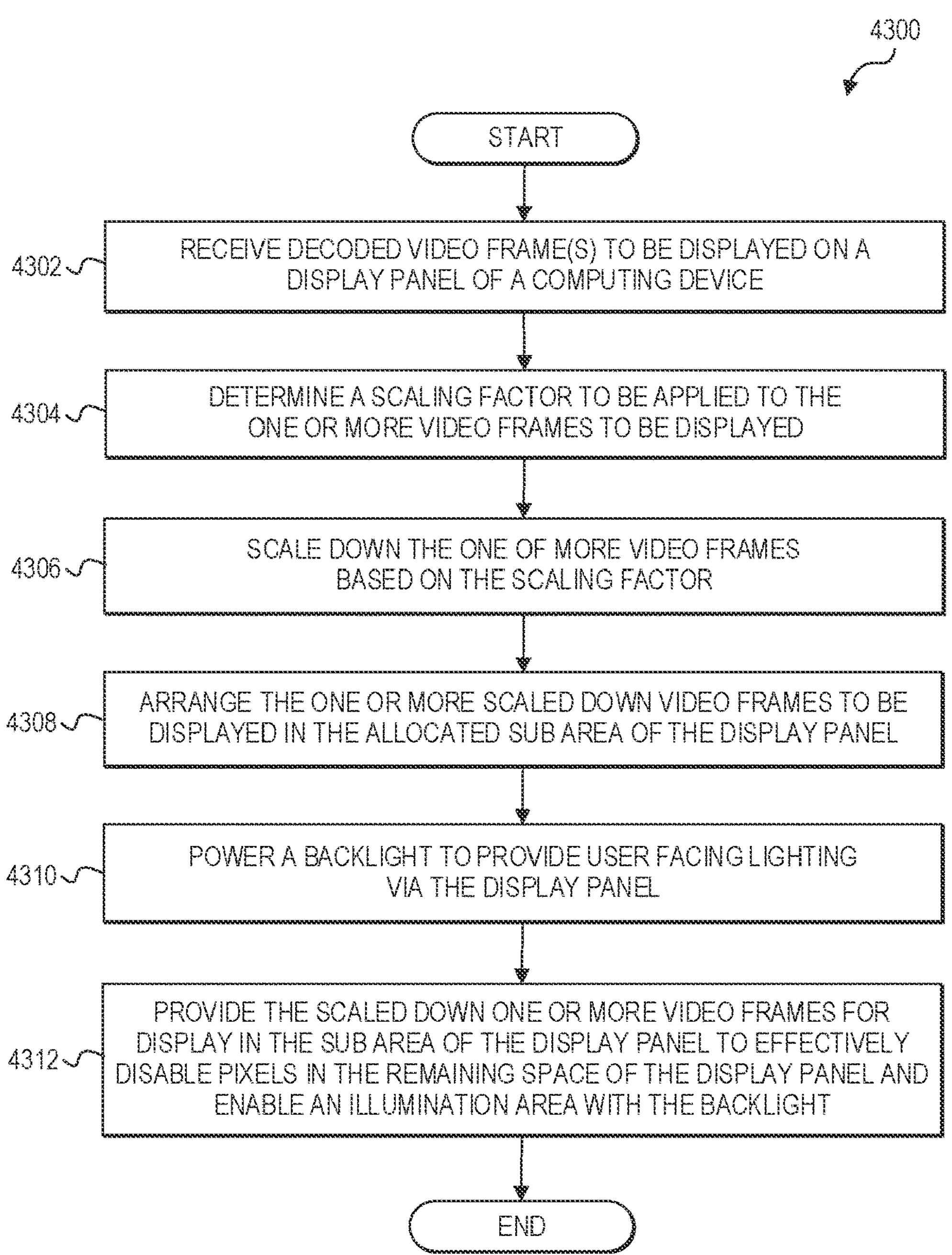
FIG. 43 is a simplified flowchart of an example process that may be associated with a lid controller hub according to at least one embodiment.

Turning to FIGS. 41-43, an embodiment for increasing the brightness of a user's appearance on a display panel during a video call is disclosed. FIG. 41 is a diagrammatic representation of an example video frame of a video call displayed with an illumination border in a display panel of a device 4100. By way of example, but not of limitation, device 4100 is illustrated as a mobile computing device implementation. Device 4100 is an example implementation of mobile computing device 122. Device 4100 includes a base 4102 and a lid 4104 with a display panel 4106. Display panel 4106 may be configured as a display panel that does not have a backlight, such as an organic light-emitting diode (OLED) or a micro-LED display panel. Lid 4104 may be constructed with a bezel area 4108 surrounding a perimeter of display panel 4106. A user-facing camera 4110 may be disposed in bezel area 4108 of lid 4104. A lid controller hub (LCH) 4130 and a timing controller (TCON) 4120 can be disposed in lid 4104 proximate and operably coupled to display panel 4106 (e.g., in a lid housing, display monitor housing). SoC 4140 may be positioned in another housing (e.g., a base housing, a tower) and communicatively connected to LCH 4130. In one or more embodiments, display panel 4106 may be configured in a similar manner for connection to a lid controller hub in a lid of a computing device as one or more embedded panels described herein (e.g., 145, 280, 380, 927). In one or more embodiments, LCH 4130 represents an example implementation of LCH 155, 260, 305, 954, 1705, 1860, 2830A, 2830B, SoC 4140 represents an example implementation of SoC 140, 240, 340, 914, 1840, 2840A, 2840B, and TCON 4120 represents an example implementation of TCON 150, 250, 355, 944, 1706, 2820A, 2820B. In one or more configurations of lid 4104 and base 4102, lid 4104 may be rotatably connected to base 4102. It should be apparent, however, that numerous other configurations and variations of a device that enables implementation of LCH 4130 may be used to implement the features associated with increasing the brightness of the user's appearance in a video call as disclosed herein.

An example scaled down image 4112 from multiple video streams in a video call is displayed on display panel 4106. In this example, multiple scaled down video frames 4114A, 4114B, 4114C, and 4114D received from different connections to the video call may be scaled down and displayed concurrently in a sub-area of display panel 4106. A sub-area may be allocated to a size that allows an illumination area 4116 to be formed in the remaining space of the display panel. In display panel 4106, the sub-area is placed in display panel 4106 such that illumination area 4116 surrounds three sides of the sub-area in which the scaled down video frames are displayed.

Display panel 4106 can be user-facing (UF) and portioned to allow brighter spots (e.g., in Illumination area 4116) to increase the brightness of user-facing images (e.g., user face, relevant content). Illumination area 4116 also shines soft light on a user who is facing display panel 4106, and therefore, video frames captured by camera 4110 may be brighter than usual with the soft light shining on the user's face.

A combination of scaling down images (or video frames) to be displayed, disabling pixels in an illumination area 4116 of display panel 4106, and using a lightguide with a backlight on an OLED panel (or other non-backlit display panel) can achieve increased brightness of user-facing images as well as increased brightness in images captured of a user who is facing display panel 4106. First, LCH 4130 can be configured to scale down video frames received from SoC 4140 to make room for illumination area 4116. In one example, image processing algorithms (e.g., 2833A) of a vision/imaging module (e.g., 2832A) of LCH 4130 can downsize the video frames based on a user-selected scaling factor or a system configured scaling factor. Second, pixels in illumination area 4116 of display panel 4106 can be disabled or turned off by not supplying electric signals to the pixels in the illumination area. In an embodiment, timing controller (TCON) 4120 may be configured to control where the scaled down final video frame(s) are placed in display panel 4106, effectively disabling the pixels where the video frame(s) are not displayed. Third, a lightguide (e.g., FIG. 42) and a light-emitting diode (LED) backlight can be used with display panel 4106 to illuminate a user. Users in the images being displayed in the sub-area, as well as a user-facing display panel 4106 can benefit from illumination.

Numerous advantages can be achieved by creating an illumination area in a display panel during a video call. For example, a portioned UF display panel with illumination area 4116 and scaled-down images (or video frames) 4114A-4114D mitigates the risk of aging/burn-in of OLED display panel 4106 and thus, the life of display panel 4106 may be extended. Furthermore, one or more embodiments allows a narrow bezel area (e.g., 4108), which is desirable as devices are increasingly being designed to be thinner and smaller while maximizing the display panel size. Additionally, by scaling down the one or more images (video frames) 4114A-4114D to be displayed, the entire display area is not needed in the video call. In addition, there is no thickness effect since the addition of the LEDs at the edges of the display panel does not increase the thickness of the display. Furthermore, this feature (scaling down video frames and creating an illumination area) can be controlled by LCH 4130 without involving the operating system running on SoC 4140.

It should be noted that scaled-down video frames and the sub-area where the scaled down video frames are displayed, as illustrated in FIG. 41, are for example purposes only. Various implementations are possible based on particular needs and preferences. One or more video frames that are scaled down may be scaled to any suitable size and positioned in any suitable arrangement that allows at least some area of display panel 4106 to be portioned as an illumination area. For example, illumination area 4116 may surround one, two, three or more sides of the scaled-down images. The scaled-down images may be arranged in a grid format as shown in FIG. 41, or may be separated or combined in smaller groups, or positioned in any other suitable arrangement. Moreover, any number of video frames can be scaled down and displayed together by adjusting the scaling factor to accommodate a desired illumination area.

FIG. 42 is a diagrammatic representation of possible layers of an organic light emitting diode (OLED) display panel 4200. OLED display panel 4200 is one example implementation of display panel 4106. The layers of OLED display panel 4200 can include an OLED layer 4202, a prismatic film 4204, an integrated single lightguide layer 4206, and a reflective film 4208. In at least one embodiment, prismatic film 4204 is adjacent to a back side of OLED layer 4202, and integrated single lightguide layer 4206 is disposed between prismatic film 4204 and reflective film 4208. Multiple light-emitting diodes (LEDs) 4210 can be positioned adjacent to one or more edges of the integrated single lightguide layer 4206. LEDs 4210 provide a backlight that reflects off reflective film 4208 and travels to OLED layer 4202 to provide user-facing light through OLED layer 4202, which includes soft white light via an illumination area, such as illumination area 4116.

A lightguide layer (e.g., 4210) may be a lightguide plate or lightguide panel (LGP), which is generally parallel to the OLED layer and distributes light behind the OLED layer. Lightguide layers may be made from any suitable material (s) including, but not necessarily limited to a transparent acrylic made from PMMA (polymethylmethacrylate). In one embodiment, the LEDs 4210 may be positioned adjacent or proximate to one, two, three, or four outer edges of the lightguide layer.

FIG. 43 is a simplified flowchart illustrating an example process 4300 for increasing the brightness of user-facing images in a display and of images captured of a user that faces the display. One or more operations to implement process 4300 may be performed by lid controller hub (LCH) 4130 proximate to and coupled to display panel 4106 of device 4100. In at least some embodiments, image processing algorithms (e.g., 2833A) of a vision/imaging module (e.g., 172, 263, 363, 1740, 1863, 2832A, 2832B) in LCH 4130 and/or TCON 4120 can perform at least some of the operations.

At 4302, LCH 4130 can receive one or more decoded video frames from SoC 4140, which is communicatively coupled to LCH 4130. In some scenarios, a single video frame of a video stream in a video call may be received for display in a sub-area allocated within display panel 4106. In other scenarios, multiple video frames may be received from different senders (e.g., different computing devices) connected to the video call, which are to be displayed in the allocated sub-area.

At 4304, a scaling factor to be applied to the one or more video frames to be displayed can be determined. In some scenarios, a single video frame may be received for display on display panel 4106. In this scenario, a scaling factor may be selected to downsize the single video frame to the full size of the sub-area allocated for video frames to be displayed. In another scenario, multiple video frames may be received from different sources to be concurrently displayed on display panel 4106. In this scenario, a single scaling factor may be selected to downsize each video frame by the same amount so that their combined size fits within the allocated sub-area. In yet another example, different scaling factors may be selected for different video frames to downsize the video frames by different amounts. For example, one video frame may have more prominence on display panel 4106 and therefore, may be downsized by less than the other video frames. However, the scaling factors are selected so that the combined size of the downsized video frames fits within the allocated sub-area within display panel 4106.

At 4306, the one or more video frames can be downsized based on the selected scaling factor(s). At 4308, the one or more scaled down video frames can be arranged for display in the allocated sub-area(s). For example, for displaying one video frame, a determination may be made to display the scaled down single video frame in the middle of the display panel such that the illumination area is formed on three or four sides of the scaled down single video frame. If four video frames are to be displayed, they may be arranged for display in an undivided sub-area, for example, in a grid format in the center of the display panel as shown in FIG. 41. In other implementations, multiple video frames may be spaced apart in divided smaller areas such that an illumination area is formed between each of the smaller areas containing the video frames. Numerous arrangements and placements of scaled down video frames are possible and may be implemented based on particular needs and/or preferences.

At 4310, a backlight can be powered on. In other embodiments, the backlight may be powered on when the computing device is powered on. In at least one embodiment, the backlight may be provided from a light guide parallel to and spaced behind the display panel 4106. The light guide can use LED lights around its perimeter which provide light that is reflected from a reflective film toward display panel 4106 to provide user-facing. At 4312, the one or more scaled down video frames are provided for display in the allocated sub-area (or divided sub-area). The pixels in the remaining space of display panel 4106 form an illumination area (e.g., 4116). Because electric current is not provided to the pixels in the illumination area of the display panel, these pixels are effectively disabled when the one or more video frames are displayed only within the sub-area. Thus, the pixels in the illumination area become transparent and the backlight provided from the light guide creates a soft, user-facing light through the illumination area created in the display panel.

Additional examples of the presently described video call pipeline optimizations embodiments include the following, non-limiting implementations. Each of the following non-limiting examples may stand on its own or may be combined in any permutation or combination with any one or more of the other examples provided below or throughout the present disclosure.

Example CA1 provides an apparatus or a system. The apparatus may be for example a controller hub, such as for example the lid controller hubs in a computing device described herein above, such as for example the computing devices 100, 122, 200, 300, 900, 1700-2300, 2800A/B. The system may be for example a user device, such as for example the computing devices 100, 122, 200, 300, 900, 1700-2300, 2800A/B. The apparatus or system includes: a neural network accelerator disposed in a lid of a first computing device and configured to receive a video stream from a camera of the first computing device, the neural network accelerator including first circuitry to: receive a video frame captured by a camera during a video call; identify a background area in the video frame; identify an object of interest in the video frame; generate a segmentation map including a first label for the background area and a second label for the object of interest; and send the segmentation map to an image processing module on a processor in a base of the first computing device to encode the video frame based, at least in part, on the segmentation map and to generate an encoded video frame that includes blurring in the background area, wherein the encoded video frame is to be transmitted from the first computing device to a second computing device for display on the second computing device.

Example CA2 comprises the subject matter of Example CA1, and the image processing module includes the second circuitry to provide the encoded video frame to a communication unit of the first computing device, the communication unit configured to transmit the encoded video frame to a second computing device.

Example CA3 comprises the subject matter of any one of Examples CA1-CA2, and the blurring the background area is to include reducing a resolution of the background area based on a background resolution parameter.

Example CA4 comprises the subject matter of any one of Examples CA1-CA3, and the neural network accelerator is on a lid controller hub that is disposed in the lid of the first computing device.

Example CA5 comprises the subject matter of any one of Examples CA1-CA4, and the neural network accelerator includes one or more neural networks, wherein the one or more neural networks include a fully convolutional neural network to generate the segmentation map.

Example CA6 comprises the subject matter of any one of Examples CA1-CA5, and the object of interest can be a human face, a human body, a combination of the human face and the human body, an animal, or a machine capable of human interaction.

Example CA7 comprises the subject matter of any one of Examples CA1-CA6, and the first circuitry of the neural network accelerator is further configured to: identify one or more gestures of a user in the video frame; identify a presentation area in the video frame, wherein the presentation area is to be identified based, at least in part, on proximity to the one or more gestures; and cause the segmentation map to include a third label for the presentation area.

Example CA8 comprises the subject matter of Example CA7, and the first circuitry of the neural network accelerator is further configured to increase a resolution of the presentation area without increasing the resolution of the background area.

Example CA9 comprises the subject matter of any one of Examples CA1-CA8, and the first circuitry of the neural network accelerator is further configured to identify a gaze direction of a user in the video frame, identify a viewing area in the video frame, where the viewing area is to be identified based, at least in part, on the gaze direction of the user, and cause the segmentation map to include a fourth label for the viewing area.

Example CA10 comprises the subject matter of any one of Examples CA1-CA9, and the first circuitry of the neural network accelerator is further to identify a localized area with high brightness created by a cluster of pixels in the video frame, and to modify first pixel values in the cluster of pixels based on a muting brightness parameter to reduce the high brightness in the localized area.

Example CA11 comprises the subject matter of Example CA10, and the first circuitry of the neural network accelerator is further to, subsequent to reducing the high brightness of the localized area, modify second pixel values in the background area based on a background brightness parameter.

Example CA12 comprises the subject matter of Example CA11, and the second pixel values include the modified first pixel values.

Example CA13 comprises the subject matter of any one of Examples CA1-CA12, and the segmentation map is segmented based on one of semantic segmentation or instance segmentation.

Example CA14 comprises the subject matter of any one of Examples CA herein above, and further comprises the features of any one of Examples AA1-AA16, AB1-AB2, AC1-AC22, AD1-AD10, AG1, AI1, BA1-BA12, BC1-

BC12, BE1, BG1 or BH1-BH7 (as far as those features are not redundant with features of Examples CA herein above).

Example CB1 provides a method comprising receiving, by a neural network accelerator, a video frame captured by a camera of a first computing device during a video call, identifying a background area in the video frame, identifying an object of interest in the video frame, generating, by the neural network accelerator, a segmentation map including a first label for the background area and a second label for the object of interest, and sending the segmentation map to an image processing module on a processor in a base of the first computing device to encode the video frame based, at least in part, on the segmentation map and to generate an encoded video frame that includes blurring in the background area, wherein the encoded video frame is to be transmitted from the first computing device to a second computing device for display on the second computing device.

Example CB2 comprises the subject matter of Example CB1, and the processor is a system-on-a-chip (SoC).

Example CB3 comprises the subject matter any one of Examples CB1-CB2, and the blurring the background area includes reducing a resolution of the background area based on a background resolution parameter.

Example CB3.5 comprises the subject matter of any one of Examples CB1-CB3, and the neural network accelerator is on a lid controller hub that is disposed in the lid of the first computing device.

Example CB4 comprises the subject matter any one of Examples CB1-CB3, and further comprises executing, by the neural network accelerator, a fully convolutional neural network to generate the segmentation map.

Example CB5 comprises the subject matter any one of Examples CB1-CB4, and the object of interest can be a human face, a human body, a combination of the human face and the human body, an animal, or a machine capable of human interaction.

Example CB6 comprises the subject matter any one of Examples CB1-CB5, and further comprises identifying one or more gestures of a user in the video frame, identifying a presentation area in the video frame, where the presentation area is to be identified based, at least in part, on proximity to the one or more gestures, and causing the segmentation map to include a third label for the presentation area.

Example CB7 comprises the subject matter any one of Examples CB1-CB6, and further comprises identifying a gaze direction of a user in the video frame, identifying a viewing area in the video frame, and causing the segmentation map to include a fourth label for the viewing area, where the viewing area is to be identified based, at least in part, on the gaze direction of the user.

Example CB8 comprises the subject matter of Example CB7, and further comprises increasing a resolution of the viewing area without increasing the resolution of the background area.

Example CB9 comprises the subject matter any one of Examples CB1-CB8, and further comprises identifying a localized area with high brightness created by a cluster of pixels in the video frame, and modifying first pixel values in the cluster of pixels based on a muting brightness parameter to reduce the high brightness in the localized area.

Example CB10 comprises the subject matter of Example CB9, and further comprises, subsequent to reducing the high brightness of the localized area, modifying second pixel values in the background area based on a background brightness parameter.

Example CB11 comprises the subject matter of Example CB10, and the second pixel values include the modified first pixel values.

Example CB12 comprises the subject matter any one of Examples CB1-CB11, and the segmentation map is segmented based on one of semantic segmentation or instance segmentation.

Example CB13 comprises the subject matter any one of Examples CB herein above and further comprises the elements of the method of any one of Examples AF1-AF12 or BD1-BD11 (as far as those method elements are not redundant with method elements of Examples CB herein above).

Example CC1 provides a computing device, comprising a lid housing containing a display panel and a camera, a base housing coupled to the lid housing, a first processing unit operably coupled to the display panel and disposed in the lid housing, a second processing unit disposed in the base housing, and an image processing module coupled to the first processing unit and the second processing unit. In Example CC1, the first processing unit is optionally to receive a video frame captured by the camera during a video call, identify a background area in the video frame, identify an object of interest in the video frame, and generate a segmentation map including a first label for the background area and a second label for the object of interest. In Example CC1, the image processing module is optionally to receive the segmentation map from the first processing unit, and encode the video frame based, at least in part, on the segmentation map, where encoding the video frame is to include blurring the background area in the video frame.

Example CC2 comprises the subject matter of Example CC1, and the first processing unit includes a neural network accelerator, and where the second processing unit is a silicon-on-a-chip (SoC).

Example CC3 comprises the subject matter any one of Examples CC1-CC2, and the neural network accelerator includes one or more neural networks, and where the one or more neural networks include a fully convolutional neural network to generate the segmentation map.

Example CC4 comprises the subject matter any one of Examples CC1-CC3, and the image processing module is further configured to provide the encoded video frame to a communication unit of the computing device, and the communication unit is to transmit the encoded video frame to another computing device.

Example CC5 comprises the subject matter any one of Examples CC1-CC4, and the blurring the background area is to include reducing a resolution of the background area based on a background resolution parameter.

Example CC6 comprises the subject matter any one of Examples CC1-CC5, and the object of interest can be a human face, a human body, a combination of the human face and the human body, an animal, or a machine capable of human interaction.

Example CC7 comprises the subject matter any one of Examples CC1-CC6, and the first processing unit is further configured to identify one or more gestures of a user in the video frame, identify a presentation area in the video frame, and cause the segmentation map to include a third label for the presentation area, where the presentation area is to be identified based, at least in part, on proximity to the one or more gestures.

Example CC8 comprises the subject matter of Example CC7, and the first processing unit is further configured to increase a resolution of the presentation area without increasing the resolution of the background area.

Example CC9 comprises the subject matter any one of Examples CC1-CC8, and the first processing unit is further configured to identify a gaze direction of a user in the video frame, identify a viewing area in the video frame, and cause the segmentation map to include a fourth label for the viewing area, where the viewing area is to be identified based, at least in part, on the gaze direction of the user.

Example CC10 comprises the subject matter any one of Examples CC1-CC9, and the first processing unit is further configured to identify a localized area with a high brightness created by a cluster of pixels in the video frame, and modify first pixel values in the cluster of pixels based on a muting brightness parameter to reduce the high brightness in the localized area.

Example CC11 comprises the subject matter of Example CC10, and the first processing unit is further configured to, subsequent to reducing the high brightness of the localized area, modify second pixel values in the background area based on a background brightness parameter.

Example CC12 comprises the subject matter of Example CC11, and the second pixel values include the modified first pixel values.

Example CC13 comprises the subject matter any one of Examples CC1-CC12, and the segmentation map is segmented based on one of semantic segmentation or instance segmentation.

Example CC14 comprises the subject matter any one of Examples CC herein above, and further comprises the features of any one of Examples AA1-AA16, AG1, BA1-BA12, or BE1 (as far as those features are not redundant with features of Examples CC herein above).

Example CD1 provides a system comprising a display panel, a processor coupled to the display panel, a timing controller, and a light source to provide a backlight to the display panel. In Example CD1, the display panel comprises a sub-area including first pixels, and an illumination area including second pixels. In Example CD1, the processor is configured to execute one or more instructions to receive a first video frame of a first video stream associated with a video call, select a first scaling factor to downsize the first video frame based, at least in part, on a number of video frames to be concurrently displayed, and generate a first scaled-down video frame based on the first scaling factor. In Example CD1, the timing controller is to provide the first scaled-down video frame for display in the sub-area of the display panel, where the second pixels of the illumination area are disabled.

Example CD2 comprises the subject matter of Example CD1, and the backlight provided to the display panel is to create a user-facing light via the second pixels in the illumination area.

Example CD3 comprises the subject matter any one of Examples CD1-CD2 and the display panel is one of an organic light emitting diode (OLED) or a micro-LED display panel.

Example CD4 comprises the subject matter any one of Examples CD1-CD3 and the display panel includes a reflective film spaced from a back side of the display panel, where the light source includes a lightguide member disposed between the display panel and the reflective film, and one or more light emitting diodes (LEDs) at an edge of the member. In Example CD4 the backlight is to originate from the one or more LEDs and is to be reflected by the reflective film to the back side of the display panel.

Example CD4.5 comprises the subject matter of Example CD4, and a prismatic layer is disposed between the display panel and the lightguide member.

Example CD5 comprises the subject matter any one of Examples CD1-CD4 and the illumination area is adjacent to at least one side of the sub-area.

Example CD6 comprises the subject matter any one of Examples CD1-CD5 and the processor is configured to execute the one or more instructions further to receive a second video frame of a second video stream associated with the video call, and generate a second scaled-down video frame based on a second scaling factor, where the timing controller is to provide the second scaled-down video frame for display in the sub-area of the display panel currently with the first scaled-down video frame.

Example CD7 comprises the subject matter of Example CD6 and the first scaling factor and the second scaling factor are equal.

Example CD8 comprises the subject matter of Example CD6 and the first scaling factor is to cause greater downsizing than the second scaling factor.

Example CD9 comprises the subject matter any one of Examples CD1-CD8 and the sub-area is divided into a first smaller area and a second smaller area, where the first video frame is provided for display in the first smaller area and the second scaled-down video frame is provided for display in the second smaller area.

Example CD10 comprises the subject matter any one of Examples CD1-CD9 and the sub-area is an undivided area in the display panel.

Example CD11 comprises the subject matter any one of Examples CD1-CD10, and further comprises the features of any one of Examples AB1-AB2, AC1-AC22, AD1-AD10, AI1, BC1-BC12, BG1 or BH1-BH7 (as far as those features are not redundant with features of Examples CD1-CD10).

Example CE1 provides a method comprising receiving, by a processor coupled to a display panel of a display device, a first video frame of a first video stream associated with a video call, selecting a first scaling factor to downsize the first video frame based, at least in part, on a number of video frames to be concurrently displayed, generating a first scaled-down video frame based on the first scaling factor, and providing, by a timing controller, the first scaled-down video frame for display in a sub-area of the display panel, and providing, by a light source, a backlight to the display panel, where the sub-area includes first pixels and an illumination area of the display panel includes second pixels that are disabled.

Example CE2 comprises the subject matter of Example CE1, and the backlight provided to the display panel creates a user-facing light via the second pixels in the illumination area.

Example CE3 comprises the subject matter any one of Examples CE1-CE2, and the display panel is one of an organic light emitting diode (OLED).

Example CE4 comprises the subject matter any one of Examples CE1-CE3, and the display panel includes a reflective film spaced from a back side of the display panel, where the light source includes a prismatic layer adjacent to the display panel, a lightguide member disposed between the prismatic film and the reflective film, and one or more light emitting diodes (LEDs) at an edge of the member. Example CE4 the backlight is to originate from the one or more LEDs and is to be reflected by the reflective film to the back side of the display panel.

Example CE5 comprises the subject matter any one of Examples CE1-CE4, and the illumination area is adjacent to at least one side of the sub-area.

Example CE6 comprises the subject matter any one of Examples CE1-CE5 and the method further includes receiving a second video frame of a second video stream associated with the video call, and generating a second scaled-down video frame based on a second scaling factor, where the timing controller is to provide the second scaled-down video frame for display in the sub-area of the display panel currently with the first scaled-down video frame.

Example CE7 comprises the subject matter of Example CE6, and the first scaling factor and the second scaling factor are equal.

Example CE8 comprises the subject matter of Example CE6, and the first scaling factor is to cause greater down-sizing than the second scaling factor.

Example CE9 comprises the subject matter any one of Examples CE1-CE8 and the method further includes dividing the sub-area into a first smaller area and a second smaller area, and providing the first video frame for display in the first smaller area, and providing the second scaled-down video frame for display in the second smaller area.

Example CE10 comprises the subject matter any one of Examples CE1-CE9, and the sub-area is an undivided area in the display panel.

Example CE11 comprises the subject matter any one of Examples CE herein above, and further comprises the elements of the method of any one of Examples AF1-AF12, BD1-BD11 or CB1-CB13 (as far as those method elements are not redundant with method elements of Examples CE herein above).

Example CF1 provides an apparatus comprising means for performing the method of any one of Examples CB1-CB13 or CE1-CE11.

Example CF2 comprises the subject matter of Example CF1 and the means for performing the method comprises at least one processor and at least one memory element.

Example CF3 comprises the subject matter of Example CF2 and the at least one memory element comprises machine-readable instructions that when executed, cause the apparatus to perform the method of any one of the preceding Examples.

Example CF4 comprises the subject matter any one of Examples CF1-CF3, wherein the apparatus is one of a computing system, a processing element, or a system-on-a-chip.

Example CF5 comprises the subject matter any one of Examples CF herein above, and further comprises the features of any one of Examples AA1-AA16, AG1, BA1-BA12, or BE1 (as far as those features are not redundant with features of Examples CF herein above).

Example CG1 provides at least one machine-readable storage medium comprising instructions, where the instructions when executed realize an apparatus, realize a system, or implement a method as in any one of the preceding Examples CA1-CA14, CB1-CB13, CC1-CC14, CD1-CD11, CE1-CE11 or CF1-CF5.

Example CH1 comprises a display panel, comprising an organic light emitting diode (OLED) layer having a generally planar shape including an outwardly facing display surface and an inwardly facing back side, a lightguide layer having upper and lower sides connected by a first pair opposing outer edges, a prismatic film disposed between the OLED layer and the lightguide layer, a reflective film having an upper side opposing the lower side of the lightguide layer, and a plurality of lights adjacent to the lightguide layer. In Example CH1, the lightguide layer is generally parallel to and spaced from the inwardly facing back side of the OLED layer and the lower side of the OLED layer faces away from the OLED layer.

Example CH2 comprises the subject matter of Example CH1, and plurality of lights is proximate the first pair of the first pair of opposing outer side edges.

Example CH3 comprises the subject matter of any one of Examples CH1-CH2, and the lightguide includes a second pair of opposing edges in generally perpendicular arrangement relative to the first pair of opposing edges, where a plurality of additional lights is proximate the second pair of opposing edges.

Example CH4 comprises the subject matter of any one of Examples CH1-CH3, and the first pair of opposing edges and the second pair of opposing edges forming a generally rectangular shape.

Example CH5 comprises the subject matter of any one of Examples CH1-CH4, and the plurality of additional lights includes light emitting diodes.

Example CH6 comprises the subject matter of any one of Examples CH1-CH5, and the plurality of lights includes light emitting diodes.

Example CH7 comprises the subject matter of any one of Examples CH1-CH6, and the display panel is configured to be embedded in a lid of a computing device.

Example CH8 comprises the subject matter of Example CH7, and the display panel is configured to be operably connected to a timing controller in the lid of the computing device and to receive signals from the timing controller to drive video data for display on the OLED layer.

Example CH9 comprises the subject matter of any one of Examples CH herein above, and further comprises the features of any one of Examples AA1-AA16, AB1-AB2, AC1-AC22, AD1-AD10, AG1, AI1, BA1-BA12, BC1-BC12, BE1, BG1, BH1-BH7, CA1-CA14 (as far as those features are not redundant with features of Examples CH herein above).

Display Management for a Multiple Display Computing System

Display power, which can include a backlight and panel electronics, consumes a significant amount of power on systems today. A display in a computing system can incur forty to sixty percent (40-60%) of the total system power. An SoC and system power increases significantly when there are multiple external displays. For example, significantly higher power costs may be incurred for connecting to two 4K monitors due to rendering the additional high-resolution displays.

Many current computing devices switch between power modes to save energy, extend the life of the battery, and/or to prevent burn-in on certain display screens. Energy efficiency techniques implemented in a computing system, however, may negatively impact user experience if the techniques impair responsiveness or performance of the system.

Display management solutions to save power and energy for displays have involved user presence detection from a single display system in which a display panel is dimmed or turned off if a user is not detected. For example, a backlight may be dimmed such that brightness is reduced or the backlight may be turned off entirely. For example, software-based solutions may determine if a user's face is oriented at the single display and dim or turn off that display accordingly. Software-based solutions, however, incur significant power, in the amount of Watts range, for example. In addition, software-based solutions are only capable of handling an embedded display and would need to be more conservative when determining when to turn off the display. Moreover, these single-display solutions only have as much accuracy as the field-of-view of the single display.

Single-display user presence solutions cannot appropriately manage battery life, responsiveness gains, and privacy and security features collectively or effectively. In single-display systems, only one input from one display is obtained, which limits the amount of data that can be used to effectively manage multiple display scenarios. Depending on where the user presence enabled system is placed, the system may not effectively receive accurate information as to when the user is approaching their computing system (e.g., at a workstation, desk) and where they are looking when situated at their computing system. Moreover, if the user closes their laptop having a single-display user presence solution, then there is no way to manage the external monitor display and save power if the user looks away from that external monitor. When the laptop is closed, the external monitor would not be able to respond to any user presence behaviors.

External and high-resolution displays (e.g., 4K display) are increasingly being used in extended display scenarios. Such displays, however, significantly increase the display and system power and energy. These solutions do not have a method for handling user presence to save power and energy, which can potentially impact meeting certain state and/or federal certifications such as the California Energy Commission and Energy Star. The high resolution can also impact performance by fifty percent (50%) or more, which can further diminish user experience.

In another example, authentication software (e.g., Microsoft® Windows Hello® authentication software) allows users to place a clip-on camera on each monitor and run face authentication on the monitor to which the user's attention is directed. Such solutions are only available for authentication (e.g., by facial recognition) and logging in the user when the user is positioned at the right distance and orientation in front of the display panel. These authentication solutions do not address managing display power and brightness based on user presence.

More recent developments have included a low power component that provides human presence and attentiveness sensing to deliver privacy and security through different operational modes based on a user's presence and attentiveness. While significant for laptops or other single device implementations, these advances do not address issues surrounding multiple display modules in today's most common computing environments.

It is common in today's computing environments for users to dock their laptops at their workstations, whether in the office or at home. Studies have shown that corporate users work in a docked scenario for approximately eighty percent (80%) of the time. A common scenario is for users to dock their laptop and work mainly on a docking station with an external monitor, where the external monitor can be a larger main display that the user is engaged with for most of the docking time.

Embodiments provide a computing system that comprises a first display device including a first display panel, a first camera, and first circuitry to generate first image metadata based on first image sensor data captured by the first camera and second display device including a second display panel, a second camera, and second circuitry to generate second image metadata based on second image sensor data captured by the second camera. The computing system may further include a processor operably coupled to the first display device and the second display device. The processor is configured to select the operation mode for the display devices based on the image metadata. For instance, the processor may select a first operation mode for the first display device based on the first image metadata and a second operation mode for the second display device based on the second image metadata.

The first and second image metadata may for example indicate whether the user is engaged with the first display device or second display device, respectively, and the operation mode of the induvial display devices may be selected based on this indication. The detection of the engagement or disengagement of the user with a display device could be for example based on face recognition. For example, the first circuitry may detect a face of a user in the first image sensor data; determine that the user is present in a first field of view of the first camera based on detecting the face of the user in the first image sensor data; determine, based on the first image sensor data, a first orientation of the face of the user; and determine whether the user is engaged or disengaged with the first display device based, at least in part, on the first orientation of the face of the user. A similar operation may be performed by the second circuitry in order to determine whether the user is engaged or disengaged with the second display device. If the user is disengaged to a particular one of the display devices, an operating mode may be selected for the one display device in which the brightness of a backlight for the display panel of the one display device is progressively reduced over a time period until a user event occurs or until the backlight is reduced to a predetermined minimum level of brightness (or until the backlight is even turned off).

User presence may be used to unlock the computing system and/or authenticate the user. For example, a processor of the computing system may further determine that access to the computing system is locked, determine that an authentication mechanism is not currently running on the second display device; trigger the authentication mechanism to authenticate the user via the display device to which the user is engaged; and leave the other display device turned off until the user is authenticated.

Figures 44A, 44B:
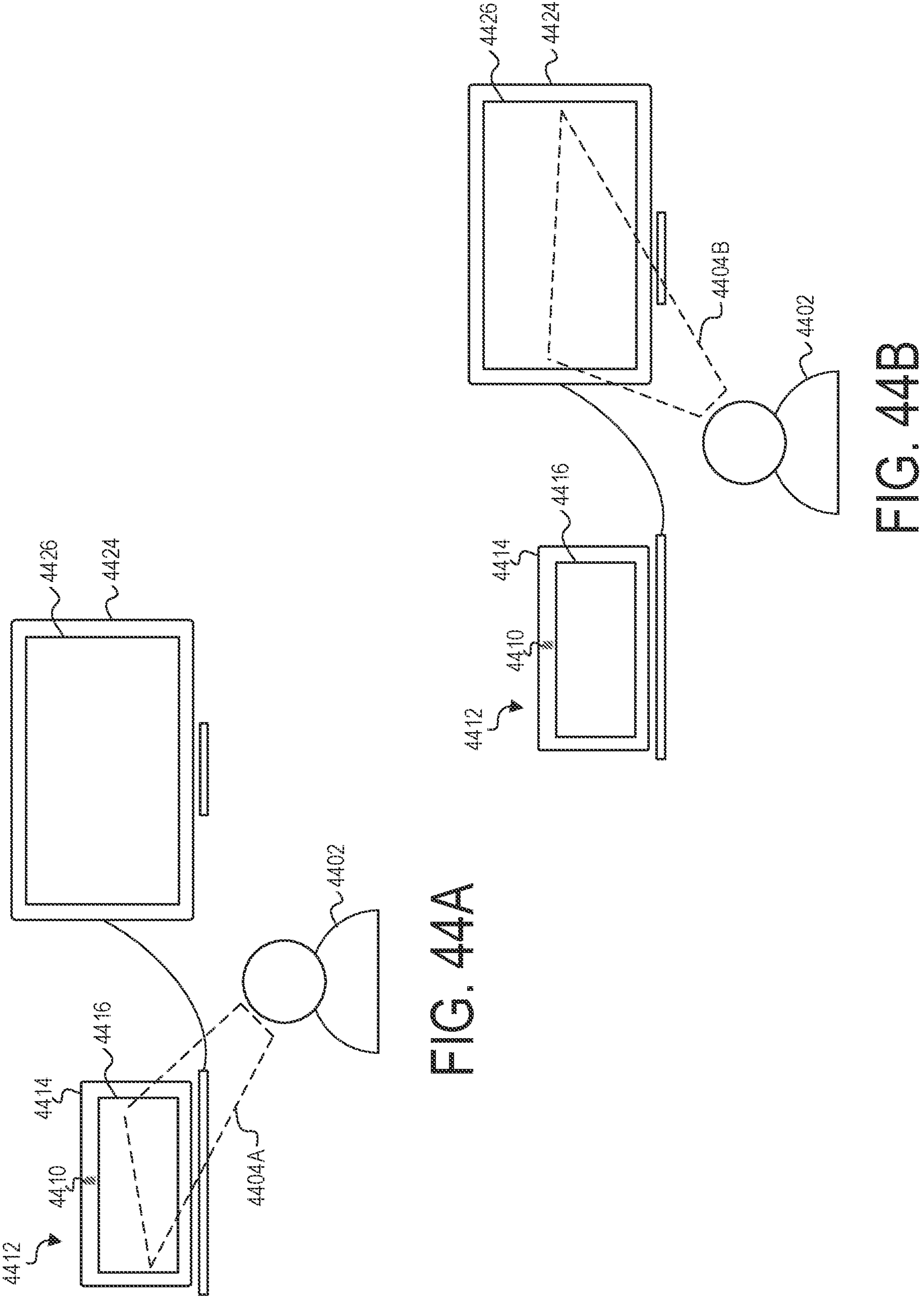
FIGS. 44A-44B are diagrammatic representations of user attentiveness to different display devices of a typical dual display computing system.

FIGS. 44A-44B demonstrate scenarios of a user's possible attentiveness in a computing system where the laptop is connected to one additional external monitor. FIG. 44A includes a user 4402, a laptop 4412 and an external monitor 4424 communicatively coupled to laptop 4412. Laptop 4412 includes a primary display panel 4416 in a lid 4414 of the laptop and a user-facing camera 4410 coupled to the lid. External monitor 4424 includes a secondary display panel 4426. Only laptop 4412 is enabled with user presence and attentiveness detection where the user presence policy can dim the display and/or turn it off altogether based on whether the user is disengaged or not present from that single embedded primary display panel 4416. Because laptop 4412 is the only system enabled with user presence and attentiveness detection, then that system is the only one that can dim or turn off its embedded display panel based on the user's attentiveness, i.e., based on that display's point of view. Thus, display management may be applied only to the primary display panel in the laptop, or it may be uniformly applied to all screens.

In FIG. 44A, when the user's attentiveness is directed to primary display panel 4416, as indicated at 4404A, laptop 4412 can detect the user's face and presence and initiate (or maintain) the appropriate operational mode to enable use of the laptop and its primary display panel 4416, while external monitor 4424 also remains on and incurs power and energy. When the user's attentiveness is directed to secondary display panel 4426 of external monitor 4424, as indicated at 4404B in FIG. 44B, laptop 4412 can apply display management to its primary display panel 4416. In cases where display management is uniformly applied to both monitors, then any change (e.g., dimming, sleep mode) applied to primary display panel 4416 is also applied to secondary display panel 4426 even though the user is engaged with secondary display panel 4426.

Figure 45B:
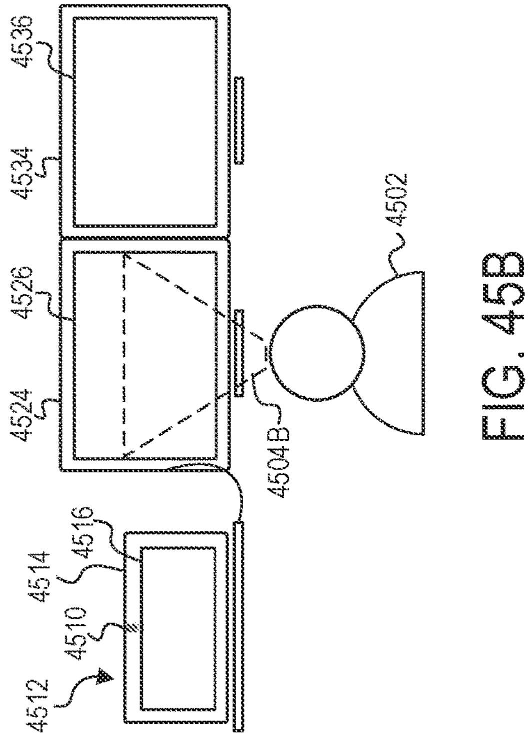
FIGS. 45A-45C are diagrammatic representations of user attentiveness to different display devices of a typical multiple display computing system.
Figure 45A:
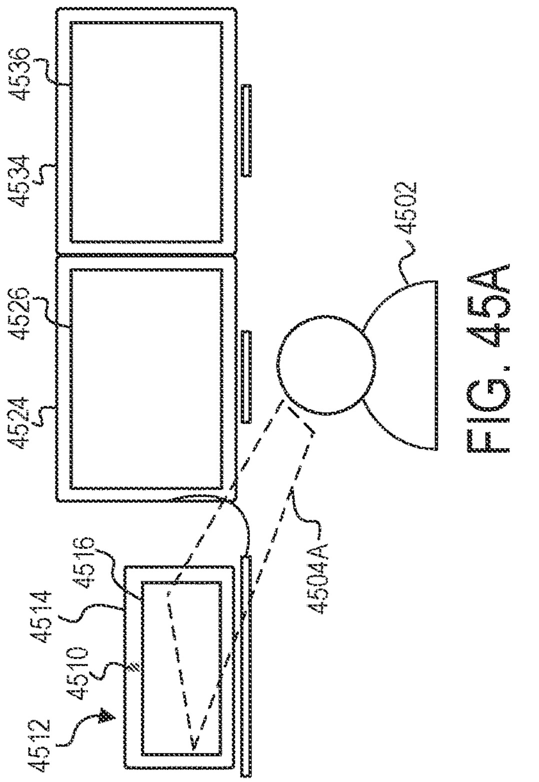
Figure 45C:
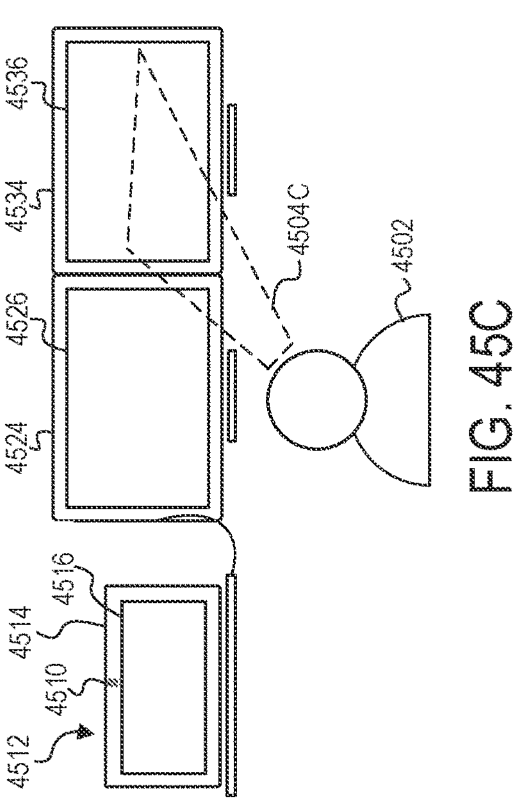

There are many multiple screen and docking configurations. In another example, FIG. 45A-45C demonstrate scenarios of a user's possible attentiveness in a computing system where the laptop is connected to two additional external monitors. FIG. 45A includes a user 4502, a laptop 4512, and first and second external monitors 4524 and 4534 communicatively coupled to laptop 4512. Laptop 4512 includes a primary display panel 4516 in a lid 4514 of the laptop and a camera 4510, including an image sensor, coupled to the primary display panel. External monitor 4524 includes a secondary display panel 4526, and external monitor 4534 also includes a secondary display panel 4536. Only laptop 4512 is enabled with user presence and attentiveness detection. The user can be engaged and focused on any of the three monitors. Because laptop 4512 is the only system enabled with user presence and attentiveness detection, then that system is the only one that can dim or turn off its embedded display based on the user's attentiveness, i.e., based on that display's point of view. If the user remains engaged to just that laptop display, the other two monitors would remain powered on since they do not provide any user presence-based inputs into the policy. Thus, display management may be applied only to the display panel in the laptop, or it may be uniformly applied to all three screens.

In FIG. 45A, when the user's attentiveness is directed to primary display panel 4516 of laptop 4512, as indicated at 4504A, laptop 4512 can detect the user's face and presence and initiate (or maintain) the appropriate operational mode to enable use of the system, while both external monitors 4524 and 4534 also remain powered on and incur power and energy. When the user's attentiveness is directed to the middle screen, as indicated at 4504B in FIG. 45B, laptop 4512 can apply display management to its primary display panel 4516, while secondary display panel 4536 would remain powered on and incur power and energy. This also may make for a less ideal user experience since only one display can handle dimming policies while the other external monitor remains on. Similarly, when the user's attentiveness is directed to the last screen, as indicated at 4504C in FIG. 45C, laptop 4512 can apply display management to its primary display panel 4516, while the middle display panel 4526 would remain powered on and incur power and energy.

Display power management for multiple displays and docking scenarios based on user presence and attentiveness, as disclosed herein, can resolve these issues. Embodiments described herein expand a single display policy to handle multiple displays to seamlessly manage each individual display panel according to a global collective policy. The embodiments disclosed herein enable a primary display device (e.g., lid containing embedded display panel in a mobile computing device, monitor connected to a desktop) in a multiple display computing system, and one or more secondary displays (e.g., external monitors) in the multiple display computing system, to perform user presence and attentiveness detection and individualized display management based on the detection. Thus, any display panel of a display device can be dimmed and/or turned off according to the user's behavior. Policies can be implemented to manage multiple display panels (e.g., a primary display panel of a computing device and one or more other display panels in external monitors operably coupled to the computing device) in a cohesive manner. Examples can include policies to accommodate waking the system upon face detection from any of the multiple display devices, adaptively dimming display panels (e.g., by reducing the backlight) based on user attentiveness to a particular display device, preventing locking a display panel if a user is detected (even if the user is not interacting with the computing system), and locking the computing system when the use is no longer detected by any of the display devices.

In one or more embodiments, a lid controller hub, such as LCH 155, 260, 305, 954, 1705, 1860, 2830A, 2830B, or at least certain features thereof, can be used to implement the user presence and attentiveness-based display management for multiple displays and docking scenarios. The embodiments disclosed herein can intelligently handle inputs received from every display (e.g., via respective LCHs) to seamlessly dim or turn off each display based on user presence and attentiveness data. In one or more embodiments, a system can be triggered to wake even before the user sits down. In addition, the area in which a user can be detected may be enlarged by using a camera for each display. The system can also be triggered to wake even before any usages of the system when the user is already logged on. Embodiments herein also provide for preventing a system from dimming a display panel or setting the system in a low-power state based on user presence at any one of multiple displays, even if the user is not actively interacting with the system. Accordingly, power and energy can be saved and user experience improved when more than one (or all) displays can provide user presence and attentiveness detection.

Figure 46:
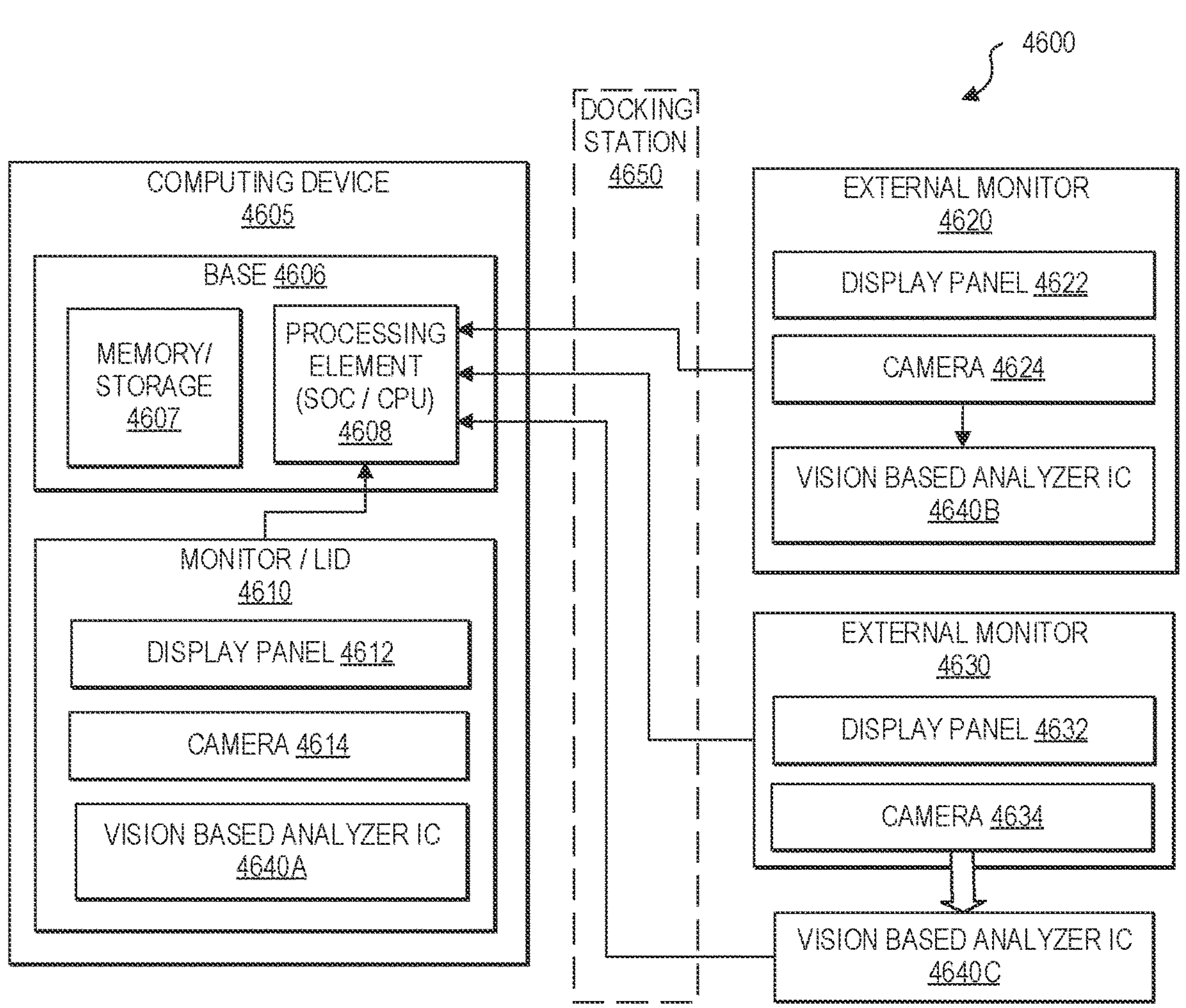
FIG. 46 is a simplified block diagram of a multiple display computing system configured to manage the display devices based on user presence and attentiveness according to at least one embodiment.

Turning to FIG. 46, FIG. 46 is a simplified block diagram illustrating possible details of a multiple display system 4600 in which an embodiment for user presence-based display management can be implemented to apply a global policy to handle the multiple display devices. In one or more embodiments, each display device is adapted to provide its own user presence and attentiveness input. Multiple display system 4600 can include a computing device 4605 such as a laptop or any other mobile computing device, connected to one or more additional display devices. In at least one example, computing device 4605 (and its components) represents an example implementation of other computing devices (and their components) disclosed herein (e.g., 100, 122, 200, 300, 900, 1700-2300, 2800A, 2800B). Additional display devices in example system 4600 are embodied in a first external monitor 4620 and a second external monitor 4630. In one possible implementation, external monitors 4620 and 4630 may be docked to computing device 4605 via a docking station 4650. It should be apparent, however, that other implementations are possible. For example, external monitors 4620 and 4630 may be directly connected to computing device 4605 (e.g., via HDMI ports on the computing device), or may connect to computing device 4605 using any other suitable means.

Computing device 4605 can be configured with a base 4606 and a lid 4610. A processing element 4608, such as a system-on-a-chip (SoC) or central processing unit (CPU), may be disposed in base 4606 along with memory/storage 4607. A display panel 4612 and a user-facing camera 4614 may be disposed in lid 4610. External monitors 4620 and 4630 are also configured with respective display panels 4622 and 4632 and respective cameras 4624 and 4634.

Each display device, including the primary display device (e.g., 4612) of the computing device and the one or more additional external (or secondary) display device(s) connected to the computing device (e.g., 4620, 4630), can be configured with its own vision-based analyzer integrated circuit (IC), which may be included contain some or all of the features of one or more lid controller hubs described herein (e.g., LCH 155, 260, 305, 954, 1705, 1860, 2830A, 2830B). For example, a vision-based analyzer IC 4640A is disposed in lid 4610 of computing device 4605, a vision-based analyzer IC 4640B is disposed in first external monitor 4620, and a vision-based analyzer IC 4640C is disposed external to second external monitor 4630.

The vision-based analyzer ICs 4640A, 4640B, and 4640C each comprise circuitry to perform machine learning algorithms that can, based on image sensor data generated by an associated camera, perform user presence detection, face detection, and face orientation detection in an imaging field of view from their respective cameras 4614, 4624, and 4634. Vision-based analyzer ICs 4640A, 4640B, and 4640C can generate respective image metadata based on respective image sensor data generated by respective cameras 4614, 4624, and 4634. The image metadata generated by a given vision-based analyzer IC associated with a given camera may indicate whether a user is present in the field of view of the given camera, engaged with a display panel associated with the given camera, disengaged from the display panel associated with the given camera, and/or not present in the field of view of the given camera.

Image metadata generated by vision-based analyzer ICs 4640A, 4640B, and 4640C can be provided to SoC 4608, which can selectively control settings of particular performance parameters affecting the power levels and/or the performance levels of the multiple display devices 4610, 4620, and 4630 and computing device 4605 to which the multiple display devices are docked or otherwise connected. Settings for the display devices can be controlled according to policies that are defined based on user presence, user absence, user engagement, and/or user disengagement with each display device. Because a dedicated camera and a vision-based analyzer IC are implemented for each display device (e.g., primary display device of a computing device and secondary display devices of external monitor(s)), user presence-based policies can be more accurately managed. Examples of user presence-based policies can include, but are not necessarily limited to face and head presence and orientation detection for waking the system when a user is detected, adaptively dimming display panels when a user is not attentive, not locking the system when a user is present, and locking the system when a user is absent. Each vision-based analyzer IC coupled to a camera for a display panel can provide input that indicates a user approaching its display device from a unique field of view, which can improve the accuracy and speed to wake the system and trigger face authentication. Also, more accuracy can be provided to manage a display device (e.g., dim or turn off the backlight of the display panel when the user is disengaged or not present), for each display individually and collectively. Importantly, power and performance can improve when one or more display panels can be dimmed or turned off by adjusting the backlight, and/or when a display panel refresh rate and rendering can be reduced for one or more display panels. In at least the context of embodiments for display management for a multiple display computing system, a display panel can be dimmed by adjusting the backlight of the display panel to a reduced brightness, and is turned off when no backlight is provided to the display panel. It should be noted, however, that even when no backlight is provided to the display panel such that the display panel is effectively turned off, cameras 4614, 4624, and 4634 may be configured for "always-on" usage such that each camera can continue to capture images and generate image sensor data, and vision based analyzer ICs 4640A, 4640B, and 4640B can continue to evaluate the image sensor data.

In one or more embodiments, a dedicated vision-based analyzer IC may be provisioned for each display device in a multiple display system (e.g., 4600). Embodiments allow for a vision-based analyzer IC to be integrated into a display device or to be configured as an add-on device to a display device. For example, in some cases, dedicated vision-based analyzer ICs may be integrated into a lid of a computing device and into external monitors. In other scenarios, however, a vision-based analyzer IC may be configured as a dongle or other small device capable of being connected to and used with any display device in a computing system. For example, in system 4600, lid 4610 of computing device 4605 and first external monitor 4620 may have respective integrated vision-based analyzer ICs 4640A and 4640B. However, second external monitor 4630 may have an add-on vision-based analyzed IC 4640C. In one example, add-on vision-based analyzer IC 4640C may be integrated with its own camera and attached to the housing of second external monitor 4630 such that the external camera is positioned to capture images of an appropriate imaging field of view for second external monitor 4630. In another example, second external monitor 4630 may be configured with a port that allows add-on vision-based analyzer IC 4640C to be connected a camera embedded in the second external monitor, such as camera 4634.

Figure 47:
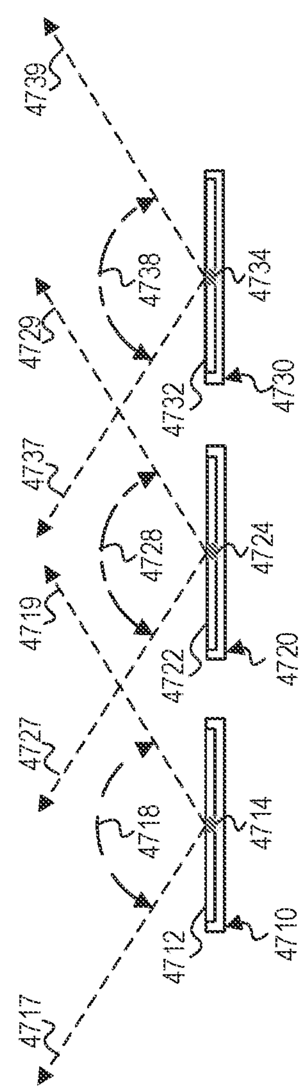
FIG. 47 is a top plan view illustrating possible fields of view of cameras in a multiple display computing system.

FIG. 47 is a top plan view illustrating possible fields of view of cameras in a multiple display system. In this example scenario, top plan views of a first display device 4710, a second display device 4720, and a third display device 4730 are shown. At least one of the display devices may be configured as part of a computing device (e.g., lid 4610 of computing device 4605). The other two display devices may be embodied as external monitors (e.g., 4620, 4630) or other devices including display panels operably coupled to the computing device. First display device 4710 includes a first display panel 4712 and a first user-facing camera 4714, second display device 4720 includes a second display panel 4722 and a second camera 4724, and third display device 4730 includes a third display panel 4732 and a third camera 4734. Each camera can be configured for always-on usage and can face the direction of its associated display panel. Each camera 4714, 4724, and 4734 can be disposed in a bezel area surrounding its respective display panel 4712, 4722, or 4732, coupled to its respective display panel 4712, 4722, or 4732, externally attached to its respective display device 4710, 4720, or 4730, and/or located on another portion of its respective display device or associated computing device.

In at least one embodiment, each camera is associated with an imaging field of view (FoV), and may include (or be operably coupled to) a suitable image sensor for detecting movement and/or light that may indicate the presence of a user in the camera's imaging FoV. For example, first camera 4714 is associated with a first imaging FoV 4718 spanning between dashed lines 4717 and 4719. Second camera 4724 is associated with a second imaging FoV 4728 spanning between dashed lines 4727 and 4729. Third camera 4734 is associated with a third imaging FoV 4738 spanning between dashed lines 4737 and 4739. In the example of FIG. 47, first camera 4714 generates image sensor data representing an image of the area surrounding first display device 4710 that is visible within imaging FoV 4718. Second camera 4724 generates image sensor data representing an image of the area surrounding second display device 4720 that is visible within second imaging FoV 4728. Third camera 4734 generates image sensor data representing an image of the area surrounding third display device 4730 that is visible within third imaging FoV 4738.

As shown in FIG. 47, depending on the arrangement of a multiple display system, imaging FoVs may overlap. In this example, imaging FoVs 4718, 4728, and 4738 associated with display devices 4710, 4720, and 4730 overlap to create an extended area that is larger than the FoV of a single camera and in which the presence of a user can be sensed by one or more of cameras 4714, 4724, and 4734. It should be noted that although the multiple devices shown in FIG. 47 are arranged along a generally straight line, numerous other configurations are possible. For example, any of the display devices may be angled or turned based on particular needs and preferences of a user. Different arrangements (e.g., angles, tilts, positions) may result in different fields of view and different overlapping portions of the fields of view for the multiple cameras.

FIGS. 48A-48C are top plan views illustrating possible head/face orientations of a user relative to a display device. In these example scenarios, a display device 4810, which includes a display panel 4812 and a user-facing camera 4814, is shown. A user 4802 is also shown positioned opposite to display panel 4812, such that the user can view the display panel. In this example, user 4802 is located within a field of view (FoV) of camera 4814 and thus, image sensor data generated by camera 4814 can include data representing user 4802. For illustrative purposes, face orientations 4804A-4804D indicate example directions of the gaze of user 4802 relative to display panel 4812. In one or more examples, a face orientation or gaze direction extends perpendicularly from the user's face (e.g., the center of the user's face such as the nose, the center point between the eyes, the center point of lips). Display device 4810 represents an example lid of a computing device (e.g., lid 4610 of computing device 4605) or an external monitor (e.g., 4620, 4630) or other device with a display panel operably coupled to a computing device.

In one or more embodiments, image sensor data generated by camera 4814 can be analyzed by a vision-based analyzer IC (e.g., 4640A, 4640B, 4640C) to determine whether a user is present in the camera's imaging field of view (FoV) as described with reference to FIG. 47. In addition, when a user is determined to be present in the imaging FoV of camera 4814, the vision-based analyzer IC may determine a face orientation of user 4802 relative to display panel 4812. Machine learning algorithm(s) may be used to train the vision-based analyzer IC to recognize human facial features and, based on the recognition of such facial features, to determine a user's face orientation, the location of the user's head/face within an imaging field of view (FoV) of the associated camera. In at least one embodiment, a user's intent (e.g., engaged, disengaged) can be inferred from the identified face orientation, and parameters defining the maximum angle of rotation for a user's face and/or gaze direction.

In one or more embodiments, determining whether user 4802 is engaged or disengaged from display panel 4812 can be accomplished by determining whether an angle of rotation of a user's face relative to display panel 4812 is within a first-level area between user 4802 and display panel 4812. In one example, the angle of rotation of a user's face relative to display panel 4812 may be calculated as the angle defined between a direct display path (e.g., 4803) and the user's face orientation or gaze direction (e.g., 4804A-4804D). The direct display path (e.g., 4803) may be defined as a generally direct path from camera 4814 to user 4802, as the camera is typically proximate to the display panel. The user's head orientation (e.g., 4804A-4804D) may correspond to a perpendicular direction extending from the user's face (e.g., from the nose, the center of the lips, the center of the forehead between the eyes). The first-level area may be defined as the area between a first-level maximum angle of rotation of a user's face to the left of the direct display path and a first-level maximum angle of rotation of the user's face to the right of the direct display path. In one or more implementations, the first-level maximum angle of rotation to the left is the same as the first-level maximum angle of rotation to the right and may be, for example forty-five degrees (45°). The first-level maximum angles of rotation may be user and/or system configurable in at least one embodiment.

As shown in FIGS. 48A-48C, the direct display path 4803 and face orientations 4804A-4804D indicate possible scenarios of a user's face orientation relative to display panel 4812, from which the engagement or non-engagement of user 4802 to display panel 4812 can be inferred. Generally, if user 4802 is facing towards display panel 4812 (regardless of whether the user is located directly in front of display panel 4812 or at some other location within the imaging FoV of camera 4814), the vision-based analyzer IC may infer that the user is interested (e.g., engaged) in the content rendered on the display panel and, therefore, does not want the operation of the computing device or the brightness of display panel 4812 to be negatively impacted. In another scenario, if user 4802 is turned to either side relative to a direct display path from the user to display panel 4812, but not turned completely away from display panel 4812, vision-based analyzer IC may infer that the user is not currently interested (e.g., present but disengaged) in contents rendered on display panel 4812, but is still present and engaged with the operation of the computing device. For example, user 4802 may be sitting at his or her desk within the imaging FoV associated with camera 4814 but turned to the side to view a second display panel of a docked external monitor. Thus, while the user may be disengaged from display panel 4812, the user may be interested in contents rendered on the second display panel of the external monitor and therefore, may want the operation of the computing device to continue. In this case, display panel 4812 may be progressively dimmed over time (e.g., brightness of a backlight is reduced) assuming the user does not redirect his or her attention back to display panel 4812. However, a vision-based analyzer IC associated with the external monitor may determine that user 4802 is present and engaged with the second display panel in the external monitor. Thus, the operation of the computing device and the second display panel of the external monitor would not be negatively impacted (e.g., display panel dimmed, SoC transitioning into a low-power state) in this scenario. Generally, the performance of the computing device, display panel 4812, and the second display panel of the external monitor can be adjusted based on the inferred engagement of user 4802 to either increase performance for improved user experience (e.g., when the user is engaged) or decrease performance to conserve power (e.g., when the user is either present and disengaged or absent).

In at least one embodiment, image metadata indicating user presence, absence, engagement, or disengagement with respect to display panel 4812 may be generated based on identifying user presence/absence and face orientation of a detected human face. This image metadata can be provided to a processing element of a computing device (e.g., SoC 4608 of computing device 4605) communicatively coupled to the vision-based analyzer IC of display device 4810. Based on the indication of whether a user is engaged, disengaged, present, and/or absent, and on one or more predefined rules, the computing device can control settings for particular performance parameters affecting the power level and/or performance level of display device 4810.

In a first example shown in FIG. 48A, the vision-based analyzer IC may determine that user 4802 is present and engaged with respect to display panel 4812 based on determining that the user's face orientation 4804A is within a first-level area 4818. In one implementation, first-level area 4818 may extend forty-five degrees (45°) to the left and forty-five degrees (45°) to the right of the direct display path 4803. In this example, first-level area 4818 may span approximately ninety degrees (90°) between dashed line 4817, which represents a first-level maximum angle of rotation to the right, and dashed line 4819, which represents a first-level maximum angle of rotation to the left. The user's face orientation 4804A, forms an angle of rotation with direct display path 4803 that is less than the first-level maximum angle of rotation to the right indicated by dashed line 4817. Therefore, the user's face orientation 4804A is within first-level area 4818. Accordingly, the vision-based analyzer IC can infer that user 4802 is engaged with display panel 4812 (e.g., interested in content rendered on display panel 4812), even if user 4802 is not currently interacting with a user interface (e.g., keyboard, touchpad, mouse, touchscreen).

In a second example shown in FIG. 48B, the vision-based analyzer IC may determine that user 4802 is present but not engaged with respect to display panel 4812 based on determining that the user's face orientation 4804B or 4804C is within a second-level area 4828A or 4828B. In one implementation, each second-level area 4828A and 4828B lies outside first-level area 4818, but does not extend past a second-level maximum angle of rotation to the left or to the right from the direct display path. In one example, the second-level maximum angles of rotation from direct display path 4803 are ninety degrees (90°) to the left indicated at dashed line 4829 and ninety degrees (90°) to the right indicated at dashed line 4827. The left and right second-level areas may span approximately forty-five degrees (45°) each and may be defined between dashed lines 4819 and 4829 and between dashed lines 4817 and 4827. In one scenario of FIG. 48B, user's face orientation 4804C forms an angle of rotation with the direct display path 4803 that is between the first-level maximum angle of rotation to the right indicated by dashed line 4817 and the second-level maximum angle of rotation to the right indicated by dashed line 4827. Therefore, the user's face orientation 4804C is within second-level area 4828A. Accordingly, in this scenario, the vision-based analyzer IC can infer that user 4802 is not engaged with display panel 4812, but is still present and possibly engaged with another display device. In the other scenario of FIG. 48B, user's face orientation 4804B forms an angle of rotation with the direct display path 4803 that is between the first-level maximum angle of rotation to the left indicated by dashed line 4819 and the second-level maximum angle of rotation to the left indicated by dashed line 4829. Therefore, the user's face orientation 4804B is within second-level area 4828B. Accordingly, in this scenario, the vision-based analyzer IC can infer that user 4802 is not engaged with display panel 4812, but is still present and possibly engaged with another display device.

In a third example shown in FIG. 48C, the vision-based analyzer IC may determine either that user 4802 is not present or that the user is present but the user's face is undetectable with respect to display panel 4812 based on determining that the user's face orientation 4804D is within a third level area 4838. In one implementation, third level area 4838 may extend past a second-level maximum angle of rotation to the left or to the right from the direct display path. In one example, third level area 4838 may span approximately one-hundred eighty degrees (180°) between dashed line 4827, which represents the second-level maximum angle of rotation to the right, and dashed line 4829, which represents the second-level maximum angle of rotation to the left. The user's face orientation 4804D is not identified because the face of user 4802 is not captured by camera 4814 since it is turned away from camera 4814 and display panel 4812. Accordingly, the vision-based analyzer IC can infer that user 4802 is not present. In some scenarios, however, the vision-based analyzer IC may infer that user 4802 is present (e.g., based on other detectable features like a body, a back of a head) but that the user's face is not detectable. This may be useful, for example, to implement a more aggressive dimming policy, rather than a dimming policy that is applied when the user's face orientation is within the second-level area.

In one or more embodiments, an additional level area may be defined. In this embodiment, when a user's face orientation is determined to be within the additional level area, the user's attentiveness is unknown. In one possible implementation, first-level area 4818 and second-level areas 4828A and 4828B may be reduced in size to create additional level area on the right and left between the first and second-level areas shown in FIGS. 48A-48C. For example, a first-level area (e.g., 4818) may span seventy-four degrees (74°) between a first-level maximum angle of rotation to the right (e.g., 37°), and a first-level maximum angle of rotation to the left (e.g., 37°). A second (additional) level area on the right may span fifteen degrees (15°) between the first-level maximum angle of rotation to the right (e.g., 37°) and a second-level maximum angle of rotation to the right (e.g., 52°). A second (additional) level area on the left may span fifteen degrees (15°) between the first-level maximum angle of rotation to the left (e.g., 37°) and a second-level maximum angle of rotation to the left (e.g., 52°). A third level area (e.g., 4828A) on the right may span thirty-eight degrees (38°) between the second-level maximum angle of rotation to the right (e.g., 52°) and a third level maximum angle of rotation to the right (e.g., 90°). A third level area on the left may span thirty-eight degrees (38°) between the second-level maximum angle of rotation to the left (e.g., 52°) and a third level maximum angle of rotation to the left (e.g., 90°). A fourth level area (e.g., 4838) may span one hundred eighty degrees (180°) between the third level maximum angle of rotation to the right (90°) and the third level maximum angle of rotation to the left (90°).

In this example, when the face orientation of the user is in one of the additional second-level areas, a determination may be made that the status of the user's engagement with the display device is unknown. In this scenario where a user has an unknown status, display management may be handled in any suitable manner according to particular implementations and needs. In one example, an unknown status may prevent the display panel from being progressively dimmed to ensure that it is not dimming prematurely and/or undesirably. In some implementations, a timer may be started to monitor the time that the user remains in the unknown status orientation. If a threshold amount of time expires, then the display brightness may be reduced immediately to a predetermined minimum level of display brightness for users who are still present but not engaged, or progressive dimming may be applied to the display device. The other level areas may be evaluated in the same manner as described with reference to FIGS. 48A-48C. In particular, if the user's face orientation is within the first-level area, then it is inferred that the user is engaged with the display panel and a normal/default level of brightness may be provided to the display panel. If the user's face orientation is within the third level area, then it is inferred that the user is present but disengaged with the display panel associated with the captured image sensor data, but the user may be engaged with another display device. In this scenario, dimming the backlight may be progressively applied to the display panel. If the user's face orientation is within the fourth level area, then an inference is drawn that the user is either not present or the user's face is not detectable. In this scenario, the display panel may be turned off immediately (e.g., if all other display devices provide image sensor data indicating the user is not present) or aggressive dimming may be progressively applied to the display panel until the display panel is turned off and no backlight is provided.

It should be noted that the particular values (e.g., degrees, distances) provided herein for user fields of view are for illustrative purposes only. While such given values may indeed be implemented in one or more scenarios, such values may be adjusted to any other suitable values based on particular needs and implementations. Furthermore, such values may be adjusted per display device. For example, in some scenarios it may be desirable for a particular display device, such as one that is at the end of several display devices in a single workstation, to have the range of rotation of the first-level area expanded to ensure that the display panel is not dimmed too frequently.

Figures 49A, 49B:
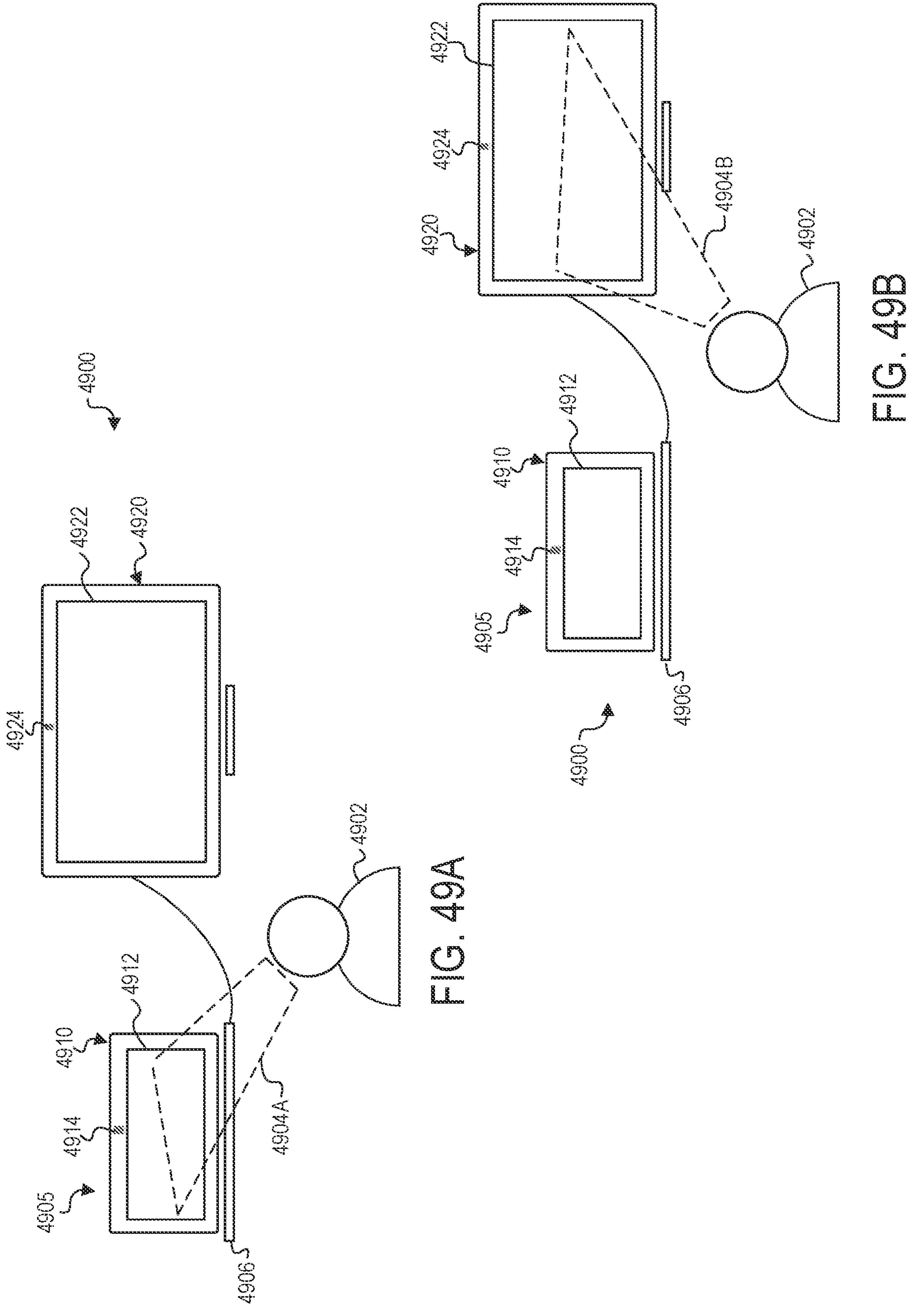
FIGS. 49A-49B are diagrammatic representations of user attentiveness to different display devices in a dual display computing system configured to perform user presence-based display management for multiple displays according to at least one embodiment.

FIGS. 49A-49B illustrate an example two display system 4900 in which an embodiment of user presence-based display management is implemented. The two-display system 4900 includes a computing device 4905 and an external monitor 4920 operably coupled to computing device 4905. Computing device 4905 may include a base 4906 and a lid 4910. In this example, lid 4910 includes an embedded primary display panel 4912 and a user-facing camera 4914, including an image sensor. External monitor 4920 includes a secondary display panel 4922 and a user-facing camera 4924 that includes an image sensor. In this example, cameras 4914 and 4924 are embedded in bezel areas of their respective lid and monitor. It should be apparent, however, that these cameras may be integrated with or externally coupled to their respective lid and monitor in any other suitable manner. FIGS. 49A-49B also show a user 4902 and possible attentiveness directed toward the two display panels 4912 and 4922.

Each of the user-facing cameras 4914 and 4924 can be coupled to a respective vision-based analyzer IC (e.g., an LCH as described herein such as LCH 155, 260, 305, 954, 1705, 1860, 2830A, 2830B, etc. or circuitry that contains some of the features thereof), which may be disposed within the lid/monitor housing or could be operably coupled to the lid/monitor by an external connector (e.g., a dongle). Each vision-based analyzer IC can be configured to provide input to computing device 4905 indicating whether a user is present, engaged, disengaged, or not present in a field of view of its associated user-facing camera. The input from a given vision-based analyzer IC can be generated based on image sensor data generated for images captured by its associated camera 4914 or 4924.

FIG. 49A shows the attentiveness of user 4902, which is directed to primary display panel 4912 as indicated at 4904A. Camera 4914 can capture images in a first field of view specific to camera 4914. A first vision-based analyzer IC coupled to camera 4914 can use image sensor data from the captured images to detect the user's presence and the user's face orientation. The first vision-based analyzer IC can then provide input to computing device 4905 indicating whether the user is present, engaged, disengaged, or not present based on the first field of view of camera 4914. Camera 4924 can capture images in a second field of view specific to camera 4924. A second vision-based analyzer IC coupled to camera 4924 can use image sensor data from the captured images to detect the user's presence and face orientation from the second field of view. The second vision-based analyzer IC can then provide input to the computing device 4905 indicating whether the user is present, engaged, disengaged, or not present based on the second field of view of camera 4924.

Embodiments implemented in the dual display and docking scenario of FIGS. 49A-49B have the capability to dim and turn off the appropriate display, depending on where the user is facing. For example, in FIG. 49A, the vision-based analyzer IC associated with display panel 4912 in lid 4910 of computing device 4905 can detect user presence and face orientation as indicated at 4904A, while the vision-based analyzer IC associated with display panel 4922 of external monitor 4920 may detect user presence but not user attentiveness because the user's face is turned toward computing device 4905 instead. Accordingly, the computing device can initiate (or maintain) the appropriate operational mode to enable use of the computing device and its primary display panel 4912. The computing device can also adaptively dim display panel 4922 of external monitor 4920, until a threshold amount of time passes without detecting user attentiveness toward the external monitor. Once a threshold amount of time has passed, display panel 4922 may be turned off, while the user continues to use the computing device and its embedded display panel 4912.

Figures 50A, 50B, 50C:
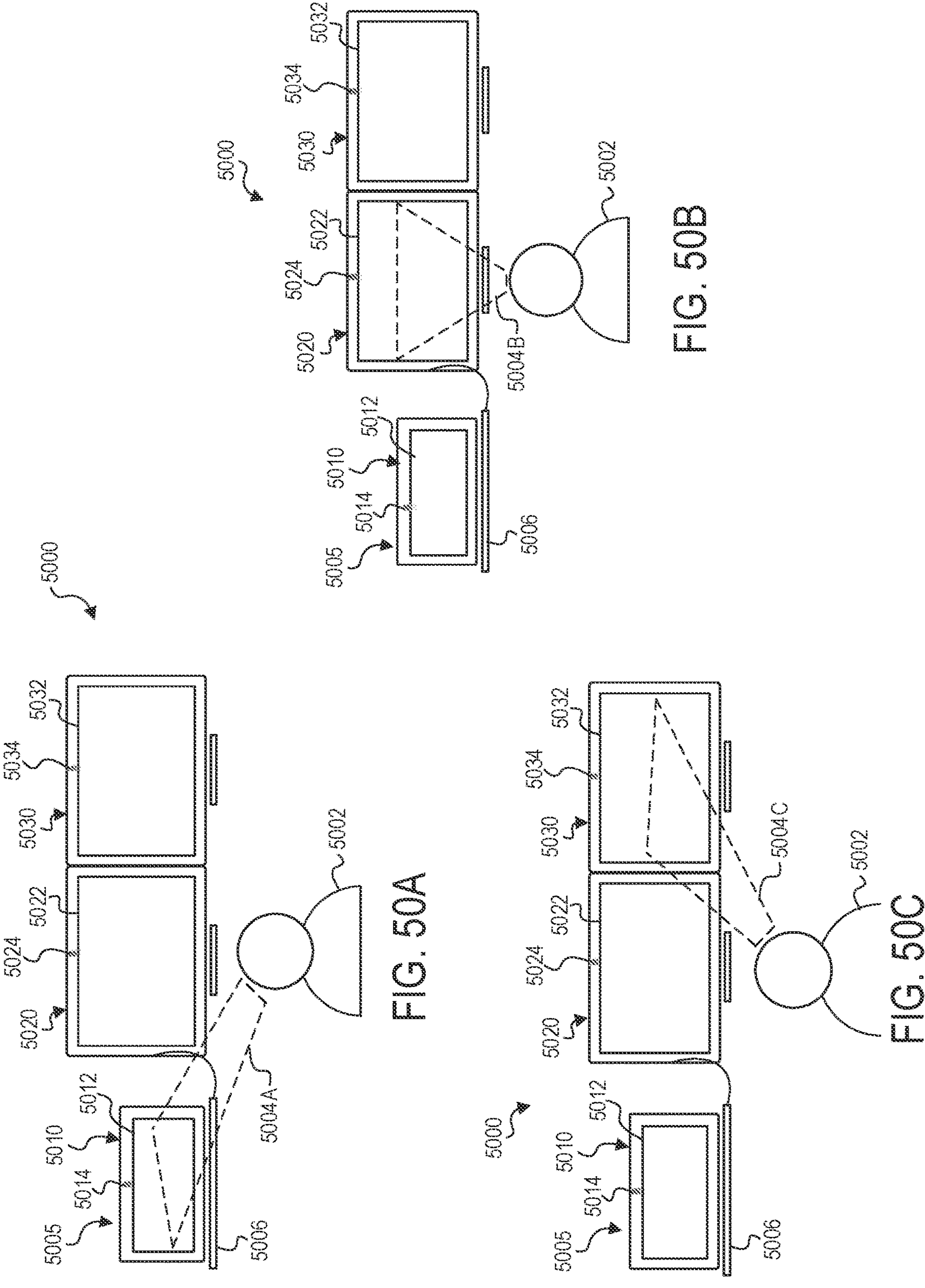
FIGS. 50A-50C are diagrammatic representations of user attentiveness to different display devices in a multiple display computing system configured to perform user presence-based display management for multiple displays according to at least one embodiment.

In FIG. 49B, the vision-based analyzer IC associated with display panel 4922 of external monitor 4920 can detect user presence and face orientation as indicated at 4904B, while the vision-based analyzer IC associated with display panel 4912 in lid 4910 of computing device 4905 may detect user presence but not user attentiveness because the user's face is turned toward external monitor 4920 instead. Accordingly, the computing device can initiate (or maintain) the appropriate operational mode to enable use of the computing device and external display panel 4922. The computing device can also adaptively dim display panel 4912 of computing device 4905, until a threshold amount of time passes without detecting user attentiveness toward the computing device. Once a threshold amount of time has passed, display panel 4912 may be turned off, while the user continues to use the computing device and external monitor 4920.

Where a computing device is connected to more than one additional external monitor, user presence-based policies can be applied to any number of displays. FIGS. 50A-50C illustrate an example multiple display system 5000 in which display management based on user presence and attentiveness is implemented. The multiple display system 5000 includes a computing device 5005, a first external monitor 5020 operably coupled to computing device 5005, and a second external monitor 5030 operably coupled to computing device 5005. Computing device 5005 may include a base 5006 and a lid 5010. In this example, lid 5010 includes an embedded primary display panel 5012 and a user-facing camera 5014, including an image sensor. First external monitor 5020 includes a secondary display panel 5022 and a user-facing camera 5024 that includes an image sensor. Second external monitor 5030 also includes a secondary display panel 5032 and a user-facing camera 5034 that includes an image sensor. In this example, cameras 5014, 5024, and 5034 are embedded in bezel areas of their respective lid/monitors. It should be apparent, however, that these cameras may be integrated with or externally coupled to their respective lid/monitors in any other suitable manner. FIGS. 50A-50C also show a user 5002 and possible attentiveness directed toward the multiple display panels 5012, 5022, and 5032.

Each of the user-facing cameras 5014, 5024, and 5034 can be coupled to a respective vision-based analyzer IC (e.g., an LCH as disclosed herein such as LCH 155, 260, 305, 954, 1705, 1860, 2830A, 2830B, etc. or circuitry that contains some of the features thereof), which may be disposed within the lid/monitor housing or could be operably coupled to the lid/monitor by an external connector (e.g., a dongle). Each vision-based analyzer IC can be configured to provide input to computing device 5005 indicating whether a user is present, engaged, disengaged, or not present in a field of view of its associated user-facing camera. The input from a given vision-based analyzer IC can be generated based on image sensor data generated for images captured by its associated camera 5014, 5024, or 5034.

FIG. 50A shows the attentiveness of user 5002, which is directed to primary display panel 5012 as indicated at 5004A. Camera 5014 can capture images in a first field of view specific to camera 5014. A first vision-based analyzer IC coupled to camera 5014 can use image sensor data from the captured images to detect the user's presence and the user's face orientation. The first vision-based analyzer IC can then provide input to computing device 5005 indicating whether the user is present, engaged, disengaged, or not present based on the first field of view of camera 5014. Camera 5024 can capture images in a second field of view specific to camera 5024. A second vision-based analyzer IC coupled to camera 5024 can use the captured images to detect the user's presence and face orientation from the second field of view. The second vision-based analyzer IC can then provide input to computing device 5005 indicating whether the user is present, engaged, disengaged, or not present based on the second field of view of camera 5024. Camera 5034 can capture images in a third field of view specific to camera 5034. A third vision-based analyzer IC coupled to camera 5034 can use the captured images to detect the user's presence and face orientation from the third field of view. The third vision-based analyzer IC can then provide input to computing device 5005 indicating whether the user is present, engaged, disengaged, or not present based on the third field of view of camera 5034.

Embodiments implemented in the multiple display of FIGS. 50A-50C have the capability to dim and turn off the appropriate display, depending on where the user is facing. For example, in FIG. 50A, the first vision-based analyzer IC associated with display panel 5012 in lid 5010 of computing device 5005 can detect user presence and face orientation as indicated at 5004A. The second vision-based analyzer IC associated with display panel 5022 of external monitor 5020 may detect user presence but not user attentiveness because the user's face is turned toward computing device 5005 instead. Similarly, the third vision-based analyzer IC associated with display panel 5032 of external monitor 5030 may detect user presence but not user attentiveness because the user's face is turned toward computing device 5005 instead. Accordingly, the computing device can initiate (or maintain) the appropriate operational mode to enable use of the computing device and its primary display panel 5012. The computing device can also adaptively dim display panel 5022 of external monitor 5020 until a threshold amount of time passes without detecting user attentiveness toward external monitor 5020. Once a threshold amount of time has passed, display panel 5022 may be turned off, while the user continues to use the computing device and its embedded display panel 5012. Similarly, the computing device can also adaptively dim display panel 5032 of external monitor 5030 until a threshold amount of time passes without detecting user attentiveness toward the external monitor 5030. Once a threshold amount of time has passed, display panel 5032 may be turned off, while the user continues to use the computing device and its embedded display panel 5012.

In FIG. 50B, the vision-based analyzer IC associated with display panel 5022 of external monitor 5020 can detect user presence and face orientation as indicated at 5004B. The first vision-based analyzer IC associated with display panel 5012 in lid 5010 of computing device 5005 may detect user presence but not user attentiveness because the user's face is turned toward external monitor 5020 instead. Similarly, the third vision-based analyzer IC associated with display panel 5032 of external monitor 5030 may detect user presence but not user attentiveness because the user's face is turned toward external monitor 5020 instead. Accordingly, the computing device can initiate (or maintain) the appropriate operational mode to enable use of the computing device and the display panel 5022 of external monitor 5020. The computing device can adaptively dim display panel 5012 of computing device 5005, until a threshold amount of time passes without detecting user attentiveness toward the computing device. Once a threshold amount of time has passed, display panel 5012 may be turned off, while the user continues to use the external monitor 5020. The computing device can also adaptively dim display panel 5032 of external monitor 5030, until a threshold amount of time passes without detecting user attentiveness toward the external monitor 5030. Once a threshold amount of time has passed, display panel 5032 may be turned off, while the user continues to use the external monitor 5020.

In FIG. 50C, the vision-based analyzer IC associated with display panel 5032 of external monitor 5030 can detect user presence and face orientation as indicated at 5004C. The first vision-based analyzer IC associated with display panel 5012 in lid 5010 of computing device 5005 may detect user presence but not user attentiveness because the user's face is turned toward external monitor 5030 instead. Similarly, the second vision-based analyzer IC associated with display panel 5022 of external monitor 5020 may detect user presence but not user attentiveness because the user's face is turned toward external monitor 5030 instead. Accordingly, the computing device can initiate (or maintain) the appropriate operational mode to enable use of the computing device and the display panel 5032 of external monitor 5030. The computing device can adaptively dim display panel 5012 of computing device 5005, until a threshold amount of time passes without detecting user attentiveness toward the computing device. Once a threshold amount of time has passed, display panel 5012 may be turned off, while the user continues to use the external monitor 5030. The computing device can also adaptively dim display panel 5022 of external monitor 5020, until a threshold amount of time passes without detecting user attentiveness toward the external monitor 5020. Once a threshold amount of time has passed, display panel 5022 may be turned off, while the user continues to use the external monitor 5030.

Figure 51:
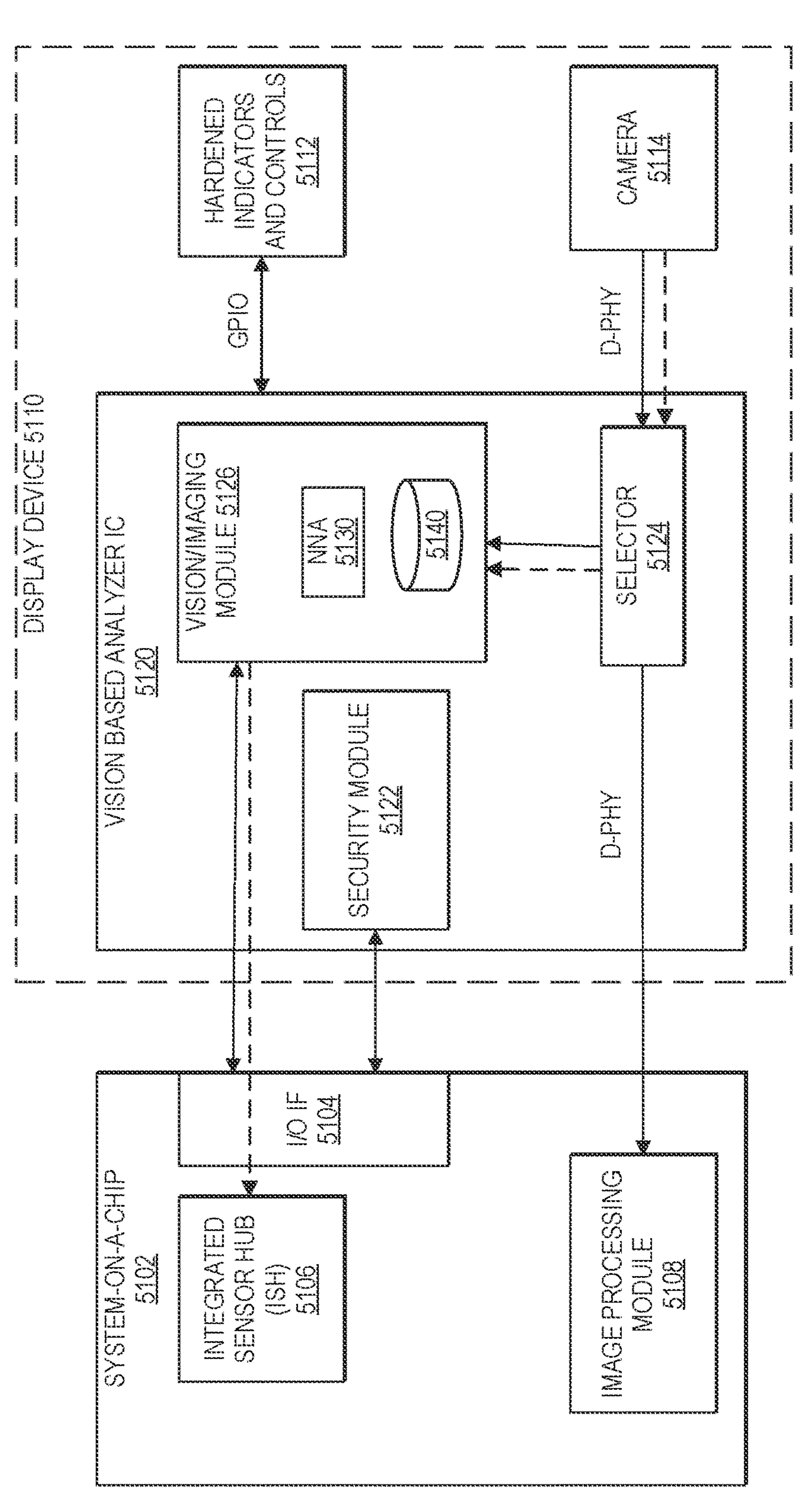
FIG. 51 is a schematic illustration of additional details of the computing system of FIG. 46 according to at least one embodiment.

FIG. 51 is a block diagram illustrating additional possible details of a vision-based analyzer IC 5120 operably coupled to an SoC 5102 in a multiple display computing system, such as multiple display computing system 4600. In one or more examples, SoC 5102 shows possible details of SoC 4608 in computing device 4605 of multiple display computing system 4600 of FIG. 46. In one or more examples, vision-based analyzer IC 5120 shows possible details of vision-based analyzer ICs 4640A, 4640B, and 4640C, which are implemented respectively in lid 4610 of computing device 4605, in first external monitor 4620, and external to second external monitor 4630 of multiple display computing system 4600. Accordingly, a display device 5110 is illustrated in FIG. 51 to represent any one of the possible display devices in which vision-based analyzer IC 5120 may be implemented. A camera 5114 may be integrated with display device 5110 or coupled to the display device as an add-on and communicatively coupled to vision-based analyzer IC 5120. Camera 5114 is arranged to be user-facing and can have a unique imaging field of view that extends outwardly from a display panel in display device 5110. Hardened indicators and control 5112 may be provided in display device 5110 and can include light-emitting diodes (LEDs) to indicate how camera 5114 is being used (e.g., by software running in SoC 5102, by vision-based analyzer IC 5120).

Generally, in one or more embodiments, SoC 5102 and vision-based analyzer ICs 5120 can perform different functions associated with display management for a multiple display computing system as described herein. In some examples, SoC 5102 includes an input/output (I/O) interface (IF) 5104, an integrated sensor hub (ISH) 5106, and an image processing module 5108. In some examples, vision-based analyzer IC 5120 includes a vision/imaging module 5126, a security module 5122, and a selector 5124. Vision/imaging module 5126 is an artificial intelligence-based vision processing unit that supports processing image sensor data for detecting human face(s) and head/face orientation. Image sensor data can be generated for each frame of a sequence of images captured by user-facing camera 5114 and streamed into vision/imaging module 5126 where, for each frame of image sensor data, human face(s) and head/face orientation are detected, image metadata is generated (e.g., indicating user presence, absence, engagement, and/or disengagement), and the image metadata is sent to ISH 5106 of SoC 5102. In some embodiments, the image metadata may indicate when a user is present but the user's face is undetectable such as when a user is turned around from a display screen (e.g., user's face orientation is within the third level area 4838). In one or more examples, camera 5114 can send a stream of image data sensor files (or frames) to vision/imaging module 5126, which may include a neural network accelerator (NNA) 5130 and a storage unit such as a database 5140. In one or more examples, SoC 5102 and vision-based analyzer IC 5120, and components thereof, may be the configured with at least some of the same features as provided in one or more other SoCs (e.g., 140, 240, 340, 914, 1840, 2840A, 2840B, 4608) and/or lid controller hubs (e.g., 155, 260, 305, 954, 1705, 1860, 2830A, 2830B) disclosed herein.

NNA 5130 may be configured to perform an initial analysis of image sensor data generated by the camera 5114 embedded in or coupled to display device 5110 to determine whether a user is present or not present in a field of view, and engaged or disengaged with the display device. NNA 5130 may utilize machine learning algorithms (e.g., neural networks) to detect a human face, a face orientation, and/or multiple faces in image sensor data received from camera 5114. NNA 5130 may include hardware, firmware, software, or any suitable combination thereof to perform the human face(s) and face orientation detections. Image metadata for display device 5110 may be created each time image sensor data is generated by camera 5114 and analyzed by NNA 5130. The image metadata can indicate whether a user is present or not present in the field of view of camera 5114, and whether the user is engaged with or disengaged from display device 5110.

The example vision-based analyzer IC 5120 may be implemented as a separate die from SoC 5102 and specifically designed to perform this vision-based analysis with relatively low power (e.g., around 10 mW) for an "always-on" implementation. Vision-based analyzer IC 5120 is one example implementation of vision-based analyzers 4640A, 4640B, 4640C and may be implemented in display device 5110. Vision-based analyzer IC 5120 may be configured as a lid controller hub (LCH), or portions thereof, as disclosed herein (e.g., LCH 155, 260, 305, 954, 1705, 1860, 2830A, 2830B). Subsequent to analyzing image sensor data and generating image metadata in response to the analysis, vision/imaging module 5126 may transmit (e.g., via an $I^2C$ serial bus) the image metadata to integrated sensor hub (ISH) 5106 of SoC 5102 for further processing. In one optimization, the image metadata may be stored in database 5140 for comparison to subsequent image metadata that is generated for new image sensor data captured by camera 5114. In this optimization, image metadata is only transmitted to the SoC in response to determining that an event has occurred based on a comparison of the newly generated image metadata to previously generated image metadata that is stored in database 5140.

When ISH 5106 receives image metadata from vision-based analyzer IC 5120 of display device 5110, the ISH may use the image metadata to identify an appropriate operation mode for the SoC 5102, the display device associated with the received image metadata, and other display devices operably coupled to SoC 5102, and to adjust corresponding performance parameters accordingly. Examples of operation modes may include, but are not necessarily limited to one or more of 1) present and engaged, 2) present and passively engaged, 3) present and disengaged, 4) not present.

As shown in the illustrated example, the vision-based analyzer IC 5120 is communicatively coupled between camera 5114 and SoC 5102 to enable vision/imaging module 5126 to perform the initial low power analysis of image sensor data. However, when a user initiates an operation that involves the use of the camera 5114 (e.g., for a video conferencing call), an example selector 5124 may forward the image sensor data directly to an image processing module 5108 of SoC 5102 and bypass vision/imaging module 5126.

In some examples, vision-based analyzer IC 5120 includes security module 5122 to maintain the security and/or integrity of the vision-based analyzer IC 5120. Security module 5122 can give end-users full visibility and control of user-facing camera 5114. In some implementations, security module 5122 communicates with SoC 5102 via I/O interface 5104. However, security module 5122 ensures that no image sensor data representing what is captured in an imaging field of view of camera 5114, is exposed to SoC 5102 without authorization. For example, a user can have the option to authorize video frames of a video call. In addition, security module 5122 ensures that image sensor data cannot be accessed by potential malware without the user's knowledge (e.g., via hardened indicators and controls 5112) or control (e.g., via a privacy switch). In particular, hardened indicators and controls 5112 can ensure the current state of selector 5124 (e.g., Normal, ULP Vision, or Privacy Mode) is properly reflected by the indicators. In addition to receiving image sensor data, vision-based analyzer IC 5120 may also receive inputs for hardened indicators and controls 5112 and provide appropriate signals to the LEDs via general purpose inputs/outputs (GPIOs).

Figure 52:
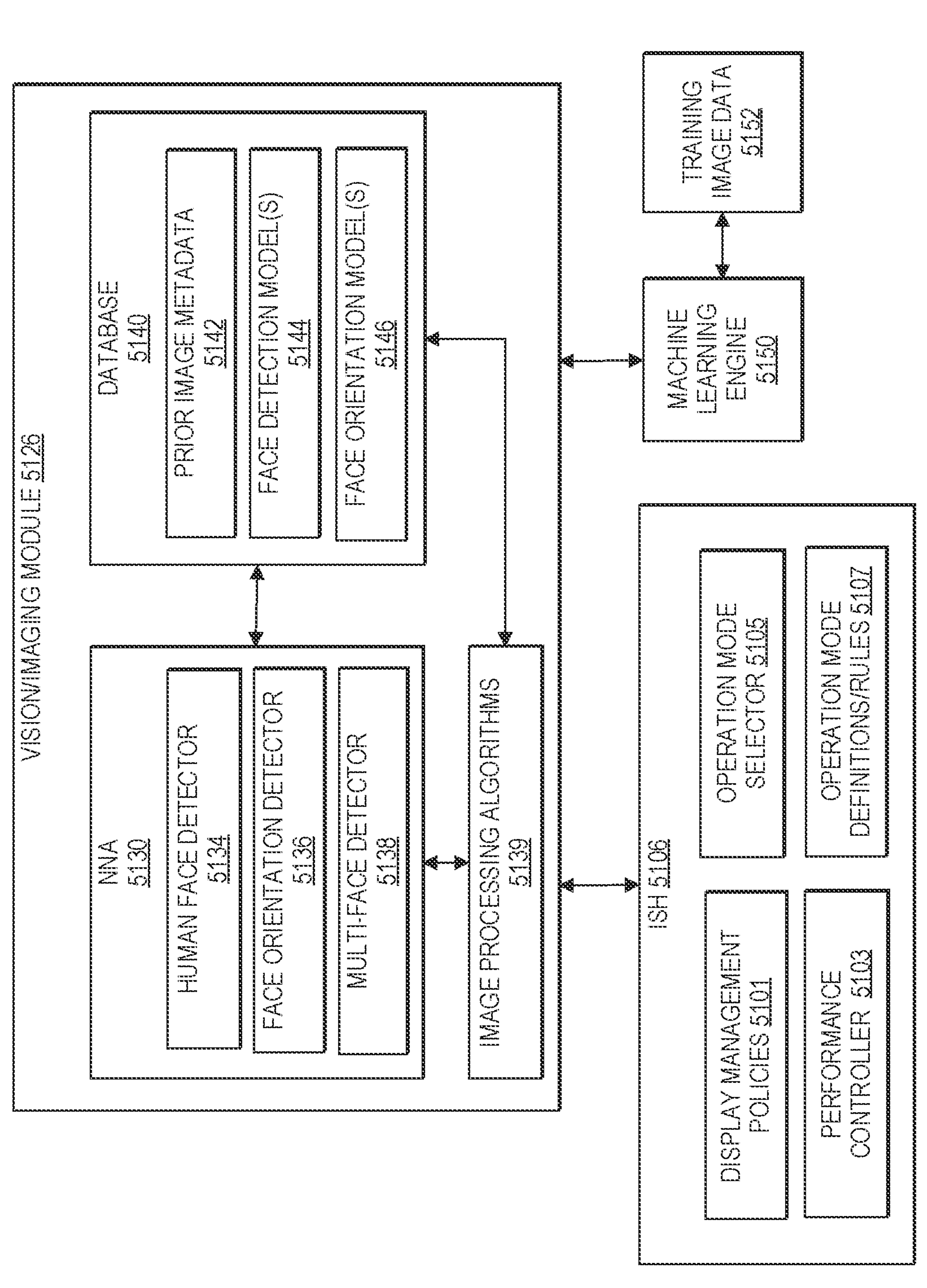
FIG. 52 is a simplified block diagram illustrating additional details of the components of FIG. 51 according to at least one embodiment.

FIG. 52 is a block diagram illustrating additional possible details of vision/imaging module 5126 of vision-based analyzer IC 5120 and integrated sensor hub (ISH) 5106 of SoC 5102. Vision/imaging module 5126 can include NNA 5130, database 5140, and image processing algorithms 5139. ISH 5106 can include display management policies 5101, performance controller 5103, an operation mode selector 5105, and operation mode definitions/rules 5107.

NNA 5130 may implement one or more deep neural networks (DNNs) such as convolutional neural networks (CNNs) that are tuned for human face, head/face orientation, and multi-face detection. In at least one embodiment, neural networks may be implemented using machine learning models that are trained to recognize a human face and the orientation of the face. In at least one example, a machine learning model is trained to identify the orientation of a human face in degrees of rotation. In at least one embodiment the degrees of rotation may be measured from a path between the human face and the display device where the camera is embedded or coupled. A machine learning engine 5150 can train the machine learning models using training image data 5152. The example training image data 5152 can include historical image data for a particular user or users and/or a plurality of other human subjects. Machine learning engine 5150 may run in the computing device (e.g., 4605) associated with vision-based analyzer ICs that are using the models, in a local or remote server, in the cloud, or in any other suitable system or device from which the trained models can be provided to or accessed by the appropriate vision-based analyzer ICs, such as vision-based analyzer IC 5120.

Training image data 5152 may be stored in any suitable storage unit or memory. In some examples, training image data 5152 may be stored in the same system or device in which machine learning engine 5150 is stored and/or running. In other examples, the training image data 5152 may be stored external to the system or device in which machine learning engine 5150 is stored and/or running, but may be in a location that is accessible to machine learning engine 5150.

Trained models may be stored in database 5140 to be used by NNA 5130 to detect a human face (or faces) and to determine the orientation of a human face. For example, a face detection model(s) 5144 and a face orientation model(s) 5146 may be stored in database 5140.

In one or more examples, NNA 5130 can include a human face detector 5134, a face orientation detector 5136, and a multi-face detector 5138. Human face detector 5134 may use face detection model(s) 5144 to identify a human face from image sensor data generated by user-facing camera 5114 from its unique imaging FoV, which surrounds a front portion of the display device in which vision-based analyzer IC 5120 is disposed. Detecting a human face in the image sensor data is an indication that a user is present in the imaging FoV. Not detecting a human face in the image sensor data is an indication that a user is not present (or is absent) in the imaging FoV. Human face detector 5134 may also generate information that can be used to determine the distance of the detected user's face from the camera that generated the image sensor data. In one example, a neural network of human face detector 5134 may be trained to predict a bounding box of a human head as part of detecting a human face. Once a bounding box has been determined and the human face has been recognized, the distance of the user (e.g., the user's face) to the camera can be determined based on the size of the bounding box. In some implementations, this determination may be made by NNA 5130. In other implementations, the bounding box information may be provided to image processing algorithms 5139 to determine the distance of a detected human face to the camera associated with the display device.

If a human face is detected, face orientation detector 5136 may use face orientation model(s) 5146 to determine the orientation of the face. In one example, the orientation of the face may be provided in degrees relative to a path between user facing camera 5114 and the detected human face. The face orientation may be determined based on identification of facial features in the image sensor data (e.g., number of ears visible, number of eyes visible). The face orientation can be used to infer whether the user is engaged or disengaged with the particular display device associated with the camera that generated the image sensor data. In one example as previously described herein, if the user's face orientation is within a level one area, then it may be inferred that the user is engaged with the display device associated with camera 5114. If the user's face orientation is within a level two area, then it may be inferred that the user is not engaged with the display device associated with camera 5114, but may be engaged with another display device docked or otherwise connected to the same computing device. If the user's face orientation is within a level three area, then it may be inferred that the user is not engaged with the display device associated with camera 5114 or any other display device docked or otherwise connected to the same computing device. In some implementations, these inferences may be determined by NNA 5130. In other implementations, these inferences may be determined by image processing algorithms 5139.

In one or more embodiments, NNA 5130 may also include multi-face detector 5138 to detect multiple faces within image sensor data generated by user-facing camera 5114 from its unique imaging FoV. In at least one embodiment, face detection model(s) 5144 may be trained to detect multiple human faces in image sensor data of a single image. In other embodiments, face detection model(s) 5144 may be trained to detect a single human face and another model may be trained for multi-face detection. When multiple human faces are detected, in at least one embodiment, each detected face may be analyzed to determine face orientation, and to infer whether the user associated with the detected face is engaged in the display device. Dimming and/or turning off a display panel of the display device associated with camera 5114 may be done only if all of the detected human faces are determined to be disengaged with the display device.

Image processing algorithms 5139 may be provided in vision imaging module 5126 as part of NNA 5130 or separately implemented. Image processing algorithms 5139 may be implemented in circuitry and may include hardware, firmware, software, or any suitable combination thereof. Image processing algorithms 5139 may use information generated by human face detector 5134, face orientation detector 5136, and multi-face detector 5138 based on a current frame of image sensor data to generate new image metadata for an image captured by camera 5114. The new image metadata can indicate whether a user is present, not present, engaged, or not engaged in current image sensor data representing the captured image. Once the new image metadata has been generated, image processing algorithms 5139 may compare the new image metadata with prior image metadata 5142 stored in database 5140 to determine whether any changes between the two image metadata binaries (or files) indicate that an event has occurred that is relevant to a user's presence, absence, engagement or disengagement with the display device associated with camera 5114. Prior image metadata 5142 can represent image metadata that was generated based on a frame of image sensor data received by vision/imaging module 5126 immediately prior to receiving the frame of image sensor data from which the new image metadata was generated.

If it is determined that an event has occurred based on the comparison, then vision/imaging module 5126 can store a copy of the new image metadata in database 5140 as prior image metadata 5142 and send the new image metadata to ISH 5106. If it is determined that no events have occurred based on the comparison, then the new image metadata may not be sent to ISH 5106 in at least one embodiment, in order to save processing resources. However, the new image metadata may still be stored in database 5140 as prior image metadata 5142.

In one or more embodiments, ISH 5106 of SoC 5102 is configured to receive image metadata from vision/imaging module 5126, to apply the appropriate policy based on the image metadata, to select the appropriate operation mode for the display device associated with the received image metadata and possibly the computing device to which the display device is docked or otherwise connected, and to adjust performance parameters based on the selected operation mode, if needed.

Operation mode definitions/rules 5107 may include various operation modes that may be applied to each display device (e.g., 4610, 4620, 4630) separately based on the image metadata that is generated for each display device. Based on the image metadata and applicable policy for the received metadata, an appropriate operation mode can be selected and applied to the display device associated with the received image metadata. In one example, operation modes that may be applied to a particular display device can include, but are not necessarily limited to:

- Engaged Operation Mode—Image metadata indicates user is present and engaged—user is detected and gaze direction is in a level one area relative to the display device (e.g., user may be reading or watching a video on the display device);
- Adaptive Dimming Operation Mode (regular or aggressive)—Image metadata indicates user is present and disengaged—user is detected but is not engaged with display device (but may be engaged with another display device in the computing system); and
- Absent Operation Mode—Image metadata indicates user is not present or user face is undetectable—user face is not detected It should be noted that other operation modes may also be used, such as operation modes for an SoC or other processing element of a computing device. These other operation modes may be used in conjunction with the operation modes for display devices as described herein.

In one or more embodiments, a performance controller 5103 may control performance parameters governing the power consumption, performance, and/or system responsiveness of computing device 4605 and the multiple display devices 4610, 4620, and 4630 docked or otherwise connected to the computing device. The performance parameters may be adjusted in response to a determination of the presence and/or engagement of a user with one or more display devices 4610, 4620, 4630 in computing system 4600. For instance, performance controller 5103 may control performance parameters to wake the system when one of the display devices in the system detects a user approaching, and may trigger a face-based authentication. In another instance, performance controller 5103 may control performance parameters to dim the backlight for a particular display device if the user is determined to not be engaged with that particular display device. The backlight may be progressively dimmed (e.g., brightness of a backlight is reduced) based on predetermined periods of time during which the user does not engage with the display device. In another example, performance controller 5103 may control performance parameters to lock a computing system quickly upon determining that the user has walked away from the multiple displays in a computing system. In yet another example, performance controller 5103 may control performance parameters to override any attempts by the SoC to lock the system if at least one of the display devices of the computing system detects a user that is present and engaged even if the user is not interacting with a user interface such as a keyboard, a mouse, a touch pad, etc.

Various display management policies 5101 may be implemented by SoC 5102 based on image metadata received from vision/imaging module 5126. Example display management policies 5101 may include, but are not necessarily limited to a Wake on Face policy, an Adaptive Dimming policy, a No Lock on Presence policy, and a Lock on Absence policy. In a multiple display computing system, a Wake on Face policy can be invoked as a user approaches the computing system and enters a field of view of one or more of the cameras associated with each display device. When a Wake on Face policy is invoked, the computing system wakes and a face-based authentication (e.g., Windows Hello® authentication software) is triggered. Thus, the computing system is ready before the user is seated in front of any of the display devices or interacting (e.g., via user interface mechanisms, voice) with the computing system. For multiple display computing systems, the display device with which the user first engages (e.g., by directing her attention to that display device) triggers the computing system to wake up. Other display devices in the multiple display computing system remain off until the user has successfully logged into the computing system. The Wake on Face multiple display policy covers more real estate in which the user approaches and looks at the computing system. Because each display device has an associated camera with a different imaging field of view, the area around a multiple display computing system in which movement and light can be sensed and from which images can be captured is expanded relative to a single display computing system. This creates a more robust solution, especially for users who may enter a workspace from different directions.

In one or more embodiments, an Adaptive Dimming policy may be invoked in a multiple display computing system to progressively dim a backlight of a display panel over a defined period of time when the user is not attentive, and further turning off the display device when the user is no longer present. When an Adaptive Dimming policy is invoked, a regular or aggressive dimming operation mode may be selected for the particular display device. Significant battery life gains can be achieved by implementing this policy. Power savings and responsiveness can be optimized per display device for each display device in which a vision-based analyzer IC is implemented. For example, when a user is engaged and looking at a first display device directly in front of the user, the policy can be tuned to dim the display on any other display that the user is not looking at. In one implementation, the adaptive dimming policy can include progressively dimming over a period of time the display panel from which the user has disengaged, and turning off the display panel from which the user's face turned away (e.g., face orientation >90° in either direction). This policy can be applied to any number of additional external display devices with an integrated or add-on vision-based analyzer IC 5120 (or LCH 155, 260, 305, 954, 1705, 1860, 2830A, 2830B, etc.). Along with dimming and turning off the display panels of the display devices, a refresh rate can also be managed. For example, the refresh rate can be lowered for any display panel from which the user is disengaged. Thus, SoC 5102 can apply the adaptive dimming policy to reduce the refresh rate and reduce rendering, to optimize performance.

In one or more embodiments a No Lock on Presence policy may be invoked in a multiple display computing system to prevent the computing system from locking and the display device from turning off when the user is present, even if the user is not actively typing or moving the mouse or if the user is disengaged. When a No Lock on Presence policy is invoked, an engaged operation mode may be selected (or not changed) for the particular display device if the user is still engaged. This scenario may occur, for example, when the user is reading a long document or watching an embedded video. If the user is disengaged, then the disengaged operation mode may be selected (or not changed) for the particular display, but the no lock on presence policy may be invoked to prevent the computing system from locking and to prevent the backlight from turning off completely. Thus, in at least one embodiment of a multiple display computing system, the computing system will not lock if image metadata from at least one display device indicates that the user is present and either engaged (e.g., face orientation between ≤45° in either direction) or disengaged (e.g., face orientation >45° but 90° in either direction).

In one or more embodiments a Lock on Absence policy may be invoked in a multiple display computing system to turn off the display devices and lock the computing system quickly when the user walks away instead of waiting for an inactivity timeout to expire. When a Lock on Absence policy is invoked, an absent operation mode may be selected for each particular display device. Inactivity timeouts are commonly around five minutes and may be performed based on lack of user interaction with the computing system (e.g., via a user interface such as a mouse, touchpad). Inactivity timeouts may not occur at all when certain applications are running (e.g., embedded videos). In one or more embodiments, a multiple display computing system may be configured to lock the computing system and turn off all display devices when all display devices indicate that the user is not present (e.g., no user presence or face orientation >90° in either direction).

Embodiments of display management for multiple display computing systems provide an enhanced user experience. With better accuracy from additional user presence inputs, embodiments allow for detection when a user approaches their system much quickly and more seamlessly because the first display that can detect a user approaching can wake the system. Additionally, there is greater accuracy in multiple inputs. Adaptive dimming provides significant energy and power savings to turn off either the laptop display or the additional external displays that the user is not engaged with. This savings can be on the order of 50-100 W. This significant energy savings can also apply to wireless display scenarios.

Because embodiments of display management of multiple display computing systems allow refresh rates and rendering to be reduced by not having to drive additional external monitors when a user is disengaged from one or more of those external monitors, performance can be optimized. Typically, high resolutions displays translates to high costs including render tax on GPU overhead to process and render, display tax on graphics and display engine to compose and transmit data, and the CPU budget impact on thermally constrained form factors. Analysis with battery life measurement tools have indicated a ≥50% performance loss when attached to an external 4K display.

Not having to drive an additional display device unnecessarily can reduce rendering and refresh rates significantly. By opportunistically reducing the refresh rate and display rendering when the user is disengaged or not present, display power and energy can meet (and even exceed) certain state certifications (e.g., California Energy Commission and Energy Star standards). In addition, along with optimizing the user experience for certain features (e.g., Wake-on-Face, Adaptive Dimming, No Lock on Presence, and Lock on Absence), issues on correlation policies can be appropriately handled. Correlation policies can include when there are user input events (HID) correlated with whether the user is present and engaged, disengaged or not present, embodiments can solve this problem for multiple display computing system scenarios, to accurately indicate if the user is present and engaged or disengaged/not present without having to wait for user input events. In particular, embodiments can indicate which display is not correlated to manage power, energy, and performance effectively.

Turning to FIGS. 53-58, simplified flowcharts represent example hardware logic, machine-readable instructions, firmware, software, or any suitable combination thereof that may be associated with an embodiment of multiple display computing system 4600 in which user presence and attentiveness-based display management is implemented. In at least one embodiment, a set of operations corresponds to the activities shown in flowcharts of FIGS. 53-58. In one example, a lid control hub (e.g., 155, 260, 305, 954, 1705, 1860, 2830A, 2830B), or a portion thereof (e.g., vision-based analyzer integrated circuit (e.g., 4640A, 4640B, 4640C, 5120)) may utilize or perform at least some of the operations, and an SoC (e.g., 140, 240, 340, 914, 1840, 2840A, 2840B, 4608, 5102) may utilize or perform at least some of the operations. For ease of illustration, the flowcharts of FIGS. 53-58 may be described with reference to components of FIGS. 46 and 51, but it should be appreciated and understood that these components have been further illustrated and described throughout this application and that one or more of those illustrations and descriptions are applicable to the components referenced with respect to FIGS. 53-58.

Figure 53:
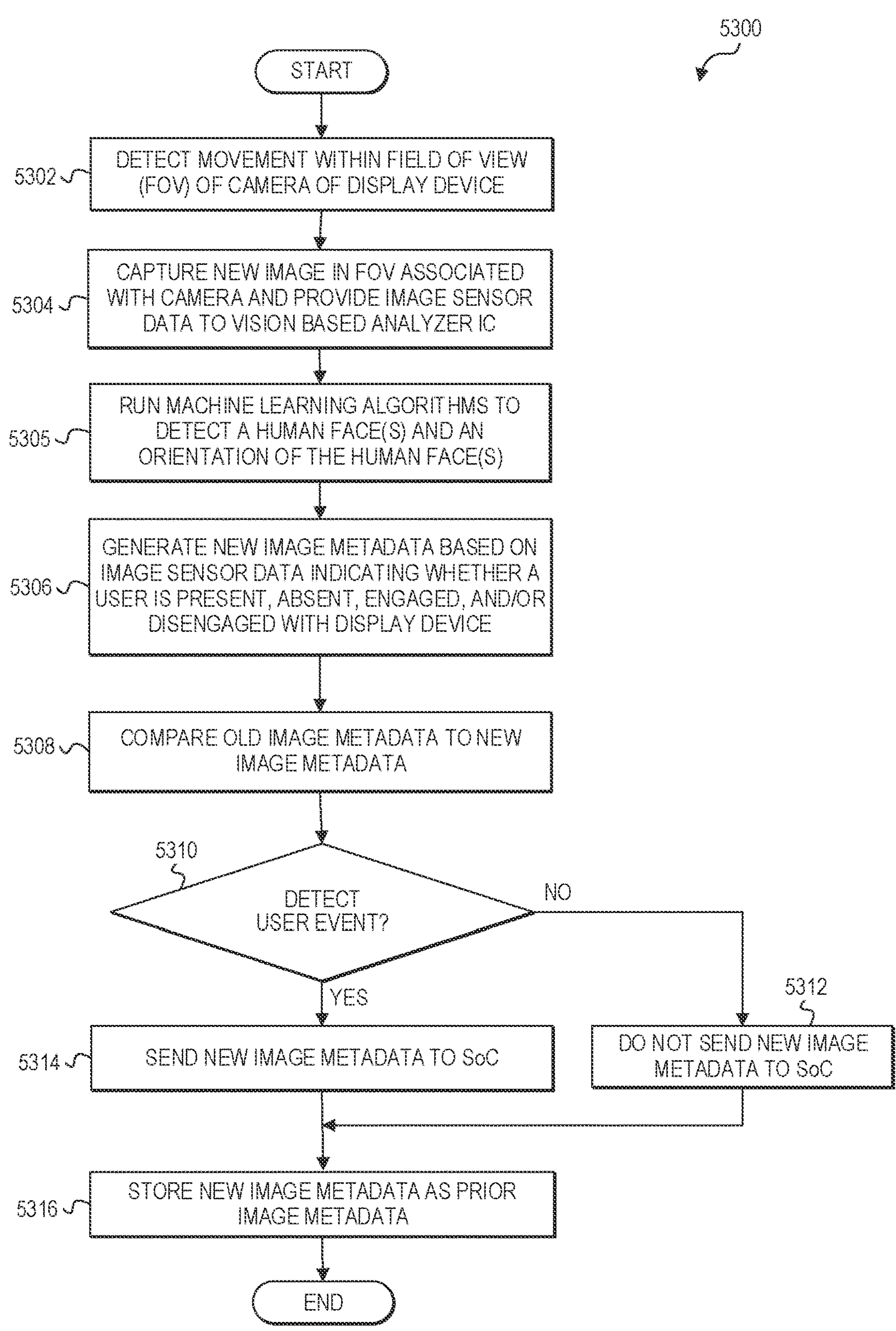
FIG. 53 is a high-level flowchart of an example process that may be associated with a lid controller hub according to at least one embodiment.

FIG. 53 is a high-level flowchart of an example process 5300 associated with detecting user presence in a multiple display computing system (e.g., 4600) according to at least one embodiment. In at least one embodiment, a set of operations corresponds to the activities of example process 5300. In one example, the operations may be performed by vision/imaging module (e.g., 172, 263, 363, 1740, 1863, 2832A, 2832B, 5126) disposed in a display device (e.g., 241, 341, 4610, 4620, 4630, 5110) of a multiple display computing system and a camera (e.g., 4614, 5114) associated with the display device. More specifically, a neural network accelerator (e.g., 276, 327, 1740, 1863, 2834A, 2834B, 5130) may perform one or more of the operations.

At 5302, movement within a field of view (FoV) of camera 5114 associated with display device 5110 may be detected. In some implementations, detecting movement may be performed by an imaging sensor that is integrated with the camera or communicatively coupled to camera 5114. At 5304, the camera captures a new image (or frame) in the FoV associated with the camera. The camera generates image sensor data for the new image (or frame) and the image sensor data is provided to vision-based analyzer IC 5120, which is associated with display device 5110. More specifically, in at least one embodiment, the image sensor data is provided to neural network accelerator 5130 to perform user presence detection, face detection, face orientation detection, and possibly multi-face detection.

At 5305, NNA 5130 may run one or more machine learning algorithms to detect a human face(s) and, if a human face is detected, an orientation of the human face(s). At 5306, vision/imaging module 5126 may generate new image metadata based on face, user presence, and head orientation detection performed by NNA 5130. The new image metadata may include, for example, an indication of whether a user is present or absent from the new image captured in front of display device 5110 by camera 5114. Presence of the user may be determined based on face detection. If a human face is detected, then a user is present. If a user is determined to be present, then head orientation new image metadata may also include an indication of whether the user is engaged with the display device 5110 associated with the camera or disengaged (e.g., passively engaged) with display device 5110.

At 5308, the new image metadata may be compared to prior image metadata to determine whether any user events have occurred since the prior image associated with the prior image metadata was captured. To determine whether a user event has occurred, the new image metadata that was generated based on image sensor data of a new image captured by camera 5114 can be compared to stored prior image metadata that was previously generated based on image sensor data of an image captured prior to the new image being captured. Thus, the new image metadata is compared to the prior image metadata to identify differences and determine if those differences correspond to a user event. A user event may occur when a change in user presence is detected in the new image metadata as compared to the prior image data. For example, a user may not be present in the prior image but a user may be present in the new image, or a user may be present in the prior image but a user may not be present in the new image. Another user event that may occur is when the face orientation of a user changes. In this scenario, a human face would have been detected in the prior image and the orientation of the face may have been identified. If the new image metadata indicates that the face orientation of the detected user is different than the face orientation indicated in the prior image metadata, then a user event has occurred. For example, the prior image metadata may indicate the user was not engaged with the display device (which is determined based on face orientation) and the new image metadata may indicate the user is engaged with the display device (which is determined based on face orientation), or vice versa.

At 5310, a determination is made as to whether a user event has occurred based on the comparison performed in 5308. If a user event has not occurred (e.g., the prior image metadata and the new image metadata are the same), then at 5312, as an optimization, the new image metadata may not be sent to SoC 5102. If it is determined that a user event has occurred based on the comparison performed in 5308, then at 5314, the new image metadata is sent to SoC 5102 to determine an operation mode for the display device (and possibly the computing device to which the display device is connected). At 5316, the new image metadata may be stored as prior image metadata for comparison against the next new image metadata to be generated for the display device.

FIG. 54 is a high-level flowchart of an example process 5400 associated with processing new image sensor data in a multiple display computing system (e.g., 4600) to detect user presence, a human face(s), and head/face orientation according to at least one embodiment. Example process 5400 may provide additional details associated with one or more operations (e.g., 5305, 5306) of process 5300 in FIG. 53. In at least one embodiment, a set of operations corresponds to the activities of example process 5400. In one example, at least some of the operations may be performed by a neural network accelerator (e.g., 276, 327, 1740, 1863, 2834A 2834B, 5130) and possibly image processing algorithms 5139 in a vision/imaging module (e.g., 172, 263, 363, 1740, 1863, 2832A, 2832B, 5126) of a vision-based analyzer IC (e.g., 4640A, 4640B, 4640C, 5120).

At 5402, NNA 5130 can run one or more machine learning algorithms on image sensor data of a new image captured by camera 5114 associated with display device 5110. One example machine learning algorithm may be neural network models trained to detect human faces and, when executed, can detect whether a human face is present in the image sensor data. At 5404, a determination is made as to whether a human face was detected in the image sensor data by the neural network model for face detection. If a human face was not detected, then at 5406, new image metadata is generated to indicate that no user is present. The new image metadata may also indicate that no user is engaged with display device 5110.

If it is determined at 5404 that a human face was detected in the image sensor data by the neural network model for face detection, then at 5408, another machine learning algorithm may be run to determine the head/face orientation of the detected human face. One example machine learning algorithm may be a neural network model trained to detect the orientation of a human face (e.g., in degrees) and, when executed, can detect the orientation of the detected human face in the image sensor data. In at least one embodiment, the face orientation may be determined in degrees of rotation relative to a direct display path defined between the user's face and the display device The direct display path may be calculated from the detected face to a center of a display panel of the display device, to the camera that captured the image, or any other suitable point associated with the display device.

At 5410, the user's face orientation can be evaluated to determine if it is within a maximum angle of rotation for engagement with display device 5110 to be inferred. In one example the maximum angle of rotation is a first-level maximum of angle of rotation (e.g., 45°) of the user's face in either direction relative to the direct display path between the user's face and display device 5110 (e.g., at a center of the display panel of the display device, at the camera, or any other suitable location on display device).

At 5412, if the user's face orientation is determined to be within the first-level maximum angle of rotation (e.g., 45°), then an inference can be made that the user is engaged with the display panel of display device 5110 (e.g., the user may be reading or viewing something on the display panel). In this scenario, at 5416, new image metadata is generated to indicate that a user is present and that the user is engaged with display device 5110.

If the user's face orientation is determined to be greater than the first-level maximum angle of rotation but not greater than a second-level maximum angle of rotation (e.g., 90°), then it can be inferred that the user is disengaged from the display panel of display device 5110, but may be engaged with another display panel in the computing system to which display device 5110 is docked or otherwise connected. In this scenario, at 5414, new image metadata is generated to indicate that a user is present but that the user is not engaged (i.e., disengaged) with display device 5110.

It should be noted that if the user's face orientation is greater than the second-level maximum angle of rotation or is otherwise not detectable, then the user may be determined to be not present, as evaluated at 5406.

It should also be noted that, in another embodiment, the determination of whether the user's face orientation is within a particular threshold level of rotation to infer engagement or disengagement, could be made by the SoC (e.g., 5102). In this embodiment, the metadata could include an indication of the determined face orientation and this information could be used by the SoC to determine whether the user was engaged or disengaged from the display device.

Figure 55:
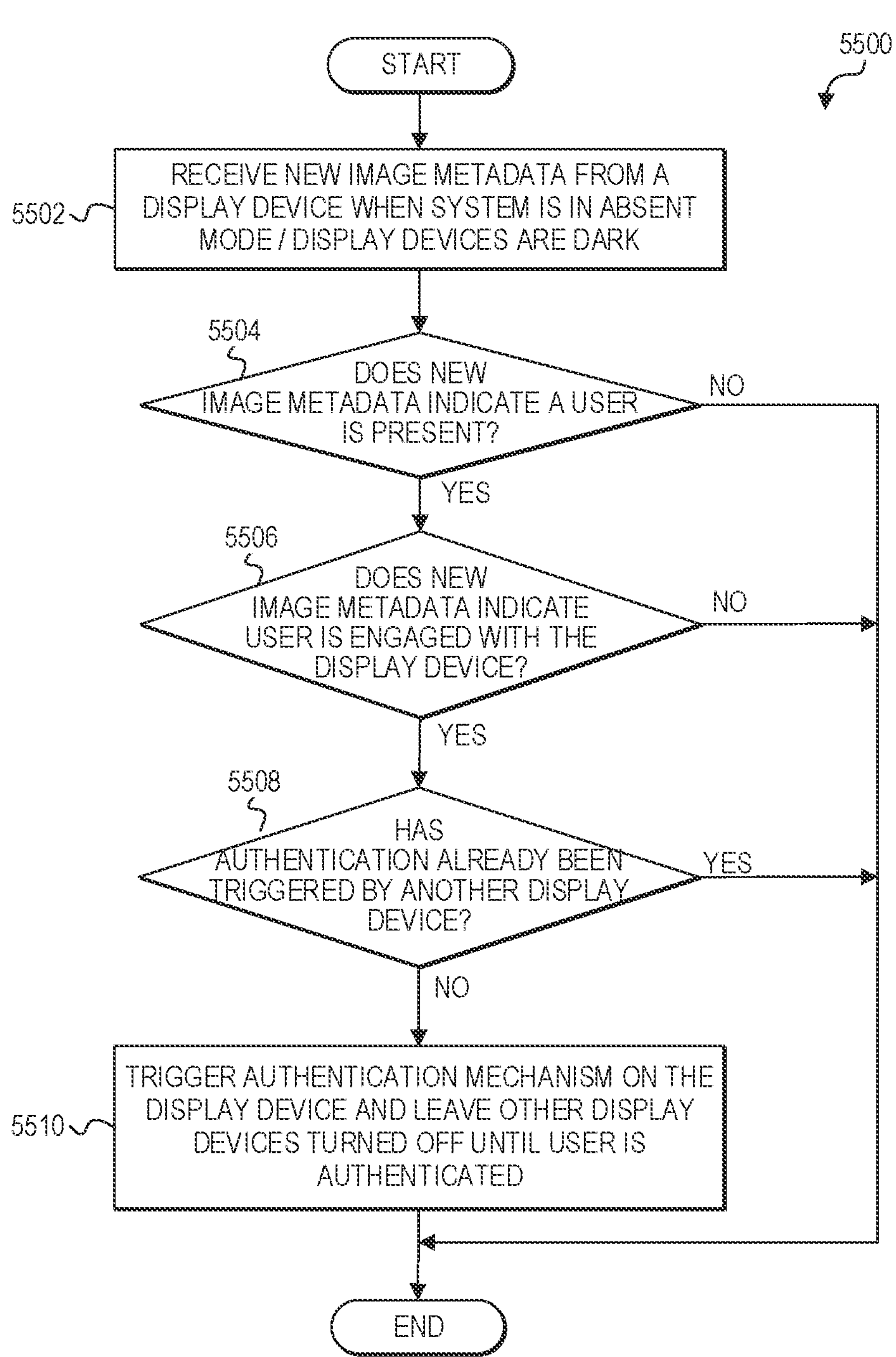
FIG. 55 is a simplified flowchart of an example process that may be associated with triggering an authentication mechanism according to at least one embodiment.

FIG. 55 is a high level flowchart of an example process 5500 associated with processing new image metadata generated by a vision-based analyzer IC (e.g., 5120) of a display device (e.g., 5110) in a multiple display computing system (e.g., 4600). In at least one embodiment, a set of operations and/or instructions corresponds to the activities of example process 5500 for receiving new image metadata generated by a vision-based analyzer IC (or LCH) in a computing system when the computing system is locked (e.g., in an absent operation mode) and applying a Wake on Face policy if applicable. In one example, at least some of the operations may be performed by an SoC (e.g., 140, 240, 340, 914, 1840, 2840A, 2840B, 4140, 5102, 4608) of a multiple display computing system (e.g., 4600). In a more specific example, one or more operations of process 5500 may be performed by integrated sensor hub (e.g., 242, 342, 1790, 1842, 5106) of the SoC.

At 5502, new image metadata is received by SoC 5102 of a multiple display computing system from vision-based analyzer IC 5120 in display device 5110, when the display device is turned off (e.g., no backlight is provided to the display panels) and the computing system is locked. In at least one embodiment, a computing system may be locked when an absent operation mode is selected for all of the display devices.

At 5504, a determination is made as to whether the new image metadata indicates a user is present. A user may be indicated as present in the metadata if the machine learning algorithms (e.g., NNA 5130) detected a human face in image sensor data of a new image captured by camera 5114. If the new image metadata does not indicate that a user is present, then display device 5110 remains turned off and the computing system remains locked.

If the new image metadata indicates that a user is present, then at 5506 a determination is made as to whether the new image metadata indicates that the user is engaged with the display device. The new image metadata may indicate that the user is engaged with the display device if it was determined that the user's face orientation (e.g., relative to a direct display path to the display device) is not greater than a first-level maximum angle of rotation in either direction. If the new image metadata does not indicate that the user is engaged with the display device, then display device 5110 remains turned off and the computing system remains locked. However, the user may be engaged with another display device in the multiple display computing system and if so, new image metadata received from that other display device (which would indicate that the user is present and engaged with that display device) may cause the SoC to trigger an authentication mechanism.

At 5506, if the new image metadata indicates that the user is engaged with the display device, then at 5508 a determination can be made as to whether another display device in the multiple display computing system has already caused an authentication mechanism to be triggered by SoC 5102. If so, then display device 5110 remains turned off until the user is authenticated through the other display device.

If it is determined at 5508 that no other display device in the multiple display computing system has already caused an authentication mechanism to be triggered by SoC 5102, then at 5510, a Wake on Face policy may be invoked and the SoC can trigger the authentication mechanism on display device 5110. The other display devices in the multiple display computing system can remain turned off until the user is authenticated via display device 5110.

Figure 56:
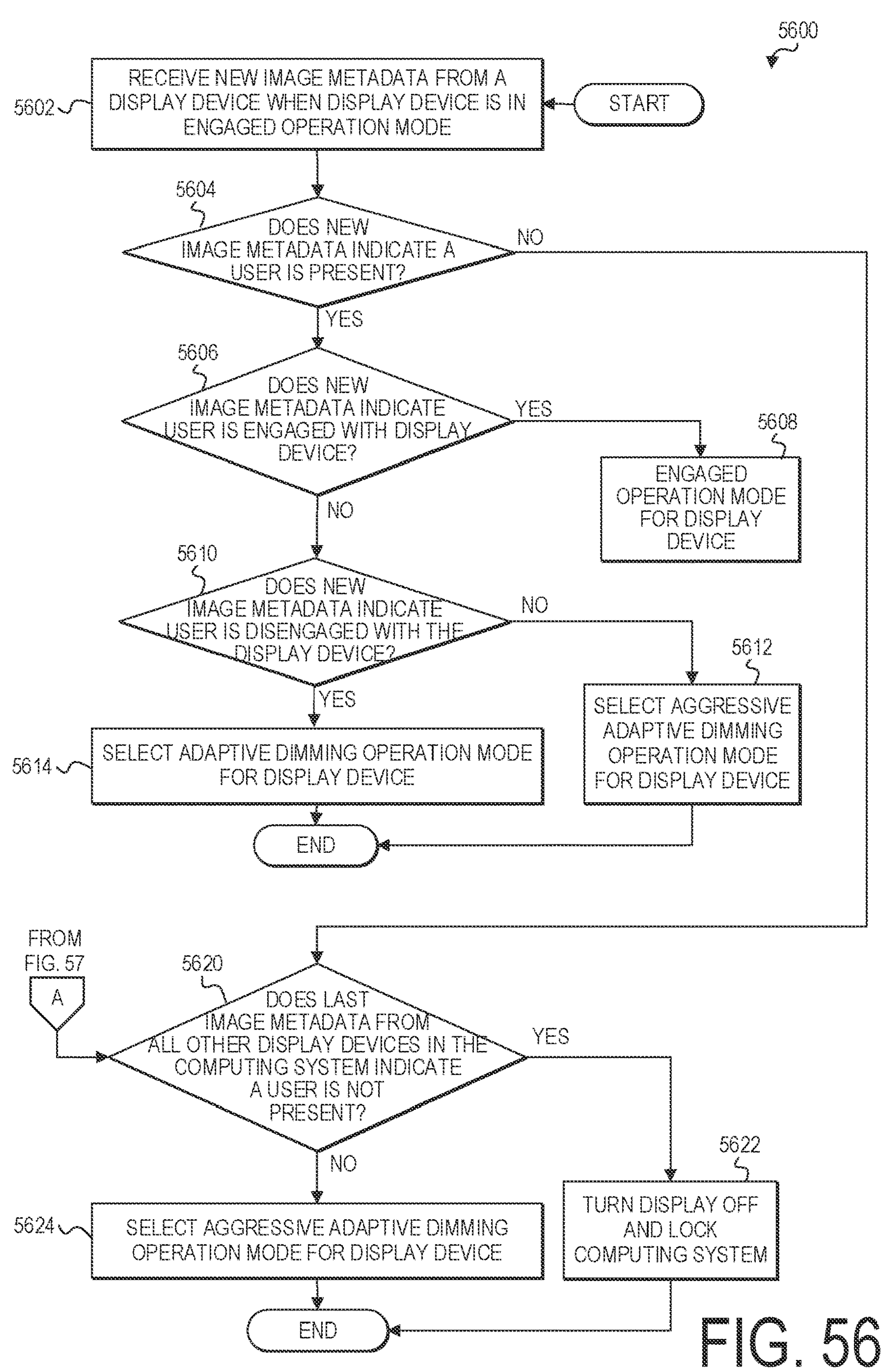
FIG. 56 show a simplified flowchart of an example process that may be associated with adaptively dimming a display panel according to at least one embodiment.

FIG. 56 illustrates a high level flowchart of an example process 5600 associated with processing new image metadata generated by a vision-based analyzer IC (e.g., 5120) of a display device (e.g., 5110) in a multiple display computing system (e.g., 4600). In at least one embodiment, a set of operations corresponds to the activities of example process 5600 for receiving the new image metadata when the display device is in an engaged operation mode (e.g., display panel of display device has default brightness) and invoking a Dimming Policy or Lock on Absence policy, if applicable. In one example, at least some of the operations may be performed by an SoC (e.g., 140, 240, 340, 914, 1840, 2840A, 2840B, 4140, 5102, 4608) of a multiple display computing system (e.g., 4600). In a more specific example, one or more operations of process 5500 may be performed by integrated sensor hub (e.g., 242, 342, 1790, 1842, 5106) of the SoC.

At 5602, new image metadata is received by SoC 5102 of a multiple display computing system from vision-based analyzer IC 5120 in display device 5110, when the display device is in an engaged operation mode (e.g., display panel of display device has default brightness).

At 5604, a determination is made as to whether the new image metadata indicates a user is present. If the new image metadata indicates that a user is present, then at 5606 a determination is made as to whether the new image metadata indicates that the user is engaged with the display device. If the user is engaged with the display device, then the user's face orientation may be in a first-level area (e.g., not greater than a first-level maximum angle of rotation, in either direction). If the new image metadata indicates that the user is engaged with the display device, then as indicated at 5608, the display device remains in the engaged operation mode (e.g., full display brightness or default display brightness).

If a determination is made at 5606 that the new image metadata does not indicate that the user is engaged with display device 5110, then at 5610, a determination is made as to whether the new image metadata indicates that the user is disengaged (but still present) with the display device. If it is determined that the user is disengaged (but still present), then at 5614, an Adaptive Dimming policy may be invoked and a regular dimming operation mode can be selected for display device 5110. In one example, a regular dimming operation mode may reduce the backlight of the display panel of display device 5110 by a predetermined percentage of brightness until a predetermined minimum level of brightness is reached. For example, the brightness of the display panel may be reduced by five percent (5%) after five seconds have passed and then by five percent (5%) per second until twenty percent (20%) is reached. The display panel may remain at twenty percent (20%) brightness until a user event occurs.

If a determination is made at 5610 that the new image metadata indicates that the user is present, but not engaged or disengaged then the user's face orientation may be in a third level area (e.g., greater than a second-level maximum angle of rotation in either direction). Thus, the user's face may be undetectable. Different approaches may desirable by different users in this scenario. Initially, at 5612, an aggressive Adaptive Dimming policy may be invoked and an aggressive dimming operation mode can be selected for display device 5110. In one possible implementation (or system/user configuration), an aggressive dimming operation mode may reduce the backlight of the display panel of display device 5110 by a predetermined percentage of brightness until the backlight is turned off. For example, the brightness of display panel may be reduced by twenty percent (20%) after five seconds have passed, and then by one percent (1%) per second until zero percent (0%) is reached, and the backlight can be turned off. In another possible implementation (or system/user configuration), an aggressive dimming operation mode may reduce the backlight of the display panel of display device 5110 by a predetermined percentage of brightness until the backlight is reduced to a predetermined minimum level of brightness. In the implementation where the backlight is eventually turned off, a no lock on presence policy may be invoked (as will be further described herein) to prevent the computing system from locking while the user is still present, even if the user's face is undetectable. In other implementations, however, the system may be configured to lock after the backlight is turned off if the user's face is undetected (e.g., when user's face orientation is in the third-level area).

With reference again to 5604, if the new image metadata does not indicate that a user is present, then at 5620, an evaluation may be made as to whether a Lock on Absence policy should be invoked. At 5620, a determination is made as to whether the last image metadata received from each of the other display devices in the multiple display computing system indicate that a user is not present. If so, then at 5622, the Lock on Absence policy may be invoked and an absent operation mode may be selected for display device 5110. When the absent operation mode is selected, the display device is turned off and no backlight is provided. When an absent operation mode is selected for display device 5110, and all of the other display devices are already in the absent operation mode (or in an aggressive dimming operation mode), then the SoC of the computing system locks and the user must be authenticated again to unlock and use the computing system.

If it is determined at 5620 that the last image metadata from at least one of the other display devices in the computing system indicates a user is present, then at 5624, an aggressive Adaptive Dimming policy may be invoked and an aggressive dimming operation mode can be selected for display device 5110 as previously described.

Figure 57:
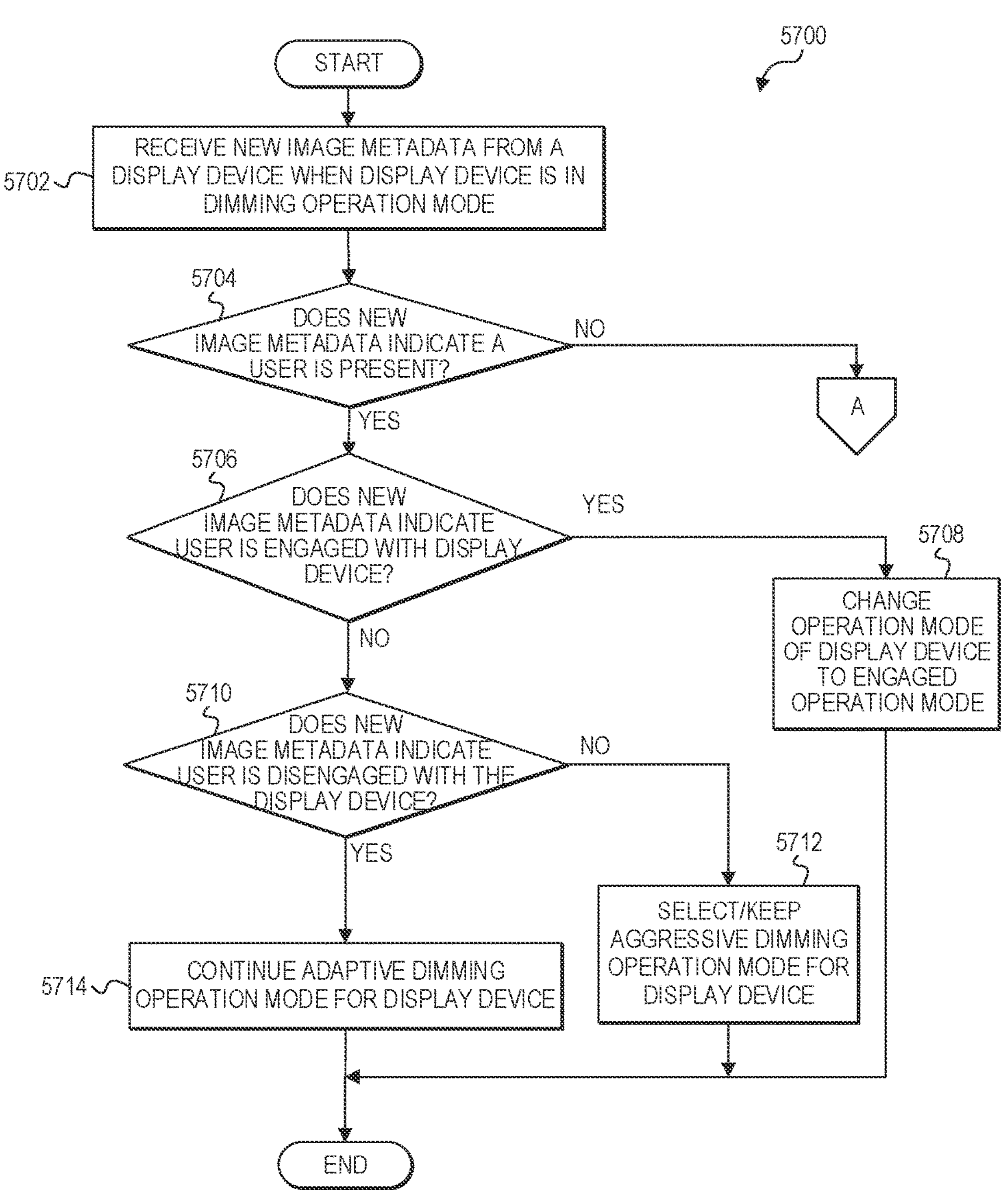
FIG. 57 is a simplified flowchart of an example process that may be associated with adaptively dimming a display panel according to at least one embodiment.

FIG. 57 is a high level flowchart of an example process 5700 associated with processing new image metadata generated by a vision-based analyzer IC (e.g., 5120) of a display device (e.g., 5110) in a multiple display computing system (e.g., 4600). In at least one embodiment, a set of operations corresponds to the activities of example process 5700 for receiving the new image metadata when the display device is in a regular or aggressive dimming operation mode. In one example, at least some of the operations may be performed by an SoC (e.g., 140, 240, 340, 914, 1840, 2840A, 2840B, 4140, 5102, 4608) of a multiple display computing system (e.g., 4600). In a more specific example, one or more operations of process 5700 may be performed by integrated sensor hub (e.g., 242, 342, 1790, 1842, 5106) of the SoC.

At 5702, new image metadata is received by SoC 5102 of a multiple display computing system from vision-based analyzer IC 5120 in display device 5110, when the display device is in a dimming operation mode.

At 5704, a determination is made as to whether the new image metadata indicates a user is present. If the new image metadata indicates that a user is present, then at 5706 a determination is made as to whether the new image metadata indicates that the user is engaged with the display device. If the new image metadata indicates that the user is engaged with the display device, then at 5708, the dimming operation mode for the display device is changed to an engaged operation mode. Thus, brightness of the display panel of display device 5110 may be increased to the full or default display brightness.

If a determination is made at 5706 that the new image metadata does not indicate that the user is engaged with display device 5110, then at 5710, a determination is made as to whether the new image metadata indicates that the user is disengaged with the display device. If the new image metadata indicates that the user is disengaged (but present), then the user's face orientation may be in a second-level area (e.g., greater than a first-level maximum angle of rotation but not greater than a second-level maximum angle of rotation, in either direction). In this scenario, at 5714, display device 5110 remains in the adaptive dimming operation mode as previously described herein.

If a determination is made at 5710 that the new image metadata indicates that the user is not disengaged (but is still present) then the user's face orientation may be in a third level area (e.g., greater than a second-level maximum angle of rotation in either direction). Thus, the user's face may not be detectable. In this scenario, at 5712, if the display device is currently in a regular adaptive dimming operation mode, an aggressive adaptive dimming operation mode can be selected for display device 5110, as previously described herein. Otherwise, if the aggressive adaptive dimming operation mode is already selected for display device 5110, then it remains selected.

With reference again to 5704, if the new image metadata does not indicate that a user is present, then the process may flow to process 5600 of FIG. 56, as indicated by (A), to evaluate whether a Lock on Absence policy should be invoked, as previously described herein.

Figure 58:
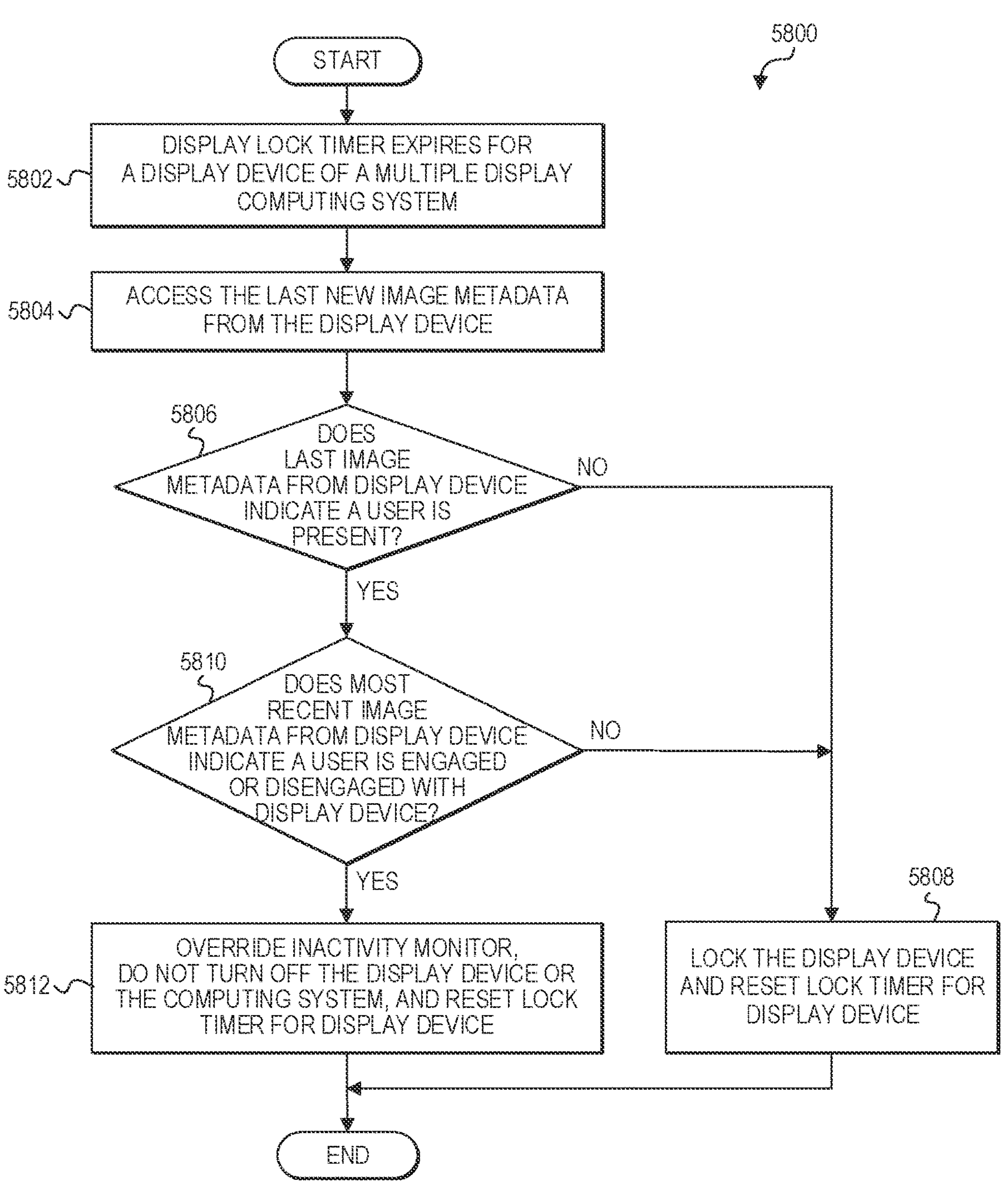
FIG. 58 is simplified flowchart of an example process that may be associated with inactivity timeout for a display device according to at least one embodiment.

FIG. 58 is a high-level flowchart of an example process 5800 associated with an inactivity timeout process for a display device (e.g., 5110) of a multiple display computing system (e.g., 4600). In at least one embodiment, a set of operations and/or instructions corresponds to the activities of example process 5800 for evaluating image metadata generated by a vision-based analyzer IC (or LCH) of a display device and applying a No Lock on Presence policy if applicable. In one example, at least some of the operations may be performed by an SoC (e.g., 140, 240, 340, 914, 1840, 2840A, 2840B, 4140, 5102, 4608) of a multiple display computing system (e.g., 4600). In a more specific example, one or more operations of process 5800 may be performed by integrated sensor hub (e.g., 242, 342, 1790, 1842, 5106) of the SoC.

At 5802, a display lock timer for display device 5110 expires. At 5804, the last image metadata from the display device is accessed. In one or more embodiments, the last image metadata of each display device in a multiple display computing system may be stored in any suitable memory or storage unit until a newer version of image data is received and replaces the currently stored image metadata.

At 5806, a determination is made as to whether the last image metadata from display device 5110 indicates a user is present. If it is determined at 5806 that the last image metadata of display device 5110 indicates that a user is present, then at 5810, a determination is made as to whether the last image metadata from display device 5110 indicates that the user is engaged or disengaged. For example, if the new image metadata indicates that the user is disengaged (but present), then the user's face orientation may be in a second-level area (e.g., greater than a first-level maximum angle of rotation but not greater than a second-level maximum angle of rotation, in either direction). Alternatively, if the last image metadata indicates that the user is engaged with the display device, then user's face orientation may be in a first-level area (e.g., not greater than a first-level maximum angle of rotation, in either direction). In either of these scenarios, the user is still present and at 5812, a No Lock on Presence policy may be invoked and an inactivity monitor can be overridden to prevent display device 5110 from being locked. Instead, display device 5110 remains in whatever mode is currently selected (e.g., engaged operation mode, adaptive dimming operation mode).

If it is determined at 5806 that the last image metadata of display device 5110 indicates that a user is not present, or if it is determined at 5810 that the last image metadata from display device 5110 indicates that a user is not engaged and not disengaged with the display device (i.e., the user is present, but the face is not detectable), then at 5808, an absent operation mode may be selected for the display device and the display device may be turned off (e.g., backlight is turned off) and the computing system may be locked. In addition, the lock timer for display device 5110 may be reset.

The following examples pertain to embodiments in accordance with this specification. Example DA1 provides a computing system comprising: first circuitry in a first display and communicatively coupled to a first camera, the first circuitry to generate first image metadata based on first image sensor data captured by the first camera; second circuitry in a second display device and communicatively coupled to a second camera, the second circuitry to generate second image metadata based on second image sensor data captured by the second camera from a second field of view of the second camera, wherein the first field of view and the second field of view partially overlap; and a processor operably coupled to the first display device and the second display device, where the processor is to: select a first operation mode for the first display device based on the first image metadata; and select a second operation mode for the second display device based on the second image metadata.

Example DA2 comprises the subject matter of Example DA1, and the computing system further includes third circuitry in a third display device, the second circuitry coupled to a third camera and to the processor, the third circuitry: generate third image metadata based on third image sensor data captured from a third field of view by the third camera, where the processor is to: receive the third image metadata from the third display device; and select a third operation mode for the third display device based on the third image metadata.

Example DA3 comprises the subject matter of any one of Examples DA1-DA2, and the first circuitry is further configured to: detect a face of a user in the first image sensor data; determine that the user is present in the first field of view of the first camera based on detecting the face of the user in the first image sensor data; determine, based on the first image sensor data, a first orientation of the face of the user; and determine whether the user is engaged or disengaged with the first display device based, at least in part, on the first orientation of the face of the user.

Example DA4 comprises the subject matter of Example DA3, and the user is determined to be engaged with the first display device based on determining that the face of the user is not rotated more than a first maximum angle of rotation in either direction relative to a first path between the face of the user and the first display device.

Example DA5 comprises the subject matter of any one of Examples DA3-DA4, and based on determining that the user is engaged with the first display device, the first image metadata is to indicate that the user is engaged with the first display device.

Example DA6 comprises the subject matter of any one of Examples DA3-DA5, and the second circuitry is configured to: detect the face of the user in the second image sensor data; and determine that the user is present in the second field of view of the second camera based on detecting the face of the user in the second image sensor data; determine, based on the second image sensor data, a second orientation of the face of the user; and determine whether the user is engaged or disengaged with the second display device based, at least in part, on the second orientation of the face of the user.

Example DA6.5 comprises the subject matter of Example DA6, and the user is determined to be disengaged with the second display device based on determining that the face of the user is rotated, in either direction relative to a second path between the face of the user and the second display device, more than a first maximum angle of rotation and not more than a second angle of rotation.

Example DA7 comprises the subject matter of any one of Examples DA6-DA6.5, and based on determining that the user is disengaged with the second display device, the second image metadata is to indicate that the user is disengaged with the second display device.

Example DA8 comprises the subject matter of any one of Examples DA6-DA7, and the first circuitry is further configured to: execute a machine-learning algorithm to detect the face of the user in the first image sensor data and to determine the first orientation of the face of the user, and the second circuitry is further to execute the machine learning algorithm to detect the face of the user in the second image sensor data and to determine the second orientation of the face of the user.

Example DA9 comprises the subject matter of Example DA8, and the machine learning algorithm includes one or more neural networks trained to recognize human faces and human face orientations.

Example DA10 comprises the subject matter of any one of Examples DA1-DA9, and the processor is further configured to: determine that the first image metadata indicates that a user is present and that the user is engaged with the first display device; determine that access to the computing system is locked; determine that an authentication mechanism is not currently running on the second display device;

trigger the authentication mechanism to authenticate the user via the first display device; and leave the second display device turned off until the user is authenticated.

Example DA11 comprises the subject matter of any one of Examples DA1-DA10, and the processor is further configured to: determine that the second image metadata indicates that a user is present and that the user is disengaged with the second display device, where the second operation mode is to be selected based on determining that the user is disengaged with the second display device; and in response to selecting the second operation mode, progressively reduce a brightness of a backlight for a display panel of the second display device over a time period until a user event occurs or until the backlight is reduced to a predetermined minimum level of brightness.

Example DA12 comprises the subject matter of any one of Examples DA1-DA10, and the processor is further configured to: determine that the second image metadata indicates that a user is present and that a face of the user is not detectable, where the second operation mode is to be selected based on determining that the user is present and that the face of the user is not detectable; and in response to selecting the second operation mode, progressively reduce brightness of a backlight for a display panel of the second display device over a time period until a user event occurs or until the backlight is turned off.

Example DA13 comprises the subject matter of any one of Examples DA1-DA10, and the processor is further configured to: determine that the second image metadata indicates that a user is not present; determine that last image metadata associated with all the other display devices operably coupled to the processor indicate that the user is not present; and in response to selecting the second operation mode: turn off the second display device and all the other display devices operably coupled to the processor; and lock the computing system.

Example DA14 comprises the subject matter of any one of Examples DA1-DA13, and the processor is further configured to determine that a maximum amount of time allowed for inactivity has passed for the first display device, access last image metadata associated with the first display device, and based on determining that the last image metadata associated with the first display device indicates that a user is present, prevent the first display device from being turned off.

Example DA15 comprises the subject matter of any one of Examples DA1-DA14, and the first image metadata is to indicate whether a user is present or not present in the first field of view associated with the first camera and whether the user is engaged or disengaged with the first display device.

Example DA16 comprises the subject matter of any one of Examples DA1-DA14, and the first circuitry is further configured to determine a first event occurred in the first field of view, and in response to determining that the first event occurred in the first field of view, send the first image metadata to the processor.

Example DA17 comprises the subject matter of Example DA16, and the first circuitry is further configured to determine that the first event occurred by comparing the first image metadata to fourth image metadata previously generated by the first circuitry based on other image sensor data captured from the first field of view by the first camera prior to capturing the first image sensor data.

Example DA18 comprises the subject matter any one of Examples DA herein above, and further comprises the features of any one of Examples AB1-AB2, AC1-AC22, AD1-AD10, AI1, BC1-BC12, BG1, BH1-BH7, CA1-CA14, or CD1-CD11 (as far as those features are not redundant with features of Examples DA herein above).

Example DB1 provides a computing system comprising: a computing device including: a lid containing a first display device, the first display device including: a first camera; first circuitry communicatively coupled to the first camera, the first circuitry to generate first image metadata based on first image sensor data captured by the first camera from a first field of view; and a processor operably coupled to the first circuitry in the lid, the processor configured to select a first operation mode for the first display device based on the first image metadata; and a second display device operably coupled to the processor of the computing device, the second display device including: second circuitry communicatively coupled to a second camera associated with the second display device, the second circuitry to generate second image metadata based on second image sensor data captured by the second camera from a second field of view, where the first field of view and the second field of view partially overlap, and where the processor is to select a second operation mode for the second display device based on the second image metadata.

Example DB2 comprises the subject matter of Example DB1, and the first circuitry is configured to detect a face of a user in the first image sensor data, determine that the user is present in the first field of view based on detecting the face of the user in the first image sensor data, determine, based on the first image sensor data, a first orientation of the face of the user, and determine whether the user is engaged or disengaged with the first display device based, at least in part, on the first orientation of the face of the user.

Example DB3 comprises the subject matter of Example DB2, and the user is determined to be engaged with the first display device based on determining that the face of the user is not rotated more than a first maximum angle of rotation in either direction relative to a path between the face of the user and the first display device.

Example DB4 comprises the subject matter of any one of Examples DB2-DB3, and the second circuitry is configured to detect the face of the user in the second image sensor data, and determine that the user is present in the second field of view of the second camera based on detecting the face of the user in the second image sensor data, determine, based on the second image sensor data, a second orientation of the face of the user, and determine whether the user is engaged or disengaged with the second display device based, at least in part, on the second orientation of the face of the use.

Example DB4.5 comprises the subject matter of Example DB4, and the user is determined to be disengaged with the second display device based on determining that the face of the user is rotated, in either direction relative to a second path between the face of the user and the second display device, more than a first maximum angle of rotation and not more than a second angle of rotation.

Example DB5 comprises the subject matter of any one of Examples DB4-DB4.5, and the first circuitry is further configured to execute a machine-learning algorithm to detect the face of the user in the first image sensor data and to determine the first orientation of the face of the user, and the second circuitry is further to execute the machine learning algorithm to detect the face of the user in the second image sensor data and to determine the second orientation of the face of the user.

Example DB6 comprises the subject matter of Example DB5, and the machine learning algorithm includes one or more neural networks trained to recognize human faces and human face orientations, where the human face orientations are represented in degrees of rotation.

Example DB7 comprises the subject matter of any one of Examples DB1-DB6, and the processor is further configured to determine that the first image metadata indicates that a user is present and that the user is engaged with the first display device, determine that access to the computing system is locked, trigger an authentication mechanism to authenticate the user via the first display device, and leave the second display device turned off until the user is authenticated.

Example DB8 comprises the subject matter of any one of Examples DB1-DB7, and the processor is further configured to determine that the second image metadata indicates that a user is present and that the user is disengaged with the second display device, where the second operation mode is to be selected based on determining that the user is disengaged with the second display device, and in response to selecting the second operation mode, progressively reduce a brightness of a backlight for a display panel of the second display device over a time period.

Example DB9 comprises the subject matter of any one of Examples DB1-DB7, and the processor is further configured to determine that the second image metadata indicates that a user is not present, determine that last image metadata associated with all the other display devices operably coupled to the processor indicate that the user is not present, and in response to selecting the second operation mode, turn off the second display device and all the other display devices operably coupled to the processor and lock the computing system.

Example DB10 comprises the subject matter of any one of Examples DB1-DB9, and the processor is further configured to determine that a maximum amount of time allowed for inactivity has passed for the first display device, access last image metadata associated with the first display device, and based on determining that the last image metadata associated with the first display device indicates that a user is present, prevent the first display device from being turned off.

Example DB11 comprises the subject matter of any one of Examples DB1-DB10, and the first image metadata is to indicate whether a user is present or not present in a first field of view associated with the first camera and whether the user is engaged or disengaged with the first display device.

Example DB12 comprises the subject matter of any one of Examples DB1-DB10, and the first circuitry is further configured to determine a first event occurred in the first field of view, and in response to determining that the first event occurred in the first field of view, send the first image metadata to the processor.

Example DB13 comprises the subject matter of Example DB12, and the first circuitry is further configured to determine that the first event occurred by comparing the first image metadata to third image metadata previously generated by the first circuitry based on other image sensor data captured from the first field of view by the first camera prior to capturing the first image sensor data.

Example DB14 comprises the subject matter of any one of Examples DB1-DB13, and the second display device is operably coupled to the computing device via a docking station.

Example DB15 comprises the subject matter any one of Examples DB herein above, and further comprises the features of any one of Examples AB1-AB2, AC1-AC22, AD1-AD10, AI1, BC1-BC12, BG1, BH1-BH7, CA1-CA14, or CD1-CD11 (as far as those features are not redundant with features of Examples DB herein above).

Example DC1 provides an apparatus, comprising circuitry configured to be communicatively coupled to a camera associated with an external monitor and a computing device operably coupled to the external monitor, the circuitry to receive image sensor data captured from a field of view of the camera, detect a face of a user in the image sensor data, determine that the user is present in the field of view of the camera based on detecting the face of the user in the image sensor data, determine an orientation of the face of the user, and determine whether the user is engaged or disengaged with the external monitor based, at least in part, on the orientation of the face of the user, generate image metadata to indicate that the user is present in the field of view of the camera and to further indicate whether the user is engaged or disengaged with the external monitor, and send the image metadata to a processor of the computing device.

Example DC2 comprises the subject matter of Example DC1, and the orientation of the face of the user is to be determined relative to a path between the face of the user and the external monitor.

Example DC3 comprises the subject matter of any one of Examples DC1-DC2, and the circuitry is further configured to, based on the orientation of the face of the user, determine that the face of the user is not rotated more than a first maximum angle of rotation, where, based on a determination that the face of the user is not rotated more than the first maximum angle of rotation, the image metadata is to indicate that the user is engaged with the external monitor.

Example DC4 comprises the subject matter of any one of Examples DC1-DC2, and the circuitry is further configured to: based on the orientation of the face of the user, determine that the face of the user is rotated more than a first maximum angle of rotation but not more than a second maximum angle of rotation, where, based on a determination that the face of the user is rotated more than a first maximum angle of rotation but not more than a second maximum angle of rotation, the image metadata is to indicate that the user is disengaged with external monitor.

Example DC5 comprises the subject matter of any one of Examples DC1-DC2, and the circuitry is further configured to: based on the orientation of the face of the user, determine that the face of the user is rotated more than a second maximum angle of rotation, where, based on a determination that the face of the user is rotated more than a second maximum angle of rotation, the image metadata is to indicate that the user is present and that the face of the user is undetectable.

Example DC6 comprises the subject matter of any one of Examples DC1-DC5, and the circuitry is further configured to execute a machine-learning algorithm to detect the face of the user in the image sensor data and to determine the orientation of the face of the user.

Example DC7 comprises the subject matter of Example DC6, and the machine learning algorithm includes one or more neural networks trained to recognize human faces and human face orientations, where the human face orientations are represented in degrees of rotation.

Example DC8 comprises the subject matter of any one of Examples DC1-DC7, and the circuitry is external to the computing device.

Example DC9 comprises the subject matter of any one of Examples DC1-DC8, and the external monitor is connected to the computing device via a docking station.

Example DC10 comprises the subject matter of any one of Examples DC1-DC9, and the circuitry and the camera are either embedded in the external monitor or removably connected to the external monitor.

Example DC11 comprises the subject matter any one of Examples DC herein above, and further comprises the features of any one of Examples AA1-AA16, AG1, BA1-BA12, BE1, CA1-CA14, or CF1-CF4 (as far as those features are not redundant with features of Examples DC herein above).

Example DD1 provides an apparatus comprising a processor operably coupled to a first display device and a second display device, the processor is to execute one or more instructions to receive first image metadata associated with a first image captured by a first camera from a first field of view proximate the first display device, determine that the first image metadata indicates that a user is present in the first field of view and that the user is engaged with the first display device, receive second image metadata associated with a second image captured by a second camera from a second field of view proximate the second display device, determine that the second image metadata indicates that the user is present in the second field of view and that the user is disengaged with the second display device, select a first operation mode for the first display device based, at least in part, on the first image metadata, and select a second operation mode for the second display device based, at least in part, on the second image metadata Example DD2 comprises the subject matter of Example DD1, and the processor is to execute the one or more instructions further to determine that access to a computing system comprising the processor is locked, determine that an authentication mechanism is not currently running on the second display device, trigger the authentication mechanism to authenticate the user via the first display device, and leave the second display device turned off until the user is authenticated.

Example DD3 comprises the subject matter of any one of Examples DD1-DD2, and the processor is to execute the one or more instructions further to determine that the second image metadata indicates that the user is disengaged with the second display device, and progressively reduce a brightness of a backlight for a display panel of the second display device over a time period.

Example DD4 comprises the subject matter of Example DD3, and the brightness of the backlight is to be progressively reduced until the backlight is either reduced to a predetermined minimum level of brightness or turned off.

Example DD5 comprises the subject matter of any one of Examples DD1-DD4, and the processor is to execute the one or more instructions further to receive third image metadata associated with a third image captured by a third camera from a third field of view proximate a third display device operably coupled to the processor, determine that the third image metadata indicates that the user is not present in the third field of view, determine that last image metadata associated with the first display device indicates that the user is not present in the first field of view and that last image metadata associated with the second display device indicates that the user is not present in the second field of view, select a third operation mode for the third display device, and in response to selecting the third operation mode: turn off the third display device, the first display device, and the second display device, and lock a computing system comprising the processor.

Example DD5.1 comprises the subject matter of any one of Examples DD1-DD6, and the user is determined to be engaged with the first display device based on determining that a face of the user is not rotated more than a first maximum angle of rotation in either direction relative to a first path between the face of the user and the first display device.

Example DD5.2 comprises the subject matter of any one of Examples DD1-DD6.1, and the user is determined to be disengaged with the first display device based on determining that a face of the user is rotated more than a first maximum angle of rotation and less than a second maximum angle of rotation, in either direction relative to a second path between the face of the user and the second display device.

Example DD6 comprises the subject matter of any one of Examples DD1-DD5.2, and the processor is to execute the one or more instructions further to determine that a maximum amount of time allowed for inactivity has passed for the first display device, access last image metadata associated with the first display device, and based on determining that the last image metadata associated with the first display device indicates that the user is present, prevent the first display device from being turned off.

Example DD7 comprises the subject matter any one of Examples DD herein above, and further comprises the features of any one of Examples AA1-AA16, AG1, BA1-BA12, BE1, CA1-CA14, or CF1-CF4 (as far as those features are not redundant with features of Examples DD herein above).

Example DE1 provides a method comprising: generating, by first circuitry coupled to a first camera, first image metadata based on first image sensor data captured by the first camera from a first field of view proximate a first display device; generating, by second circuitry coupled to a second camera, second image metadata based on second image sensor data captured by the second camera from a second field of view proximate a second display device, wherein the first field of view and the second field of view partially overlap; receiving, by a processor of a computing device, the first image metadata from the first circuitry and the second image metadata from the second circuitry; selecting, by the processor, a first operation mode for the first display device based on the first image metadata; and selecting, by the processor, a second operation mode for the second display device based on the second image metadata.

Example DE2 comprises the subject matter of Example DE1, and the method further includes detecting a face of a user in the first image sensor data, determining that the user is present in the first field of view of the first camera based on the detecting the face of the user in the first image sensor data, determining, based on the first image sensor data, a first orientation of the face of the user, and determining whether the user is engaged or disengaged with the first display device based, at least in part, on the first orientation of the face of the user.

Example DE3 comprises the subject matter of Example DE2, and the method further includes determining that the user is engaged with the first display device based on determining that the face of the user is not rotated more than a first maximum angle of rotation in either direction relative to a first path between the face of the user and the first display device.

Example DE4 comprises the subject matter of any one of Examples DE2-DE3, and based on the determining that the user is engaged with the first display device, the first image metadata is generated to indicate that the user is engaged with the first display device.

Example DE5 comprises the subject matter of any one of Examples DE2-DE4, and the second circuitry is to: detecting the face of the user in the second image sensor data; and determining that the user is present in the second field of view of the second camera based on the detecting the face of the user in the second image sensor data; determining, based on the second image sensor data, a second orientation of the face of the user; and determining whether the user is engaged or disengaged with the second display device based, at least in part, on the second orientation of the face of the user.

Example DE5.5 comprises the subject matter of Example DE5, and the method further includes determining that the user is disengaged with the second display device based on determining that the face of the user is rotated more than a first maximum angle of rotation and not more than a second maximum angle of rotation in either direction relative to a second path between the face of the user and the second display device.

Example DE6 comprises the subject matter of any one of Example DE5-DE5.5, and based on the determining that the user is disengaged with the second display device, the second image metadata is generated to indicate that the user is disengaged with the second display device.

Example DE7 comprises the subject matter of any one of Examples DE5-DE6, and the detecting the face of the user in the second image sensor data and the determining the second orientation of the face of the user includes executing one or more machine learning algorithms, and the detecting the face of the user in the first image sensor data and the determining the first orientation of the face of the user includes executing the one or more machine learning algorithms.

Example DE8 comprises the subject matter of Example DE7, and the one or more machine learning algorithms include one or more neural networks trained to recognize human faces and human face orientations.

Example DE9 comprises the subject matter of any one of Examples DE1-DE8, and the method further includes determining that the first image metadata indicates that a user is present and that the user is engaged with the first display device, determining that access to a computing system comprising the processor is locked, determining that an authentication mechanism is not currently running on the second display device, triggering the authentication mechanism to authenticate the user via the first display device, and leaving the second display device turned off until the user is authenticated.

Example DE10 comprises the subject matter of any one of Examples DE1-DE9, and the method further includes: determining that the second image metadata indicates that a user is present and that the user is disengaged with the second display device, where the selecting the second operation mode is based on determining that the user is disengaged with the second display device; and, in response to the selecting the second operation mode, progressively reducing a brightness of a backlight for a display panel of the second display device over a time period.

Example DE11 comprises the subject matter of Example DE10, and the brightness of the backlight is progressively reduced until the backlight is either reduced to a predetermined minimum level of brightness or turned off.

Example DE12 comprises the subject matter of any one of Examples DE1-DE9, and the method further includes: determining that the second image metadata indicates that a user is present and that a face of the user is not detectable, where the selecting the second operation mode is based on the determining that the user is present and that the face of the user is not detectable; and in response to the selecting the second operation mode, progressively reducing a brightness of a backlight for a display panel of the second display device over a time period until either a user event occurs or the backlight is turned off.

Example DE13 comprises the subject matter of any one of Examples DE1-DE9, and the method further includes determining that the second image metadata indicates that a user is not present, determining that last image metadata associated with the first display device indicates that the user is not present, and in response to the selecting the second operation mode: turning off the first display device and the second display device, and locking a computing system comprising the processor.

Example DE14 comprises the subject matter of any one of Examples DE1-DE13, and the method further includes determining that a maximum amount of time allowed for inactivity has passed for the first display device, accessing last image metadata associated with the first display device, and based on determining that the last image metadata associated with the first display device indicates that a user is present, preventing the first display device from being turned off.

Example DE15 comprises the subject matter of any one of Examples DE1-DE14, and the first image metadata indicates whether a user is present or not present in the first field of view associated with the first camera and whether the user is engaged or disengaged with the first display device.

Example DE16 comprises the subject matter of any one of Examples DE1-DE14, and the method further includes determining a first event occurred in the first field of view, and in response to the determining that the first event occurred in the first field of view, sending, from the first circuitry, the first image metadata to the processor.

Example DE17 comprises the subject matter of Example DE16, and the method further includes determining that the first event occurred by comparing the first image metadata to third image metadata previously generated by the first circuitry based on other image sensor data captured from the first field of view by the first camera prior to capturing the first image sensor data.

Example DE18 comprises the subject matter any one of Examples DE herein above, and further comprises the elements of the method of any one of Examples AF1-AF12, BD1-BD11, CB1-CB13, or CE1-CE11 (as far as those method elements are not redundant with method elements of Examples DE herein above).

Example DF1 provides an apparatus, the apparatus comprising means for performing the method of any one of Examples DE1-DE17.

Example DF2 comprises the subject matter of Example DF1, and the means for performing the method comprises at least one processor and at least one memory element.

Example DF3 comprises the subject matter of Example DF2, and the at least one memory element comprises machine-readable instructions that when executed, cause the apparatus to perform the method of any one of the preceding Examples.

Example DF4 comprises the subject matter of any one of Examples DF1-DF3, and the apparatus is one of a computing system, a processing element, or a system-on-a-chip.

Example DF5 comprises the subject matter any one of Examples DF herein above, and further comprises the features of any one of Examples AA1-AA16, AG1, BA1-BA12, BE1, CA1-CA14, or CF1-CF4 (as far as those features are not redundant with features of Examples DF herein above).

Example DG1 provides at least one machine-readable storage medium comprising instructions, where the instructions when executed realize an apparatus, realize a computing system, or implement a method as in any one of the preceding Examples.

Local Contrast Enhancement and Global Dimming of Images

In some embodiments, the power consumption of embedded emissive displays (such as OLED, micro-LED, and QLED displays) in mobile computing devices can be reduced by dimming pixels at the image (frame) level and compensating for the resulting loss of contrast by enhancing the local contrast in the image. The resulting images retain local contrast similar to that of the original image and remain visually appealing to users due to the fact that the human visual system focuses on a region of about two degrees of angular diameter.

In some embodiments, an apparatus, e.g. a timing controller, can enhance a local contrast of individual tiles of a plurality of tiles of an input image to generate an enhanced image. Furthermore, an enhanced image average local contrast value for the enhanced image, and an image average local contrast value for the input image is determined by the apparatus. These parameters are used to determine a global dimming factor. For example, this may involve the apparatus determining a global dimming factor based on the enhanced image average local contrast value and the image average local contrast value. The enhanced image may be dimmed based on the global dimming factor to generate a dimmed enhanced image. The global dimming factor may be for example based on one or more of a dimming aggressiveness level, a display brightness setting of the display on which the dimmed enhanced image is to be displayed, or an ambient light level. In one example implementation, the global dimming factor is determined according to:

$$DF=1.0-AL\cdot(CF-1.0)$$

wherein DF is the global dimming factor, AL is a dimming aggressiveness level, and CF is a contrast enhancement factor determined according to:

$$CF=\frac{\text{enhanced image average local contrast value}}{\text{image average local contrast value}}$$

The apparatus may optionally further generate a final image that is based on the dimmed enhanced image to be displayed on a display. The display may be for example located in a lid of a computing device according to one of the implementations discussed herein above.

Figure 59:
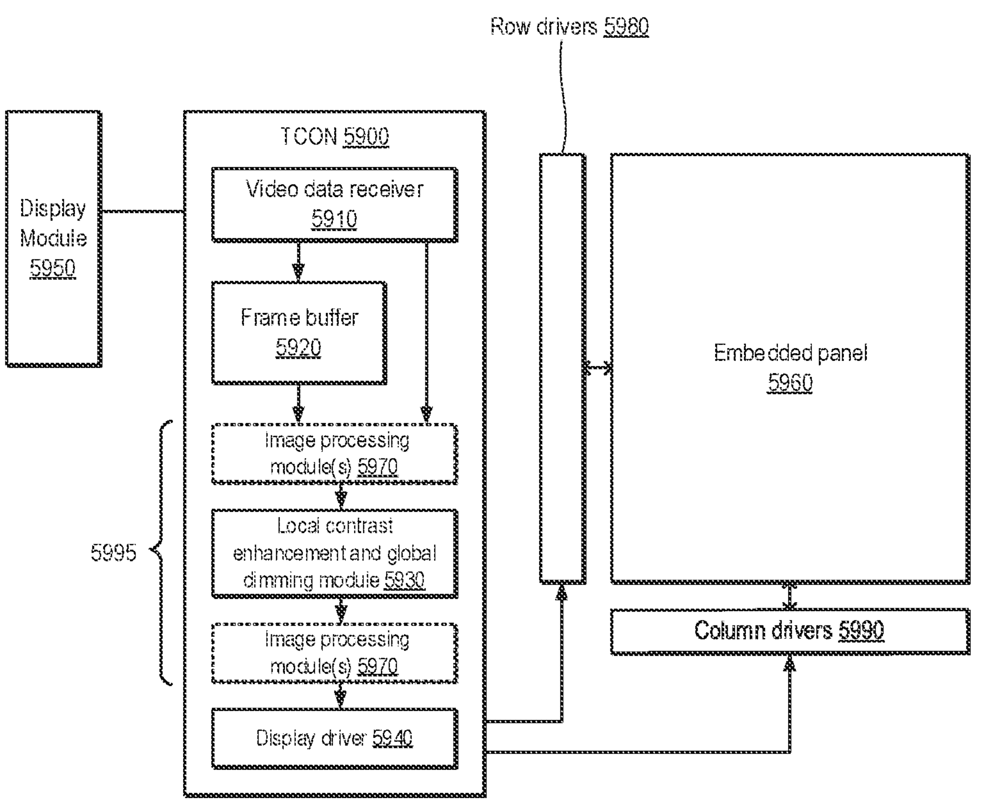
FIG. 59 is a block diagram of an example timing controller comprising a local contrast enhancement and global dimming module.

FIG. 59 illustrates a block diagram of an example timing controller comprising a local contrast enhancement and global dimming module. The timing controller 5900 comprises a video data receiver 5910, a frame buffer 5920, a local contrast enhancement and global dimming module 5930, and a display driver 5940. The timing controller 5900 receives video data from a display module 5950 located in a base of a mobile computing device and drives an embedded panel 5960. The timing controller 5900 and the embedded panel 5960 are located in a lid of the mobile computing device. The display driver 5940 drives display panel controller circuitry, such as row drivers 5980 and column drivers 5990.

In one or more embodiments, the timing controller 5900 represents an example implementation of TCON 150, 250, 355, 2820A, 2820B and the embedded panel 5960 represents an example implementation of embedded display panel 145, 280, 380, 2806A, 2806B, 4612, either of which can be used in an example implementation of lid 120, 220, 301, 1820, 4610, which in turn can be part of an example implementation of mobile computing device (user device) 100, 200, 300, 2800A, 2800B, 4605. In one or more embodiments, the display module 5950 represents an example implementation of display module 241, 341, which can be used in an example implementation of SoC 140, 240, 2840A, 2840B, 4608, which can be located in an example implementation of base 210, 315, 1810, 4606, which in turn can be part of an example implementation of mobile computing device (user device) 100, 200, 300, 2800A, 2800B, 4605.

The local contrast enhancement and global dimming module 5930 enables the power consumed by the display panel 5960 to be reduced by globally dimming the images to be displayed while enhancing their local contrast so that the displayed images have a local contrast similar to that before they were processed by the module 5930. In some embodiments, the local contrast enhancement and global dimming module 5930 is part of a frame processing stack 5995 that comprises one or more image processing modules 5970 located before and/or after the local contrast enhancement and global dimming module 5930 in the stack 5995. The image processing modules 5970 can comprise any of the image processing modules illustrated in FIG. 8 (e.g., modules 822, 824, 825, 826) or FIG. 67 (e.g., modules 6725, 6726, 6728) or any other image processing modules described or referenced herein.

Figure 60:
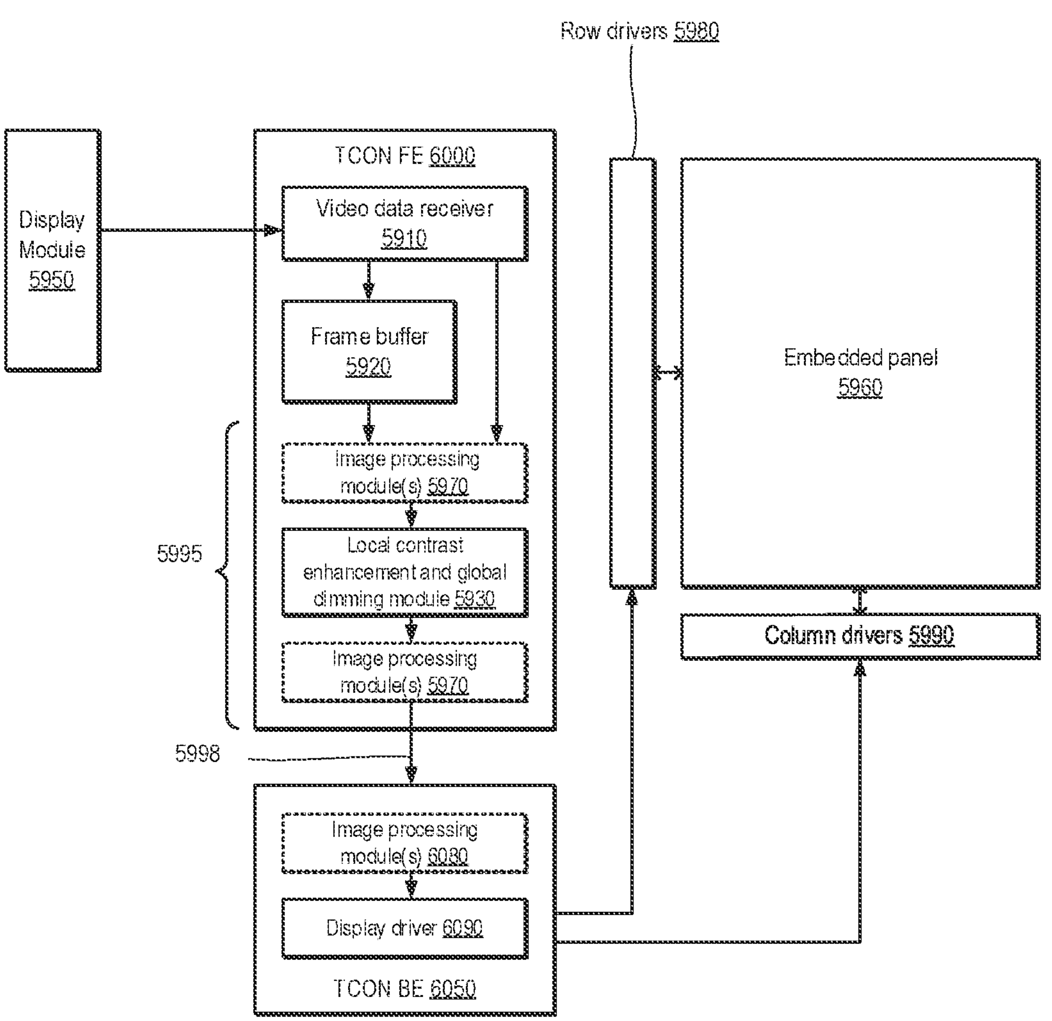
FIG. 60 is a block diagram of an example timing controller front end comprising a local contrast enhancement and global dimming module.

FIG. 60 illustrates a block diagram of an example timing controller front end comprising a local contrast enhancement and global dimming module. The timing controller front end (TCON FE) 6000 comprises some of the same components as the timing controller 5900. Instead of comprising a display driver to drive the embedded display panel 5960, the TCON FE 6000 sends processed video data 5998 to a timing controller backend 6050 (TCON BE) that comprises one or more image processing modules 6080 that perform additional processing on the processed video data 5998 before the video data is provided to a display driver 6090 that drives the embedded panel control circuitry. As discussed previously with regards to FIGS. 10C & 10D, breaking the timing controller into front end and back end components can provide for flexibility in timing controller design. A timing controller front end can comprise modules specific to a particular mobile device design and a timing controller back end can be compatible with multiple timing controller front end designs that have different feature sets. In one or more embodiments, the timing controller front end 6000 represents an example implementation of TCON FE 1052, 1076 and the timing controller back end 6050 represents an example implementation of TCON BE 1060, 1070, both of which can be used in an example implementation of lid 120, 220, 301, 1820, 4610, which in turn can be part of an example implementation of mobile computing device (user device) 100, 200, 300, 2800A, 2800B, 4605.

In some embodiments, the display module 5950 communicates with the TCON 5900 or TCON FE 6000 over an eDP connection and the video data receiver 5910 comprises an eDP main link receiver. In some embodiments, the display driver 5940 and display driver 6090 are P2P transmit modules.

Figure 61:
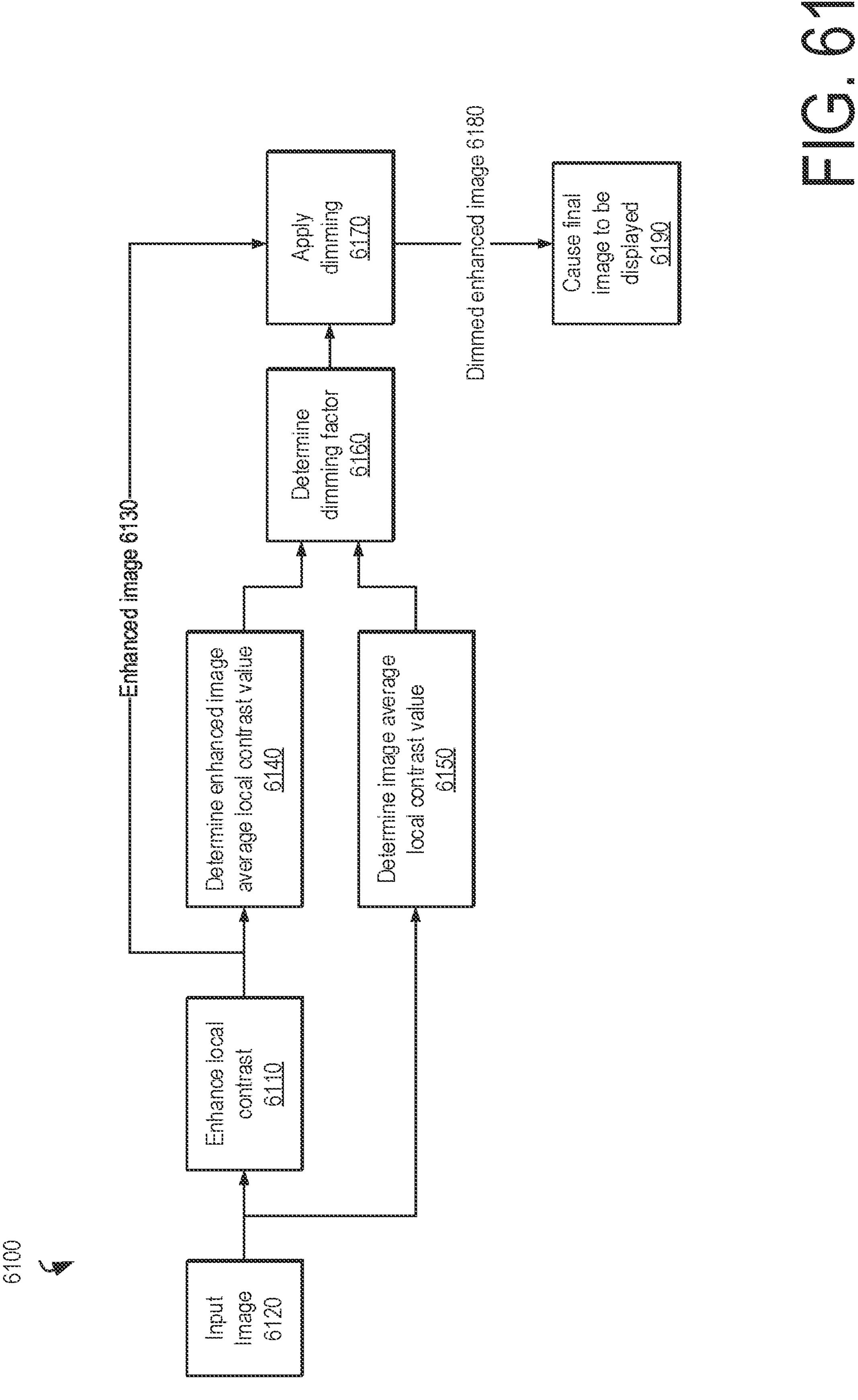
FIG. 61 is a first example of a local contrast enhancement and global dimming example method.

FIG. 61 illustrates a first example of a local contrast enhancement and global dimming example method. The method 6100 can be performed by a timing controller on images included in video data provided to the timing controller. At 6110, local contrast enhancement is applied to an input image 6120 to generate an enhanced image 6130. At 6140, an enhanced image average local contrast value is determined for the enhanced image 6130 and at 6150, an image average local contrast value is determined for the input image 6120. At 6160, a global dimming factor is determined based on the enhanced image average local contrast value and the image average local contrast value. At 6170, the enhanced image 6130 is globally dimmed based on the global dimming factor to generate a dimmed enhanced image 6180. At 6190, a final image based on the dimmed enhanced image 6180 is caused to be displayed on a display.

Local contrast of an image can be enhanced at 6110 using various existing approaches, such as those that are based on histogram equalization or utilize unsharp masks. In a histogram equalization local contrast enhancement approach, an image is divided into tiles and a pixel brightness histogram for each tile is generated. In some embodiments, tiles can be square tiles 256×256 pixels or 128×128 pixels in size. Correction lookup tables are generated from the histograms and applied to the tiles to provide for a more equalized distribution of pixel brightness. Spatial smoothening filters can be used to smooth out discontinuities near tile boundaries. In a local contrast enhancement approach that utilizes unsharp masks, a blurred negative of the input image is used to create a mask of the image that is combined with the image to generate a sharpened image. In some local contrast enhancement embodiments utilizing unsharp masks, a moving average two-dimensional finite impulse response sharpening filter is used.

In some embodiments, the enhanced image average local contrast value determined at 6140 and the image average local contrast value determined at 6150 are determined using a histogram-based approach. Again, an image is divided into tiles. For each tile, a pixel brightness histogram is generated by bucketizing pixel brightness values (e.g., pixel luma values) into a number of bins and counting the number of pixels that have a brightness value that falls into the brightness range associated with each bin. For example, binning images with an 8-bit color depth into 32 bins, pixels with luma values of 0-7 are binned into bin 0, pixels with luma values of 8-15 are binned into bin 1, and so on. Although reference is made to a pixel's luma value, any image described herein can employ any color encoding scheme (e.g., RGB, YUV, any non-linear encoding scheme, such as gamma encoding) and a pixel's brightness can be determined from the values for the color encoding scheme employed if pixel brightness is not one of the color encoding scheme parameters. For example, if an image is encoded using an RGB color scheme, pixel brightness can be determined from the RGB values for a pixel. If an image employs a color encoding scheme in which each pixel's brightness is not one of the color encoding scheme's components (e.g., RGB), a pixel's brightness can be determined. The local contrast for a tile can be defined as the normalized distance between a highest populated bin (the bright bin) and a lowest populated bin (the dark bin) of a pixel brightness histogram. In some embodiments, bins corresponding to either end of the brightness spectrum are filtered out as follows. The dark bin is the bin at which the cumulative pixel count (starting at bin 0) reaches 4% of the total number of pixels in the tile. The bright bin is the bin at which the cumulative pixel count reaches 90% of the total number of pixels. Cumulative pixel count threshold percentages other than 4% for determining the dark bin and 90% for determining the bright bin can be used. The local contrast of a tile is determined by Equation 1:

$$\text{Contrast}=(\text{bright bin index}-\text{dark bin index})/\text{maximum bin index} \quad \text{(Eq. 1)}$$

For example, consider a tile being binned into 32 bins having index values of zero through 31. If the dark bin for the tile is bin 6 and the bright bin for the tile is bin 28, the local contrast for the tile is 0.71 ((28−6)/31). The image average local contrast value is the average of the local contrast for all of the tiles in an image. Although examples using 32 bins have been provided, image average local contrast values can be calculated using different numbers of bins. In some embodiments, an image average local contrast value is the average of the local contrast for fewer than all of the tiles in an image. For example, an image average local contrast value can be an average of the local contrast of every other (every third, etc.) tile in an image.

In some embodiments, brightness histograms for tiles of the image 6120 are determined by a display module, GPU, or other computing components as part of generating the image. In such embodiments, determining an image average local contrast value can comprise using brightness histogram information previously determined during image generation. In some embodiments, brightness histogram information generated by a computing component located in a base of a mobile computing device can be provided by a display module located in the base to a timing controller located in a lid of the mobile computing device. The brightness information can be sent along with or part of the video data sent by the display module to the timing controller. In some embodiments, brightness histogram information for the image 6120 can be generated by the timing controller during image processing performed before an image being subjected to local contrast enhancement and global dimming being performed, and the local contrast enhancement and global dimming can utilize the brightness histogram information previously generated by the timing controller. Brightness histogram information for tiles of the enhanced image 6130 can be determined as part of generating the enhanced image 6130 or determined after generation of the enhanced image 6130.

The global dimming factor determined at 6160 is based on the enhanced image average local contrast value and the image average local contrast value determined for the input image 6120. The global dimming factor indicates an amount of global dimming to be applied to the enhanced image 6130. That is, the global dimming factor indicates an amount by which the brightness of the pixels of the enhanced image 6130 is to be reduced. Generally, the more the local contrast of the input image 6120 is enhanced, the more the enhanced image 6130 will be dimmed. In some embodiments, the global dimming factor is calculated according to Equation 2:

$$DF=1.0-AL\cdot(CF-1.0) \quad \text{(Eq. 2)}$$

wherein DF is the global dimming factor, AL is a dimming aggressiveness level, and CF is a contrast enhancement factor determined according to Equation 3:

$$CF=\frac{\text{enhanced image average local contrast value}}{\text{input image average local contrast value}} \quad \text{(Eq. 3)}$$

The global dimming factor generally has a range of zero to one and represents a factor by which the brightness of pixels in the enhanced image 6130 is to be reduced. The dimming aggressiveness level can be any value greater than or equal to one and reflects a level of display panel power reduction to be realized via local contrast enhancement and global dimming of images. Increasing the dimming aggressiveness level value results in a decreased global dimming factor, which results in increased display panel power savings. In one example of applying Equations 2 and 3, for an input image where the CF is 1.05 and the dimming aggressiveness level is set to 4, the global dimming factor is 0.8, meaning the image is globally dimmed by 20%. In some embodiments, a lower limit can be set for the global dimming factor to prevent excessive dimming. In some embodiments, a global dimming factor lower limit can be in the range of 0.4 to 0.7. In one application of local contrast enhancement and global dimming, the CF for a plurality of test images was within a range of 1.03-1.07, and a dimming aggressiveness level in the range of 2 to 6 resulted in dimmed enhanced images that were still visually appealing while providing for display power reductions. In some embodiments, the dimming aggressiveness level is set by an OEM or other mobile computing device manufacturer. In other embodiments, the dimming aggressiveness level is set by an end-user through a user interface.

In some embodiments, the global dimming factor can further depend on a user-configurable display brightness setting. A display brightness setting indicating that brighter images are to be displayed can result in the global dimming factor taking on a narrower range of high values (e.g., 0.7-1.0). A display brightness setting indicating that dimmer images are to be displayed can result in the global dimming factor taking on a wider range of values (e.g., 0.4-1.0) or a narrower range of lower values (e.g., 0.4-0.7). In some embodiments, the global dimming factor can further depend on an ambient light level based on sensor data generated by an ambient light sensor integrated into a lid or a base of a mobile computing device. For example, an ambient light level indicating a greater amount of ambient light can result in the global dimming factor taking on a narrower range of high values (e.g., 0.7-1.0). An ambient light level indicating a lesser amount of ambient light can result in the global dimming factor taking on a wider range of values (e.g., 0.4-1.0) or a narrower range of lower values (e.g., 0.4-0.7). In embodiments where the enhanced image comprises non-linearly encoded pixel values, such as gamma encoded pixel values, the non-linearly pixel value encoding can be decoded prior to dimming of the enhanced image.

In some embodiments, the global dimming factor is applied to the enhanced image 6130 by linearly scaling pixel intensity values by the global dimming factor. In some embodiments, dimming an image comprises, for each pixel, multiplying a matrix comprising pixel intensity values for each pixel with a matrix comprising elements that match the global dimming factor. In other embodiments, the dimmed enhanced image 6180 can be generated by referencing a lookup table associated with the global dimming factor and comprising index values corresponding to pixel brightness levels and return values corresponding to the pixel brightness scaled by the global dimming factor. In some embodiments, a plurality of lookup tables, each associated with a different global dimming factor, can be stored in memory local to a local contrast enhancement and global dimming module operating in a timing controller. Global dimming factor lookup tables can be stored in non-volatile memory located in the timing controller, a lid controller hub communicatively coupled to the timing controller, or the base of a mobile computing device when the mobile computing device is turned off and loaded into memory local to the timing controller prior to the processing of images by a local contrast enhancement and global dimming module. In some embodiments, the set of global dimming factors associated with the global dimming factor lookup tables can be distributed over a range of global dimming factors at equal intervals (e.g., one-tenth intervals (0.4, 0.5 . . . 0.9, 1.0), one-twentieth intervals (0.4, 0.45 . . . 0.95, 1.00)). In some embodiments, new global dimming factor lookup tables can be generated for global dimming factors that occur frequently, and the new global dimming factor lookup tables generated during run-time can be stored in non-voltage memory and loaded into memory local to the timing controller memory the next time the mobile computing device is powered up.

At 6190, a final image is caused to be displayed on a display. In some embodiments, the final image to be displayed is the dimmed enhanced image 6180. In other embodiments, the dimmed enhanced image 6180 undergoes additional image processing to generate the final image to be displayed. In some embodiments, the method 6100 is performed by a timing controller. In some embodiments, the method 6100 is performed by a local contrast enhancement and global dimming module in a timing controller. The method 6100 can be performed by hardware, software, firmware, or any combination thereof.

In some embodiments, the application of local contrast enhancement and global dimming of images can reduce the power consumption of emissive display by 10-30%. If the emissive display is incorporated into a laptop, overall system power reductions of 5-15% can be realized.

Figure 62A:
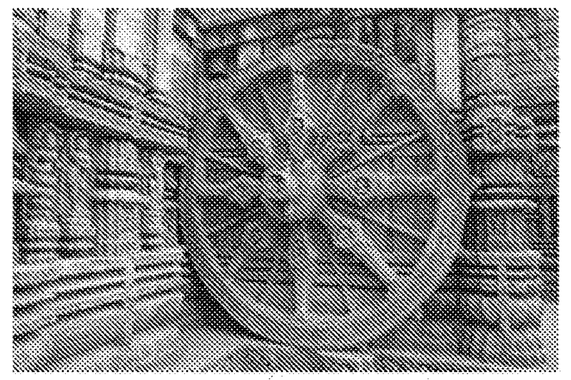
FIGS. 62A-62B illustrates the application of local contrast enhancement and global dimming to an example image.
Figure 62B:
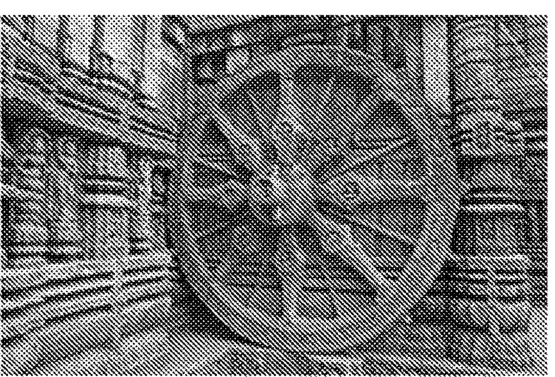

FIGS. 62A-B illustrate the application of local contrast enhancement and global dimming to an example image. FIG. 62A shows an input image prior to the application of local contrast enhancement and global dimming and FIG. 62B shows the resulting dimmed enhanced image. As can be seen, the dimmed enhanced image appears visually similar to the input image. When viewed on an emissive display, FIGS. 62A and 62B will look more similar. Displaying the dimmed enhanced image shown in FIG. 62B resulted in display power reductions of 20% relative to the display power consumption associated with display of the associated input image.

Figure 63:
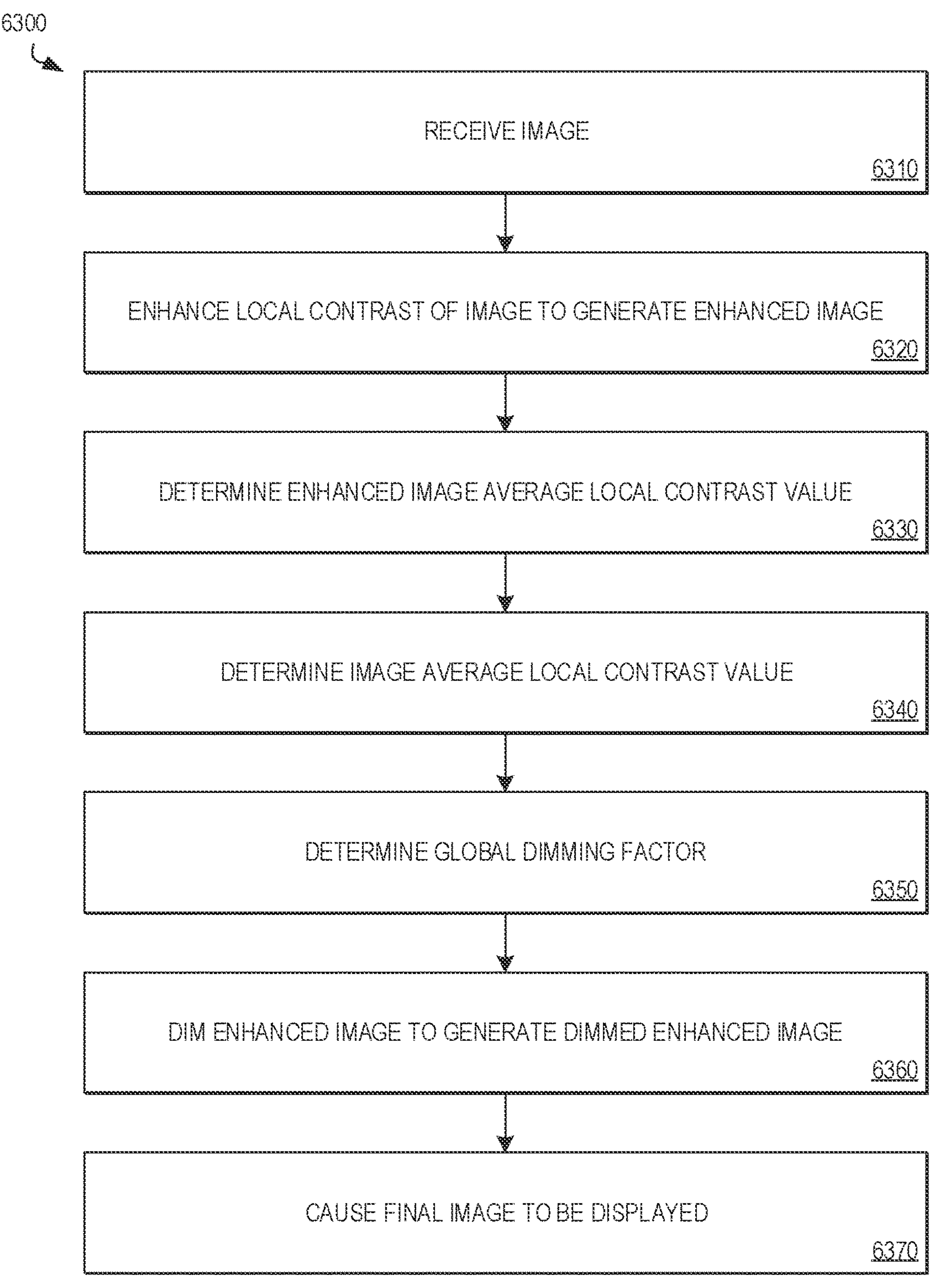
FIG. 63 is a first example of a local contrast enhancement and global dimming example method.

FIG. 63 is a second example of a local contrast enhancement and global dimming example method. The method 6300 can be performed by a contrast enhancement and dimming (CED) module located in a timing controller in a lid of a mobile computing device. At 6310, an image is received. In the example, the CED module receives an image included in video data received from a display module in a base of the mobile computing device. The image may have already undergone some image processing by the timing controller. At 6320, a local contrast of individual tiles of a plurality of tiles of the image is enhanced to generate an enhanced image. In the example, the CED module enhances local contrast in 256×256-pixel tiles in the image. At 6330, an enhanced image average local contrast value is determined for the enhanced image. In the example, the CED module determines an enhanced image average local contrast value of 0.82 for the enhanced image. At 6340, an image average local contrast value is determined for the image. In the example, an image average local contrast value of 0.78 is determined for the input image. At 6350, a global dimming factor based on the enhanced image average local contrast value and the image average local contrast value is determined. In the example, a global dimming factor is calculated using Equations (2) and (3). The CF is 1.05 and with a dimming aggressiveness level of 3, the global dimming factor is 0.85. At 6360, the enhanced image is dimmed based on the global dimming factor to generate a dimmed enhanced image. In the example, the brightness of the pixels in the enhanced image is dimmed by a factor of 0.85. At 6370, a final image is caused to be displayed on a display located in the lid of a mobile computing device, the final image based on the dimmed enhanced image. In the example, the dimmed enhanced image is displayed on the lid in the mobile computing device. The method 6300 can optionally include one or more additional actions, such as performing additional image processing on the dimmed enhanced image to generate the final image.

Additional examples of the presently described display panel power reduction embodiments include the following, non-limiting implementations. Each of the following non-limiting examples may stand on its own or may be combined in any permutation or combination with any one or more of the other examples provided below or throughout the present disclosure.

Example EA1 includes a method comprising: receiving a first image; enhancing a local contrast of individual tiles of a plurality of tiles of the first image to generate a second image; determining a second image average local contrast value for the second image; determining a first image average local contrast value for the first image; determining a global dimming factor based on the second image average local contrast value and the first image average local contrast value; and dimming the second image based on the global dimming factor to generate a dimmed enhanced image.

Example EA2 includes the method of Example EA1, wherein the final image is the dimmed enhanced image.

Example EA3 includes the method of Example EA1, further comprising performing additional image processing on the dimmed enhanced image to generate the final image.

Example EA4 includes the method of any one of Examples EA1-EA3, wherein the determining the global dimming factor is further based on a dimming aggressiveness level.

Example EA5 includes the method of any one of Examples EA1-EA4, wherein the determining the global dimming factor is further based on a display brightness setting.

Example EA6 includes the method of any one of Examples EA1-EA5, wherein the determining the global dimming factor is further based on an ambient light level.

Example EA7 includes the method of any one of Examples EA1-EA6, wherein the global dimming factor is determined according to:

$$DF=1.0-AL\cdot(CF-1.0)$$

wherein DF is the global dimming factor, AL is a dimming aggressiveness level, and CF is a contrast enhancement factor determined according to:

$$CF=\frac{\text{enhanced image average local contrast value}}{\text{input image average local contrast value}} \quad \text{(Eq. 3)}$$

Example EA8 includes the method of any one of Examples EA1-EA7, further comprising causing a final image to be displayed on a display located in a lid of a mobile computing device, the final image based on the dimmed enhanced image.

Example EA9 includes the method of any one of Examples EA1-EA8, wherein the first image average local contrast value is determined using a histogram-based approach.

Example EA10 includes the method of Example EA9, wherein the histogram-based approach comprising determining a pixel brightness histogram for the individual tiles in the first image.

Example EA11 includes the method of any one of Examples EA1-EA8, wherein the determining the first image average local contrast value comprises determining, for the individual tiles in the first image: determining a pixel brightness histogram for the individual tiles; and determining a normalized distance between a highest-populated bin of the pixel brightness histogram and a lowest-populated pixel brightness bin of the pixel brightness histogram.

Example EA12 includes the method of any one of Examples EA herein above and further comprises the elements of the method of any one of Examples AE1-AE11, AH1, BB1-BB11, BF1, CB1-CB12, CE1-CE10, or DE1-DE16 (as far as those method elements are not redundant with method elements of Examples EA herein above).

Example EB1 includes an apparatus comprising: a video data receiver to receive video data, the video data comprising data representing one or more images; and a local contrast enhancement and global dimming module to, for individual of the images: enhance a local contrast of individual tiles of a plurality of tiles of the individual image to generate an enhanced image; determine a second image average local contrast value for the enhanced image; determine a first image average local contrast value for the individual image; determine a global dimming factor based on the second image average local contrast value and the first image average local contrast value; and dim the enhanced image based on the global dimming factor to generate a dimmed enhanced image. The apparatus can be, for example, a timing controller.

Example EB2 includes the apparatus of Example EB1, wherein the determining the global dimming factor is further based on a dimming aggressiveness level.

Example EB3 includes the apparatus of Example EB1 or EB2, wherein the determining the global dimming factor is further based on a display brightness setting.

Example EB4 includes the apparatus of any one of Examples EB1-EB3, wherein the determining the global dimming factor is further based on an ambient light level.

Example EB5 includes the apparatus of any one of Examples EB1-EB4, wherein the global dimming factor is determined according to:

$$DF=1.0-AL\cdot(CF-1.0)$$

wherein DF is the global dimming factor, AL is a dimming aggressiveness level, and CF is a contrast enhancement factor determined according to:

$$CF=\frac{\text{second image average local contrast value}}{\text{first image average local contrast value}}.$$

Example EB6 includes the apparatus of any one of Examples EB1-EB5, wherein the apparatus is located in a lid of a mobile computing device, the apparatus further comprising a display driver to cause a final image to be displayed on a display located in the lid, the final image based on the dimmed enhanced image.

Example EB7 includes the apparatus of any one of Examples EB1-EB6, wherein, for individual of the dimmed enhanced images, the final image is the individual dimmed enhance image.

Example EB8 includes the apparatus of any one of Examples EB1-EB6, further comprising one or more additional image processing modules to, for individual of the dimmed enhanced images, perform additional image processing on the individual dimmed enhanced image to generate the final image.

Example EB9 includes the apparatus of any one of Examples EB1-EB8, wherein the apparatus is a timing controller front end.

Example EB10 includes the apparatus of any one of Examples EB1-EB8, wherein the second image average local contrast value is determined using a histogram-based approach.

Example EB11 includes the apparatus of Example EB10, wherein the histogram-based approach comprising determining a pixel brightness histogram for individual tiles of a plurality of tiles in the second image.

Example EB12 includes the apparatus of any one of Examples EB1-EB8, wherein the determining the second image average local contrast value comprises determining, for individual second image tiles in the second image: determining a pixel brightness histogram for the individual second image tile; and determining a normalized distance between a highest-populated bin of the pixel brightness histogram and a lowest-populated pixel brightness bin of the pixel brightness histogram.

Example EB13 includes the apparatus of any one of the Examples EB herein above, and further the features of any one of the Examples AA1-AA15, AB1, AC1-AC22, AD1-AD10, BA1-BA12, BC1-BC11, CA1-CA13, CC1-CC13, CD1-CD10, CH1-CH8, DA1-DA17, DB1-DB13, DC1-DC5, or DD1-DD5 (as far as those features are not redundant with the features of Examples EB herein above).

Example EC1 includes a mobile computing device comprising: a base comprising a system-on-a-chip (SoC), the SoC comprising a display module; a lid rotatably coupled to the base, the lid comprising: an embedded display panel; a timing controller comprising: a video data receiver to receive video data from the display module, the video data comprising data representing one or more images; and a local contrast enhancement and global dimming module to, for individual of the one or more images: enhance a local contrast of individual tiles of a plurality of tiles of the individual image to generate an enhanced image; determine a second image average local contrast value for the enhanced image; determine a first image average local contrast value for the individual image; determine a global dimming factor based on the second image average local contrast value and the first image average local contrast value; and dim the enhanced image by the global dimming factor to generate a dimmed enhanced image; and a display driver to, for individual of the dimmed enhanced images, cause a final image to be displayed on a display on the embedded display panel, the final image based on the individual dimmed enhanced image.

Example EC2 includes the mobile computing device of Example EC1, wherein, for individual of the dimmed enhanced images, the final image is the individual dimmed enhance image.

Example EC3 includes the mobile computing device of Example EC1, further comprising one or more image processing modules to, for individual of the dimmed enhanced images, perform additional image processing on the individual dimmed enhanced images to generate the final image.

Example EC4 includes the mobile computing device of any one of Examples EC1-EC3, wherein the determining the global dimming factor is further based on a dimming aggressiveness level.

Example EC5 includes the mobile computing device of any one of Examples EC1-EC4, wherein the determining the global dimming factor is further based on a display brightness setting.

Example EC6 includes the mobile computing device of any one of Examples EC1-EC5, wherein the determining the global dimming factor is further based on an ambient light level.

Example EC7 includes the mobile computing device of any one of Examples EC1-EC6, wherein the global dimming factor is determined according to:

$$DF=1.0-AL\cdot(CF-1.0)$$

wherein DF is the global dimming factor, AL is a dimming aggressiveness level, and CF is a contrast enhancement factor determined according to:

$$CF = \frac{\text{second image average local contrast value}}{\text{first image average local contrast value}}.$$

Example EC8 includes the mobile computing device of any one of Examples EC1-EC7, wherein the embedded display panel is an organic light-emitting diode (OLED) embedded display panel.

Example EC9 includes the mobile computing device of any one of Examples EC1-EC8, wherein the first image average local contrast value is determined using a histogram-based approach.

Example EC10 includes the mobile computing device of Example EC9, wherein the histogram-based approach comprising determining a pixel brightness histogram for the individual tiles.

Example EC11 includes the mobile computing device of any one of Examples EC1-EC8, wherein the determining the first image average local contrast value comprises determining, for the individual tiles of the plurality of tiles: determining a pixel brightness histogram for the individual tile; and determining a normalized distance between a highest-populated bin of the pixel brightness histogram and a lowest-populated pixel brightness bin of the pixel brightness histogram.

Example EC12 includes the mobile computing device of any one of Examples EC herein above and further comprises the features of any of Examples AA1-AA15, AB1, AC1-AC22, AD1-AD10, BC1-BC11, CA1-CA13, CD1-CD10, CH1-CH8, DA1-DA17, or DB1-DB13 (as far as those features are not redundant with features of Examples EC herein above).

Example ED1 includes an apparatus comprising: a video data receiver to receive video data, the video data comprising data representing one or more images; and a local contrast enhancement and global dimming module to, for individual of the one or more images: enhance a local contrast of individual regions of a plurality of region of the individual region to generate an enhanced image; determine a second image average local contrast value for the enhanced image; determine a first average local contrast value for the individual image; and determine a global dimming factor based on the second image average local contrast value and the first image average local contrast value; dim, by a dimming means, the enhanced image by the global dimming factor to generate a dimmed enhanced image. The apparatus can be, for example, a timing controller.

Example EE1 includes an apparatus comprising: a video data receiver to receive video data, the video data comprising data representing one or more images; a local contrast enhancement and global dimming means to, for individual of the images, enhance local contrast and globally dim the individual image to generate a dimmed enhanced image; and a display driver to, for individual of the dimmed enhanced images, cause a final image to be displayed on a display on an embedded display panel, the final image based on the individual dimmed enhanced image.

Example EF1 includes one or more non-transitory computer-readable storage media storing computer-executable instructions for causing a mobile computing device to perform any one of the methods of Examples EA herein.

Example EF2 includes one or more non-transitory computer-readable storage media storing computer-executable instructions for causing a mobile computing device to perform any one of the methods of Examples EA herein above and further comprises the method elements of the method of any one of Examples AE1-AE11, AH1, BB1-BB11, BF1, CB1-CB12, CE1-CE10, or DE1-DE16 (as far as those method elements are not redundant with method elements of Examples EA herein above).

Example EG1 includes a system comprising one or more means to implement one or more of the methods of Examples EA herein above.

Example EG2 includes a system comprising one or more means to implement one or more of the methods of Examples EA herein above and further any one of the methods of Examples AE1-AE11, AH1, BB1-BB11, BF1, CB1-CB12, CE1-CE10, or DE1-DE16 (as far as those methods are not redundant with the methods of Examples EA herein above).

Example EH1 includes a device comprising: memory to store instructions; and a processor coupled to the memory, the instructions executed by the processor to perform the method of any one of Examples EA herein above.

Low-Power Always-On Display

In some embodiments, a mobile computing device comprises a foldable display that includes an "always-on" portion that is visible to a user and displays content when the device is closed and in a low-power mode. To reduce power consumption when the device is in this low-power mode, the portion of the display not visible to a user when the device is closed is disabled. This can be done by placing one or more components of the display pipeline (such as the frame buffer, image processing modules, row drivers, and column drivers) in a low-power state. The content displayed on the always-on portion of the display while the device is closed can be updated periodically with new images provided by an SoC display module, but in some embodiments, a second display module that is part of a low-power subsystem can provide images to the lid, thus allowing the SoC display module to remain in a low-power state. Extending an existing display to provide an always-on display capability by selectively disabling a portion of the display is less expensive than adding a second display and a second timing controller and can result in a lower device cost.

Embodiments provide a mobile computing device that has a base, a foldable display, and a lid rotatably attached to the base. The lid might comprise a timing controller comprising a frame buffer. The timing controller of the computing device can enable a first display portion of the foldable display when the computing device is in a full display mode, and disable the first display portion and enable a second display portion of the foldable display when the computing device is in a partial display mode. The first display portion may be, for example, visible when the computing device is in an open configuration and may not be visible when the computing device is in a closed configuration. By contrast, the second display portion may be visible when the computing device is in the closed configuration, wherein the computing device can be in a closed configuration when in the partial display mode. The timing controller of the computing device may be further able to place at least a portion of a frame buffer into a frame buffer low-power state, when the computing device is in the partial display mode. The frame buffer may store image data corresponding to images displayed at the foldable display. Optionally, the timing controller can enable the second display portion when the mobile computing device is in the full display mode. In an example, the computing device might be in the partial display mode. In this mode, the timing controller may place one or more row drivers and/or one more column drivers that drive rows and columns of the first display portion, respectively, into a low-power state.

Figure 64A:
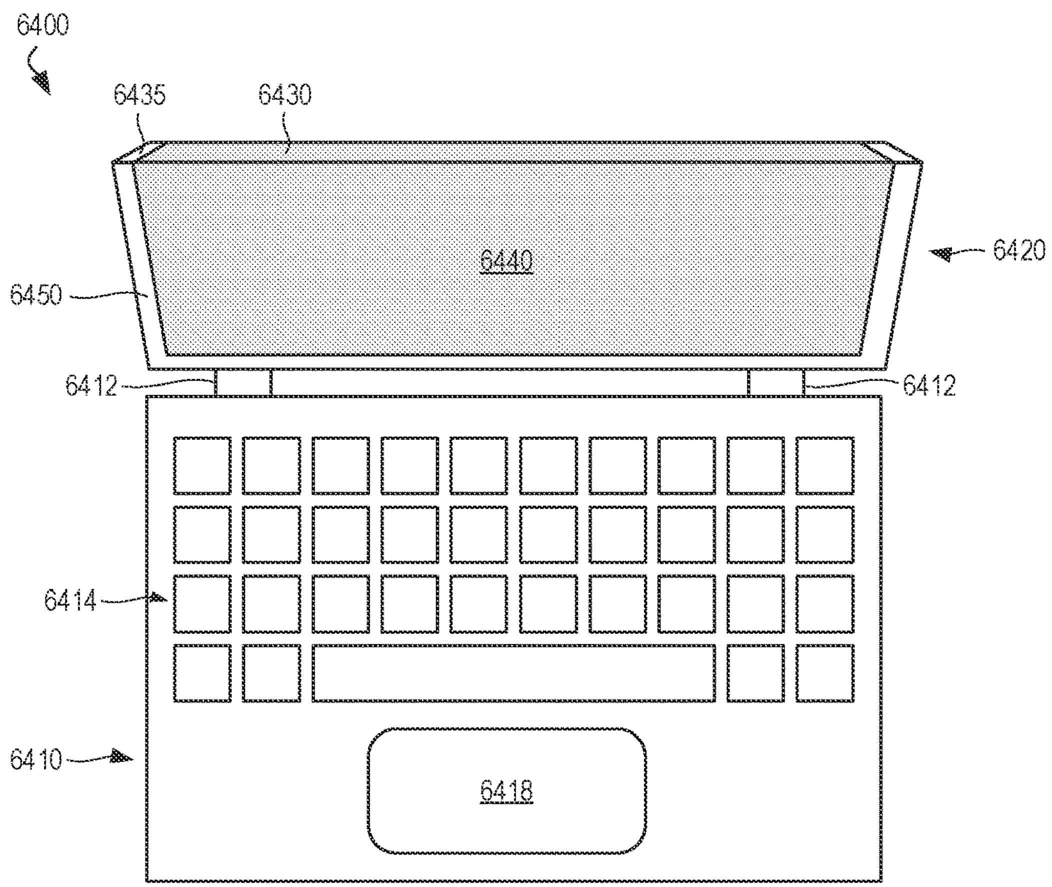
FIGS. 64A and 64B illustrate top views of a mobile computing device in open and closed configurations, respectively, with a first example foldable display comprising a portion that can be operated as an always-on display.
Figure 64B:
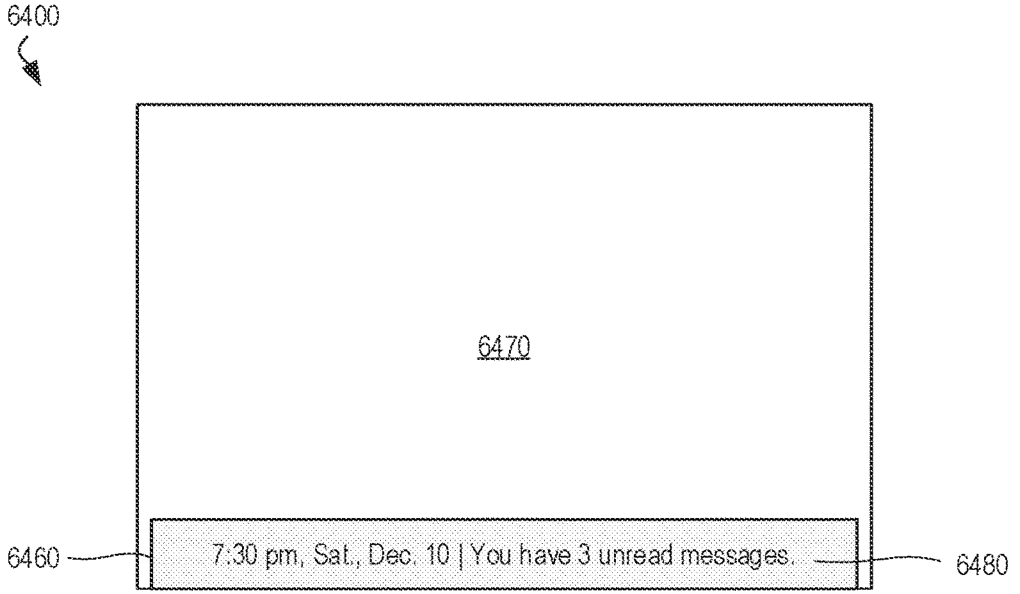

FIGS. 64A and 64B illustrate top views of a mobile computing device in open and closed configurations, respectively, with a first example foldable display comprising a portion that can be operated as an always-on display. The mobile computing device 6400 comprises a base 6410 rotatably attached to a lid 6420 via a hinge 6412. The base 6410 comprises a physical keyboard 6414 and a trackpad 6418. The lid 6420 comprises a foldable display 6430 wrapped around a lid top edge 6435. The foldable display 6430 comprises a first display portion 6440 located on a surface 6450 of the lid 6420 that is user-facing when the device 6400 is in an open configuration and a second display portion 6460 on a surface 6470 of the lid. The second display portion 6460 can be operated as an always-on portion of the display 6430 as it is visible when the device 6400 is in the closed configuration, as shown in FIG. 64B. A notification 6480 is shown on the second display portion 6460 while the device 6400 is closed. With reference to FIG. 1B, the lid surfaces 6450 and 6470 correspond to the B cover and A cover, respectively, of the mobile computing device 6400.

Figures 65A, 65B, 65C:
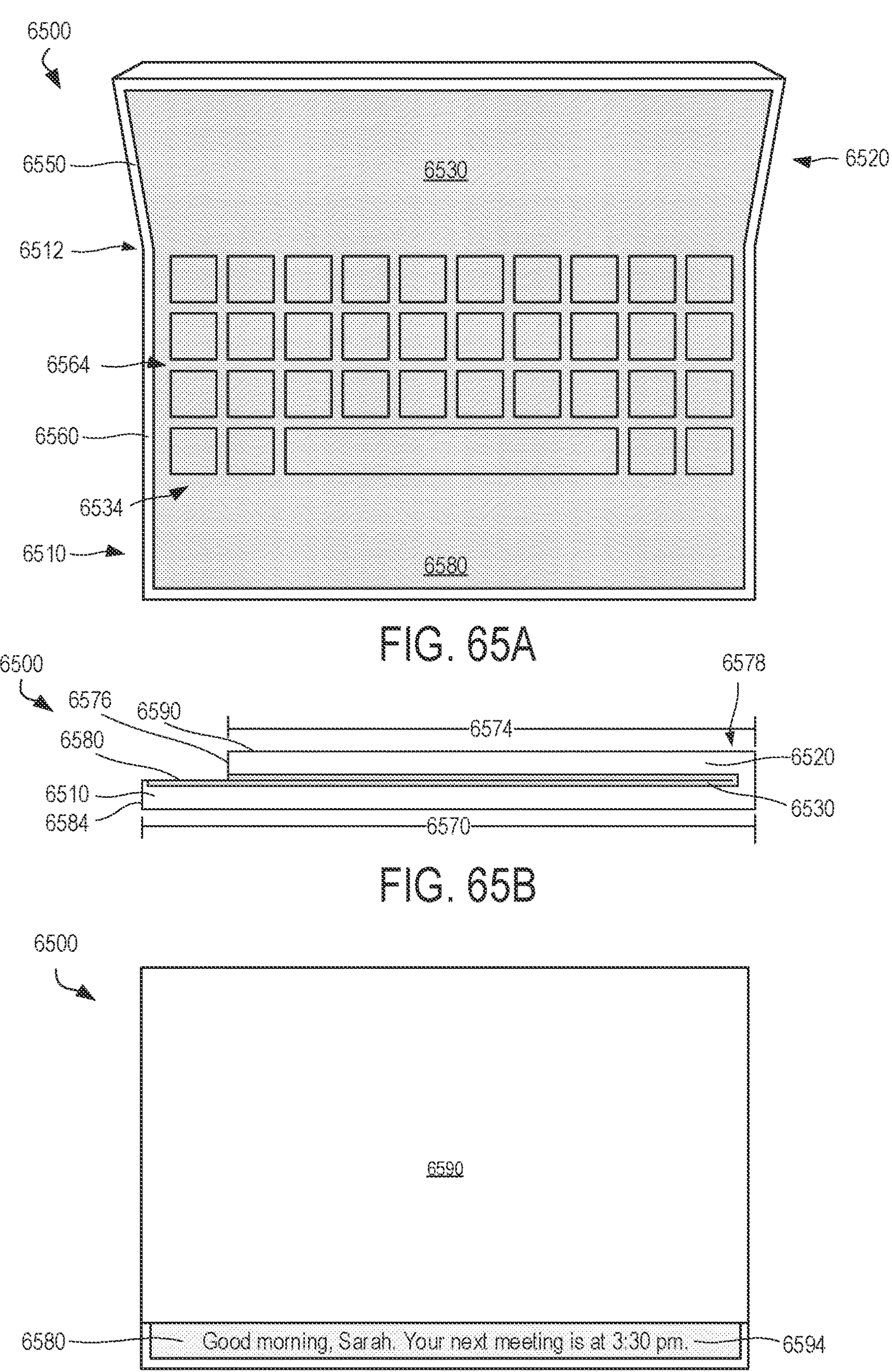
FIG. 65A illustrates a top view of a mobile computing device in an open configuration with a second example foldable display comprising a portion that can be operated as an always-on display.
FIGS. 65B and 65C illustrate a cross-sectional side view and top view, respectively, of the mobile computing device of FIG. 65A in a closed configuration.

FIG. 65A illustrates a top view of a mobile computing device in an open configuration with a second example foldable display comprising a portion that can be operated as an always-on display. The mobile computing device 6500 comprises a base 6510 rotatably attached to a lid 6520 via a hinge 6512. The device 6500 comprises a foldable display 6530 that covers a portion of a lid surface 6550 and a portion of a base surface 6560, the lid surface 6550 being a user-facing surface and the base surface being an upward-facing surface when the device 6500 is in an open configuration. A virtual keyboard 6534 is displayed on a base display portion 6564 of the foldable display 6530. FIGS. 65B and 65C illustrate a cross-sectional side view and top view, respectively, of the mobile computing device of FIG. 65A in a closed configuration. A length 6574 of the lid 6520 from a lid top edge 6576 to a hinge end portion 6578 is less than a length 6570 of the base 6510 extending from a base front edge 6584 to the hinge end portion 6578, leaving a display portion 6580 of the foldable display 6530 visible when the device 6500 is closed. Display portion 6580 can be operated as an always-on display. Viewed from above, a top surface 6590 of the lid 6520 appears adjacent to the always-on display portion 6580. Notification content 6594 can be shown on the always-on display portion 6580 while the device 6500 is closed. With reference to FIG. 1B, the lid surface 6550, the base surface 6560, and the lid top surface 6590, correspond to the B cover, C cover, and A cover, respectively, of the mobile computing device 6500.

Figures 66A, 66B, 66C, 66D, 66E, 66F, 66G, 66H, 66I, 66J, 66K, 66L:
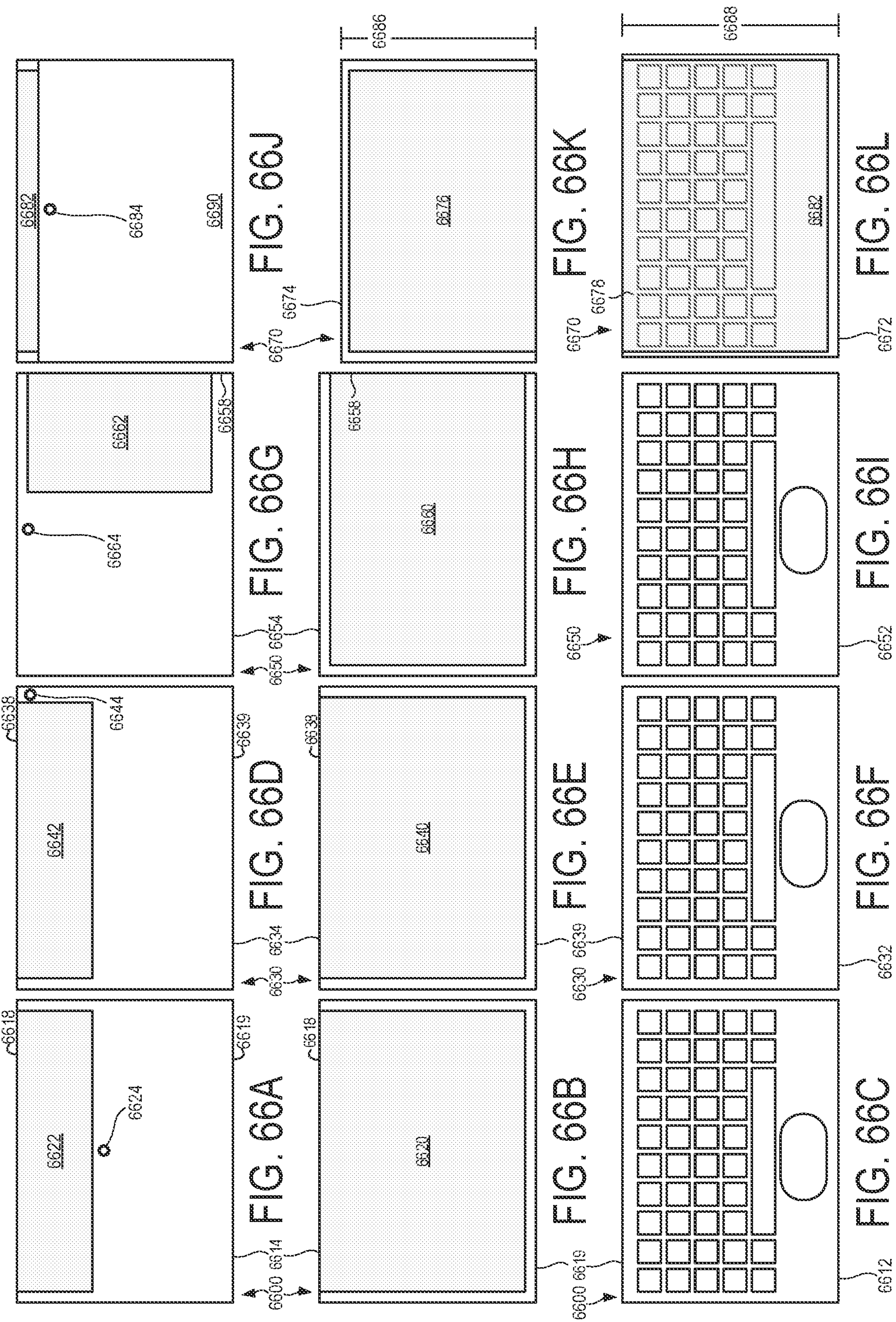
FIGS. 66A-66L illustrate various views of mobile computing devices comprising a foldable display having a display portion that can be operated as an always-on display.

FIGS. 66A-66L illustrate various views of mobile computing devices comprising a foldable display having a display portion that can be operated as an always-on display. FIGS. 66A-66C illustrate views of the A cover, B cover, and C cover, respectively, of a mobile computing device 6600 comprising a base 6612, a lid 6614, and a foldable display that wraps over a top edge 6618 of the lid 6614. The lid top edge 6618 is located distally from a hinge end portion 6619 at which the mobile computing device 6600 rotatably attaches to the base 6612. The foldable display comprises a first display portion 6620 and a second display portion 6622. The first display portion 6620 is user-facing when the device 6600 is in an open configuration and the second display portion 6622 is world-facing when the device 6600 is in either the open configuration or a closed configuration. The second display portion 6622 can be operated as an always-on display portion as it is visible when the device 6600 is in a closed configuration. A camera 6624 is located on the A cover of the device 6600, below the second display portion 6622.

FIGS. 66D-66F illustrate A cover, B cover, and C cover views, respectively, of a mobile computing device 6630 comprising a base 6632, a lid 6634, and a foldable display that wraps over a top edge 6638 of the lid 6634. The lid top edge 6638 is located distally from a hinge end portion 6639 at which the mobile computing device 6630 rotatably attaches to the base 6632. The foldable display comprises a first display portion 6640 and a second display portion 6642. The first display portion 6640 is user-facing when the device 6630 is in an open configuration and the second display portion 6642 is world-facing when the device 6630 is in either the open configuration or a closed configuration. The second display portion 6642 can be operated as an always-on display portion as it is visible when the device 6630 is in a closed configuration. A camera 6644 is located on the A cover of the device 6630, to the side of the second display portion 6642.

FIGS. 66G-66I illustrate A cover, B cover, and C cover views, respectively, of a mobile computing device 6650 comprising a base 6652, a lid 6654, and a foldable display that wraps around a side edge 6658 of the lid 6654. The foldable display comprises a first display portion 6660 and a second display portion 6662. The first display portion 6660 is user-facing when the device 6650 is in an open configuration and the second display portion 6662 is world-facing when the device 6650 is in either the open configuration or a closed configuration. The second display portion 6662 can be operated as an always-on display portion as it is visible when the device 6650 is in a closed configuration. A camera 6664 is located on the A cover of the device 6650, to the side of the second display portion 6662. In other embodiments, a foldable display can wrap around both side edges of a lid and comprise two world-facing second display portions, either or both of which can be operated as an always-on display.

FIGS. 66J-66L illustrate a top, B cover, and C cover views, respectively, of a mobile computing device 6670 comprising a base 6672, a lid 6674, and a foldable display that extends across the base 6672 and the lid 6674. The foldable display comprises a first display portion 6676 located in the lid and a second display portion 6678 located in the base. The first display portion 6676 is user-facing and the second display portion 6678 is upward-facing when the device 6670 is in an open configuration. A portion 6682 of the second display portion 6678 can be operated as an always-on display portion as it is visible when the device 6670 is in a closed configuration. A camera 6684 is located on the A cover of the device 6670. FIG. 66J illustrates a top view of the mobile computing device 6670 while in a closed configuration and shows the always-on display portion 6682 of the second display portion 6678 that is visible when the mobile computing device 6670 is closed, due to a lid length 6686 being shorter than a base length 6688. The always-on display portion 6682 appears adjacent to an A cover 6690 of the computing device 6670 when viewed from above.

Figure 67:
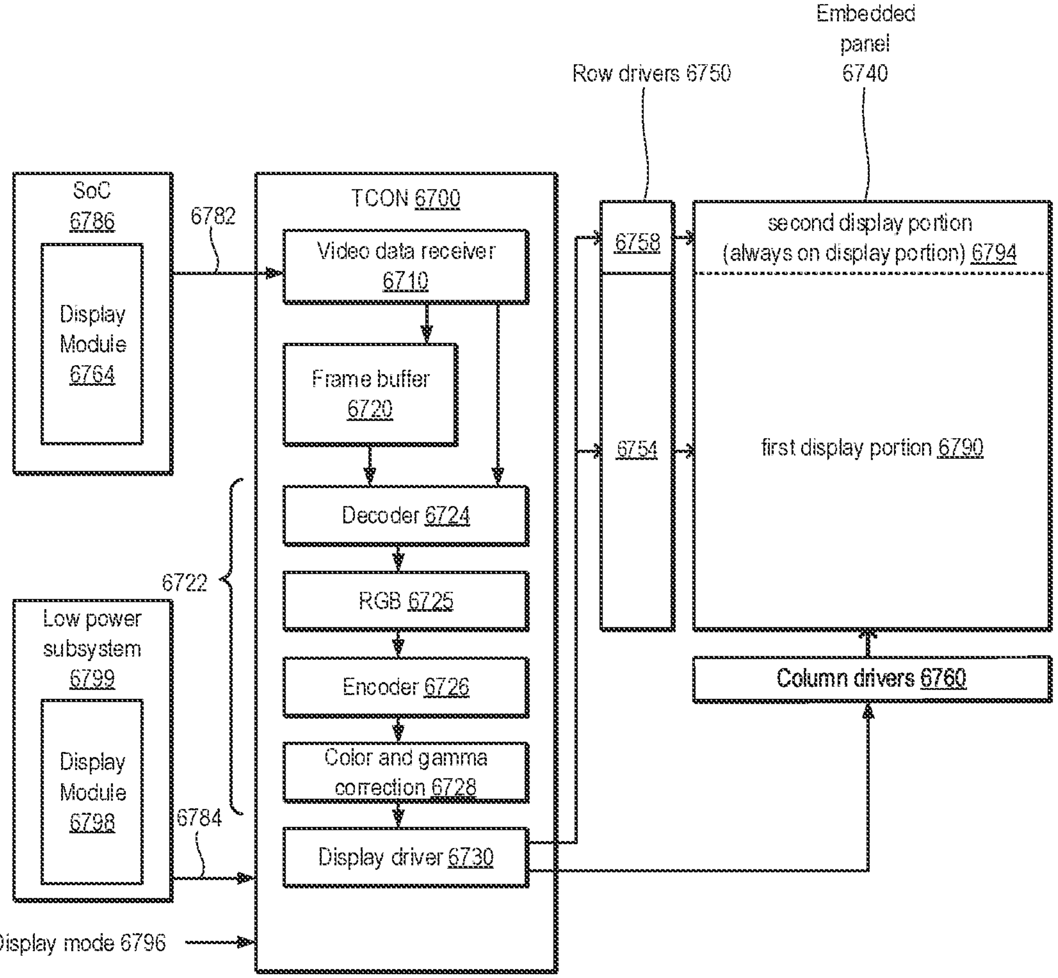
FIG. 67 is a block diagram of an example timing controller and additional display pipeline components associated with a foldable display having an always-on display portion.

FIG. 67 illustrates a block diagram of an example timing controller and additional display pipeline components associated with a foldable display having a portion that can be operated as an always-on display. The timing controller 6700 comprises a video data receiver 6710, a frame buffer 6720, a processing stack 6722, and a display driver 6730. The timing controller 6700, along with an embedded foldable display panel 6740 and display panel control circuitry (e.g., row drivers 6750 and column drivers 6760) are located in the lid of a mobile computing device. The video data receiver 6710 receives video data over a connection 6782 from a display module 6764 that is part of an SoC 6786 and located in a base of the mobile computing device. The frame processing stack 6722 comprises a decoder 6724, an RGB module 6725, and a VDSC encoder 6726. The decoder 6724 decodes encoded frames before they are processed by the RGB module 6725 and encoder 6726 re-encodes the frames before they are processed by the color and gamma correction module 6728. The color and gamma correction module 6728 performs color and gamma correction on the frames. In some embodiments, the decoder 6724 and the encoder 6726 perform frame decoding and encoding in accordance with the VESA® Display Compression Standard (VDSC).

In one or more embodiments, the timing controller 6700 represents an example implementation of TCON 150, 250, 355, 2820A, 2820B, 5900 and the embedded panel 6790 represents an example implementation of embedded display panel 145, 280, 380, 2806A, 2806B, 4612, 5960 either of which can be used in an example implementation of lid 120, 220, 301, 1820, 4610, which in turn can be part of an example implementation of mobile computing device (user device) 100, 200, 300, 2800A, 2800B, 4605. In one or more embodiments, the display module 6764 represents an example implementation of display module 241, 341, 5950, which can be used in an example implementation of SoC 140, 240, 2840A, 2840B, 4608, which can be located in base 210, 315, 1810, 4606, which in turn can be part of mobile computing device (user device) 100, 200, 300, 2800A, 2800B, 4605.

In some embodiments, the frame processing stack 6722 comprises one or more modules in addition to those shown in FIG. 67. The additional image processing modules can include any of the modules illustrated in FIGS. 8 and 59 or any other image processing modules described or referenced herein. In some embodiments, the frame processing stack 6722 can comprise fewer modules than those shown in FIG. 67. In some embodiments, the display module 6764 communicates with the TCON 6700 over an eDP connection and the video data receiver 6710 comprises an eDP main link receiver. In some embodiments, the display driver 6730 is a P2P transmit module.

The foldable display panel 6740 comprises a first display portion 6790 and a second display portion 6794. The first display portion 6790 is visible when the mobile computing device is an open configuration and is not visible when the mobile computing device is a closed configuration (such as first display portion 6440 in FIG. 64A and display portions 6620, 6640, 6660, and 6676 in FIGS. 66B, 66E, 66H, and 66K, respectively), and the second display portion 6794 is visible when the mobile computing device is in a closed configuration (such as second display portion 6460 in FIG. 64B and display portions 6622, 6642, 6662, and 6682 in FIGS. 66A, 66D, 66G, and 66J, respectively). The second display portion 6794 can operate as an always-on display portion when the mobile device is in a closed configuration. The first display portion 6790 and the second display portion 6794 are enabled based on a display mode of the mobile computing device. When the mobile computing device is in an open configuration, the device can be in a full display mode in which both the first and second display portions 6790 and 6794 are enabled. In some embodiments multiple full display modes are possible. For example, in a first full display mode, the first display portion 6790 is enabled and the second display portion 6794 is disabled and in a second full display mode, the first and second display portions 6790 and 6794 are enabled and displaying content. When the mobile computing device is in a closed configuration, the device can be in a partial display mode in which the first display portion 6790 is disabled and does not display content and the second display portion 6794 is enabled and operates as an always-on display.

In some embodiments, in addition to being based on a physical configuration of the mobile computing device, the display mode is further based on user-configurable settings. For example, user-configurable display settings may be provided to a user that allow the user to select whether the second display portion is to be enabled or disabled when the device is in an open configuration and whether the second display portion is to be enabled when the device is in a closed configuration. The timing controller 6700 receives display mode information 6796 from a lid controller hub or a component in the base of the mobile computing device, such as the display module 6764.

To reduce device power consumption, one or more components of a display pipeline of the device can be placed into a low-power state when the device is in a partial display mode. The display pipeline comprises components involved in the generation, processing, and displaying of images displayed at the display panel 6740. In the embodiment illustrated in FIG. 67, display pipeline components include the display module 6764, the video data receiver 6710, the frame buffer 6720, the frame processing stack 6722, the display driver 6730, the row drivers 6750, and the column drivers 6760. Placing the mobile computing device in a lower power state can comprise placing any of its constituent components in a low-power state. For example, a row driver can be placed in a row driver low-power state, a column driver can be placed in a column driver low-power state, a frame buffer can be placed in a frame buffer low power state, a display module can be placed in a display module low-power state, etc. Placing a component or a portion of a component in a low-power state can comprise, for example, reducing its operating voltage, operating the component at a lower frequency, disabling the component, or disabling component functionality (such as disabling a portion of a memory array or disabling output drivers). A display pipeline component can be placed into a low-power state by timing controller control logic or by display mode information (e.g., display mode information 6796) being provided directly to individual display pipeline components and causing the module to be placed into a low-power state.

In some embodiments, when a device is in a partial display mode, row drivers 6754 that drive the first display portion 6790 can be placed into a low-power state while row drivers 6758 that drive the second display portion 6794 remain enabled. In other embodiments, the column drivers 6760 can comprise a first set of column drivers that drive a first display portion and a second set of column drivers that drive an always-on display portion and the first set of column drivers are disabled and the second set of column drivers are enabled when the device is in a partial display mode. In some embodiments, portions of a timing controller display driver (e.g., display driver 6730) that drive row or column drivers that drive a first display portion can be placed in a low-power state when the device is in a partial display mode.

In some embodiments, a portion of the frame buffer 6720 is placed into a low-power state when the device is in a partial display mode. Placing a portion of the frame buffer 6720 in a low-power state can comprise disabling the portions of the memory array in the frame buffer 6720 that store images displayed at the first display portion 6790, disabling control circuitry that control the portions of the memory array that store images displayed in the first display portion 6790, or only storing image data corresponding to images displayed on the second display portion 6794 of the display.

In some embodiments, the TCON 6700 comprises a first frame buffer that stores image data corresponding to images to be displayed at the first display portion 6790 and a second frame buffer that stores image data corresponding to images to be displayed at the second display portion 6794. The first and second frame buffers are sized based on the size of the first and second display portions, respectively, and are thus each smaller than the size of a single frame buffer (e.g., frame buffer 6720) that would be needed to store image data for images to be displayed across display portions 6790 and 6794. The first frame buffer can be placed into a low-power state when the device is in a partial display mode.

In some embodiments, the TCON 6700 comprises a first frame buffer to store images to be displayed across the first display portion 6790 and the second display portion 6794 and a second frame buffer to store images to be displayed at the second display portion 6794, the second frame buffer being smaller than the first frame buffer. When a mobile computing device is in a full display mode, the TCON 6700 utilizes the first frame buffer and the second frame buffer is placed in a low-power state and when in a partial display mode, the TCON 6700 places the first frame buffer into a low-power state and utilizes the second frame buffer.

In some embodiments, one or more image processing components of the frame processing stack 6722 can be bypassed when the mobile computing device is in a partial display mode to reduce display pipeline power consumption. For example, if content displayed at the second display portion 6794 when the device is in a partial display mode is displayed in black and white or otherwise would not benefit from processing by modules in the frame processing stack, those modules can be bypassed when the device is in a partial display mode. Bypassing a component can comprise placing at least a portion of the bypassed components into a low-power state. As an example, a portion of a bypassed module can remain enabled to allow for image data to pass through the module while the remainder of the bypassed component can be disabled.

In some embodiments, display pipeline power consumption can be reduced by components in the pipeline operating only on the portion of image data corresponding to content displayed at the second display portion 6794. In components that operate on pixel data for pixels in parallel, the portion of the component that performs operations on pixel data corresponding to the first display portion can be disabled. In modules that operate on pixel data for multiple pixels serially, the module can be configured (by, for example, timing controller logic) to operate only on pixel data for pixels corresponding to the second display portion 6794.

In some embodiments, the content displayed at the second display 6794 when the device is in a partial display mode can comprise notification content updated at a rate that is less than the embedded panel's typical refresh rate (e.g., 30-120 Hz) when operating in full display mode. For example, if the notification content comprises a clock that shows the hour and minute, the display module 6764 can exit from a low-power state once a minute to generate a new image for display at the second display portion that shows the current time. After generating the updated image, the display module 6764 can return to a low-power state. Examples of other types of information that can be included in notification content and displayed at the second display portion 6794 while the device is in partial display mode include information about an upcoming meeting, remaining battery life, number of unread messages (e.g., email, text, social media), and a context-based greeting (e.g., “Good Morning!”). Many other types of information can be included in the notification content. Notification content can be updated at various intervals depending on the information being displayed (e.g., once a minute if displaying a clock, once every 5 or 10 minutes to update unread message information, once every 60 minutes to update meeting information). In some embodiments, the timing controller can signal to a display module when to wake up and generate updated notification content. In other embodiments, the waking of the display module to generate updated information can be controlled by a component in the base.

In some embodiments, notification content can be provided to the TCON 6700 over an out-of-band connection 6784 by a display module 6798 that is part of a low-power subsystem 6799 located in the device base (e.g., 210, 315, 1810, 4606). The low-power subsystem 6799 can generate notification content at a lower power level than the SoC 6786. The notification content can be provided as video data provided to the TCON 6700 over a connection 6784 that is separate from the connection 6782 used by the display module 6764 to provide video data to the video data receiver 6710. By using the low-power subsystem 6799 to generate notification content, the SoC 6786 and the display module 6764 can be kept in a low-power state and power consumption of the mobile computing device reduced. In some embodiments, the out-of-band connection 6784 is a USB connection or a MIPI Display Serial Interface (MIPI DSI) connection.

Figure 68:
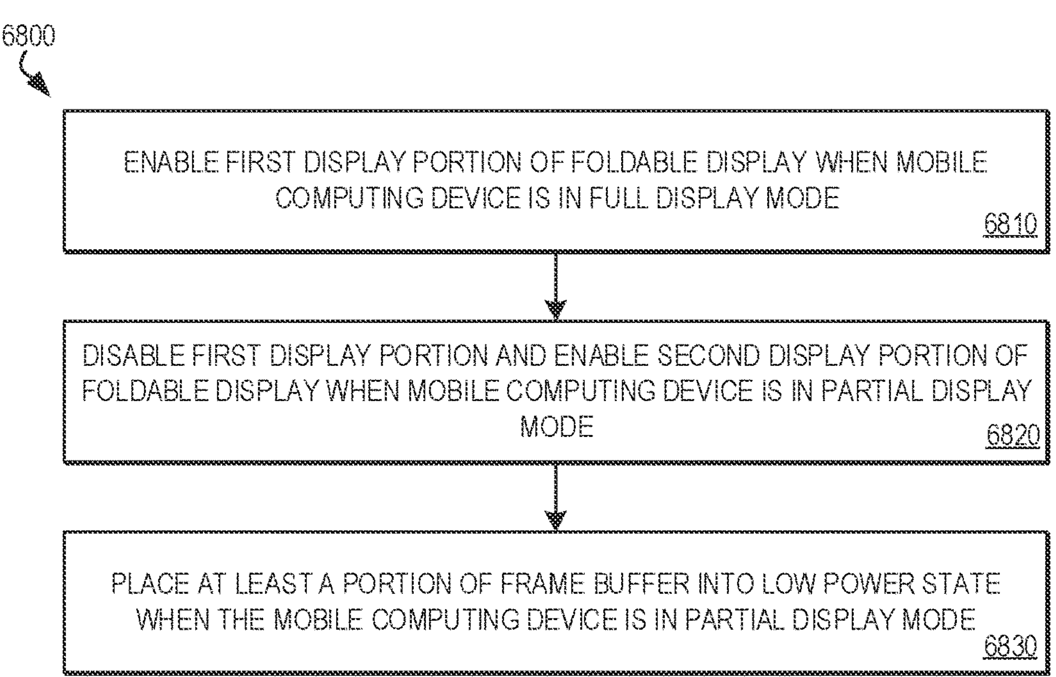
FIG. 68 illustrates an example method for operating a foldable display of a mobile computing device capable of operating as an always-on display.

FIG. 68 illustrates an example method for operating a foldable display of a mobile computing device capable of operating as an always-on display. The method 6800 can be performed by, for example, a laptop comprising a foldable display that wraps around the top of the lid of the laptop. The foldable display has a user-facing portion when the lid is open and a world-facing portion that operates as an always-on display when the laptop lid is closed. At 6810, a first display portion of a foldable display of a mobile computing device is enabled when the mobile computing device is in a full display mode. In the example, the user-facing portion of the laptop is enabled and displays content when the laptop enters a full display mode in response to the lid being opened. At 6820, the first display portion is disabled and a second display portion of the foldable display is enabled when the mobile computing device is in a partial display mode. The first display portion is visible when the mobile computing device is in an open configuration and not visible when the mobile computing device is in a closed configuration. The second display portion is visible when the mobile computing device is in the closed configuration, and the mobile computing device is in the closed configuration when in the partial display mode. In the example, the user-facing portion of the display is disabled and the world-facing portion of the display is enabled when the lid is closed, and the second display portion operates as an always-on display. At 6830, at least a portion of a frame buffer is placed into a frame buffer low-power state when the mobile computing device is in the partial display mode, the frame buffer storing image data corresponding to images displayed at the foldable display. In the example, the portion of the memory array in the frame buffer used to store images for display at the foldable display is placed into a lower power state. That is, only the portion of the memory array in the frame buffer that stores images to be displayed at the always-on display is enabled.

Additional examples of the presently described low-power always-on embodiments include the following, non-limiting implementations. Each of the following non-limiting examples may stand on its own or may be combined in any permutation or combination with any one or more of the other examples provided below or throughout the present disclosure.

Example FA1 is a method comprising: enabling a first display portion of a foldable display of a mobile computing device when the mobile computing device is in a full display mode; disabling the first display portion and enabling a second display portion of the foldable display when the mobile computing device is in a partial display mode, the first display portion visible when the mobile computing device is in an open configuration and not visible when the mobile computing device is in a closed configuration, the second display portion visible when the mobile computing device is in the closed configuration, the mobile computing device in the closed configuration when in the partial display mode; and placing at least a portion of a frame buffer into a frame buffer low-power state when the mobile computing device is in the partial display mode, the frame buffer storing image data corresponding to images to be displayed at the foldable display.

Example FA2 includes the method of Example FA1, further comprising enabling the second display portion when the mobile computing device is in the full display mode.

Example FA3 includes the method of Example FA1 or FA2, further comprising, when the mobile computing device is in the partial display mode, placing one or more row drivers that drive rows of the first display portion into a row driver low-power state.

Example FA4 includes the method of any one of Examples FA1-FA3, further comprising, when the mobile computing device is in the partial display mode, placing one or more column drivers that drive columns of the first display portion into a column driver low-power state.

Example FA5 includes the method of any one of Examples FA1-FA4, wherein the frame buffer is a first frame buffer and the mobile computing device comprises a second frame buffer that is smaller than the first frame buffer, the method further comprising, when the mobile computing device is in the partial display mode, utilizing the second frame buffer to store image data corresponding to images to be displayed at the second display portion.

Example FA6 includes the method of any one of Examples FA1-FA5, further comprising bypassing one or more image processing components in a display pipeline when the mobile computing device is in the partial display mode.

Example FA7 includes the method of any one of Examples FA1-FA6, further comprising configuring one or more image processing components in a display pipeline to not process image data corresponding to a portion of an image to be displayed on the first display portion when the mobile computing device is in the partial display mode.

Example FA8 includes the method of any one of Examples FA1-FA7, further comprising: displaying first images at the first display portion when the mobile computing device is in the full display mode, the first images corresponding to video data provided by a first display module; and displaying second images at the second display portion when the mobile computing device is in the partial display mode, the second images corresponding to video data provided by a second display module.

Example FA9 includes the method of Example FA8, further comprising, when the mobile computing device is in the partial display mode: placing the first display module into a first display module low-power state; and periodically waking the second display module from a second display module low-power state to generate a new image to be displayed at the second display portion.

Example FA10 includes the method of any one of Examples FA1-FA9, wherein the mobile computing device comprises a lid rotatably attached to a base and the foldable display covers at least a portion of a first surface of the lid and at least a portion of a second surface of the lid, the first surface of the lid being a user-facing surface when the mobile computing device is in an open configuration and the second surface of the lid being a world-facing surface.

Example FA11 includes the method of Example 10, wherein the lid comprises a top edge located distally from a hinge end portion at which the lid rotatably attaches to the base and the foldable display wraps around the top edge of the lid.

Example FA12 includes the method of Example 10, wherein the lid comprises side edges and the foldable display wraps around at least one of the side edges.

Example FA13 includes the method of any one of Examples FA1-FA9, wherein the mobile computing device comprises a lid rotatably attached to a base, the foldable display covers at least a portion of a first surface of the lid and at least a portion of a first surface of the base, the first surface of the lid and the first surface of the base facing each other when the mobile computing device is in the closed configuration, the lid having a lid length extending from a hinge end portion at which the lid rotatably attaches to the base to a lid top edge located distally from the hinge end portion, the base having a base length extending from a hinge end portion at which the base rotatably attaches to the lid to a base front edge located distally from the hinge end portion, the lid length being less than the base length, and the second display portion located on the first surface of the base.

Example FA14 includes the method of any one of Examples FA1-FA13 wherein placing at least a portion of the frame buffer into the frame buffer low-power state comprises disabling the frame buffer.

Example FA15 includes the method of any one of Examples FA1-FA13 wherein placing at least a portion of the frame buffer into the frame buffer low-power state comprises disabling a portion of a memory array of the frame buffer.

Example FA16 includes the method of any one of Examples FA1-FA13 wherein placing at least a portion of the frame buffer into the frame buffer low-power state comprises reducing an operating voltage of the frame buffer.

Example FA17 includes the method of any one of Examples FA herein above and further comprises the elements of the method of any one of Examples AE1-AE11, AH1, BB1-BB10, BF1, CB1-CB12, CE1-CE10, DE1-DE16, or EA1-EA11 (as far as those method elements are not redundant with method elements of Examples FA herein above).

Example FB1 includes a mobile computing device comprising: a base; a foldable display; and a lid rotatably attached to the base, the lid comprising a timing controller comprising a frame buffer, the timing controller to: enable a first display portion of the foldable display when the mobile computing device is in a full display mode; disable the first display portion and enable a second display portion of the foldable display when the mobile computing device is in a partial display mode, the first display portion visible when the mobile computing device is in an open configuration and not visible when the mobile computing device is in a closed configuration, the second display portion visible when the mobile computing device is in the closed configuration, the mobile computing device in the closed configuration when in the partial display mode; and place at least a portion of a frame buffer into a frame buffer low-power state when the mobile computing device is in the partial display mode, the frame buffer storing image data corresponding to images to be displayed at the foldable display.

Example FB2 includes the mobile computing device of Example FB1, the timing controller further to enable the second display portion when the mobile computing device is in the full display mode.

Example FB3 includes the mobile computing device of Example FBlor FB2, the timing controller further to, when the mobile computing device is in the partial display mode, place one or more row drivers that drive rows of the first display portion into a row driver low-power state.

Example FB4 includes the mobile computing device of any one of Examples FB1-FB3, the timing controller further, when the mobile computing device is in the partial display mode, place one or more column drivers that drive columns of the first display portion into a column driver low-power state.

Example FB5 includes the mobile computing device of any one of Examples FB1-FB4, wherein the frame buffer is a first frame buffer, the timing controller further comprising a second frame buffer that is smaller the first frame buffer, the timing controller further to, when the mobile computing device is in the partial display mode, utilize the second frame buffer to store image data corresponding to images to be displayed at the second display portion.

Example FB6 includes the mobile computing device of any one of Examples FB1-FB5, wherein the timing controller further comprises one or more image processing components, the timing controller further to bypass one or more image processing components in a display pipeline when the mobile computing device is in the partial display mode.

Example FB7 includes the mobile computing device of any one of Examples FB1-FB6, wherein the timing controller further comprises one or more image processing components, the timing controller further to configure one or more image processing components in a display pipeline to not process image data corresponding to a portion of an image to be displayed on the first display portion when the mobile computing device is in the partial display mode.

Example FB8 includes the mobile computing device of any one of Examples FB1-FB7, the timing controller further to: display first images at the first display portion when the mobile computing device is in the full display mode; and display second images at the second display portion when the mobile computing device is in the partial display mode; and the mobile computing device further comprising: a first display module to provide the first images to the timing controller; and a second display module to provide the second images to the timing controller.

Example FB9 includes the mobile computing device of any one of Examples FB1-FB8, wherein the lid comprises a top edge located distally from a hinge end portion at which the lid rotatably attaches to the base and the foldable display wraps around the top edge of the lid.

Example FB10 includes the mobile computing device of any one of Examples FB1-FB8, wherein the lid comprises one or more side edges and the foldable display wraps around at least one of the side edges.

Example FB11 includes the mobile computing device of any one of Examples FB1-FB8, wherein the foldable display covers at least a portion of a first surface of the lid and at least a portion of a first surface of the base, the first surface of the lid and the first surface of the base facing each other when the mobile computing device is in the closed configuration, the lid having a lid length extending from a hinge end portion at which the lid rotatably attaches to the base to a lid top edge located distally from the hinge end portion, the base having a base length extending from a hinge end portion at which the base rotatably attaches to the lid to a base front edge located distally from the hinge end portion, the lid length being less than the base length, and the second display portion located on the first surface of the base.

Example FB12 includes the mobile computing device of any one of Examples FB1-FB11 wherein placing at least a portion of the frame buffer into the frame buffer low-power state comprises disabling the frame buffer.

Example FB13 includes the mobile computing device of any one of Examples FB1-FB11 wherein placing at least a portion of the frame buffer into the frame buffer low-power state comprises disabling a portion of a memory array of the frame buffer.

Example FB14 includes the mobile computing device of any one of Examples FB1-FB11 wherein placing at least a portion of the frame buffer into the frame buffer low-power state comprises reducing an operating voltage of the frame buffer.

Example FB15 includes the mobile computing device of any one of Examples FB herein above and further comprises the features of any of Examples AA1-AA15, AB1-AB2, AC1-AC22, AD1-AD10, BC1-BC11, CA1-CA13, CD1-CD10, CH1-CH8, DA1-DA17, DB1-DB13, or EC1-EC8 (as far as those features are not redundant with features of Examples FB herein above).

Example FC1 includes one or more non-transitory computer-readable storage media storing computer-executable instructions for causing a mobile computing device to perform any one of the methods of Examples FA herein above.

Example FC2 includes one or more non-transitory computer-readable storage media storing computer-executable instructions for causing a mobile computing device to perform any one of the methods of Examples FA herein above and further comprises the method elements of the method of any one of Examples AE1-AE11, AH1, BB1-BB10, BF1, CB1-CB12, CE1-CE10, DE1-DE16, or EA1-EA11 (as far as those method elements are not redundant with method elements of Examples FA herein above).

Example FD1 includes a system comprising one or more means to implement one or more of the methods of Examples FA herein above.

Example FD2 includes a system comprising one or more means to implement one or more of the methods of Examples FA1 herein above and further any one of the methods of Examples AE1-AE11, AH1, BB1-BB10, BF1, CB1-CB12, CE1-CE10, DE1-DE16, or EA1-EA11 (as far as those methods are not redundant with the methods of Examples FA herein above).

The lid controller hub technologies described herein can be utilized by laptops and other mobile computing devices having a similar form factor, such as convertible laptops, 2-in-1s laptops, dual display laptops, hybrid laptops, foldable smartphones and foldable tablets.

Figure 69:
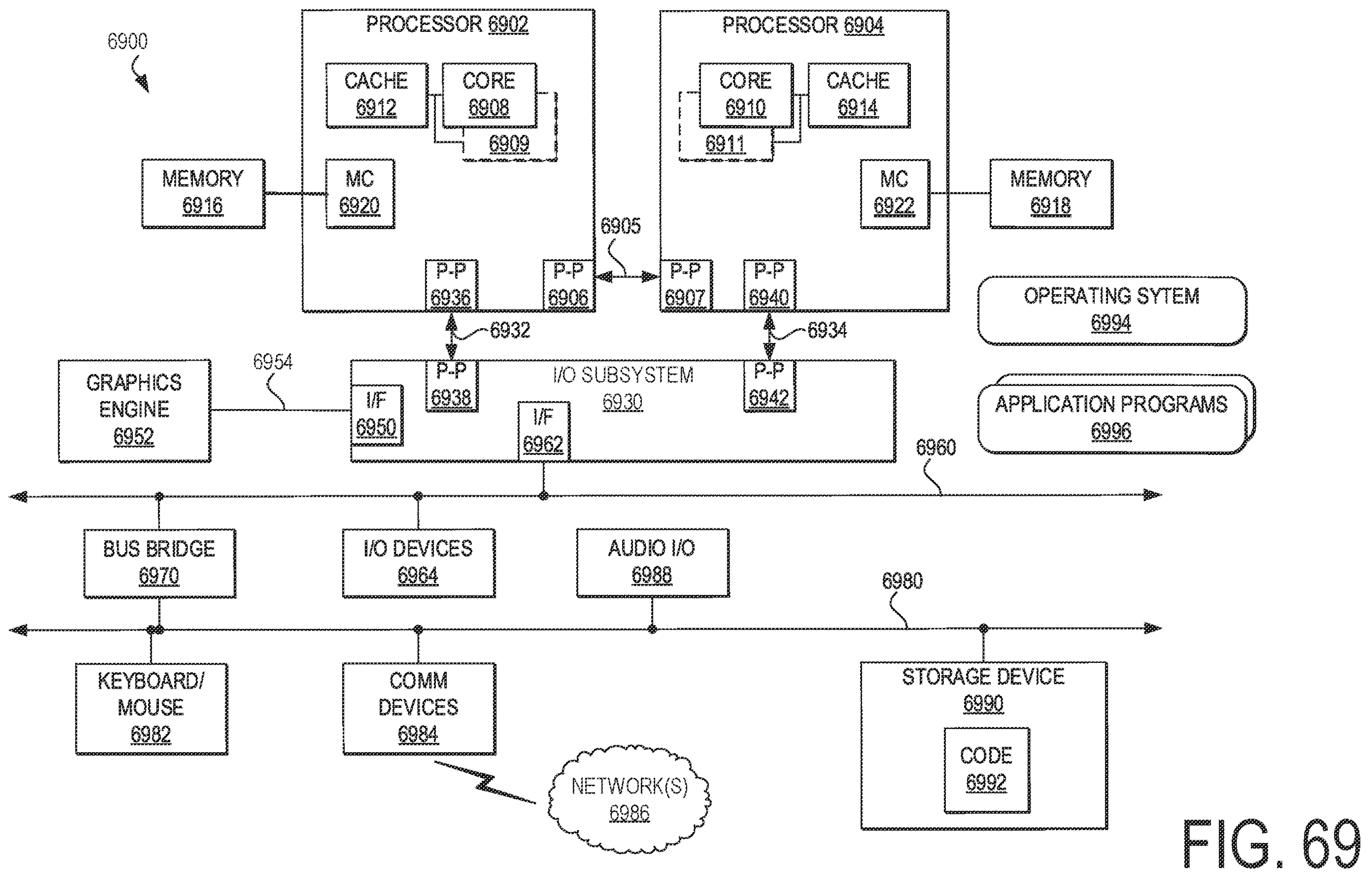
FIG. 69 is a block diagram of computing device components in a base of a fifth example mobile computing device comprising a lid controller hub.

FIG. 69 is a block diagram of computing device components in a base of a fifth example mobile computing device comprising a lid controller hub. Generally, components shown in FIG. 69 can communicate with other shown components, including those in a lid controller hub, although not all connections are shown, for ease of illustration. The components 6900 comprise a multiprocessor system comprising a first processor 6902 and a second processor 6904 and is illustrated as comprising point-to-point (P-P) interconnects. For example, a point-to-point (P-P) interface 6906 of the processor 6902 is coupled to a point-to-point interface 6907 of the processor 6904 via a point-to-point interconnection 6905. It is to be understood that any or all of the point-to-point interconnects illustrated in FIG. 69 can be alternatively implemented as a multi-drop bus, and that any or all buses illustrated in FIG. 69 could be replaced by point-to-point interconnects.

As shown in FIG. 69, the processors 6902 and 6904 are multicore processors. Processor 6902 comprises processor cores 6908 and 6909, and processor 6904 comprises processor cores 6910 and 6911. Processor cores 6908-6911 can execute computer-executable instructions in a manner similar to that discussed below in connection with FIG. 70, or in other manners.

Processors 6902 and 6904 further comprise at least one shared cache memory 6912 and 6914, respectively. The shared caches 6912 and 6914 can store data (e.g., instructions) utilized by one or more components of the processor, such as the processor cores 6908-6909 and 6910-6911. The shared caches 6912 and 6914 can be part of a memory hierarchy for the device. For example, the shared cache 6912 can locally store data that is also stored in a memory 6916 to allow for faster access to the data by components of the processor 6902. In some embodiments, the shared caches 6912 and 6914 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources, including those in a lid controller hub. Further, a processor can comprise any number of processor cores. A processor can take various forms such as a central processing unit, a controller, a graphics processor, an accelerator (such as a graphics accelerator, digital signal processor (DSP), or AI accelerator)). A processor in a device can be the same as or different from other processors in the device. In some embodiments, the device can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 6902 and 6904 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of. A lid controller hub can comprise one or more processor units.

Processors 6902 and 6904 further comprise memory controller logic (MC) 6920 and 6922. As shown in FIG. 69, MCs 6920 and 6922 control memories 6916 and 6918 coupled to the processors 6902 and 6904, respectively. The memories 6916 and 6918 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 6920 and 6922 are illustrated as being integrated into the processors 6902 and 6904, in alternative embodiments, the MCs can be logic external to a processor, and can comprise one or more layers of a memory hierarchy.

Processors 6902 and 6904 are coupled to an Input/Output (I/O) subsystem 6930 via P-P interconnections 6932 and 6934. The point-to-point interconnection 6932 connects a point-to-point interface 6936 of the processor 6902 with a point-to-point interface 6938 of the I/O subsystem 6930, and the point-to-point interconnection 6934 connects a point-to-point interface 6940 of the processor 6904 with a point-to-point interface 6942 of the I/O subsystem 6930. Input/Output subsystem 6930 further includes an interface 6950 to couple I/O subsystem 6930 to a graphics module 6952, which can be a high-performance graphics module. The I/O subsystem 6930 and the graphics module 6952 are coupled via a bus 6954. Alternately, the bus 6954 could be a point-to-point interconnection.

Input/Output subsystem 6930 is further coupled to a first bus 6960 via an interface 6962. The first bus 6960 can be a Peripheral Component Interconnect (PCI) bus, a PCI Express bus, another third generation I/O interconnection bus or any other type of bus.

Various I/O devices 6964 can be coupled to the first bus 6960. A bus bridge 6970 can couple the first bus 6960 to a second bus 6980. In some embodiments, the second bus 6980 can be a low pin count (LPC) bus. Various devices can be coupled to the second bus 6980 including, for example, a keyboard/mouse 6982, audio I/O devices 6988 and a storage device 6990, such as a hard disk drive, solid-state drive or other storage device for storing computer-executable instructions (code) 6992. The code 6992 can comprise computer-executable instructions for performing technologies described herein. Additional components that can be coupled to the second bus 6980 include communication device(s) or unit(s) 6984, which can provide for communication between the device and one or more wired or wireless networks 6986 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 6902.11 standard and its supplements).

The device can comprise removable memory such as flash memory cards (e.g., SD (Secure Digital) cards), memory sticks, Subscriber Identity Module (SIM) cards). The memory in the computing device (including caches 6912 and 6914, memories 6916 and 6918 and storage device 6990, and memories in the lid controller hub) can store data and/or computer-executable instructions for executing an operating system 6994, or application programs 6996. Example data includes web pages, text messages, images, sound files, video data, sensor data or any other data received from a lid controller hub, or other data sets to be sent to and/or received from one or more network servers or other devices by the device via one or more wired or wireless networks, or for use by the device. The device can also have access to external memory (not shown) such as external hard drives or cloud-based storage.

The operating system 6994 can control the allocation and usage of the components illustrated in FIG. 69 and support one or more application programs 6996. The application programs 6996 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

In addition, the computing device can provide one or more natural user interfaces (NUIs). For example, the operating system 6994, applications 6996, or a lid controller hub can comprise speech recognition as part of a voice user interface that allows a user to operate the device via voice commands. Further, the device can comprise input devices and components that allows a user to interact with the device via body, hand, or face gestures.

The device can further comprise one or more communication components 6984. The components 6984 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 69 illustrates one example computing device architecture. Computing devices based on alternative architectures can be used to implement technologies described herein. For example, instead of the processors 6902 and 6904, and the graphics module 6952 being located on discrete integrated circuits, a computing device can comprise a SoC (system-on-a-chip) integrated circuit incorporating one or more of the components illustrated in FIG. 69. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 69. Moreover, the illustrated components in FIG. 69 are not required or all-inclusive, as shown components can be removed and other components added in alternative embodiments.

Figure 70:
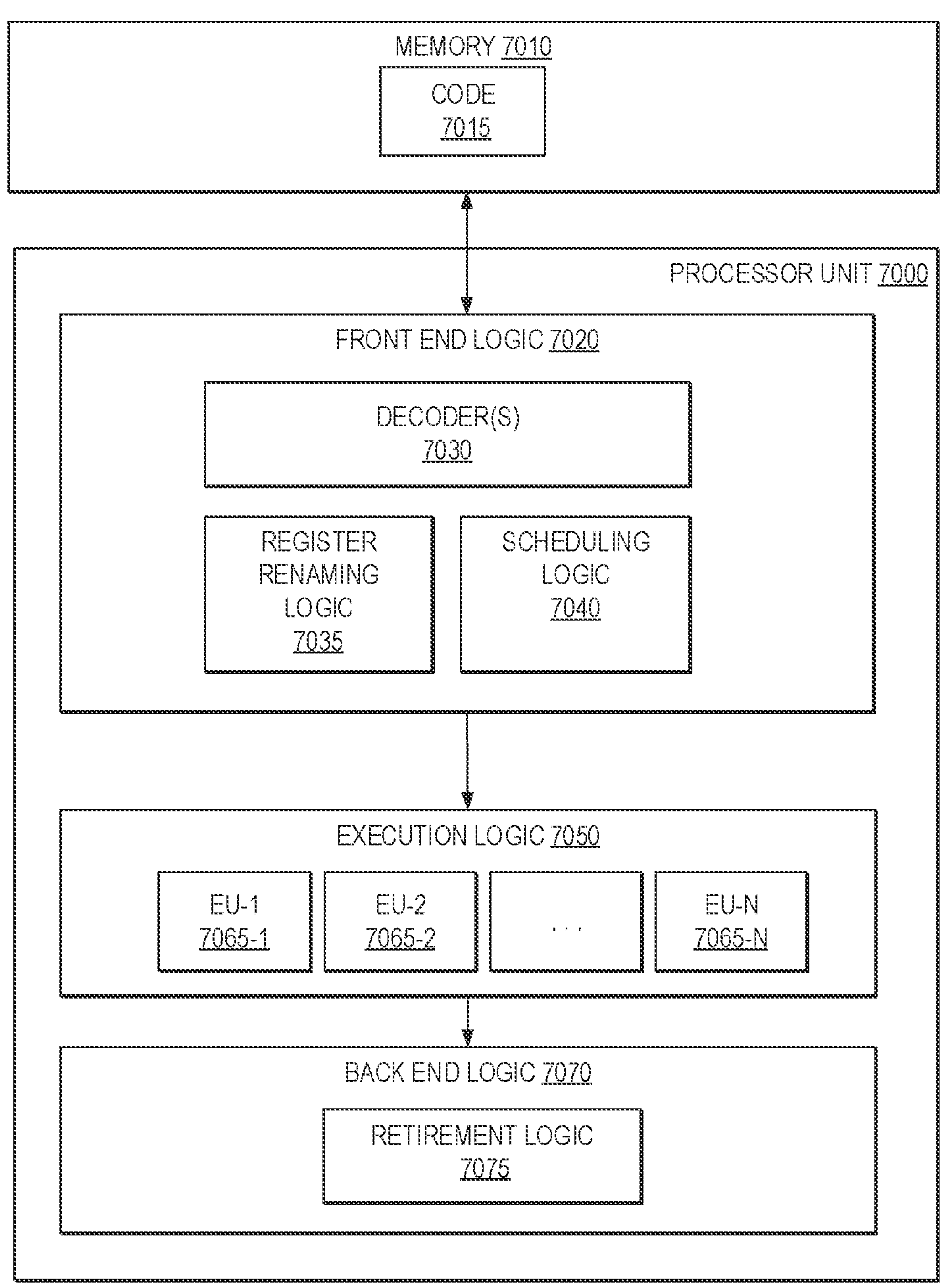
FIG. 70 is a block diagram of an exemplary processor unit that can execute instructions as part of implementing technologies described herein.

FIG. 70 is a block diagram of an example processor unit 7000 to execute computer-executable instructions as part of implementing a lid controller hub. The processor unit 7000 can be any type of processor or processor core, such as a microprocessor, an embedded processor, a digital signal processor (DSP), network processor, or accelerator. The processor unit 7000 can be a single-threaded core or a multithreaded core in that it may include more than one hardware thread context (or "logical processor") per core.

FIG. 70 also illustrates a memory 7010 coupled to the processor 7000. The memory 7010 can be any memory described herein or any other memory known to those of skill in the art. The memory 7010 can store computer-executable instructions 7015 (code) executable by the processor unit 7000.

The processor core comprises front-end logic 7020 that receives instructions from the memory 7010. An instruction can be processed by one or more decoders 7030. The decoder 7030 can generate as its output a micro operation such as a fixed width micro operation in a predefined format, or generate other instructions, microinstructions, or control signals, which reflect the original code instruction. The front-end logic 7020 further comprises register renaming logic 7035 and scheduling logic 7040, which generally allocate resources and queues operations corresponding to converting an instruction for execution.

The processor unit 7000 further comprises execution logic 7050, which comprises one or more execution units (EUs) 7065-1 through 7065-N. Some processor core embodiments can include a number of execution units dedicated to specific functions or sets of functions. Other embodiments can include only one execution unit or one execution unit that can perform a particular function. The execution logic 7050 performs the operations specified by code instructions. After completion of execution of the operations specified by the code instructions, back end logic 7070 retires instructions using retirement logic 7075. In some embodiments, the processor unit 7000 allows out of order execution but requires in-order retirement of instructions. Retirement logic 7075 can take a variety of forms as known to those of skill in the art (e.g., re-order buffers or the like).

The processor unit 7000 is transformed during execution of instructions, at least in terms of the output generated by the decoder 7030, hardware registers and tables utilized by the register renaming logic 7035, and any registers (not shown) modified by the execution logic 7050. Although not illustrated in FIG. 70, a processor can include other elements on an integrated chip with the processor unit 7000. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

In some embodiments, a lid controller hub is a packaged integrated circuit comprising components (modules, ports, controllers, driver, timings, blocks, accelerators, processors, etc.) described herein as being a part of the lid controller hub. Lid controller hub components can be implemented as dedicated circuitry, programmable circuitry that operates firmware or software, or a combination thereof. Thus, modules can be alternately referred to as "circuitry" (e.g., "image preprocessing circuitry"). Modules can also be alternately referred to as "engines" (e.g., "security engine", "host engine", "vision/imaging engine," "audio engine") and an "engine" can be implemented as a combination of hardware, software, firmware or a combination thereof. Further, lid controller hub modules (e.g., audio module, vision/imaging module) can be combined with other modules and individual modules can be split into separate modules.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

Furthermore, the words "optimize," "optimization," "optimizing," and related terms are terms of art that refer to relative improvements in power consumption, latency or other performance or behavioral traits of a system, component, or process and do not indicate that a system, component, or process has been perfectly improved upon such that an "optimal" state of power consumption, latency, or a performance or behavior trait has been achieved.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The invention claimed is:

1. A controller hub apparatus of a user device, comprising:
- a first connection to interface with a host system-on-chip (SoC) in a base of a user device;
- a second connection to interface with a user-facing camera in a lid of the user device; and
- circuitry to:
  - access a privacy switch state of the user device, the privacy state based at least in part on location information obtained from a location module of the user device;
  - control access by the SoC to data from the user-facing camera based on the privacy switch state, wherein:
  - when the privacy switch state is in a first state, the circuitry is to:
    - block data from the user-facing camera from being passed to the host SoC; and
    - cause a privacy indicator of the user device to emit a first color indication; and
  - when the privacy switch state is in a second state, the circuitry is to:
    - allow data from the user-facing camera or information about the data from the user-facing camera to be passed to the host SoC; and
    - cause the privacy indicator of the user device to emit a second color indication.

2. The apparatus of claim 1, further comprising memory to store one or more security policies, wherein the circuitry is to control access to the data from the user-facing camera based on the one or more security policies and the privacy switch state.

3. The apparatus of claim 1, wherein the circuitry is to allow information about the data from the user-facing camera to be passed to the host SoC and not allow the data from the user-facing camera to be passed to the host SoC.

4. The apparatus of claim 1, wherein the circuitry is further to:
- cryptographically secure the data from the user-facing camera; and
- allow the cryptographically secured data to be passed to the SoC.

5. A system comprising:
- a base;
- a lid coupled to the base via a hinge;
- a host system-on-chip (SoC) in the base;
- a user-facing camera in the lid;
- a privacy switch;
- a privacy indicator comprising a multicolor light emitting diode (LED):
- a location module;
- a controller hub in the lid, the controller hub comprising circuitry coupled to the user-facing camera and the privacy switch, wherein the circuitry is to control a state of the privacy switch based at least in part on location information obtained from the location module and to control access by the SoC to data from the user-facing camera based on the state of the privacy switch, wherein the circuitry is to:
when the privacy switch state is in a first state:
block data from the user-facing camera from being passed to the host SoC; and
cause the privacy indicator to emit a first color; and
when the privacy switch state is in a second state:
allow data from the user-facing camera or information about the data from the user-facing camera to be passed to the host SoC; and
cause the privacy indicator to emit a second color.

6. The system of claim 5, further comprising a memory to store one or more security policies, wherein the circuitry is to allow data from the user-facing camera to be passed to the host SoC based on the one or more security policies.

7. The system of claim 5, wherein the circuitry is to allow information about the data from the user-facing camera to be passed to the host SoC and not allow the data from the user-facing camera to be passed to the host SoC.

8. The system of claim 5, wherein the host SoC comprises an image processing module, and the circuitry is to:
cryptographically secure the data from the user-facing camera by one or more of encrypting the data and digitally signing the data; and
allow the cryptographically secured data to be passed to the image processing module.

9. The system of claim 5, wherein the privacy indicator comprises a light emitting diode (LED) and the circuitry is to cause the LED to not be illuminated when the privacy switch is in the first state.

10. The system of claim 5, wherein the circuitry is directly coupled to the privacy indicator.

11. The system of claim 5, further comprising a manageability engine coupled to the circuitry, wherein the circuitry is further to control the state of the privacy switch based on information obtained from the manageability engine.

12. The system of claim 5, further comprising a microphone, wherein the circuitry is further coupled to the microphone and is further to control access to data from the microphone by the host SoC based on the privacy switch state.

13. One or more non-transitory computer-readable media comprising instructions that, when executed by a machine, are to:
access a privacy switch state for a user device, the privacy state based at least in part on location information from a location module of the user device;
control access by a host system-on-chip (SoC) of the user device to data from a user-facing camera of the user device based on the privacy switch state, wherein:
when the privacy switch state is in a first state, the instructions are to:
block data from the user-facing camera from being passed to the host SoC; and
cause a privacy indicator of the user device to emit a first color indication; and
when the privacy switch state is in a second state, the instructions are to:
allow data from the user-facing camera or information about the data from the user-facing camera to be passed to the host SoC; and
cause the privacy indicator of the user device to emit a second color indication.

14. The non-transitory computer-readable media of claim 13, wherein the instructions are further to:
access one or more security policies stored on the user device; and
control access to the data from the user-facing camera based on the one or more security policies and the privacy switch state.

* * * * *